United States Patent
Vincent

(10) Patent No.: US 10,264,071 B2
(45) Date of Patent: Apr. 16, 2019

(54) SESSION MANAGEMENT IN DISTRIBUTED STORAGE SYSTEMS

(71) Applicant: Amazon Technologies, Inc., Reno, NV (US)

(72) Inventor: Pradeep Vincent, Kenmore, WA (US)

(73) Assignee: Amazon Technologies, Inc., Reno, NV (US)

( * ) Notice: Subject to any disclaimer, the term of this patent is extended or adjusted under 35 U.S.C. 154(b) by 724 days.

(21) Appl. No.: 14/231,057

(22) Filed: Mar. 31, 2014

(65) Prior Publication Data

US 2015/0280959 A1    Oct. 1, 2015

(51) Int. Cl.
  G06F 12/0868    (2016.01)
  G06F 3/06    (2006.01)
  (Continued)

(52) U.S. Cl.
  CPC .......... H04L 67/1097 (2013.01); G06F 3/067 (2013.01); G06F 3/0622 (2013.01); G06F 3/0659 (2013.01); G06F 17/30171 (2013.01); H04L 67/141 (2013.01); H04L 67/146 (2013.01); H04L 67/18 (2013.01); H04L 67/2842 (2013.01); H04L 69/28 (2013.01); G06F 12/0868 (2013.01);
  (Continued)

(58) Field of Classification Search
  CPC . H04L 67/1097; H04L 67/18; H04L 67/2482; H04L 69/28
  See application file for complete search history.

(56) References Cited

U.S. PATENT DOCUMENTS 5,701,480 A    12/1997 Raz
5,860,137 A *  1/1999 Raz .................... G06F 13/4256
                                                  707/E17.032
(Continued)

FOREIGN PATENT DOCUMENTS

CN    1481636    3/2004
CN    102687487  9/2012
(Continued)

OTHER PUBLICATIONS

USENIX, "A Directory Index for Ext2", Daniel Phillips, Sep. 19, 2001, pp. 1-13.
(Continued)

*Primary Examiner* — Davoud A Zand
*Assistant Examiner* — Albert Chiou
(74) *Attorney, Agent, or Firm* — Robert C. Kowert; Meyertons, Hood, Kivlin, Kowert & Goetzel, P.C.

(57) ABSTRACT

A request for a session identifier for a particular client is transmitted from an access subsystem of a storage service to a metadata subsystem of the service. A session identifier based on a persistent session storage location at which metadata of the client session are stored is received at the access subsystem. The session identifier is cached at the access subsystem prior to its transmission to the client. A lock state indicator generated by the metadata subsystem in response to a particular request from the client during the client session may also be cached at the access subsystem. Subsequent storage requests from the client during the session may be handled by the access subsystem using the cached session identifier and lock state indicator.

22 Claims, 69 Drawing Sheets

(51) Int. Cl.
*G06F 17/30* (2006.01)
*H04L 29/06* (2006.01)
*H04L 29/08* (2006.01)

(52) U.S. Cl.
CPC ............... *G06F 2212/1052* (2013.01); *G06F 2212/263* (2013.01); *G06F 2212/284* (2013.01); *G06F 2212/314* (2013.01); *G06F 2212/463* (2013.01); *G06F 2212/466* (2013.01)

(56) References Cited

U.S. PATENT DOCUMENTS

| | | | |
|---|---|---|---|
| 6,389,420 | B1 | 5/2002 | Vahalia et al. |
| 6,654,772 | B1 | 11/2003 | Crow et al. |
| 6,842,754 | B2 | 1/2005 | Muntz |
| 7,043,637 | B2 | 5/2006 | Bolosky et al. |
| 7,065,618 | B1 | 6/2006 | Ghemawat et al. |
| 7,240,114 | B2 | 7/2007 | Karamanolis et al. |
| 7,574,443 | B2 * | 8/2009 | Bahar ................ G06F 9/5011 |
| 7,747,584 | B1 | 6/2010 | Jernigan, IV |
| 8,112,395 | B2 | 2/2012 | Patel et al. |
| 8,112,452 | B2 | 2/2012 | Adya et al. |
| 8,205,090 | B2 | 6/2012 | Oom Temudo De Castro et al. |
| 8,229,985 | B2 | 7/2012 | Turner et al. |
| 8,285,689 | B2 | 10/2012 | Du et al. |
| 8,356,162 | B2 | 1/2013 | Muff et al. |
| 8,402,216 | B1 | 3/2013 | Nagarkar et al. |
| 8,429,248 | B1 | 4/2013 | Ketrenos et al. |
| 8,489,658 | B2 | 7/2013 | Turner et al. |
| 8,539,008 | B2 | 9/2013 | Faith et al. |
| 8,620,861 | B1 | 12/2013 | Uhrane et al. |
| 8,937,942 | B1 * | 1/2015 | Li ..................... H04L 67/1097 370/386 |
| 9,171,009 | B1 | 10/2015 | Faibish et al. |
| 2002/0138559 | A1 | 9/2002 | Ulrich et al. |
| 2002/0194242 | A1 | 12/2002 | Chandrasekaran et al. |
| 2004/0103105 | A1 | 5/2004 | Lindblad et al. |
| 2004/0148306 | A1 | 7/2004 | Moulton et al. |
| 2004/0181605 | A1 | 9/2004 | Nakatani et al. |
| 2004/0220931 | A1 | 11/2004 | Guthridge et al. |
| 2005/0027795 | A1 | 2/2005 | San Andres et al. |
| 2005/0066095 | A1 | 3/2005 | Mullick et al. |
| 2005/0289143 | A1 | 12/2005 | Oshri et al. |
| 2007/0067332 | A1 | 3/2007 | Gallagher et al. |
| 2007/0083657 | A1 | 4/2007 | Blumenau et al. |
| 2007/0168351 | A1 | 7/2007 | Fachan |
| 2007/0174428 | A1 | 7/2007 | Lev Ran et al. |
| 2008/0104032 | A1 | 5/2008 | Sarkar |
| 2009/0271412 | A1 | 10/2009 | Lacapra et al. |
| 2010/0011037 | A1 | 1/2010 | Kazar |
| 2010/0192018 | A1 | 7/2010 | Aiyer et al. |
| 2010/0205231 | A1 | 8/2010 | Cousins |
| 2011/0131185 | A1 | 6/2011 | Kirshenbaum |
| 2011/0178985 | A1 | 7/2011 | San Martin Arribas et al. |
| 2011/0307534 | A1 | 12/2011 | Peng et al. |
| 2012/0047111 | A1 | 2/2012 | Hayden et al. |
| 2012/0072596 | A1 * | 3/2012 | Kruse ................ G06F 17/3012 709/226 |
| 2012/0079190 | A1 | 3/2012 | Colgrove et al. |
| 2012/0254126 | A1 | 10/2012 | Mitra et al. |
| 2013/0007518 | A1 | 1/2013 | George et al. |
| 2013/0110781 | A1 | 5/2013 | Golab et al. |
| 2013/0218934 | A1 | 8/2013 | Lin et al. |
| 2013/0226887 | A1 | 8/2013 | Braam et al. |
| 2013/0339406 | A1 | 12/2013 | Kanfi |
| 2014/0006465 | A1 | 1/2014 | Davis et al. |
| 2014/0059226 | A1 | 2/2014 | Merrerli et al. |
| 2015/0234846 | A1 | 8/2015 | Moore et al. |

FOREIGN PATENT DOCUMENTS

| | | |
|---|---|---|
| EP | 0665495 | 8/1995 |
| JP | 2002500791 | 1/2002 |
| JP | 2003203029 | 7/2003 |
| JP | 2006227816 | 8/2006 |
| JP | 2006525571 | 11/2006 |
| JP | 2007219741 | 8/2007 |
| JP | 2009-525534 | 7/2009 |
| JP | 201044789 | 2/2010 |
| JP | 2011-242826 | 12/2011 |
| JP | 2011248584 | 12/2011 |
| JP | 2012137977 | 7/2012 |
| WO | 1999038095 | 7/1999 |
| WO | 2004046971 | 6/2004 |
| WO | 2008069811 | 6/2008 |
| WO | 2014/025821 | 2/2014 |

OTHER PUBLICATIONS

"HyperDex: A Distributed, Searchable Key-Value Store" Robert Escriva et al., Aug. 13-17, 2012, pp. 1-12.
"Paxos Made Simple", Leslie Lamport, Nov. 1, 2001, pp. 1-14.
2012 Storage Networking Industry Association, "An Overview of NFSv4: NFSv4.0, NFSv4/1, pNFS, and proposed features" Jun. 2012, pp. 1-14. NFSv4.2.
Amazon Web Services "Amazon Virtual Private Cloud, User Guide, API Version" Feb. 1, 2014, pp. 1-155.
U.S. Appl. No. 14/231,116, filed Mar. 31, 2014, Matti Juhani Oikarinen.
U.S. Appl. No. 14/231,106, filed Mar. 31, 2014, Matti Juhani Oikarinen.
U.S. Appl. No. 14/231,098, filed Mar. 31, 2014, Pradeep Vincent.
U.S. Appl. No. 14/231,095, filed Mar. 31, 2014, Joshua Samuel Hendrickson.
U.S. Appl. No. 14/231,088, filed Mar. 31, 2014, Pradeep Vincent.
U.S. Appl. No. 14/230,378, filed Mar. 31, 2014, Jacob A. Strauss.
U.S. Appl. No. 14/231,077, filed Mar. 31, 2014, Jacob A. Strauss.
U.S. Appl. No. 14/231,070, filed Mar. 31, 2014, Matti Juhani Oikarinen.
U.S. Appl. No. 14/231,047, filed Mar. 31, 2014, Pradeep Vincent.
U.S. Appl. No. 14/231,063, filed Mar. 31, 2014, Matti Juhani Oikarinen.
U.S. Appl. No. 14/701,464, filed Apr. 30, 2015, Tarang Gupta.
U.S. Appl. No. 14/701,462, filed Apr. 30, 2015 Jacob David Luszcz, et al.
International Search Report and Written Opinion, dated Jul. 9, 2015, Amazon Technologies, Inc., pp. 1-13.
Invitation to Respond to Written Opinion from Singapore Application No. 11201608165P, dated Jul. 17, 2017, Amazon Technologies, Inc., pp. 1-10.
Notice of the Reason for Refusal from Japanese Patent Application No. 2016-560580 (English translation and Japanese version), dated Dec. 19, 2017, pp. 1-12.
Unknown, "Technology for Long Distance Live Migration Distributed Storage and Network", IEICE Technical Report NS2013-173, pp. 1-9.
Extended European Search Report from PCT/2015023669, dated Sep. 10, 2017, Amazon Technologies, Inc., pp. 1-5.
Office Action from Chinese Application No. 201580023995.6, dated Sep. 21, 2018, Amazon Technologies, Inc., pp. 1-23.

* cited by examiner

| File store name 702 | Metadata durability policy 704 | Metadata performance targets 706 | Metadata logical block policy 708 | Metadata physical page policy 710 | Metadata caching policy 712 | Data durability policy 714 | Data performance targets 716 | Data logical block policy 718 | Data physical page policy 720 |
|---|---|---|---|---|---|---|---|---|---|
| FS1 | 10-way full replication | W resp time < T1; R resp time < T2 | Fixed LB size = 512KB, dynamic allocation | Fixed pp size = 8KB | Cache timeout = C1; block realloc ineligibility timeout = BR1 | 12/6 erasure coding | W resp time < T3; R resp time < T4; W tput > Y1; R tput > Z1 | Dynamic LB sizes = 1K, 1K, 2K, 2K, 4K,...; static allocation | PP size = LB size |
| FS2 | 3-way full replication | R resp time < T7 | Fixed LB size = 1MB, static allocation | Fixed pp size =16KB | Cache timeout = C2; block realloc ineligibility timeout = BR2 | 6/4 erasure coding | W tput > Y2; R tput > Z2 | Fixed LB size = 4MB, static allocation | PP size = 32KB |
| ⋮ | | | | | | | | | |

FIG. 7

| Content type 3702 | I/O type 3704 | Access pattern 3706 | I/O payload size 3708 | Object size 3710 | Congestion control parameter settings 3710 |
|---|---|---|---|---|---|
| Metadata | Read | Sequential | < 4KB | 0 to S1 MB | Offset-dependent priority, linear |
| Metadata | Write | Random | Any | Any | Equal priority |
| Data | Read | Sequential | > 64KB | > 128MB | Offset-dependent priority, exponential decay |
| ... | | | | | |

| Attempt count = 1 | Attempt count = 2 | Attempt count = 3 | Attempt count = 4 | Rebalancing |
|---|---|---|---|---|
| AL[CPU] <= 0.5*AC[CPU] && AL[Net] <= 0.5*AC[Net] && AL[Mem] <= 0.5*AC[Mem] && AL[Dsk] <= 0.5*AC[Dsk] && AL[OSS] <= 0.5*AC[OSS] | AL[CPU] <= 0.55*AC[CPU] && AL[Net] <= 0.55*AC[Net] && AL[Mem] <= 0.55*AC[Mem] | AL[CPU] <= 0.6*AC[CPU] && AL[Net] <= 0.6*AC[Net] | AL[CPU] <= 0.8*AC[CPU] && AL[net] <= 0.8*AC[Net] | (AL[CPU] >=0.85*AC[CPU] <br> \|\| <br> AL[Net] >= 0.85*AC[Net]) <br> && <br> AL[Mem] >= 0.85*AC[Mem] <br> && <br> Seconds-since-last-rebalance > 600 <br> && <br> Estimated-peer-node-connection-acceptance-probability > 70% |

Connection acceptance and rebalancing criteria table 6655

FIG. 66

SESSION MANAGEMENT IN DISTRIBUTED STORAGE SYSTEMS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

Some large provider networks implement a variety of storage services, such as services that implement block-level devices (volumes) or objects that can be modeled as arbitrary bit buckets accessible via respective URLs. However, a number of applications running at data centers of a provider network may still face limitations with respect to their use of some of the more common storage-related programmatic interfaces, such as various industry-standard file system interfaces. Some industry-standard file systems may have been designed prior to the large-scale deployment of network-accessible services, and may therefore support consistency models and other semantics that are not straightforward to implement in distributed systems in which asynchronous computational interactions, failures of individual components and network partitions or networking-related delays are all relatively common.

BRIEF DESCRIPTION OF DRAWINGS

FIG. 7 illustrates examples of the use of distinct combinations of policies pertaining to data durability, performance, and logical-to-physical data mappings for file stores, according to at least some embodiments.

FIG. 26a illustrates an extent for which a free space threshold has been designated, while

FIG. 37 illustrates examples of congestion control policies that may be dependent on the type of storage object being accessed and various characteristics of the requested accesses, according to at least some embodiments.

FIG. 66 illustrates an example of connection acceptance and re-balancing criteria that may be used at an access subsystem node, according to at least some embodiments.

Figure 1:
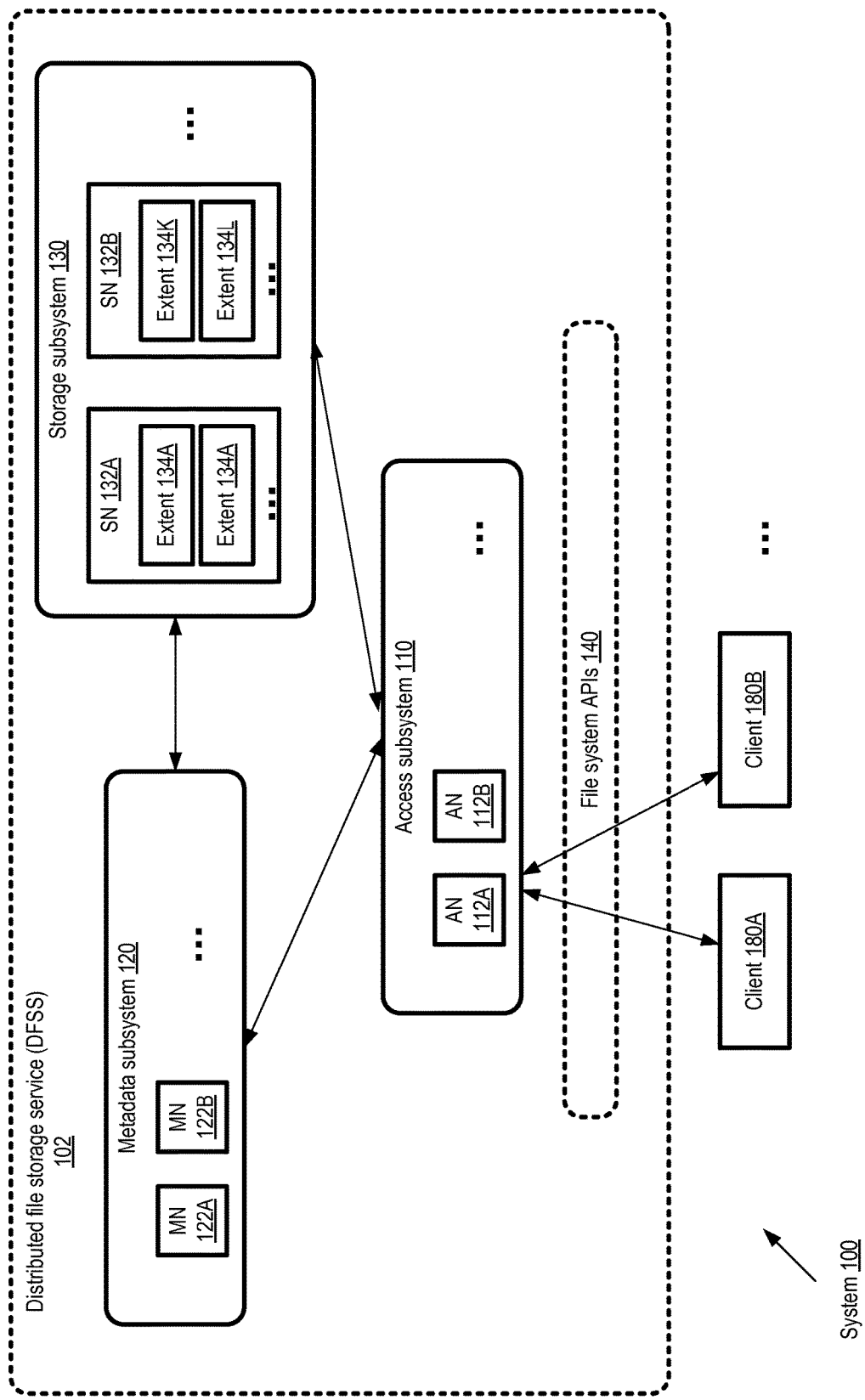
FIG. 1 provides a high-level overview of a distributed file storage service, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for a high-availability, high-durability scalable file storage service are described. In at least some embodiments, the file storage service may be designed to support shared access to files by thousands of clients, where each individual file may comprise very large amounts (e.g., petabytes) of data, at performance, availability and durability levels that are targeted to be independent of the size of the file and/or the number of concurrent users. One or more industry-standard file system interfaces or protocols may be supported by the service, such as various versions of NFS (network file system), SMB (Server Message Block), CIFS (Common Internet File System) and the like. Accordingly, in at least some embodiments, the consistency models supported by the distributed file storage service may be at least as strong as the models supported by the industry-standard protocols—for example, the service may support sequential consistency. In a distributed system implementing a sequential consistency model, the result of an execution of operations implemented collectively at a plurality of executing entities (e.g., nodes or servers of the distributed system) is expected to be the same as if all the operations were executed in some sequential order. The file storage service may be designed for use by a wide variety of applications, such as file content serving (e.g. web server farms, software development environments, and content management systems), high performance computing (HPC) and "Big Data" applications such as media, financial, and scientific solutions requiring on-demand scaling of file store capacity and performance, and the like. The term "file store" may be used herein to indicate the logical equivalent of a file system—e.g., a given client may create two different NFS-compliant file stores FS1 and FS2, with the files of FS1 being stored within one set of subdirectories of a mountable root directory, and the files of FS2 being stored within a set of subdirectories of a different mountable root directory.

To help enable high levels of scalability, a modular architecture may be used for the service in at least some embodiments. For example, a physical storage subsystem comprising some number of multi-tenant storage nodes may be used for file store contents, while a logically distinct metadata subsystem with its own set of metadata nodes may be used for managing the file store contents in one implementation. The logical separation of metadata and data may be motivated, for example, by the fact that the performance, durability and/or availability requirements for metadata may in at least some cases differ from (e.g., more stringent than) the corresponding requirements for data. A front-end access subsystem, with its own set of access nodes distinct from the metadata and storage nodes, may be responsible for exposing network endpoints that allow clients to submit requests to create, read, update, modify and delete the file stores via the industry-standard interfaces, and for handling connection management, load balancing, authentication, authorization and other tasks associated with client interactions. Resources may be deployed independently to any one of the subsystems in some embodiments, e.g., to the access subsystem, the metadata subsystem, or the storage subsystem, without requiring corresponding deployment changes at the other subsystems. For example, if a triggering condition such as a potential performance bottleneck is identified in the access subsystem, or if some set of access subsystem nodes experience a network outage or other failure, additional access subsystem nodes may be brought online without affecting the storage or metadata subsystems, and without pausing the flow of client requests. Similar deployment changes may be made at other subsystems as well in response to various types of triggering conditions. In some embodiments, the access subsystem nodes in particular may be implemented in a largely stateless manner, so that recovery from access node failures may be especially efficient.

In at least some embodiments, the contents of the file store metadata objects (e.g., data structures representing attributes of directory entries, links, etc.) may themselves be stored on devices managed by the storage subsystem—although, as described below, in some cases different policies may be applied to the storage objects being used for the data than are applied to the storage objects being used for metadata. In such embodiments, the metadata subsystem nodes may, for example, comprise various processes or threads of execution that execute metadata management logic and coordinate the storage of metadata contents at the storage subsystem. A given storage subsystem node may include several different types of storage media in some embodiments, such as some number of devices employing rotating magnetic disks and some number of devices employing solid state drives (SSDs). In some embodiments a given storage subsystem node may store both metadata and data, either at respective different storage devices or on the same storage device. The term "file store object" may be used herein to refer collectively to data objects such as files, directories and the like that are typically visible to clients of the storage service, as well as to the internal metadata structures (including for example the mappings between logical blocks, physical pages and extents discussed below), used to manage and store the data objects.

In at least some embodiments, the distributed file storage service may be built using resources of a provider network, and may be designed primarily to fulfill storage requests from other entities within the provider network. Networks set up by an entity such as a company or a public sector organization to provide one or more network-accessible services (such as various types of cloud-based computing or storage services) accessible via the Internet and/or other networks to a distributed set of clients may be termed provider networks herein. Some of the services may be used to build higher-level services: for example, computing, storage or database services may be used as building blocks for a content distribution service or a streaming data processing service. At least some of the services of a provider network may be packaged for client use in service units called "instances": for example, a virtual machine instantiated by a virtualized computing service may represent a "compute instance". Computing devices at which such compute instances of the provider network are implemented may be referred to herein as "instance hosts" or more simply as "hosts" herein. A given instance host may comprise several compute instances, and the collection of compute instances at a particular instance host may be used to implement applications of one or more clients. In some embodiments, the file storage service may be accessible from some subset (or all) of the compute instances of a provider network, e.g., as a result of assigning the appropriate network addresses to the access subsystem nodes of the storage service, implementing the authorization/authentication protocols that are used for the virtual computing service, and so on. In some embodiments, clients outside the provider network may also be provided access to the file storage service. In various embodiments, at least some of the provider network services may implement a usage-based pricing policy—e.g., customers may be charged for a compute instance based at least partly on how long the instance was used, or on the number of requests of various types that were submitted from the compute instance. In at least some such embodiments, the file storage service may also employ usage-based pricing for at least some categories of client requests—e.g., the service may keep records of the particular file system interface requests that were completed on behalf of a given customer, and may generate billing amounts for the customer on the basis of those records.

The file store service may support high levels of data durability in some embodiments, e.g., using any of a number of different replication techniques. For example, in one embodiment, file store data and metadata may be physically stored using storage units called extents, and the contents of an extent may be replicated at various physical storage devices. The contents of an extent may be referred to herein as a "logical extent", to distinguish it from the physical copies at the different physical storage devices, which may be referred to as "extent replicas", "replica group members", or "extentlets" or a "replica group". In one implementation, for example, a file (or a metadata object) may be organized as a sequence of logical blocks, with each logical block being mapped to one or more physical data pages. A logical block may considered a unit of striping, in that at least in some implementations, the probability that the contents of two different logical blocks of the same file (or the same metadata structure) are stored at the same storage device may be low. Each replica of a given logical extent may comprise some number of physical data pages. In some embodiments, erasure-coding based extent replicas may be used, while in other embodiments, other replication techniques such as full replication may be used. In at least one embodiment, a combination of erasure coding and full replication may be used. A given modification request from a client may accordingly be translated into a plurality of physical modifications at respective storage devices and/or respective storage subsystem nodes, depending on the nature of the replication policy in use for the corresponding file store object or metadata. In some embodiments, one or more of the extent replicas of a replica group may be designated as a master replica, and updates to the extent may be coordinated, e.g., using a consensus-based replicated state machine, by the storage service node that is hosting the current master. Such a storage service node may be termed a "master node" or a "leader" herein with respect to the extent for which it stores a master replica. In one implementation, if N extent replicas of a given logical extent are being maintained, a quorum of M (where $M>=N/2$) of the replicas may be needed, and such a quorum may be obtained using an update protocol initiated by the leader/master node, before a particular update is committed. In one embodiment, some extents may be used entirely for file contents or data, while other extents may be used exclusively for metadata. In other embodiments, a given extent may store both data and metadata. In some implementations, a consensus-based protocol may be used to replicate log records indicating state changes of a given file store, and the contents of the state may be replicated using a plurality of extents (e.g., using either full replication or erasure-coded replicas). Replicated state machines may also be used to ensure consistency for at least some types of read operations in various embodiments. For example, a single client read request may actually require a plurality of physical read operations (e.g., of metadata and/or data) at various extents, and the use of replicated state machines may ensure that the result of such a distributed read does not violate the read consistency requirements of the targeted file store.

A variety of different allocation and sizing policies may be used to determine the sizes of, and relationships among, logical blocks, physical pages, and/or the extents for data and metadata in different embodiments as described below. For example, in one straightforward implementation, a file may comprise some number of fixed size (e.g., 4-megabyte)

logical blocks, each logical block may comprise some number of fixed size (e.g., 32-kilobyte) physical pages, and each extent may comprise sufficient storage space (e.g., 16 gigabytes) to store a fixed number of pages. In other embodiments, different logical blocks may differ in size, physical pages may differ in size, or extents may differ in size. Extents may be dynamically resized (e.g., grown or shrunk) in some embodiments. Static allocation may be used for logical blocks in some embodiments (e.g., all the physical storage for the entire logical block may be allocated in response to the first write directed to the block, regardless of the size of the write payload relative to the size of the block), while dynamic allocation may be used in others. Various techniques and policies governing logical block configurations and corresponding physical storage space allocations are described below in further detail. In some embodiments, different file stores managed by the file storage service may implement distinct block/page/extent sizing and configuration policies. Depending on the write sizes that the file system interfaces being used allow clients to specify, a given write operation from a client may result in the modification of only a part of a page rather than the whole page in some cases. If, in a given implementation, a physical page is the minimum level of atomicity with respect to writes supported by the storage subsystem, but write requests can be directed to arbitrary amounts of data (i.e., writes do not have to be page-aligned and do not have to modify all the contents of an integral number of pages), some writes may be treated internally within the storage service as read-modify-write sequences. Details regarding an optimistic conditional-write technique that may be employed for writes that do not cross page boundaries in some such embodiments are provided below. In general, each storage device and/or storage service node may support operations for, and/or store data for, a plurality of different customers in at least some embodiments.

In general, metadata and/or data that may have to be read or modified for a single file store operation request received from a customer may be distributed among a plurality of storage service nodes. For example, delete operations, rename operations and the like may require updates to multiple elements of metadata structures located on several different storage devices. In accordance with the sequential consistency model, in at least one embodiment an atomic metadata operation comprising a group of file system metadata modifications may be performed to respond to a single client request, including a first metadata modification at one metadata subsystem node and a second metadata modification at a different metadata subsystem node. Various distributed update protocols that support sequential consistency may be used in different embodiments—e.g., a distributed transaction mechanism described below in further detail may be used in at least some embodiments for such multi-page, multi-node or multi-extent updates. Of course, depending on the replication strategy being used, each one of the metadata modifications may in turn involve updates to a plurality of extent replicas in some embodiments.

In some embodiments, optimization techniques associated with various aspects of the file storage service, such as the use of object renaming protocols, load balancing techniques that take connection longevity into account, name space management techniques, client session metadata caching, offset-based congestion control policies, and the like, may be employed. Details on these features of the storage service are provided below in conjunction with the description of various figures.

File Storage Service Overview

FIG. 1 provides a high-level overview of a distributed file storage service, according to at least some embodiments. As shown, system 100 comprising storage service 102 may be logically divided into at least tree subsystems: a storage subsystem 130, a metadata subsystem 120 and an access subsystem 110. Each subsystem may comprise a plurality of nodes, such as storage nodes (SNs) 132A and 132B of storage subsystem 130, metadata nodes (MNs) 122A and 122B of metadata subsystem 120, and access nodes (ANs) 112A and 112B of the access subsystem 110. Each node may, for example, be implemented as a set of processes or threads executing at a respective physical or virtualized server in some embodiments. The number of nodes in any given subsystem may be modified independently of the number of nodes in the other subsystems in at least some embodiments, thus allowing deployment of additional resources as needed at any of the subsystems (as well as similarly independent reduction of resources at any of the subsystems). The terms "access server", "metadata server" and "storage server" may be used herein as equivalents of the terms "access node", "metadata node" and "storage node" respectively.

In the depicted embodiment, the storage nodes 132 may be responsible for storing extents 134 (such as extents 134A and 134 at storage node 132A, and extents 134K and 134L at storage node 132B), e.g., using some combination of SSDs and rotating disks. An extent, which may for example comprise some number of gigabytes of (typically but not always) contiguous storage space at some set of physical storage devices, may represent a unit of storage replication in some embodiments—thus, a number of physical replicas of any given logical extent may be stored. Each extent replica may be organized as a number of physical pages in some embodiments, with the pages representing the smallest units in which reads or writes are implemented within the storage subsystem. As discussed below with respect to FIG. 4, a given file store object (e.g., a file or a metadata structure) may be organized as a set of logical blocks, and each logical block may be mapped to a set of pages within a data extent. Metadata for the file store object may itself comprise a set of logical blocks (potentially of different sizes than the corresponding logical blocks for data), and may be stored in pages of a different extent 134. Replicated state machines may be used to manage updates to extent replicas in at least some embodiments.

The access subsystem 110 may present one or more file system interfaces to clients 180, such as file system APIs (application programming interfaces) 140 in the depicted embodiment. In at least some embodiments, as described below in further detail, a set of load balancers (e.g., software or hardware devices that may be configured independently of the storage service itself) may serve as intermediaries between the clients of the storage service and the access subsystem. In some cases, at least some aspects of load balancing functionality may be implemented within the access subsystem itself. In at least some embodiments the access subsystem nodes 112 may represent service endpoints established within the appropriate network fabric that is concurrently being used by clients 180. As described below with respect to FIG. 3, special network addresses associated with isolated virtual networks may be assigned to ANs 112 in some embodiments. ANs 112 may authenticate an incoming client connection, e.g., based on the client's network identity as well as user identity; in some cases the ANs may interact with identity/authentication services similar to Active Directory Service or Kerberos. Some file system protocols that may be supported by the distributed file storage service 102 (such as NFSv4 and SMB2.1) may require a file server to maintain state, for example pertaining to locks and opened file identifiers. In some embodiments, durable server state, including locks and open file states, may be handled by the metadata subsystem 120 rather than the access subsystem, and as a result the access subsystem may be considered a largely stateless server fleet that can be scaled up and down as needed. In some embodiments, as described below with respect to FIG. 6, ANs 112 may cache metadata state pertaining to various file store objects, and may use the cached metadata to submit at least some internal I/O requests directly to storage nodes without requiring interactions with metadata nodes.

The metadata subsystem 120 may be responsible for managing various types of file store metadata structures in the depicted embodiment, including for example the logical equivalents of inodes, file/directory attributes such as access control lists (ACLs), link counts, modification times, real file size, logical block maps that point to storage subsystem pages, and the like. In addition, the metadata subsystem may keep track of the open/closed state of the file store objects and of locks on various file store objects in some embodiments. The metadata subsystem 120 may sequence and coordinate operations so as to maintain desired file store object consistency semantics, such as the close-to-open semantics expected by NFS clients. The metadata subsystem may also ensure sequential consistency across operations that may involve multiple metadata elements, such as renames, deletes, truncates and appends, e.g., using the distributed transaction techniques described below. Although the metadata subsystem 120 is logically independent of the storage subsystem 130, in at least some embodiments, persistent metadata structures may be stored at the storage subsystem. In such embodiments, even though the metadata structures may be physically stored at the storage subsystem, the metadata subsystem nodes may be responsible for such tasks as identifying the particular storage nodes to be used, coordinating or sequencing storage operations directed to the metadata, and so on. In at least some embodiments, the metadata subsystem may reuse some of the state management techniques employed by the storage subsystem in some embodiments, such as the storage subsystem's consensus-based state replication machinery.

Provider Network Implementations of File Storage Service

As mentioned earlier, in some embodiments the distributed storage service may be implemented using resources of a provider network, and may be used for file-related operations by applications or clients running at compute instances of the provider network. In some embodiments a provider network may be organized into a plurality of geographical regions, and each region may include one or more availability containers, which may also be termed "availability zones" herein. An availability container in turn may comprise one or more distinct locations or data centers, engineered in such a way (e.g., with independent infrastructure components such as power-related equipment, cooling equipment, and physical security components) that the resources in a given availability container are insulated from failures in other availability containers. A failure in one availability container may not be expected to result in a failure in any other availability container; thus, the availability profile of a resource is intended to be independent of the availability profile of resources in a different availability container. Various types of applications may be protected from failures at a single location by launching multiple application instances in respective availability containers. Nodes of the various subsystems of the storage service may also be distributed across several different availability containers in some embodiments, e.g., in accordance with the availability/uptime goals of the service and/or the data redundancy requirements for various file stores. At the same time, in some implementations, inexpensive and low latency network connectivity may be provided between resources (such as the hosts or storage devices being used for the distributed file storage service) that reside within the same geographical region, and network transmissions between resources of the same availability container may be even faster. Some clients may wish to specify the locations at which at least some of the resources being used for their file stores are reserved and/or instantiated, e.g., at either the region level, the availability container level, or a data center level, to maintain a desired degree of control of exactly where various components of their applications are run. Other clients may be less interested in the exact location where their resources are reserved or instantiated, as long as the resources meet the client requirements, e.g., for performance, high availability, and so on.

In at least some embodiments, the resources within a given data center may be further partitioned into sub-groups based on differences in expected availability or failure resilience levels. For example, one or more server racks at a data center may be designated as a lower-level availability container, as the probability of correlated failures within a rack may at least in some cases be higher than the probability of correlated failures across different racks. At least in some embodiments, when deciding where to instantiate various components or nodes of the storage service, any combination of the various levels of availability containment described (e.g., the region level, the data center level, or at the rack level) may be taken into account together with performance goals and durability goals. Thus, for some types of storage service components, redundancy/replication at the rack level may be considered adequate, so in general different racks may be used for different components providing the same function (or storing replicas of the same data/metadata). For other components, redundancy/replication may also or instead be implemented at the data center level or at the region level.

Figure 2:
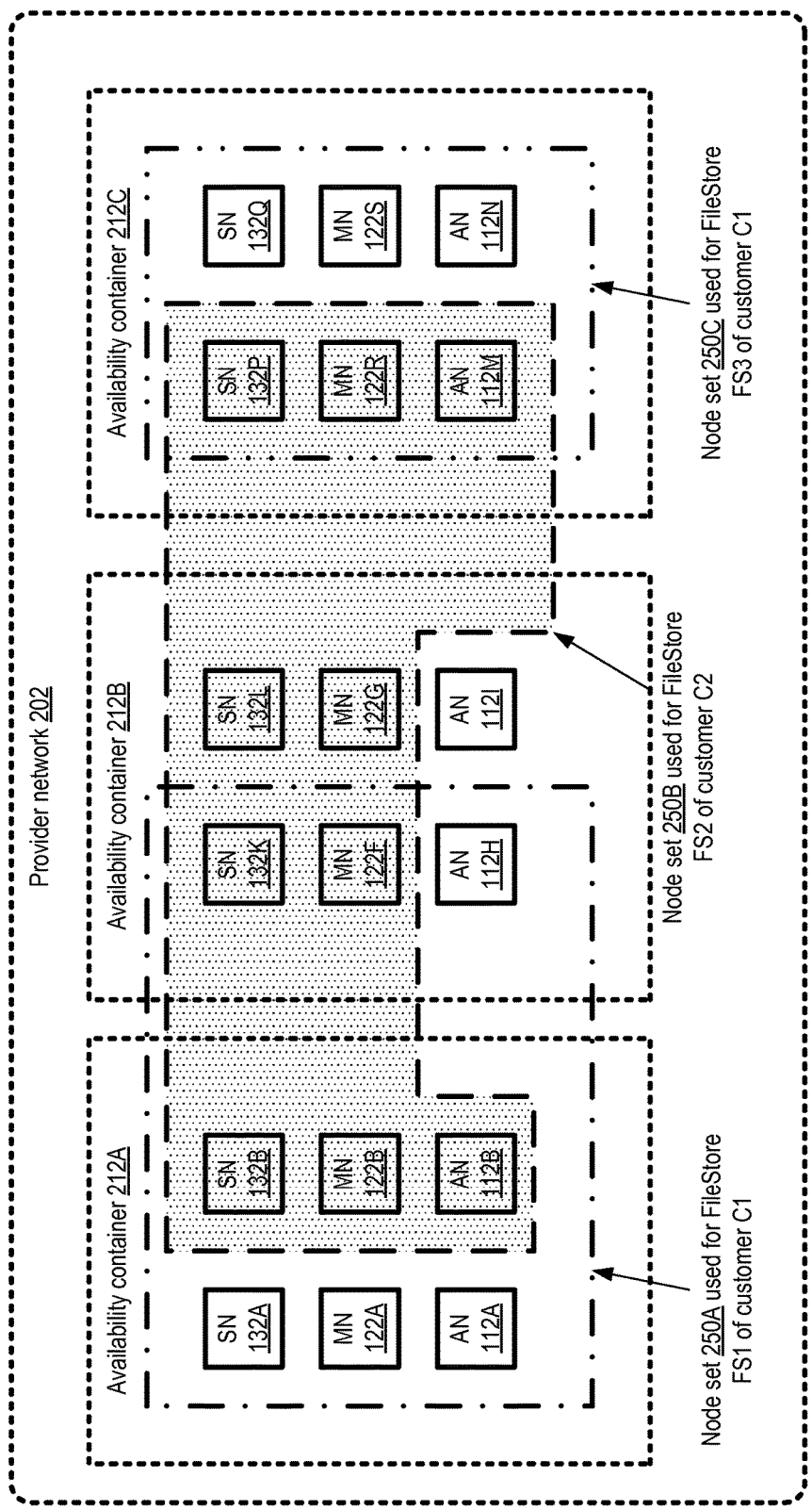
FIG. 2 illustrates the use of resources at a plurality of availability containers of a provider network to implement a file storage service, according to at least some embodiments.

FIG. 2 illustrates the use of resources at a plurality of availability containers 212 of a provider network 202 to implement a file storage service, according to at least some embodiments. In the embodiment depicted, three availability containers 212A, 212B and 212C are shown, each of which comprise some number of storage nodes, metadata nodes and access nodes of the storage service. Since each availability container is typically set up so as to prevent correlated failure events that cross availability container boundaries, the set of storage service nodes that are assigned to a given file store may typically be spread across different availability containers. It is noted that some file stores may have lower availability or durability requirements than others, and may therefore be implemented within a single availability container in at least some embodiments. In one embodiment, when the file storage service is set up, a pool of nodes may be established for each of the three subsystems in each of several availability containers 212, from which specific nodes may be assigned to a given file store as needed. In other embodiments, instead of establishing pre-configured storage service node pools, new nodes may be instantiated as needed.

The collection of ANs, MNs and SNs that collectively implement file storage for a given file store or file system may be referred to as a "node set" 250 for that file store. In the embodiment shown in FIG. 2, the storage service nodes are multi-tenant, in that a given node of any of the subsystems may be responsible for handling requests from several different clients and/or several different customers. It is noted that in various embodiments, a given customer (e.g., a business entity or individual on whose behalf a billing account has been established at the storage service) may set up several different file stores in the depicted embodiment, and that many different client devices (computing devices from which programmatic interfaces may be invoked) may be used to issue file service requests to a single file store by, or on behalf of, a given customer. In at least some embodiments, multiple user accounts (e.g., one or more user accounts for each of several employees of a customer business organization) may be set up under the aegis of a single billing account, and each of the user accounts may submit file storage requests from a variety of client devices.

Node set 250A of FIG. 2, used for file store FS1 of customer C1, comprises SNs 132A, 132B and 132K, MNs 122A, 122B and 122F, and ANs 112A, 112B and 112H, distributed among two availability containers 212A and 212B. Node set 250B, used for file store FS2 of a different customer C2, comprises nodes in three availability containers 212A, 212B and 212C: SNs 132B, 132K, 132L and 132P, MNs 122B 122F, 122G and 122R, and ANs 112B and 112M. Node set 250C, used for file store FS3 of customer C1, uses nodes of availability container 212C alone: SNs 132P and 132Q, MNs 122R and 122S, and ANs 112M and 112N. The specific nodes that are to be used for a given file store may be selected on demand based on various factors, e.g., by a placement component of the storage service, and the node set may change over time in view of changing storage space needs, performance needs, failures and the like. A given storage device at a single storage node may store data and/or metadata belonging to different clients in at least some embodiments. In at least some embodiments, a single extent may comprise data and/or metadata of a plurality of clients or customers.

At least with respect to the SNs, redundancy or replication may be implemented along several different dimensions for a given file store in some embodiments. As the amount of data in a given file grows, for example, the various logical blocks of the file may in general be mapped to different logical extents. Thus, file striping may be implemented at the logical-block level, which may help to improve performance for certain patterns of I/O requests and may also reduce the time taken to recover a large file in case one of the storage nodes or devices being used for the file fails. Metadata for the file may also be striped across multiple metadata logical extents and managed by multiple MNs in some implementations. Each logical extent (whether for data or metadata) in turn may be replicated across multiple SNs at different availability containers 212, e.g., using erasure coding or full replication, to achieve the desired degree of data durability. As noted earlier, in at least one embodiment replication may be implemented across lower-level availability containers, e.g., by choosing different racks within the same data center for different replicas. ANs and MNs may also be organized into redundancy groups in some embodiments, so that if some AN or MN fails, its workload may be quickly taken up by a different member of its redundancy group.

In some embodiments, a provider network 202 may support establishment of "isolated virtual networks" (IVNs) on behalf of various customers. An IVN (which may also be referred to in some environments as a virtual private cloud or VPC) set up for a given customer may comprise a collection of computing and/or other resources in a logically isolated section of the provider network, over which the customer is granted substantial control with respect to networking configuration. In some embodiments, for example, a customer may select the IP (Internet Protocol) address ranges to be used for the IVN resources, manage the creation of subnets within the IVN, and the configuration of route tables, gateways, etc. for the IVN. For at least some of the devices within an IVN in some embodiments, the network addresses may not be visible outside the IVN, at least by default. In order to enable connectivity between an IVN and the customer's external network (e.g., devices at the customer's data center or office premises), a virtual interface that is configured for use with private addresses (and may therefore be termed a private virtual interface) and a virtual private gateway may be set up. In some embodiments one or more VPNs (virtual private networks) may be configured between the customer's IVN and external networks (such as the customer's office network or the customer's data centers). In at least some embodiments, such VPNs may utilize secure networking protocols such as IPSec (Internet Protocol Security), SSL/TLS (Secure Sockets Layer/Transport Layer Security), DTLS (Datagram Transport Layer Security) and the like.

Figure 3:
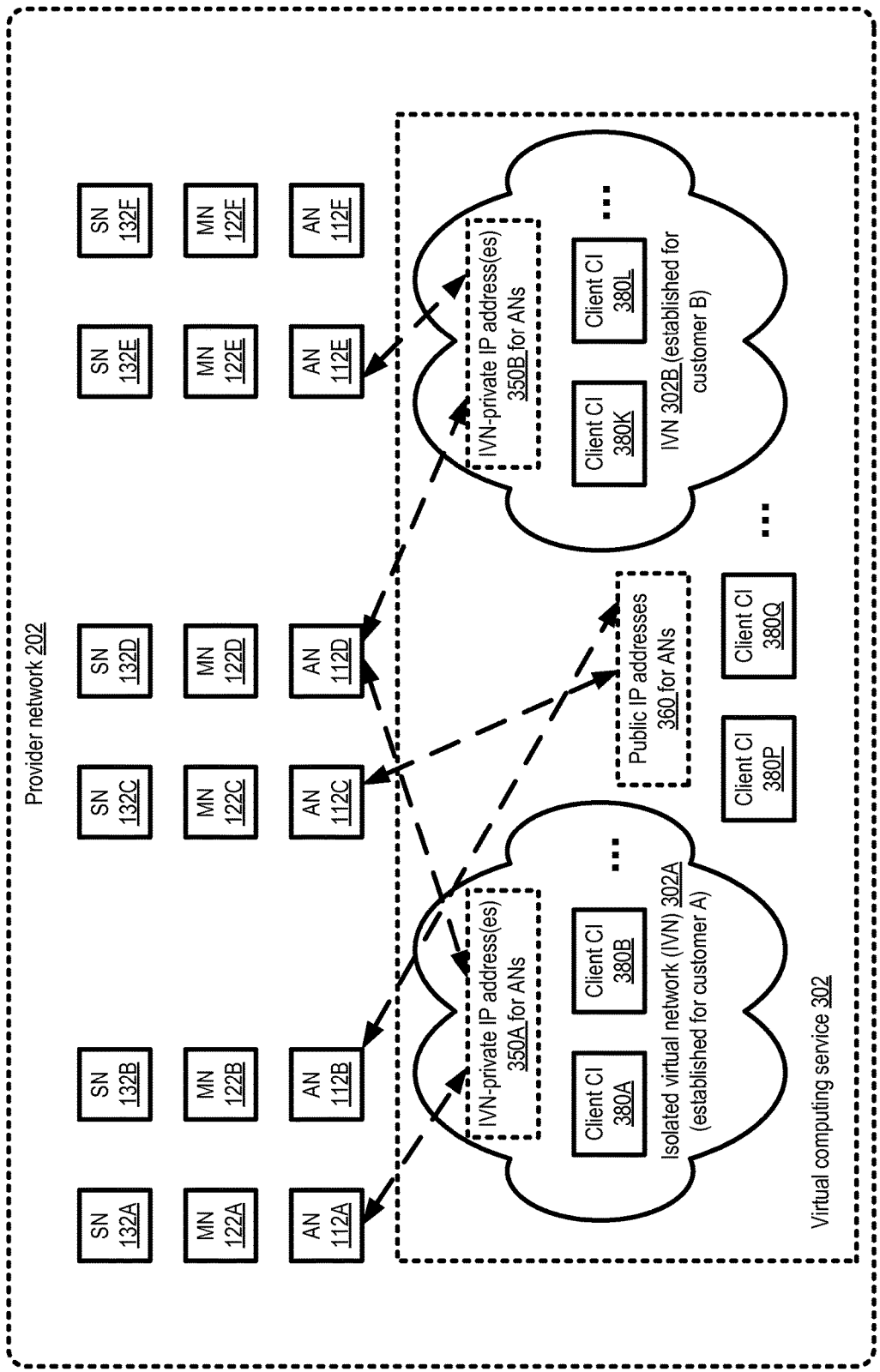
FIG. 3 illustrates a configuration in which network addresses associated with isolated virtual networks are assigned to access subsystem nodes of a storage service, according to at least some embodiments.

In some embodiments, for security or other reasons, access to a given file store managed by a distributed storage service may be limited to a specific set of client devices within one or more IVNs. FIG. 3 illustrates a configuration in which network addresses associated with isolated virtual networks 302 are assigned to access subsystem nodes of a storage service, according to at least some embodiments. As a consequence of such address assignments, only those clients whose network addresses also lie within the IVN may be able to access the file store via the ANs 112. As shown, the provider network 202 in FIG. 3 includes SNs 132A-132F, MNs 122A-122F, and ANs 112A-112F. Two IVNs 302A and 302B have been set up in the provider network 202, for customers A and B respectively. Each IVN includes a number of compute instances (CIs) of virtual computing service 302, at which applications that require file storage services may be run. In addition to the CIs shown within the IVNs 302A (e.g., CIs 380A and 380B) and 302B (CIs 380K and 380L), other CIs (e.g., 380P and 380Q) may also run on instance hosts outside the IVNs in the depicted embodiment—thus, not all clients of the file storage service need necessarily belong to an IVN 302.

In order to enable access to the file storage service from CIs within IVN 302A, ANs 112A and 112D have been assigned private IP (Internet Protocol) addresses 350A associated with IVN 302A. As a result, client CIs 380A and 380B of IVN 302A may invoke the file storage service interfaces using addresses 350A, and may be able to rely on various network isolation and security features already implemented for IVNs when interacting with the file storage service. Similarly, ANs 112D and 112E may be assigned private network addresses of IVM 302B, enabling secure access from client CIs 380K and 380L of IVN 302B. It is noted that a given AN (such as 112D) may be assigned more than one network address in at least some embodiments, allowing a single AN's resources to be shared by multiple IVNs. In other embodiments, each AN may be restricted to network addresses of no more than one IVN. In addition to the private addresses, in some embodiments, public network addresses (e.g., IP addresses accessible from the public Internet) may also be used for at least some ANs such as AN 112C, enabling access from CIs such as 380P or 380Q that are not part of an IVN. In one embodiment, clients located outside the provider network 202 may also be able to access the storage service using public IP addresses. In some embodiments, a single (private or public) network address may be assigned to a plurality of ANs 112, so that, for example, incoming work requests may be balanced across multiple ANs, and AN failover may be implemented without impacting clients (e.g., clients may continue to send file store requests to the same address even after a particular AN fails, because the remaining ANs with the same network address may continue to respond to client requests).

Logical Blocks, Pages, and Extents

Figure 4:
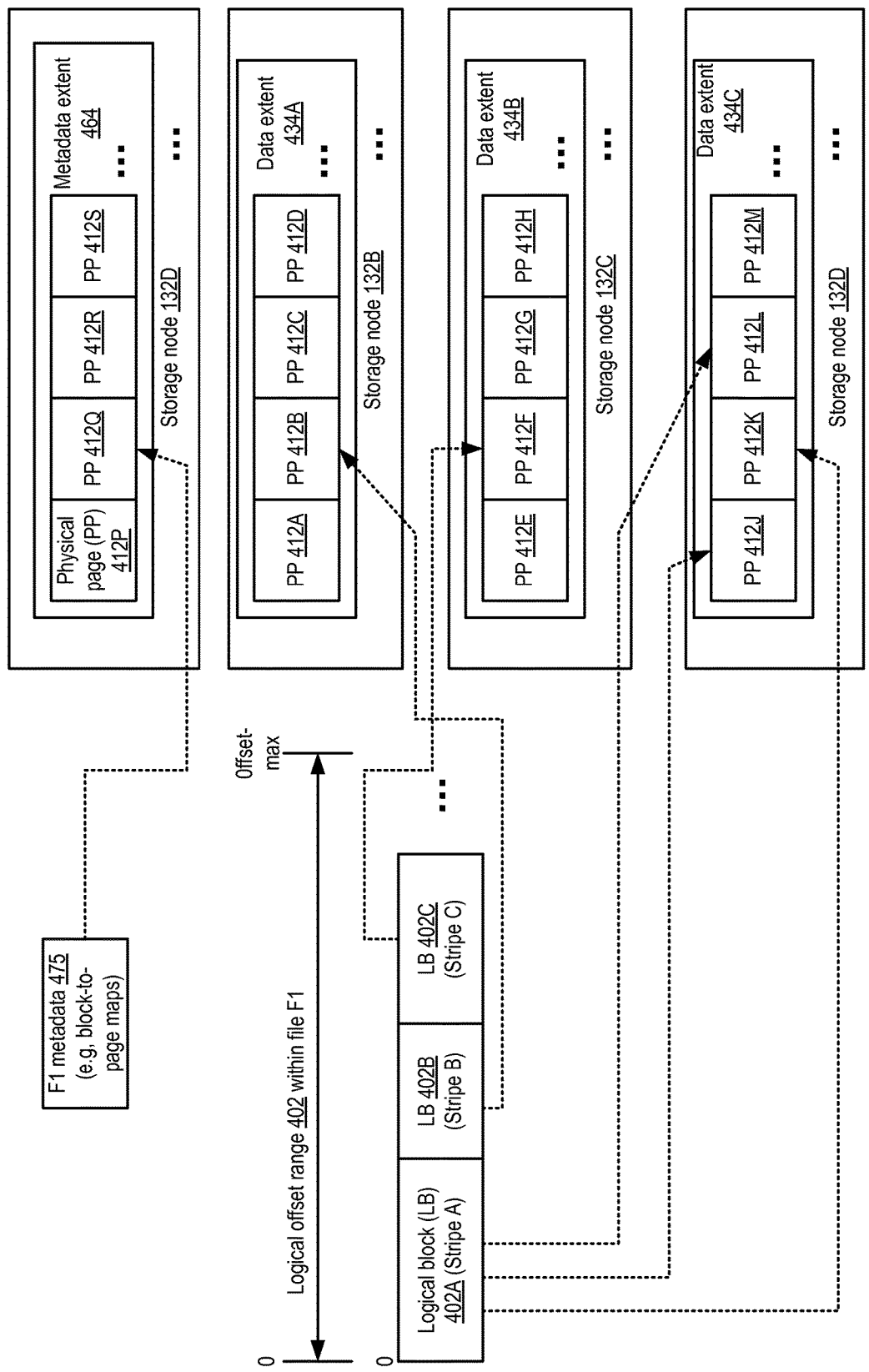
FIG. 4 illustrates a mapping between file storage service objects, logical blocks, and physical pages at one or more extents, according to at least some embodiments.

FIG. 4 illustrates a mapping between file storage service objects, logical blocks, and physical pages at one or more extents, according to at least some embodiments. Three logical blocks LB 402A, 402B and 402C have been configured for a file F1. Logical blocks may also be referred to herein as stripes, as the contents of different logical blocks of a given object such as file or metadata structure may typically be stored at distinct storage locations. In some embodiments, physical separation of stripes such as stripes A, B and C of file F1 may be enforced—e.g., no two stripes of a given object may be stored at the same physical storage device. In other embodiments, physical separation of stripes may occur with a high probability without explicit enforcement, e.g., due to the use of random or near-random distribution of stripes across large numbers of physical devices. In at least some embodiments, logical block sizes may vary within a given file or metadata structure. In other embodiments, all the logical blocks of at least some storage service objects may be of the same size. The contents of each logical block 402 may be stored in one or more physical pages (PPs) 412 of a given data extent 434 in the depicted embodiment. Thus, for example, contents of LB 402 have been written to PPs 412J, 412K and 412L at data extent 434C of storage node 132D. Contents of LB 403 are stored in PP 412B within data extent 434A of storage node 132B, and contents of LB 404 are stored in PP 412F of storage extent 434B at storage node 132C. To simplify the discussion of the mapping between blocks and pages, extent replicas are not shown in FIG. 4. At least in the depicted embodiment, the techniques used for replication of extents may be independent of the techniques used for mapping blocks to pages.

In at least some embodiments, as described below in further detail, dynamic on-demand allocation may be used for physical storage, in accordance with which only the set of pages actually needed to store the write payload of a given write request may actually be allocated when the write request is received. Consider an example scenario in which the logical block size of a particular LB is 8 megabytes, a fixed page size of 64 kilobytes is being used for the extent to which the LB is mapped, and the first write directed to the LB comprises a write payload of 56 kilobytes. In such a scenario, only one page (64 kilobytes) of storage space may be allocated in response to the request in embodiments in which on-demand allocation is being used. In other embodiments, physical storage for the entire LB may be set aside in response to the first write request directed to the LB, regardless of the write payload size.

When a client writes to a particular file for the first time, a selected metadata subsystem node may generate metadata 475 for one or more logical blocks 402 (e.g., depending on the size of the write payload relative to the logical block size, more than one logical block may be required in some cases). This metadata 475 itself may be stored in one or more physical pages such as PP 412Q of a metadata extent 464 in the depicted embodiment. The block sizes and/or page sizes being used for metadata structures may differ from those being used for the corresponding data in at least some embodiments. In at least one embodiment, the metadata extents may be stored using a different class or type of storage device (e.g., SSDs) than are used for data (e.g., rotating disks). In some implementations, at least a portion of the metadata and at least a portion of metadata for the same file store object may be stored on the same extent.

In some embodiments, as discussed above, the contents of data extents 434 and/or metadata extents 464 may be replicated, e.g., in order to meet respective data durability requirements. In such embodiments, as described in further detail below, a particular replica of a logical extent may be chosen as the master replica, and updates to the extent may be initiated and/or coordinated by the master replica (or the storage node where the master replica resides), e.g., by propagating the updates to the required number of replicas from the master before indicating that the corresponding update request has succeeded.

The order in which content of a given logical block is written at the storage device at which any given replica of the extent is stored may vary—i.e., if two 32-kilobyte physical pages P1 and P2 corresponding to a particular 1-megabyte logical block are located in the order "P1 followed by P2" on the disk or SSD, this may not necessarily imply that the data in P1 has a lower starting offset within the logical block than the data in P2. In some embodiments, pages may be moved (i.e., rearranged within their storage device) after they are first written, e.g., to facilitate improved sequential read or write performance. Within a given extent or extent replica, physical pages associated with several different files may be stored—for example, in metadata extent 634, block-to-page maps (or other metadata) of one or more files other than F1 may be stored in PPs 412P, 412R and 412S. Similarly, pages 412A, 412C, 412D, 412E, 412G, 412H, and 412M may all store contents of files other than F1. In some embodiments, a large enough number of extents may be established that the probability of any two logical blocks of the same file being mapped to the same extent (e.g., to the same replica group of extents) may be quite low. In such a scenario, it may be possible to respond in parallel to concurrent I/O requests directed to different logical blocks of the same file, as the requests may be directed (in most cases) to different storage nodes and different storage devices. In at least one embodiment, the storage system may in general tend to distribute logical blocks in an apparently random or near-random manner among available extents, e.g., by selecting the extent to be used for a particular block based on factors such as the amount of available free space at the time that the particular block is first written.

Figure 5:
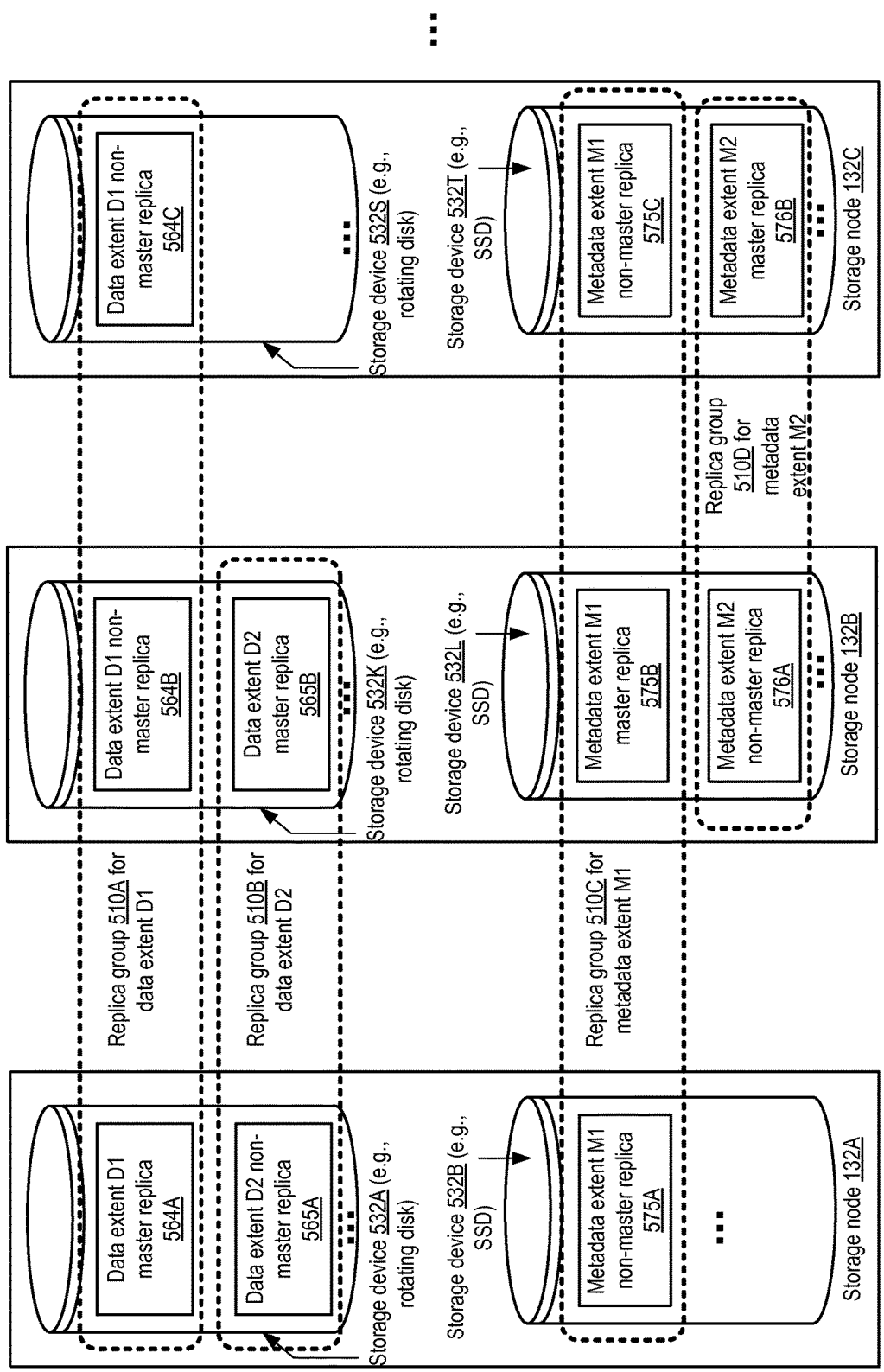
FIG. 5 illustrates a configuration of replica groups for data and metadata extents, according to at least some embodiments.

FIG. 5 illustrates a configuration of replica groups 510 for data and metadata extents, according to at least some embodiments. Two replica groups 510A and 510B for data extents D1 and D2 are shown, and two replica groups 510C and 510D for metadata extents M1 and M2 are shown. Each replica group illustrated comprises two or more replicas at respective storage devices 532 at respective storage nodes 132 of the storage subsystem, although in general it may sometimes be the case that two physical replicas of the same logical extent are stored on the same storage device or on different storage devices at the same storage node.

Each replica group 510 is shown as comprising one master replica and one or more non-master replicas. The master replica may be responsible for coordinating writes to the members of the replica group, e.g., using a replicated state machine and/or a consensus-based update protocol. In some embodiments, a replicated state machine and/or a consensus-based protocol may also be used for reads as well. The total number of replicas in a replication group may vary as a function of the durability requirements for the file data and/or metadata being stored at the replicas. In FIG. 5, replica 564A is the master replica of group 510A, replica 565B is the master replica of group 510B, replica 575B is the master replica of replica group 510C, and replica 576B is the master replica of replica group 510D. Replica groups 510A and 510C include two non-master replicas each (replicas 564B and 564C for group 510A, and replicas 575A and 575C for group 510B). Different types of replication techniques may be used in various embodiments, such as erasure-coding techniques, full replication, or a combination of full and erasure-coded replicas. In some embodiments, different replication techniques may be used for different file stores.

In at least some embodiments, a variety of different storage devices may be available for storing extent replicas, such as one or more types of SSDs and/or individual or arrayed devices based on rotating magnetic disks. In some embodiments, a given storage node 132 may comprise several different types of storage devices, while in other embodiments a given storage node may only have a single type of storage device available. In the depicted embodiment, storage nodes 132A, 132B and 132C each have an SSD device (devices 532B, 532L and 532T respectively at the three nodes) as well as a rotating disk-based device (532A, 532K and 532S respectively). In some implementations, one particular storage device technology may be preferred, for storing data extent replicas, metadata extent replicas, or for storing both types of extents as long as space is available. In one implementation, for example, metadata extents may be stored on SSDs when possible, while data extents may be stored on cheaper rotating disks. In some embodiments, data and/or metadata extents, or portions thereof, may be migrated from one type of storage device to another, for example based on usage levels.

Metadata Caching

Figure 6:
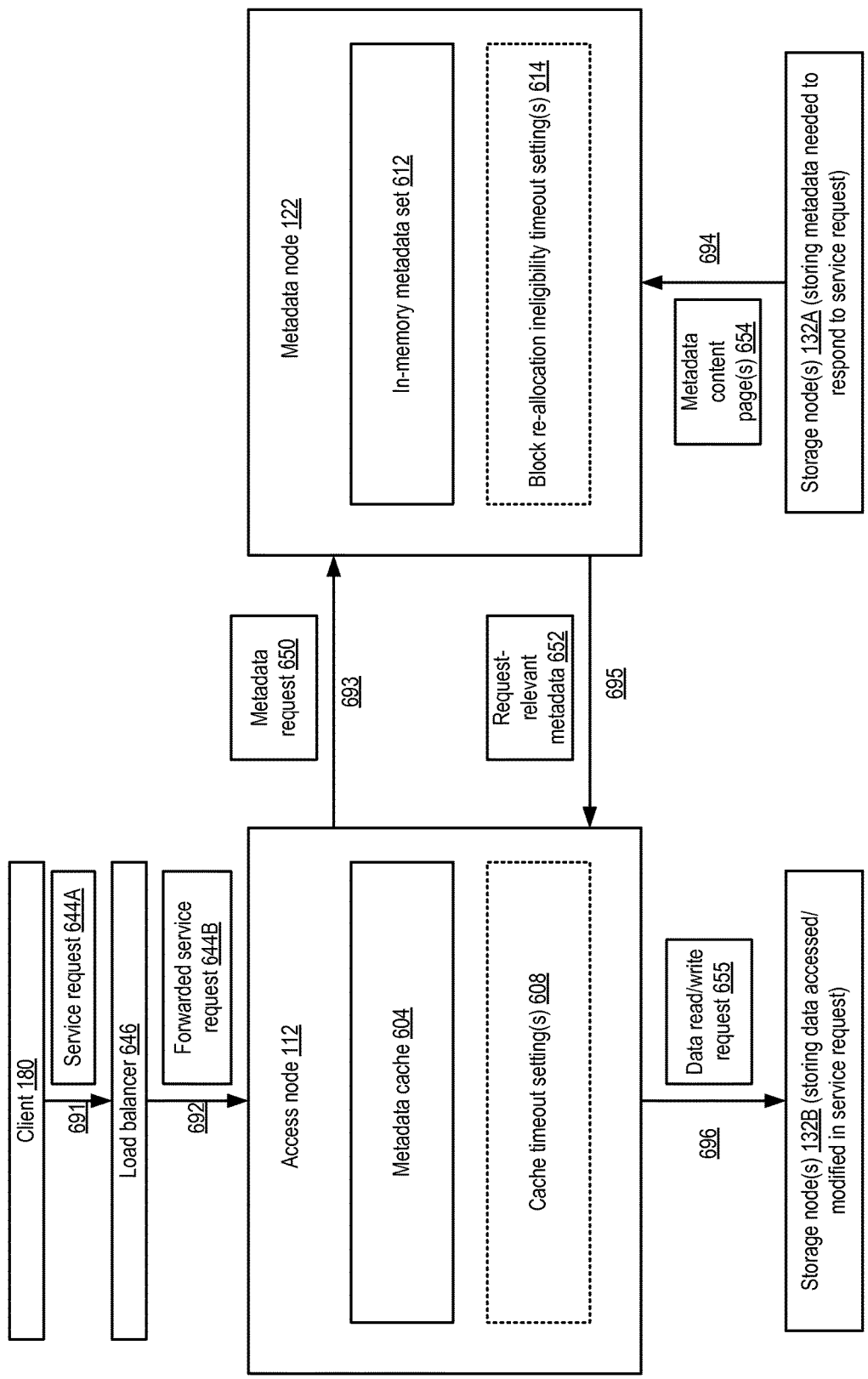
FIG. 6 illustrates examples of interactions associated with caching metadata at access subsystem nodes of a file storage service, according to at least some embodiments.

FIG. 6 illustrates examples of interactions associated with caching metadata at access subsystem nodes of a file storage service, according to at least some embodiments. As mentioned earlier, in some embodiments external load balancers may be configured to distribute client workload among the available access subsystem nodes. In the embodiment depicted in FIG. 6, a service request 644A (such as a write or a read directed to a file) is received from a client 180 at a load balancer 646. The load balancer 646 forwards a corresponding service request 644B to a selected access node 112 via a different network connection than was used for the original service request 644A.

The access node 112 may maintain a cache 604 of metadata objects regarding various file store objects. If metadata sufficient to identify a storage subsystem node 132 that stores the appropriate set of pages corresponding to forwarded service request 644B happens to be in cache 604, the access node may issue read/write requests to the storage node. However, if the metadata is not cached, the access node 112 may submit a metadata request 650 to a selected metadata subsystem node 122, as indicated by arrow 693. As mentioned earlier, the metadata contents may actually be stored at storage subsystem nodes in some embodiments. The metadata node 122 (which may comprise, for example, a process executing the metadata management code) may itself maintain an in-memory set 612 of metadata, comprising another cache layer. If the metadata requested by the access node is not in the in-memory set 612, the metadata node may obtain pages 654 containing the metadata from one or more storage nodes 132A, as indicated by arrow 694, and store the metadata in its in-memory set 612. In some cases, the request 644A from the client may require new metadata to be generated (e.g., if the request was the first write to a file, the metadata node may create metadata entries for the first logical block of the file), in which case the metadata node may ensure that the new metadata is safely stored at the storage nodes 132 before responding to the request 650 in the depicted embodiment.

At least the portion of the metadata obtained from storage node 132A that is required for responding to the client's request (termed request-relevant metadata 652) may be provided to the access node 112, as indicated by arrow 695. The access node may read the metadata, store it in cache 604, and submit read or write request(s) 655 to the appropriate storage node(s) 132 identified by the metadata, as indicated by arrow 696. The storage node(s) 132B may provide a response to the read/write request(s), not shown in FIG. 6, and the access node may in some embodiments respond to the client 180 to indicate whether the requested service operations succeeded or not. The access node 112 may be able to respond to at least some subsequent client requests using the cached metadata, without having to re-obtain the metadata from the metadata subsystem.

In the depicted embodiment, instead of using explicit cache invalidation messages, a timeout-based technique may be used for managing potential staleness of metadata cache entries at the access node. Thus, the access node 112 may use caching timeout setting(s) 608 to determine when to evict any given element of metadata from the cache 604. In some implementations, a given metadata entry may simply be removed from cache 604 after its timeout 608 expires, with no attempt to re-cache it until it is needed for a different client request. In other implementations, or for some selected types of metadata entries, the access node 112 may re-request a metadata entry from the metadata node 122 when its cache timeout expires, or check whether the metadata entry remains valid. In the latter scenario, the timeout may be re-set to the original value each time that the entry is revalidated or refreshed. At the metadata node 122, a different type of timeout setting may be used with respect to a given logical block of metadata in the depicted embodiment. When the metadata node 122 initially generates metadata for some file store object and stores the metadata in a given logical block of a metadata structure, a metadata block re-allocation ineligibility timeout period may be started, which indicates the minimum amount of time that has to pass before that metadata logical block can be re-allocated. (Such a metadata re-allocation may eventually occur, for example, in case the object whose metadata is stored in the block is deleted.) The block re-allocation ineligibility timeout setting(s) 614 may typically be set to a longer time period than the cache timeout settings 608 for the corresponding block metadata. For example, in one implementation, the block re-allocation timeout value may be two weeks, while the cache timeout setting may be one day. In such a scenario, the access node 112 may re-check the validity of a given block of metadata once every day, while the metadata node 122 may ensure that that block is not re-used for some other purpose before two weeks have passed since the initial allocation of the block.

In some embodiments, instead of using a timeout-based mechanism, an explicit lease or lock may be used for metadata entries cached at the access node. In at least one embodiment, an explicit cache invalidation mechanism may be used, in which for example the metadata node 122 may send out invalidation messages when some element of metadata is no longer valid. In one embodiment, the metadata subsystem may mark a block of metadata "invalid" or "inaccessible" in response to metadata changes. When an access node attempts to use invalid cached metadata to access data blocks, an error message indicating that the metadata is invalid may be returned by the metadata subsystem or the storage subsystem to the access node. Thus, the cached metadata may be invalidated implicitly as a result of such error messages. Various combinations of timeout-based, lock/lease-based, implicit and explicit invalidation-based strategies may be used in different embodiments for metadata cached at the access nodes.

In some of the interactions depicted in FIG. 6, such as those indicated by the arrow labeled 693, 694 and 696, some components of the storage service may act as clients of other components. For example, the access node 112 may send internal requests (i.e., requests that are generated within the storage service and use network paths that are not directly accessible to customers of the storage service) to the metadata node (arrow 693), acting as a client of the metadata node. Similarly, both the metadata node and the access node may send internal requests to storage nodes 132, acting as clients of the storage nodes. In some embodiments, the various subsystems may implement internal APIs that can be invoked by other components of the storage service to enable such interactions. A storage node 132 may, for example, respond in the same way whether a particular storage service API was invoked from an access node 112 or from a metadata node 122. Thus, at least in some embodiments, storage service nodes may be agnostic with respect to the sources from which they are willing to receive internal requests.

File Store Policies

In some embodiments, clients may be granted substantial flexibility to control various aspects of the behavior of the file storage service with respect to specific file stores. For example, one or more administrative APIs may be implemented to allow clients to set or modify the durability, performance, availability or other requirements for a particular file store, which may differ from the corresponding requirements for other file stores created on behalf of the same client or other clients. FIG. 7 illustrates examples of the use of distinct combinations of policies pertaining to data durability, performance, and logical-to-physical data mappings for file stores, according to at least some embodiments.

As shown in columns 704 and 714, the durability policies for data and metadata respectively for a given file store such as FS1 may differ, and the durability policies used at different file stores such as FS1 and FS2 may differ for either data, metadata or both. For FS1, 10-way full replication is used for metadata (10 full copies of each page of metadata are maintained), while 12/6 erasure coding is used for data durability (12 erasure coded copies are stored of each data page, of which 6 are needed to reconstruct the contents of the page). Performance goals/requirements for the metadata and data of file stores FS1 and FS2 are indicated in columns 706 and 716 respectively. The performance goals may be expressed in various units, e.g., units for latency or response time (indicated by the label "resp time" in columns 706 and 716) versus units for throughput (indicated by the label "tput"), and in some cases different sets of requirements may be specified for reads (indicated by the label R in columns 706 and 716) than for writes (indicated by the label W). The performance goals may be used, for example, to select the types of storage devices that should be used for a given file store's metadata or data.

Different approaches may be used for allocating storage space for storage objects for respective file stores in the depicted embodiment. For example, as indicated in column 708, a fixed logical block size of 512 kilobytes and a policy of dynamic page allocation is used for FS1 metadata, while for FS2 metadata, physical storage for one-megabyte logical blocks may be allocated statically. As shown in column 718, for FS1 data, a varying logical block size may be used, with the first few logical blocks of a given file being set to 1 kilobyte, 1 kilobyte, 2 kilobytes, 2 kilobytes, etc., with the logical block size gradually increasing as the file grows. For FS2 data, in contrast, fixed-size 4-megabyte logical blocks may be used. The physical page sizes used for metadata may be set as follows (column 710): 8 kilobytes for FS1 and 16 kilobytes for FS2. For data, as shown in column 720, the page size may be set equal to the logical block size for FS1, while the page size may be set to 32 kilobytes for FS2. Respective metadata cache-related settings for FS1 and FS2 are shown in column 712, including metadata cache timeouts and the block reallocation ineligibility timeouts discussed above with reference to FIG. 6. In some embodiments, e.g., in order to decrease implementation complexity of the file storage service, only a discrete set of options may be supported for durability policies, block and page sizing policies, and the like. Other types of policies, such as availability-related or uptime requirements, file store space limits, and the like, may also be set differently for different file stores in some embodiments. In at least one embodiment, clients may be able to choose from among a plurality of pricing policies on a per-file-store basis as well—e.g., some clients may select a storage-space-usage-based pricing policy, while other clients may select a file system API-count-based pricing policy.

Methods of Implementing a Scalable File Storage Service

Figure 8A:
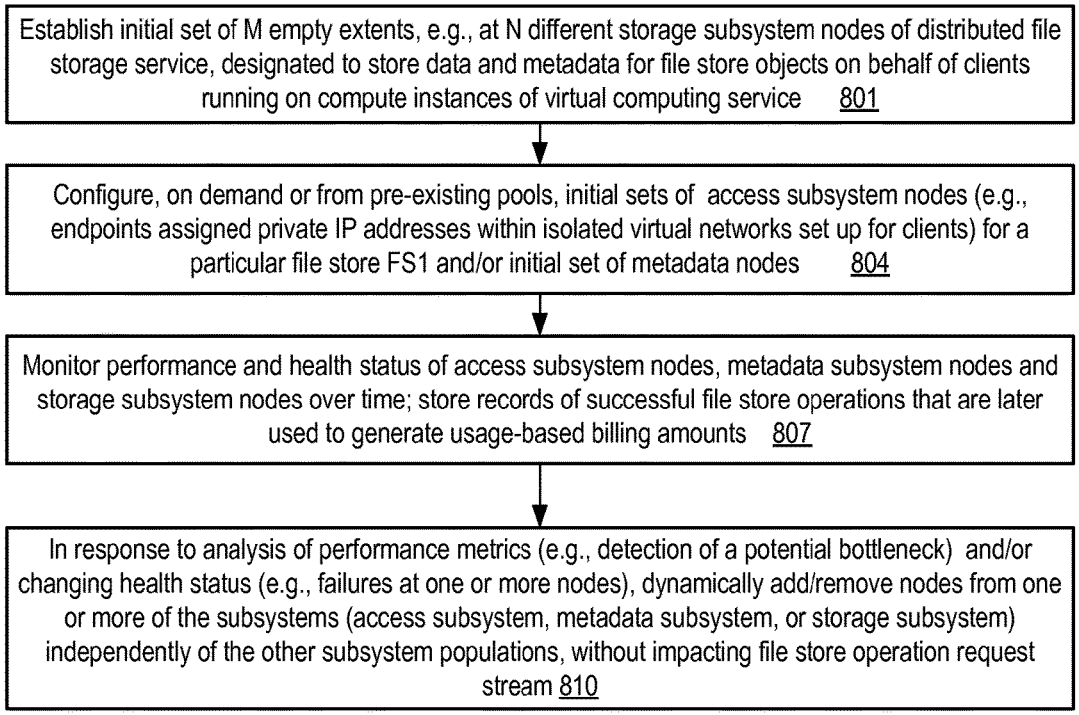
FIG. 8a is a flow diagram illustrating aspects of configuration and administration-related operations that may be performed to implement a scalable distributed file system storage service, according to at least some embodiments.

FIG. 8a is a flow diagram illustrating aspects of configuration and administration-related operations that may be performed to implement a scalable distributed file system storage service, according to at least some embodiments. As shown in element 801, an initial set of M empty extents may be established for data and/or metadata, e.g., at N different storage subsystem nodes of a distributed file storage service during a service initialization procedure. The storage service may be set up to implement file storage operations on behalf of client applications running on compute instances of a virtual computing service established at a provider network in some embodiments. In various embodiments, each storage node may comprise a plurality of extents, e.g., M may be larger than N. In embodiments in which extent contents are replicated for data durability, each of the M empty extents may be capable of storing a respective replica of the contents of a logical extent. Each storage node may comprise one or more storage devices, including for example some number of rotating disk-based devices and/or solid-state store devices. A given extent may be incorporated within a single storage device in some embodiments, or may be spread over multiple storage devices in other embodiments. In one embodiment, all the extents may be of the same size, e.g., based on a configurable parameter associated with the storage service. In other embodiments, different extents may have different sizes, and/or the size of an extent may change over time. The total number of extents in a given instantiation of the storage service may vary over time—e.g., as the size of the metadata and data grows, more storage devices and/or more extents may be deployed. The extents may represent a unit of recovery with respect to data and metadata of the storage service in some embodiments—e.g., each extent may be replicated based on durability policies or settings, using erasure coding, full replication, or some combination of replication techniques. Each extent replica group (i.e., a group of replicas of the same logical data or metadata extent) may include at least one replica designated as a master replica whose storage node (which may also be referred to as a master node or a leader node with respect to the logical extent) is responsible for coordinating updates among the group members. In some embodiments, decisions regarding master selection and/or membership of replica groups may be deferred until the first object of a file store is written. In at least some implementations, the extents may be multi-tenant—e.g., each extent may store data or metadata of a number of different clients or customers.

Some number of access subsystem nodes may be established initially to enable access to at least a particular file store FS1 (element 804) in the depicted embodiment. For example, in an embodiment in which the file store clients comprise compute instances of an isolated virtual network (IVN), private IP addresses accessible only from within the IVN may be assigned to the P access subsystem nodes. Public IP addresses may also or instead be assigned to some or all of the access subsystem nodes in some embodiments. In some embodiments, a pool of partially pre-configured access subsystem nodes may be set up, and specific access nodes may be assigned for particular file stores from the pool; in other embodiments, access nodes may be instantiated on demand. A given network address may be assigned to more than one access subsystem node in at least one embodiment.

In some embodiments, a set of Q metadata nodes may be assigned to the file store FS1 upon file store creation. In other embodiments, metadata nodes (which may also be selected from a pre-configured pool, or may be instantiated dynamically) may be assigned to FS1 on-demand, e.g., when the first write request to an object of FS1 such as a file or a directory is received (as described below with respect to FIG. 8b). Administrative components of the file storage service may monitor the performance and/or health status of various nodes of the access subsystem, the metadata subsystem, and the storage subsystem in the depicted embodiment (element 807). Records of the completed or successful file store operations performed on behalf of any given client may be stored, and such records may be later used to generate usage-based billing amounts for the client in the depicted embodiment. In response to an analysis of observed performance metrics and/or health status changes, nodes may be dynamically added or removed from any of the subsystems without affecting the population of the other layers, and without impacting the stream of incoming file storage requests (element 810). E.g., in response to a detection of a possible performance bottleneck at the access subsystem, or a detection of a failed or unresponsive access subsystem node, more access subsystem nodes may be instantiated without affecting either of the other subsystem nodes. In some cases, if the resource utilization (e.g., CPU or storage utilization) at one or more nodes remains below a threshold for some period of time, such nodes may be eliminated and their workload may be distributed among other nodes. Thus, each of the subsystems may be independently scaled up or down as needed.

Figure 8B:
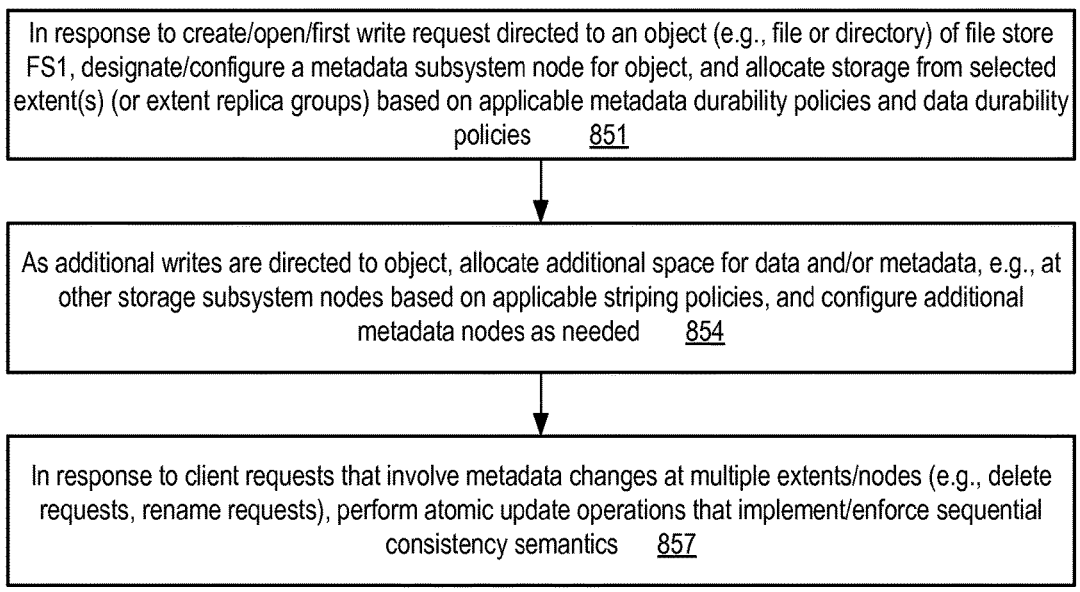
FIG. 8b is a flow diagram illustrating aspects of operations that may be performed in response to client requests at a scalable distributed file system storage service, according to at least some embodiments.

FIG. 8b is a flow diagram illustrating aspects of operations that may be performed in response to client requests at a scalable distributed file system storage service, according to at least some embodiments. In response to a create (e.g., an invocation of an "open" API) or a first write request directed to a file of file store FS1, for example, space may be allocated at one or more selected metadata extents and data extents (element 851). In the depicted embodiment, the metadata subsystem may store the metadata contents at storage subsystem nodes, e.g., the storage capabilities of the storage subsystem may be re-used for metadata instead of implementing a separate storage layer strictly for metadata. In other embodiments, a separate storage subsystem may be used for metadata than is used for data. In embodiments in which replication is being used to achieve desired data durability, space may be allocated at a plurality of metadata and/or data extents, e.g., for all the members of the appropriate extent replica groups. A particular extent may be selected to allocate one or more pages to respond to the first write based on various factors in different embodiments—e.g., based on how full the extent currently is, based on the performance characteristics of the extent relative to the performance requirements of the object being created, and so on. In at least some embodiments, the current "spread" of the objects of the file store may also be taken into account when selecting an extent—e.g., the storage subsystem may attempt to reduce the probability of "hot spots" by avoiding storing too many blocks of a given file store's data or metadata at the same extent or at the same storage node.

As additional writes are directed to objects within FS1, additional space may be allocated for data and/or metadata, e.g., at other storage subsystem nodes based on applicable striping policies (i.e., logical-block-to-physical-page mapping policies), and additional metadata nodes may be configured as needed (element 854). The nodes of each of the three subsystems—the storage subsystem, the access subsystem and the metadata subsystem—may be configured to support multi-tenancy in at least some embodiments—e.g., each storage service node may handle storage requests from, or store data/metadata of, several different clients at the same time. The clients may not be aware that the same resources that are being used for their storage requests are also being used for requests from other clients. Each storage service node may comprise, for example, one or more processes or threads that may be executed using hosts or servers of a provider network in some embodiments.

Over time, the metadata corresponding to a given file store object such as a directory or a file may end up being distributed across several different extents at several different storage nodes. Some file storage operations (e.g., rename operations or delete operations) may require modifications to metadata at more than one extent, or at more than one storage node. In response to a request for such an operation, the storage service may perform an atomic update operation that includes changes at more than one metadata page or more than one metadata extent (element 857) in a manner that supports or enforces sequential consistency. Any of a number of different types of consistency enforcement techniques may be used in different embodiments, such as a distributed transaction technique or a consistent object renaming technique, which are both described in further detail below.

Figure 9:
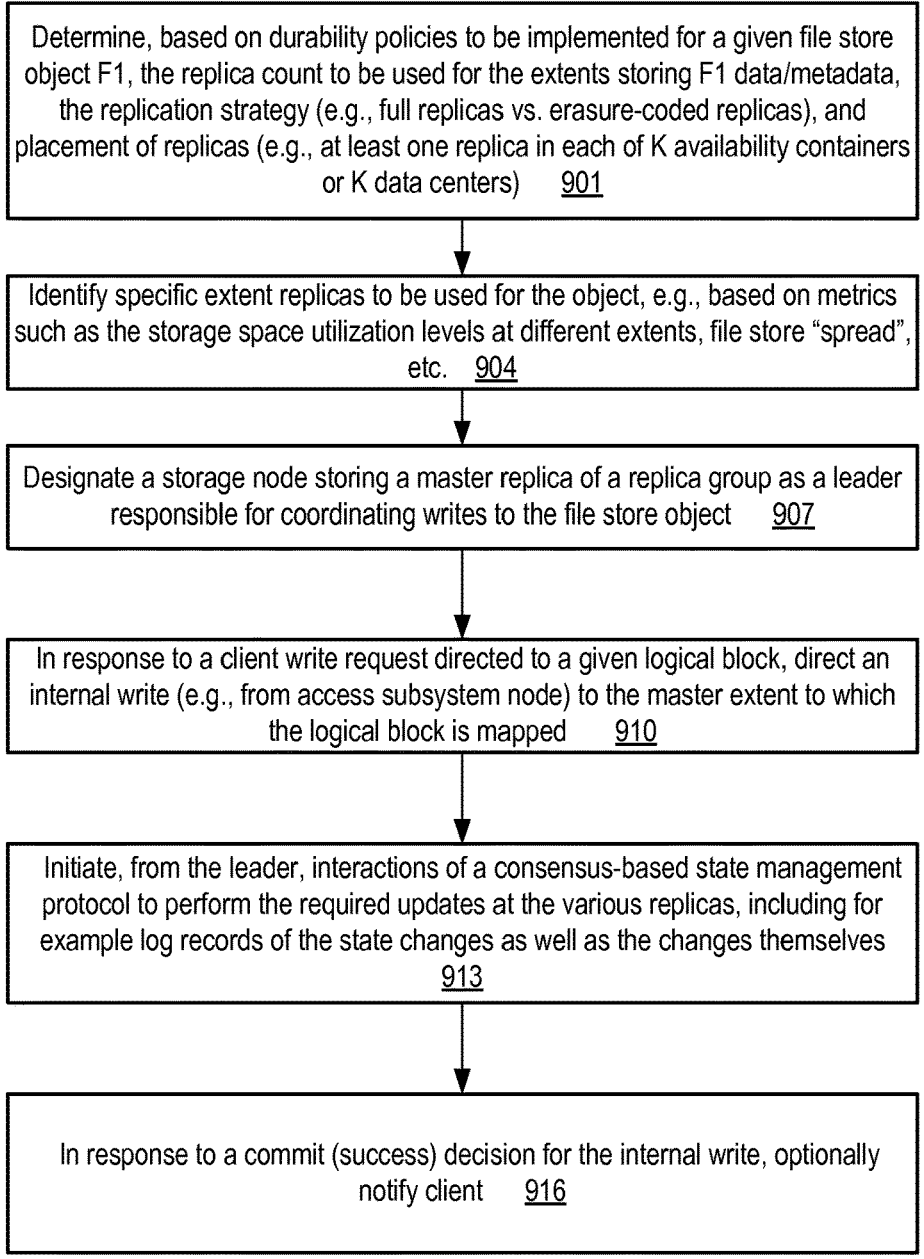
FIG. 9 is a flow diagram illustrating aspects of operations that may be performed to implement a replication-based durability policy at a distributed file system storage service, according to at least some embodiments.

FIG. 9 is a flow diagram illustrating aspects of operations that may be performed to implement a replication-based durability policy at a distributed file system storage service, according to at least some embodiments. As shown in element 901, values for each of a set of durability-related parameters that are to be used for the data and/or metadata of a given file store object F 1 may be determined, e.g., at the time that the object is created. The parameters may include replica counts—e.g., the number of replicas of each page, and therefore each extent, that stores contents of the object or contents of metadata related to the object in some embodiments. The replication strategy (e.g., whether full replication is to be used, erasure-coded replication is to be used, or some combination of such techniques is to be used), and/or the placement of the replicas among the available data center resources may also be specified as parameters in some embodiments. For example, in some embodiments in which the storage service includes a plurality of availability containers, at least one replica may be placed within each of K availability containers. An appropriate set of extent replicas may then be identified in accordance with the parameters (element 904). In some embodiments, the specific physical extents may be chosen based on an analysis of the amount of free space available at various candidates, recent workload levels at the extents or their containing storage servers, locality with respect to expected sources of client requests, the "spread" of the file store for which space is being allocated as described earlier, or based on other metrics. One of the replicas may be designated as the master replica, and its storage node may be designated as a leader responsible for coordinating various operations such as writes directed to the file store object among the members of the replica group (element 907). In at least some embodiments, the particular storage node chosen as a leader for coordinating data writes to a given file store object may also be selected as the leader for coordinating metadata writes for that file store object (even though at least some of the metadata may be stored at different storage nodes than the data).

In response to a particular write request directed to a logical block of the file store object from a client, an internal write request may be directed to the master extent replica of the logical extent to which that logical block is mapped (element 910). Thus, for example, the access node that received the client's request may first have to identify the master extent replica for the logical block, e.g., using metadata extracted from the appropriate metadata subsystem node, and then direct an internal write request to the storage node storing the master replica. In response to receiving the internal write request, the leader node may initiate interactions of a consensus-based state management protocol to replicate the write payload among the replica group members (element 913). In at least some implementations, the consensus-based protocol may be used to replicate log records of state changes, and a representation of the state itself may be replicated using erasure cording or using full replicas. If the write is committed as a result of the protocol interactions, e.g., if the write succeeds at a quorum of the replica group members, in some embodiments the requesting client may eventually be informed that the write request succeeded. In other embodiments, at least for some types of operations and some file system protocols, clients may not necessarily be provided an indication as to whether their request succeeded or not. Instead, for example, the clients may be expected to retry operations that appear not to have succeeded.

Figure 10:
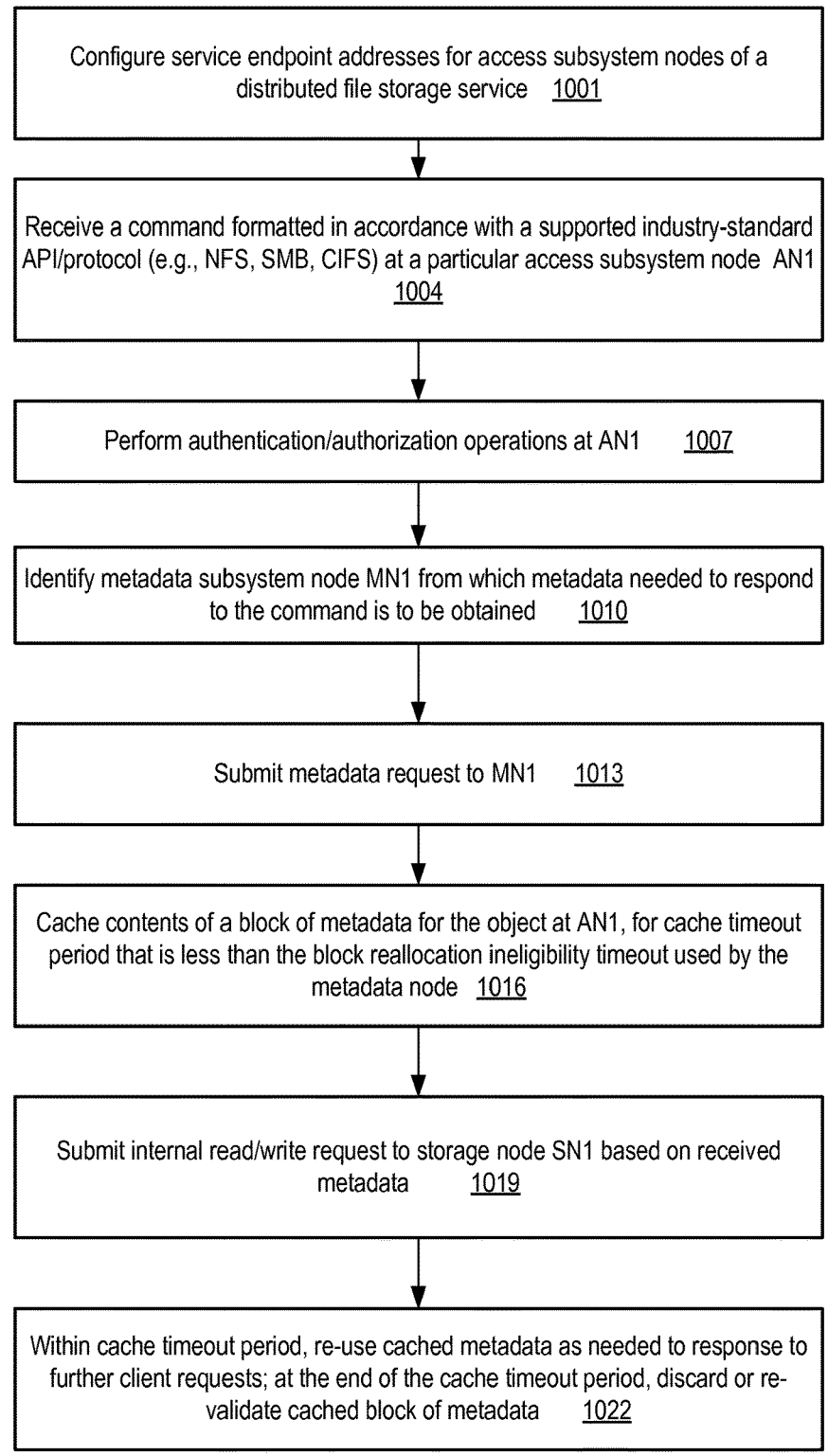
FIG. 10 is a flow diagram illustrating aspects of operations that may be performed to cache metadata at an access subsystem node of a distributed file system storage service, according to at least some embodiments.

FIG. 10 is a flow diagram illustrating aspects of operations that may be performed to cache metadata at an access subsystem node of a distributed file system storage service, according to at least some embodiments. As shown in element 1001, service endpoint addresses that allow clients to submit file store-related requests to a set of access subsystem nodes of a distributed file storage service may be configured. In some embodiments, as discussed earlier, private IP addresses that are accessible only within an isolated virtual network may be assigned for the access nodes. In other embodiments, public IP addresses that can be accessed by non-IVN clients may also or instead be used. The access subsystem nodes may be configured to respond to various types of commands, system calls, or API invocations conforming to one or more industry-standard file system protocols (e.g., one or more versions of NFS, SMB, CIFS, and the like). In some embodiments a given access subsystem node may be capable of responding to commands formatted in accordance with a plurality of such standards or protocols. In one embodiment, proprietary file system interfaces may also or instead be supported.

A command (e.g., a create, read, write, modify, reconfigure, or delete command) formatted in accordance with one of the APIs/protocols and directed to a particular file store object F1 may be received at a particular access node AN1 (element 1004). AN1 may perform a set of authentication and/or authorization operations (element 1007), e.g., based on the network identity (e.g., the source network address), user identity (e.g., a user account identifier), or other factors to decide whether to accept or reject the command.

If the command passes the authentication/authorization checks, AN1 may identify a metadata node MN1 from which metadata pertaining to F1, to be used to implement the requested operation, is to be obtained (element 1010). The access node AN1 may then submit a metadata request to MN1 (element 1013). In some embodiments, the identification of the appropriate metadata node may itself involve the submission of another request, e.g., to a metadata node that manages mappings between storage objects and other metadata nodes. A block of metadata pertaining to the file store object F1 may then be obtained at AN1. AN1 may store the metadata in a local metadata cache (element 1016), with a cache timeout setting indicating when the block of metadata is to be discarded (as potentially stale) or has to be re-validated. In at least some embodiments, the cache timeout interval may be set to a value smaller than a metadata block re-allocation timeout setting used at the metadata node to determine when it is acceptable to re-use to recycle the block of metadata for other purposes (e.g., to store metadata for a different file store object F2 in the event that F1 is deleted).

AN1 may use the received block of metadata to identify the particular storage node SN1 to which an internal read/write request is to be directed, and submit the internal request accordingly (element 1019). Prior to the expiration of the cache timeout, AN1 may re-use the cached block of metadata to issue additional internal requests that may result from further invocations of the APIs/protocols (element 1022). At the end of the cache timeout period, the block of metadata may be deleted or marked as invalid in some embodiments. In at least one embodiment, instead of merely discarding the metadata, the access node may re-validate it, e.g., by sending another request to the metadata node from which the metadata was obtained.

Conditional Writes for Single-Page Updates

As discussed earlier, in at least some embodiments the file storage service may be designed to handle large numbers of concurrent operations from hundreds or thousands of clients, potentially directed to thousands of file store objects. Traditional locking-based mechanisms to ensure atomicity and consistency may not work in such high-throughput high-concurrency environments, as the locking system itself may become a bottleneck. Accordingly, one or more optimistic schemes may be used for concurrency control in at least some embodiments, as described below. First, a concurrency control mechanism for single-page writes (i.e., write requests whose modifications are limited to a single page of a single logical extent) is described, and later a distributed transaction mechanism that can be used to implement multi-page writes as atomic operations is described.

In at least some implementations, as also described above, the physical pages used for storing data and metadata of a given file store may differ in size from the logical blocks of the corresponding objects, while write operations may in general be directed to arbitrary offsets and have write payloads of arbitrary sizes. For example, for at least one file system protocols/APIs, from the perspective of an end user of a file, a single write to the file may modify data starting at any desired byte-level offset within the file, and may modify (or write for the first time) any number of bytes starting from that byte-level offset. The storage subsystem of the file storage service may, however, treat physical pages as the units of atomicity in some embodiments—e.g., to reduce implementation complexity, a page may represent the minimum granularity supported by the storage subsystem's internal read and write APIs. Thus, there may a mismatch between the flexibility of the file store APIs exposed to the end users, and the constraints on the internal operations supported by the storage subsystem. Accordingly, the clients of the storage subsystem (e.g., the access nodes or the metadata nodes) may be forced to translate arbitrary write requests into page-level internal write operations in such embodiments. In at least some embodiments, at least some internal metadata manipulations that may not result directly from external client requests may in some cases need to modify only a small portion of a given page of metadata. Such metadata write requests may also have to be implemented at page granularity.

Figure 11:
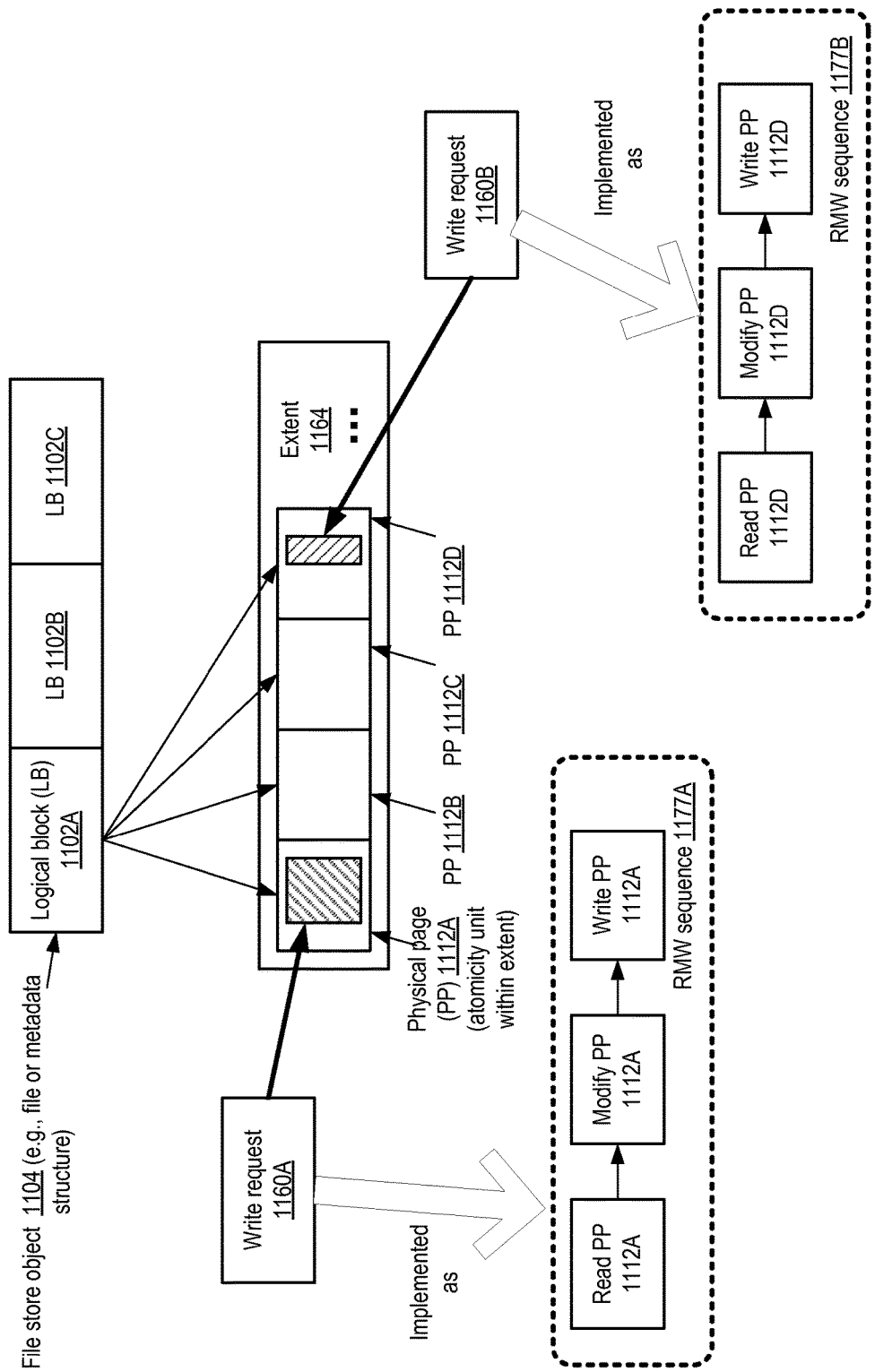
FIG. 11 illustrates examples of read-modify-write sequences that may be implemented at a file storage service in which write offsets and write sizes may sometimes not be aligned with the boundaries of atomic units of physical storage, according to at least some embodiments.

Accordingly, at least some write operations directed to physical pages may be implemented as read-modify-write sequences. FIG. 11 illustrates examples of read-modify-write sequences that may be implemented at a file storage service in which write offsets and write sizes may sometimes not be aligned with the boundaries of atomic units of physical storage, according to at least some embodiments. As shown, a file store object (such as a file or a metadata structure) may be organized as a set of logical blocks (LBs) 1102, including LB 1102A, 1102B and 1102C. Each logical block may be mapped to a set of pages within an extent (e.g., one logical extent and a plurality of physical extent replicas) of a storage subsystem, where the pages represent the units of atomicity with respect to the storage subsystem's APIs. For example, logical block 1102A is mapped to physical pages (PPs) 1112A, 1112B, 1112C and 1112D of extent 1164 in the depicted embodiment.

In response to a particular write request 1160, only a portion of a single page (such as the shaded portion of PP 1112A in the case of write request 1160A, and the shaded portion of PP1102D in the case of write request 1160B) may actually have to be changed. However, because the storage subsystem APIs may not permit partial-page writes in the depicted embodiment, each of the write requests shown may be translated into a read-modify-write sequence directed to the corresponding physical page. Thus, the client (e.g., an access node or metadata node that issued the internal write requests 1160) may determine that to implement the intended partial write, it must first read the targeted page, apply the desired changes, and then submit a write of the entire page. For write request 1160A, the read-modify-write sequence RMW 1177A may be implemented, comprising a read of page 1112A, a local modification of the contents of the page 1112A at the client, and a write of the entire page 1112A. For write request 1160B, RMW 1177B may be implemented, involving a read of page 1112D, followed by a modification and then a write of the entire page 1112D.

Given the possibility of concurrent or near-concurrent updates being requested to the same physical page, the storage service may have to ensure that contents of a given physical page has not been modified between the read of an RMW sequence and the write of the RMW sequence. In at least some embodiments, a logical timestamp mechanism, which may be implemented for replicated state management at the storage subsystem, may be used to ensure such sequential consistency as described below.

Figure 12:
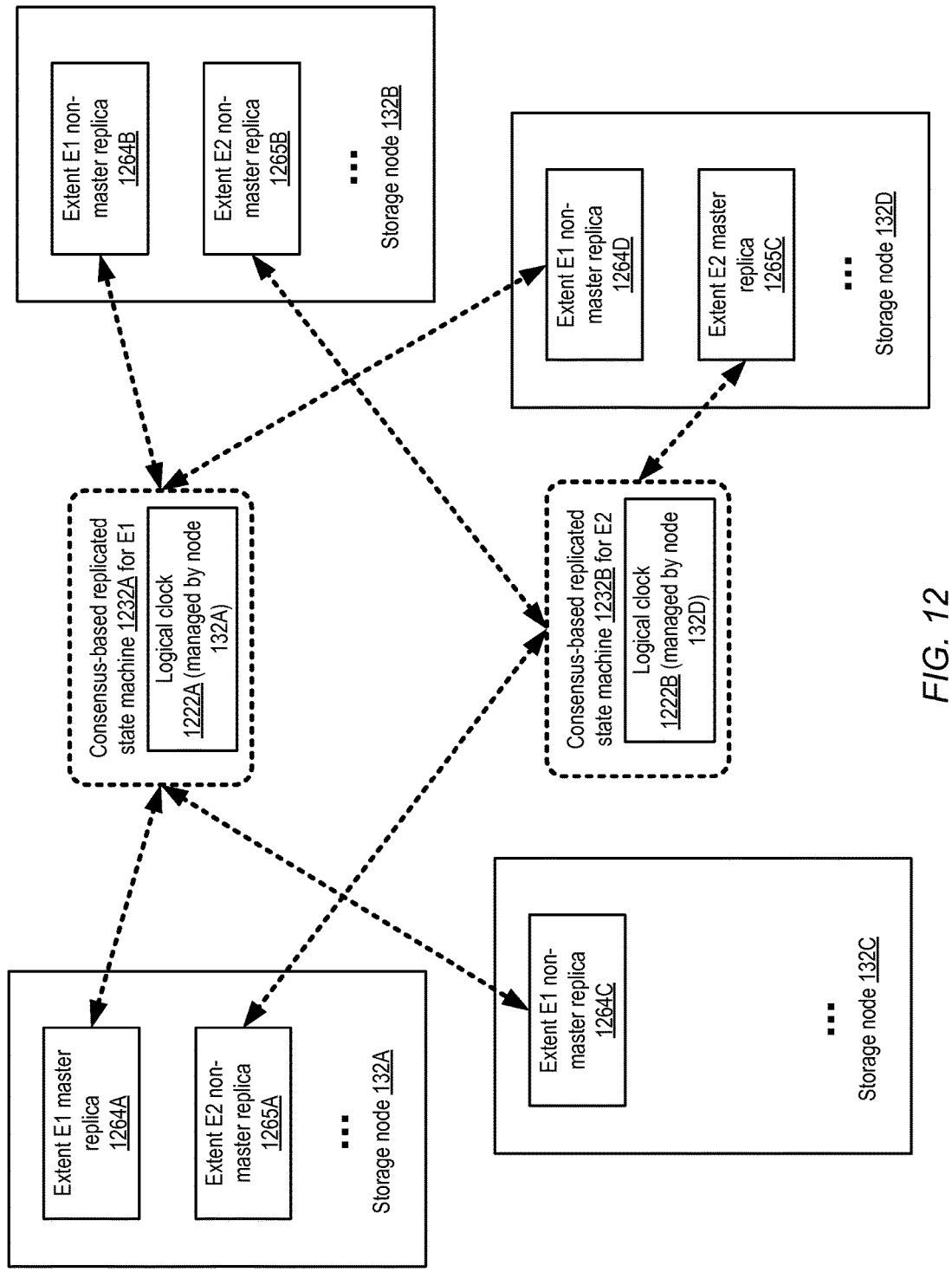
FIG. 12 illustrates the use of consensus-based replicated state machines for extent replica groups, according to at least some embodiments.

As mentioned earlier and shown in FIG. 5, replica groups of logical extents may be used in at least some embodiments to achieve the desired level of data durability. FIG. 12 illustrates the use of consensus-based replicated state machines for extent replica groups, according to at least some embodiments. For logical extent E1, four extent replicas are shown in the depicted embodiment: master replica 1264A at storage node 132, and non-master replicas 1264B, 1264C, 1264D at respective storage nodes 132B, 132C and 132D. For a different logical extent E2, master extent replica 1265C at storage node 132D and two non-master replicas 1265A (at storage node 132A) and 1265B (at storage node 132B) are shown. A consensus-based replicated state machine 1232A may be used by node 132A (the node at which the master replica is stored) to coordinate various operations on the E1 replicas, and a different consensus-based replicated state machine 1232B may be used by node 132D (the node at which master replica 1265C resides) to coordinate operations on E2 replicas.

State machine 1232A may utilize a logical clock 1222A in the depicted embodiment, and state machine 1232B may utilize a different logical clock 1222B. The logical clock may be used to indicate the relative ordering of various operations managed using the corresponding state machine, and may not be related directly to a wall-clock time or any particular physical clock in at least some embodiments. Thus, for example, a particular logical clock value LC1 may be associated with the commit of a write operation coordinated using the state machine 1232A, and a different logical clock value LC2 may indicate when a response to a read operation was provided from the replica group. If LC1<LC2 in this example, this would indicate that from the perspective of the storage subsystem, the write operation was completed prior to the read operation. The values of the logical clock may also be referred to herein as "logical timestamps" or as "operation sequence numbers" (since they may indicate the sequence in which various read or write operations were completed using the associated replicated state machine). In some implementations an integer counter implemented at the storage node at which the master replica is resident may be used as a logical clock, and that storage node may be responsible for changes to the clock's value (e.g., the counter may be incremented whenever a read or write operation is completed using the state machine).

Figure 13:
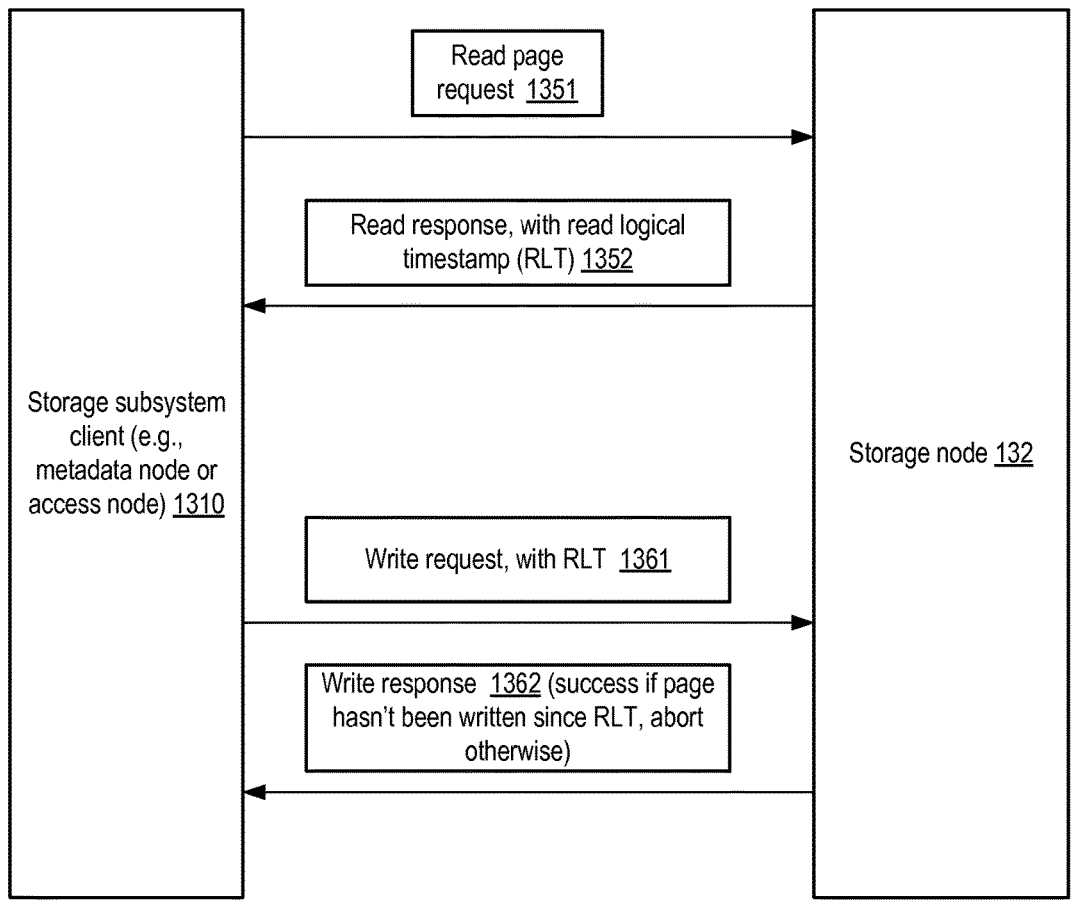
FIG. 13 illustrates example interactions involved in a conditional write protocol that may be used for some types of write operations, according to at least some embodiments.

The storage nodes may associate logical timestamp values obtained from the state machines 1232 with the read and write requests of the RMW sequences described above, and may use the logical timestamps to decide whether a particular single-page write is to be committed or aborted in various embodiments. FIG. 13 illustrates example interactions involved in a conditional write protocol that may be used for some types of write operations, according to at least some embodiments. As shown, as part of a read-modify-write sequence corresponding to a particular write operation, a client 1310 of the storage subsystem (such as an access node or a metadata node) may submit a read page request 1351 to a storage node 132 (e.g., the node at which the master replica of the extent to which the page belongs is stored). The storage node may provide a read response 1352 that comprises the contents of the requested page as well as a read logical timestamp (RLT) assigned to the read operation. The RLT may be obtained, for example, from the replicated state machine being used for the extent.

Continuing with the RMW sequence, the storage subsystem client 310 may subsequently submit a write request 1361 for the entire page to the storage node 132, and may include the RLT that was included in the read response. The storage node may determine whether the page has been successfully updated since the RLT was generated. If the page has not been updated since the RLT was generated, the requested write may be completed and a write response 1362 indicating success may be provided to the storage subsystem client. If the page has been updated as a consequence of another intervening write request since the RLT was generated, the write request may be rejected. Accepting such a write request may in some cases lead to data inconsistency, because, for example, the specific data D1 to be written in response to a given write request may be dependent on a value R1 read earlier from the page, and that value R1 may have been overwritten by the intervening write. In some implementations, if the write request from client 1310 is rejected, a write response 1362 indicating that the write was aborted may be provided to the client; in other implementations no write response may be provided. If the write is aborted, the client 1310 may initiate one or more additional RMW sequences for the same page in some embodiments, e.g., until the write eventually succeeds or until some threshold number of write attempts fails.

Figure 14:
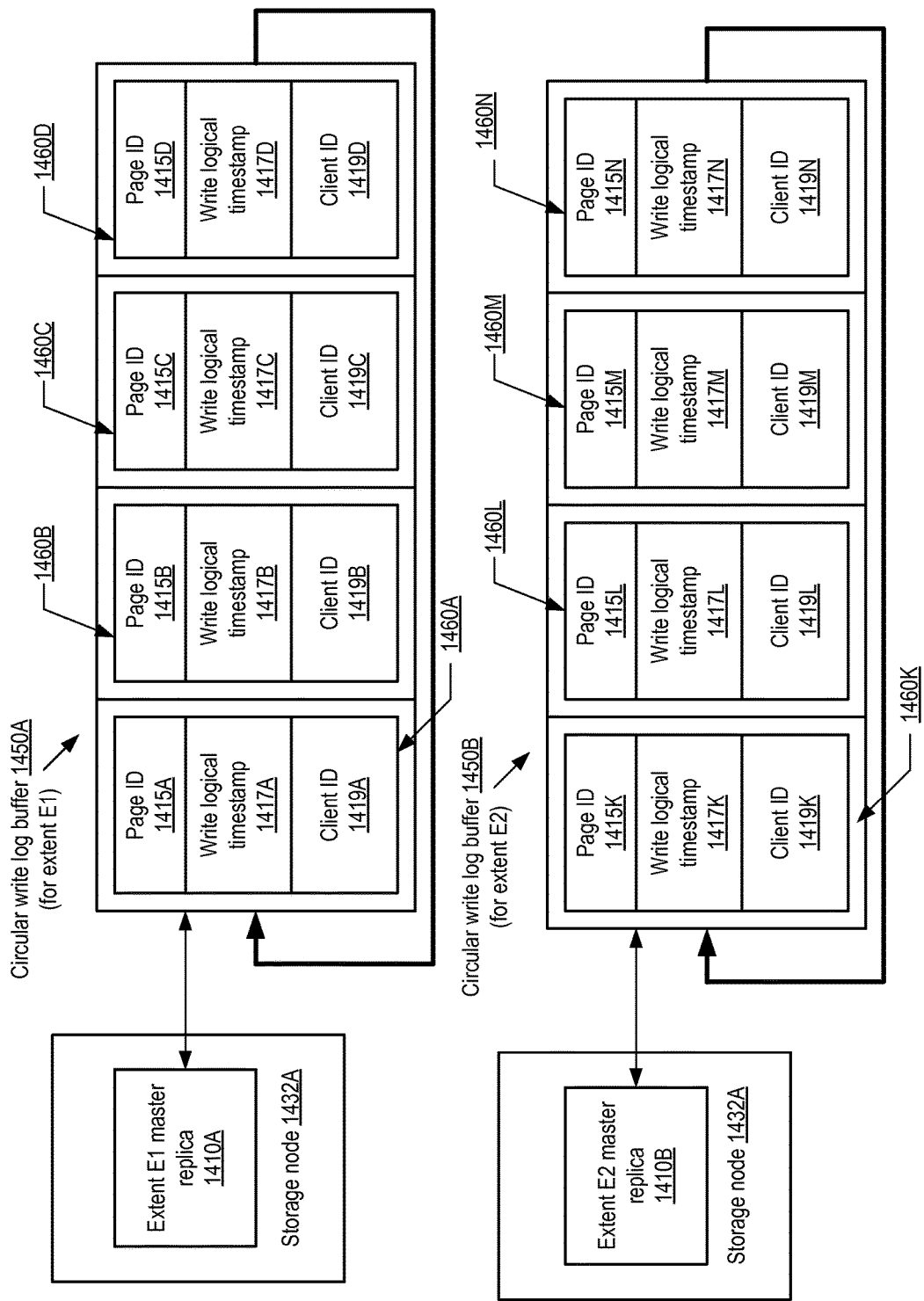
FIG. 14 illustrates example write log buffers that may be established to implement a conditional write protocol, according to at least some embodiments.

In order to detect whether an intervening write to the same page has succeeded since the RLT was generated, in some embodiments write log buffers that store write logical timestamps may be implemented at storage nodes 132. FIG. 14 illustrates example write log buffers that may be established to implement a conditional write protocol, according to at least some embodiments. In the depicted embodiment, a respective circular write log buffer 1450 is maintained for each logical extent, e.g., at the storage node where the master replica of the extent is stored. Circular buffer 1450A is maintained for extent E, by the storage node 1432A managing E1's master replica 1410A, and circular buffer 1450B is maintained by the storage node 1432B at which E2's master replica 1410B is stored. Each circular buffer comprises a plurality of write log records 1460, such as records 1460A, 1460B, 1460C and 1460D in buffer 1450A and records 1460K, 1460L, 1460M and 1460N in buffer 1450B. Each log entry 1460 in the depicted embodiment comprises a respective indication of a committed (i.e., successful) page write, indicating the page identifier that was written to, the logical timestamp associated with the completion of the write, and the client on whose behalf the write was performed. Thus, in buffer 1450A, records 1460A-1460D indicate that pages with identifiers 1415A-1415D respectively were written to, in an order indicated by respective write logical timestamps 1417A-1417D on behalf of clients with respective identifiers 1419A-1419D. Similarly, buffer 1450B indicates that pages with identifiers 1415K-1415N respectively were written to, in an order indicated by respective write logical timestamps 1417K-1417N on behalf of clients with respective identifiers 1419K-1419N. In at least some embodiments, the write log buffers may be maintained in main memory for fast access. In at least one implementation, the write logical timestamp of a given record 1460 may be implicitly indicated by the relative position of that record within the buffer. Thus, in such an implementation, explicit values of write logical timestamps need not be stored in the buffer. In some embodiments the log buffers may be stored in persistent memory, and may have indexes set up for speed retrieval by timestamp value, by page identifier, and/or by client identifier. In various embodiments, write logical timestamp information similar to that shown in FIG. 14 may be maintained at different granularities—e.g., either at the physical page granularity, at the extent granularity, or at some other level.

When the storage node 1432 has to determine whether a particular write of a read-modify-write sequence is to be accepted or rejected, and the write request includes the read logical timestamp (RLT) of the read operation of the sequence, it may inspect the write log buffer to see whether any writes with larger logical timestamps than the RLT have occurred to the same page. For example, if the RLT value corresponding to a write request of an RMW sequence for a page P1 is V1, the minimum write logical timestamp among the records 1460 is V2<V1, and there is no record in the buffer with a value V3>V1, then the storage node 1432 may conclude that no intervening write to page P1 has occurred, and the write of the RMW may accepted. If there is an entry with a write logical timestamp V3>V1 for page P1, the write may be rejected or aborted in the depicted embodiment. If the minimum write logical timestamp V2 among the records in the circular buffer 1450 is greater than V1, this might indicate that some writes directed to P1 may have succeeded since the RLT was generated but may have had their write log records overwritten (e.g., due to buffer space limitations), so at least in some embodiments the write request for P1 may also be rejected in such a scenario. If the write request of the RMW is accepted, a new write log record 1460 may be added to the circular write log buffer (potentially overwriting an earlier-generated log record) with a write logical timestamp corresponding to the commit of the write. (It is noted that depending on the number of replicas that have to be updated, and the replication protocol being used, it may take some time before the modification is propagated to enough replicas to successfully complete or commit the write.)

Circular buffers may be used in the depicted embodiment so that the total amount of memory used for the buffers remains low, and older write log records gradually get overwritten by more useful recent write log records. As the write operation of a particular read-modify-write sequence is typically expected to be performed fairly quickly after the read, older write log records may typically not be of much help in deciding whether to commit or abort a write of an RMW sequence. However, as discussed above, in some scenarios it may be the case that writes to the extent are so frequent that potentially useful write log records may get overwritten within the circular buffer. In some embodiments, the storage service may keep track of the number of writes that are rejected because of such overwrites, i.e., the write rejection rates caused specifically as a result of comparisons of read logical timestamps with earliest logical timestamps of the buffer (and subsequent determinations that the read logical timestamp is before the earliest logical timestamp) may be monitored. In some such embodiments the size of the circular log buffers may be modified dynamically—e.g., it may be increased in response to a determination that the write rejection rates resulting from buffer space constraints has exceeded some threshold, or it may simply be increased during heavy workload periods. Similarly, buffer sizes may be decreased during light workload periods or in response to a determination that the rejection rates attributable to buffer size constraints are lower than some threshold. In some embodiments other types of buffers (i.e., buffers that are not circular) may be used. In at least one embodiment the client identifiers may not be stored in the write log buffers. In some embodiments buffers similar to those shown in FIG. 14 may be used to record reads as well as writes. In at least one embodiment, the length of the buffer may be dynamically adjusted based on the timing of the reads of outstanding read-modify-write sequences. For example, if the read of a particular RMW sequence occurs at time T1, and the buffer becomes full at some time T2 before the corresponding write request of that sequence is received, the buffer size may be increased (e.g., within some maximum length threshold and/or some maximum time threshold) in an attempt to make the correct decision regarding accepting the corresponding write. In some such scenarios, when the corresponding write is received, say at time T3, the buffer size may be reduced again to its previous length.

In at least one embodiment, the storage service may maintain versioning information at the per-page level, and use the versioning information to decide whether a write of an RMW should be accepted or not. For example, instead of maintaining a log buffer of write operations at the per-extent level, in one such versioning approach, log entries may be maintained at the per-page level, so that it becomes possible to determine whether a write of an RMW is directed to the same version as the corresponding read. If a new version has been created since the read, the write may be rejected.

Figure 15:
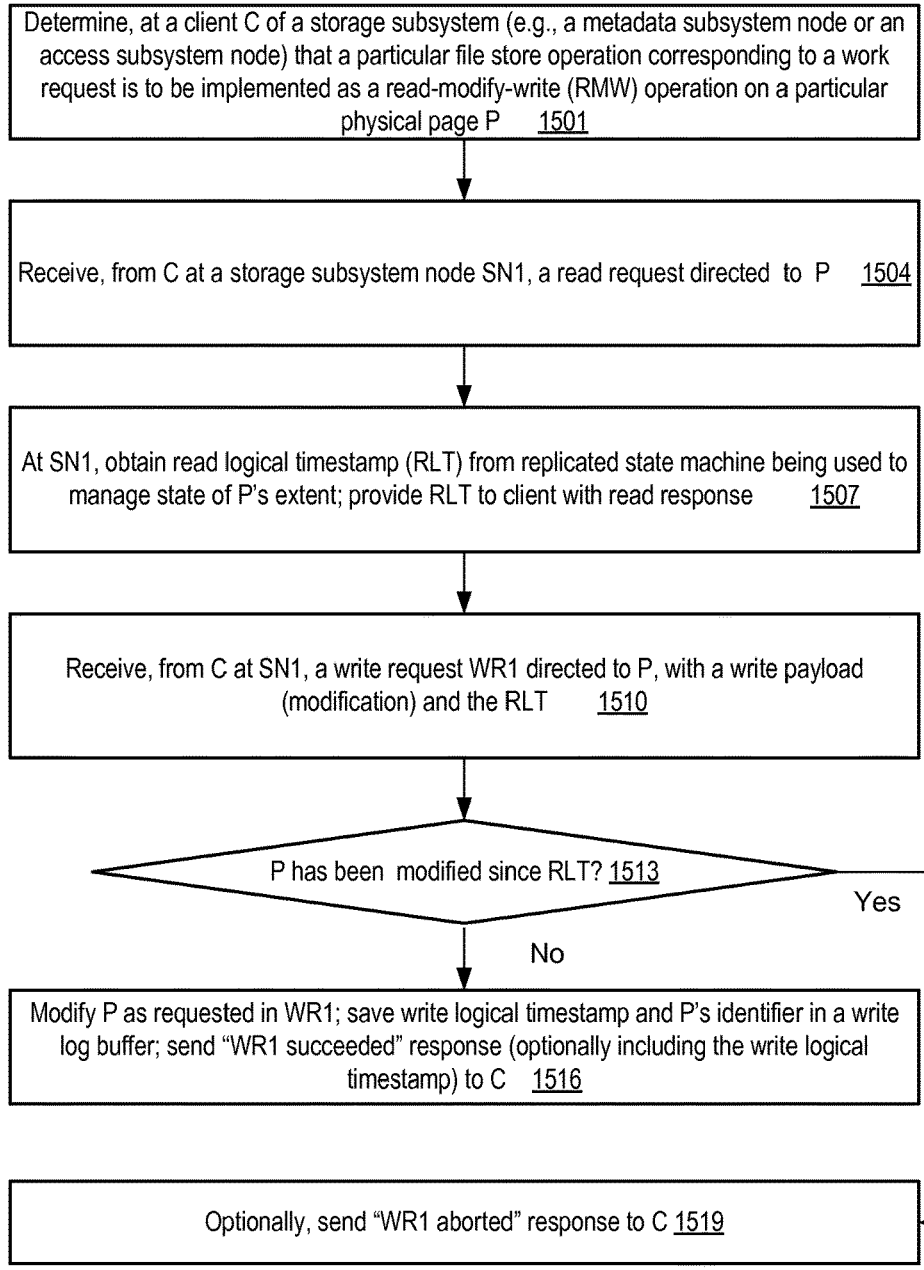
FIG. 15 is a flow diagram illustrating aspects of operations that may be performed to implement a conditional write protocol at a distributed file system storage service, according to at least some embodiments.

FIG. 15 is a flow diagram illustrating aspects of operations that may be performed to implement a conditional write protocol at a distributed file system storage service, according to at least some embodiments. As shown in element 1501, a determination may be made at a client C of a storage subsystem (such as an access node or a metadata node) that in order to implement a particular file store operation, a read-modify-write sequence on a particular page P is to be implemented. In some embodiments, all single-page writes may be translated into read-modify-write operations by default, even if the entire page is being modified; hence, in such embodiments, any write to any page may be translated into a RMW sequence, and a determination regarding whether an RMW is needed or not may be required. In other embodiments, writes that modify the whole page may not require translation to RMW sequences, while writes that modify only part of a page may be translated to RMW sequences.

As shown in element 1504, as part of the RMW sequence, a read request directed to P may be received from C at a storage node SN1 (e.g., the node at which the master replica of the extent to which P belongs is stored). A read logical timestamp RLT corresponding to the read request, indicating the order on which the read is performed relative to other reads and writes at the same extent, may be obtained (element 1507), e.g., from a replicated state machine being used to manage P's extent. The RLT may be provided to the client C that submitted the read request.

Subsequently, a write request WR1 of the RMW sequence directed to page P may be received from C at SN1 (element 1510). The write request may include the RLT value that was provided to C in the read response of element 1507, as well as the write payload (i.e., the modification to be applied to P). The storage node SN1 may determine whether the page P has been modified since the RLT was generated, e.g., by inspecting contents of a write log buffer that stores the logical timestamps associated with recent successful writes. If it is determined that P has not been modified since RLT was generated (element 1513), the write may be implemented by making the appropriate modifications to P and propagating the modifications to the appropriate number of replicas (element 1516). A write logical timestamp corresponding to the completion of the write may be stored in a write log buffer in the depicted embodiment, and at least in some embodiments an indication that the write completed may be sent to the client that issued the RMW sequence. In some implementations the write logical timestamp may be provided to the client as part of the completion indication. If it is determined that P has been modified since RLT was generated (also in operations corresponding to element 1513), the write may be rejected and in some embodiments a "write aborted" response may be sent to the client.

Distributed Transactions Using Ordered Node Chains

The conditional write technique described above may be used for ensuring sequential consistency among single-page write operations in various embodiments. However, for some types of operations of a distributed file storage service (such as deletions, renames and the like), multiple pages of metadata and/or data may have to be modified atomically— that is, either all the changes to all the pages involved have to be committed, or all the changes have to be rejected. A higher-level optimistic consistency enforcement mechanism involving distributed transactions may be employed for this purpose in at least some embodiments. To implement a distributed transaction in such an embodiment, a coordinator node (e.g., one of the metadata and/or storage nodes involved) may be selected. The coordinator may identify the storage nodes that are to participate in the changes, determine a sequence in which the individual page-level changes are to be examined for acceptance or rejection at respective storage nodes, and then initiate an ordered sequence of operations among the storage nodes in which each of the nodes can make a respective commit/abort decision for their page-level changes. If all the participants decide that their local changes are committable, the transaction as a whole may be committed, while if any one of the participants determines that their local page-level changes cannot be committed, the transaction as a whole may be aborted. Details regarding various aspects of the operations of the coordinator and the participant nodes are provided below.

Figure 16:
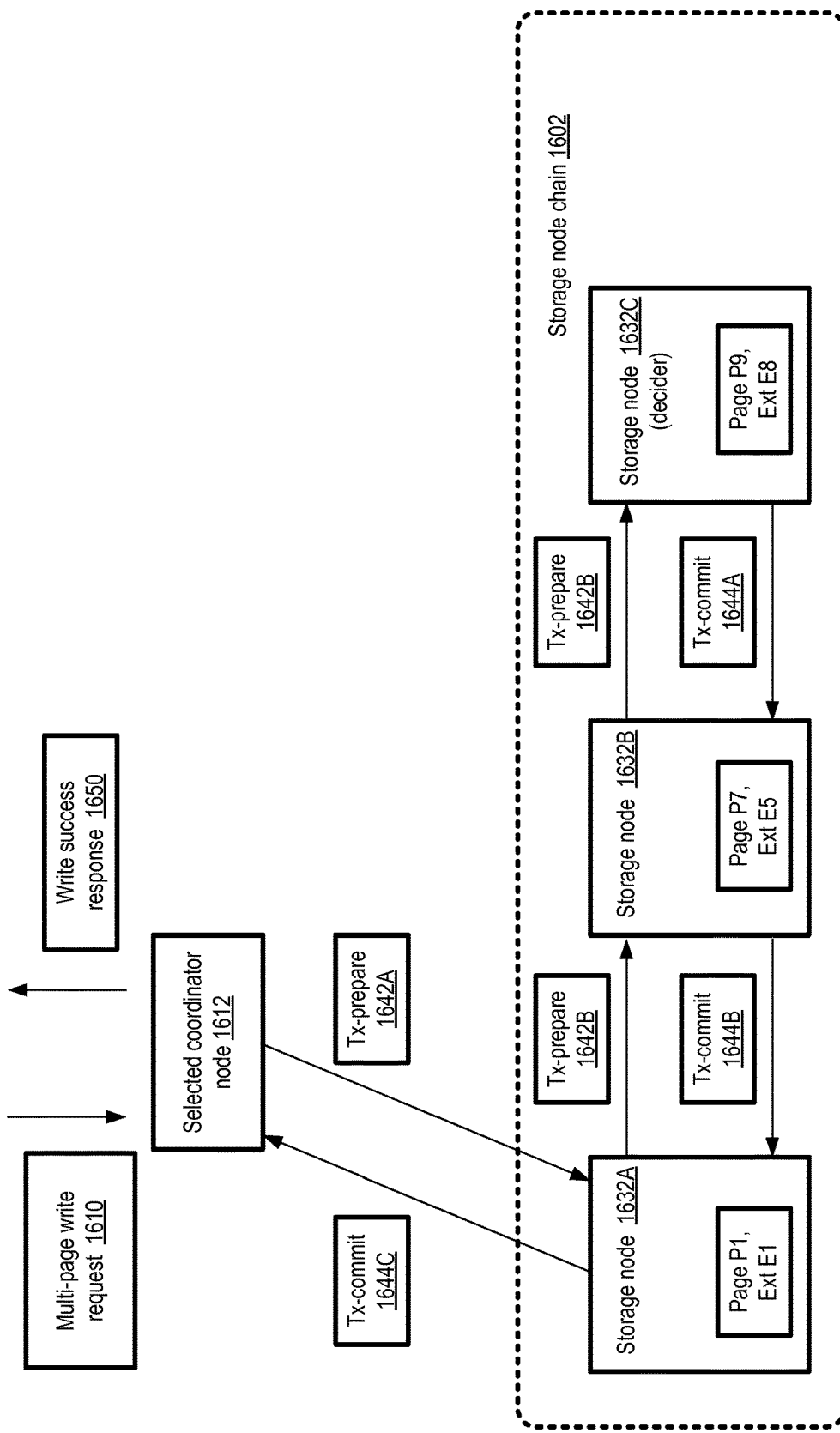
FIG. 16 illustrates an example message flow that may result in a commit of a distributed transaction at a file storage service, according to at least some embodiments.

FIG. 16 illustrates an example message flow that may result in a commit of a distributed transaction at a file storage service, according to at least some embodiments. A determination may be made that a particular file store operation requires multiple pages to be written, e.g., either at an access subsystem node or at a metadata node. A corresponding multi-page write request 1610 may be generated. The set of pages to be modified may be termed the "targeted pages" of the transaction herein. A particular node of the storage service (which may be either an access node, a metadata node, or a storage node in various embodiments) may be selected as a coordinator node 1612 for a distributed transaction to atomically implement the set of writes to the targeted pages. The coordinator may identify the set of pages that are to be modified and the set of storage nodes (which may include itself if the coordinator is a storage node) at which page-level changes are to be initiated or performed (e.g., the set of storage nodes at which master replica extents containing the targeted pages are stored). Any of a variety of techniques may be used to select the coordinator node—e.g., in some embodiments, the storage node at which a randomly-selected page of the set of pages to be modified resides may be selected as the coordinator, while in other embodiments the workload levels at candidate coordinator nodes may be taken into account, and an attempt may be made to distribute the work associated with transaction coordination among the storage nodes of the service.

In at least some embodiments, a sequence in which the pages targeted for modifications should be locked may be determined by the coordinator 1612 in accordance with a deadlock avoidance technique. For example, a deadlock analysis module may be provided the identifiers of the pages and extents to be modified in the transaction, and the deadlock analysis module may sort the identifiers based on some selected sort order (e.g., a lexicographic sort order based on a concatenation of extent ID, page ID and/or other factors) to determine the locking order. The same sort order may be used consistently across all the distributed transactions for the file store, and as a result locks for any given pair of pages P1 and P2 may always be requested in the same order. For example, if the deadlock analysis module indicates that a lock on P1 should be acquired before a lock on P2 for transaction Tx1, it would never indicate that a lock on P2 should be acquired before a lock on P1 for any other transaction Tx2, thus avoiding deadlocks.

In at least some embodiments, as part of a preliminary phase of the distributed transaction, the selected coordinator node 1612 may also issue read requests directed to the targeted pages, and obtain the corresponding read logical timestamps (RLTs) for those reads in accordance with the techniques described earlier. The read logical timestamps may be used for making page-level commit decisions at each of the storage nodes at which the targeted pages reside, as described below.

The selected coordinator node 1612 may then compose a transaction-prepare (Tx-prepare) message 1642A, which includes an indication of the order in which the targeted pages are to be analyzed for respective page-level commit decisions, a node chain comprising the storage nodes responsible for making the page-level commit decisions in that order, the actual changes to be made to the pages (the bytes to be written), and the RLTs for each of the targeted pages. Node chain 1602 is shown in FIG. 16 by way of an example. The last or terminal member of the node chain (e.g., node 1632C in node chain 1602) may be designated as a "commit decider" or "decider" node, since its own local page-level commit decision may lead to a commit of the transaction as a whole.

Figure 17:
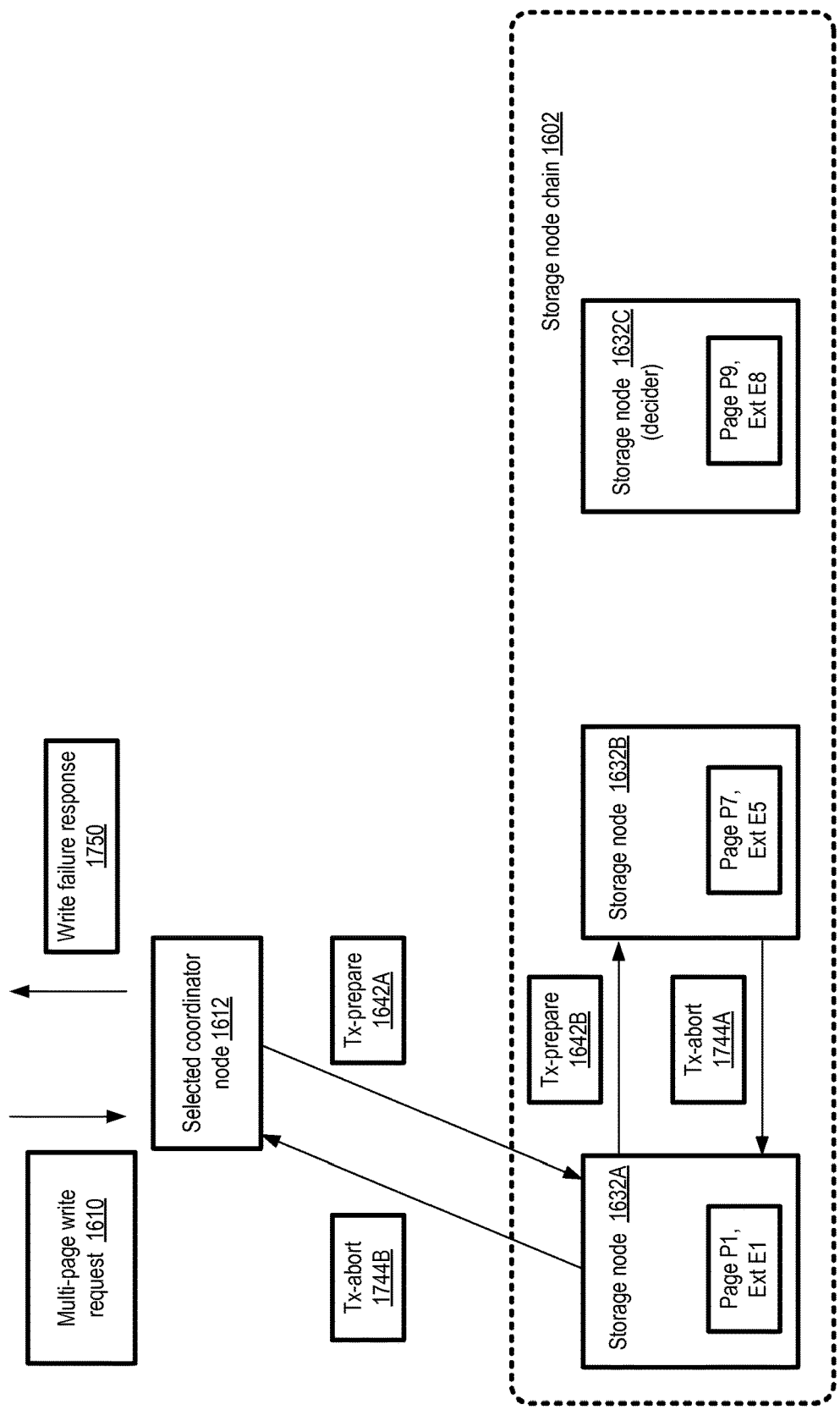
FIG. 17 illustrates an example message flow that may result in an abort of a distributed transaction at a file storage service, according to at least some embodiments.

The coordinator may transmit the Tx-prepare message 1642A to the first node of the node chain, such as storage node 1632A of node chain 1602, which stores at least one of the targeted pages (page P1 of logical extent E1 in FIG. 16). Node 1632A may perform a local page-level commit analysis, e.g., using the RLT for page P1 to decide whether the change to P1 can be committed. Using a technique similar to that described earlier with respect to conditional writes and RMW sequences, if P1 has not been modified since its RLT was obtained, the change to P1 may be deemed committable. If P1 has been modified since the RLT was obtained, the change may have to be rejected (the rejection scenario is illustrated in FIG. 17 and described below; FIG. 16 illustrates a scenario in which all the page-level commit decisions are affirmative). Assuming that the proposed change to P1 is committable, node 1632A may lock P1 (e.g., acquire a lock managed by a replicated state machine used for extent E1) and store an "intent record" in persistent storage. As long as page P1 is locked, no reads or updates may be performed on P1 on behalf of any other transaction or any other RMW sequence in the depicted embodiment. The intent record may indicate that the node 1632A intends to perform the proposed modification to P1, and will do so if the remaining chain members can also agree to perform their respective page-level modifications. Node 1632A may then transmit Tx-prepare message 1642B (whose contents may be similar or identical to those of 1642A) to the next node 1632B of the node chain.

A similar local page-level commit analysis may be performed at node 1632B with respect to page P7 of logical extent E5. If node 1632B determines that its local page-level changes are committable (e.g. using P7's RLT, which was included in the Tx-prepare message 1642B), node 1632B may acquire a lock on P7, store its own intent record, and transmit Tx-prepare message 1642C (similar or identical to 1642B) to the decider node 1632C.

Decide node 1632C (the terminal or last node in the chain) may perform its own page-level commit analysis with respect to page P9 of extent E8. If the proposed modification to page P8 is committable (e.g., if no writes to P8 have been performed since P8's RLT was obtained by the coordinator) the decider may determine that the transaction as a whole is to be committed, and may perform or initiate the proposed changes to P8. The decider node may generate a Tx-commit message 1644A indicating that the distributed transaction is to be committed, and transmit it to the other nodes of the chain. In the depicted embodiment, the Tx-commits may be propagated sequentially in the reverse order relative to the propagation of the Tx-prepare messages. In other embodiments, the Tx-commits may be sent in parallel to some or all of the non-decider nodes and/or the coordinator, or may be sent in a different sequential order than that shown in FIG. 16.

When a non-decider node of chain 1602 receives the Tx-commit message, it may perform or initiate its local page-level modifications, release the lock on the local targeted page (e.g., P7 in the case of node 1632B and P1 in the case of node 1632A), delete the intent record it had generated earlier for the page, and (if required) transmit the Tx-commit message to another node (e.g., node 1632B may send Tx-commit message 1644B to node 1632A, and node 1632A may send Tx-commit message 1644C back to the coordinator). When the coordinator node 1612 receives the Tx-commit message, in some embodiments it may transmit a write success response 1650 to the requester of the multi-page write 1610. The techniques described above, of performing local page-level commit analyses in a predetermined order determined to avoid deadlocks, locking pages only when a Tx-prepare message is received and the local commit analysis succeeds, and storing intent records in persistent storage (from which they may be accessed in case the storage node responsible for the intent record is replaced as a result of a failure that may occur before the transaction completes, for example), may all help increase the efficiency and recoverability of operations that require atomicity for multiple writes in distributed storage services.

In at least some embodiments, any one of the storage nodes of the node chain identified for a given distributed transaction may decide, based on its local commit analysis, that the proposed modification for its local page is not acceptable, and may therefore initiate an abort of the transaction as a whole. FIG. 17 illustrates an example message flow that may result in an abort of a distributed transaction at a file storage service, according to at least some embodiments. As in the case of FIG. 16, node 1612 may be selected as coordinator of a distributed transaction attempted in response to a multi-page write request 1610. The coordinator may perform a preliminary set of operations of the transaction similar to those described in the context of FIG. 16, such as determining an order in which local page-level commit decisions are to be made and locks are to be acquired, generating the node chain 1602 and creating the Tx-prepare message 1642A. The Tx-prepare message may be sent to the first node 1632A of the chain by the coordinator 1612.

Node 1632A may perform its local commit analysis, and decide that the proposed changes to page P1 of extent E1 are acceptable. As in the scenario shown in FIG. 16, node 1632A may acquire a lock on P1, store an intent record in persistent storage, and transmit Tx-prepare message 1642B to the next node 1632B of chain 1602. In the scenario illustrated in FIG. 17, node 1632B may decide that the proposed changes to page P7 of extent E5 are not acceptable, e.g., because P7 has been successfully modified since its RLT was obtained by the coordinator 1612. Accordingly, instead of storing an intent record indicating that it is willing to perform the proposed modification to P7, node 1632B may instead generate a Tx-abort message 1744A, indicating that the transaction should be aborted. The Tx-abort message 1744A may be sent to the node from which the Tx-prepare message 1642B was received in the depicted embodiment, although in other embodiments it may be sent in parallel to other node chain members that have already stored intent records after successful local commit analyses. Upon receiving the Tx-abort message 1744A, node 1632A may delete its intent record, release the lock on page P1, and transmit the Tx-commit message 1644C back to the coordinator 1612. The coordinator 1612 may in turn send a write failure response 1750 to the requester of the multi-page write in some embodiments. In at least some embodiments, and depending on the semantics of the APIs being used, neither a write failure response 1750 nor a write success response 1650 may be transmitted in at least some embodiments—instead, the requesting entities may determine whether their requests succeeded or not using other commands (e.g., a directory listing command may be used to determine whether a delete or rename succeeded). It is noted that not all the nodes in the node chain may participate in a transaction that gets aborted—e.g., decider node 1632C in FIG. 17 may not even be made aware that it was to participate in the distributed transaction. Thus, aborts may not end up wasting any resources at several of the chain members, which may help reduce the overall amount of processing associated with distributed transactions compared to some other techniques.

Figure 18:
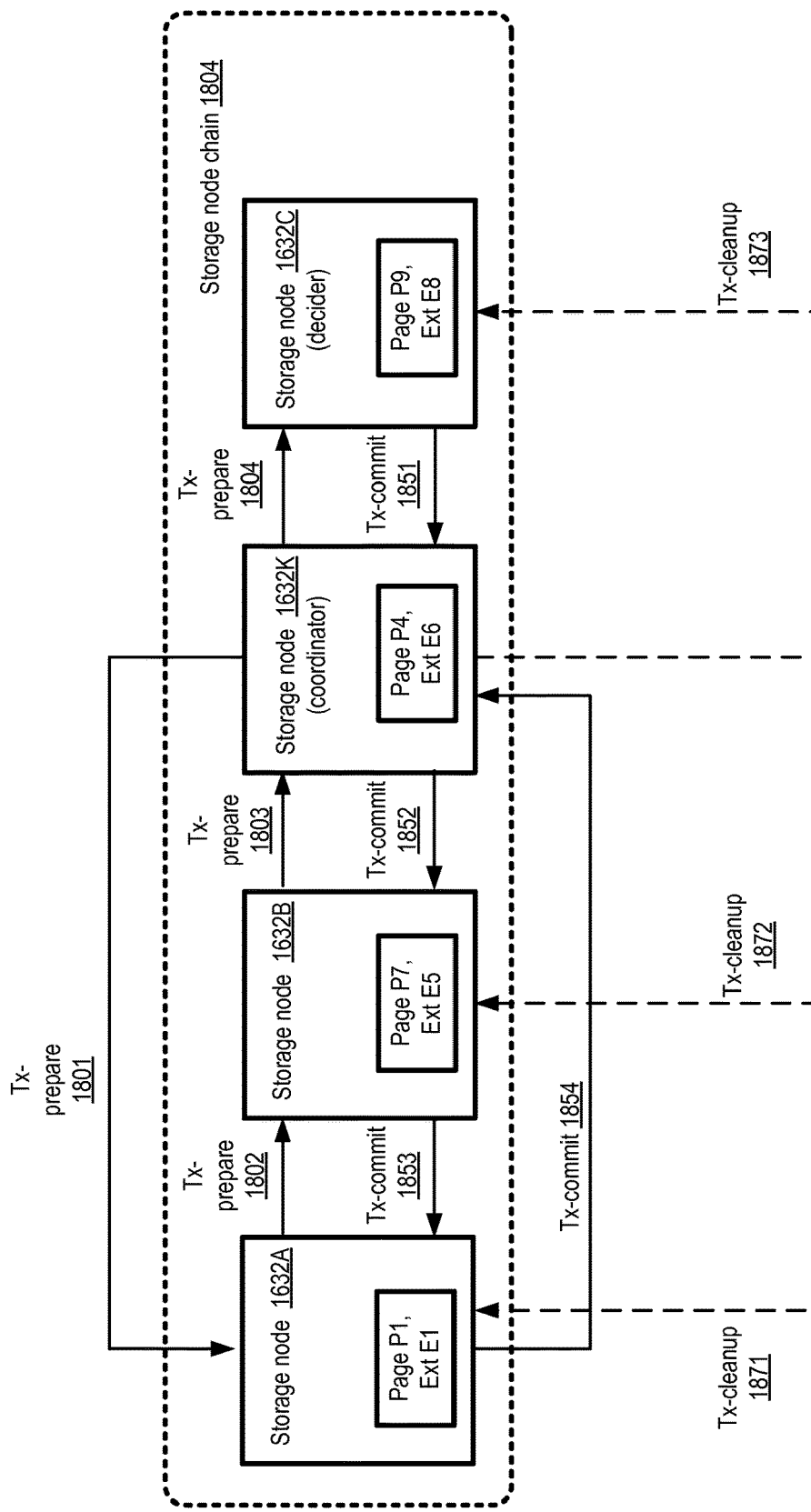
FIG. 18 illustrates an example of a distributed transaction participant node chain that includes a node designated as the coordinator of the transaction, according to at least some embodiments.

As noted above, one of the participant storage nodes of a node chain identified for a transaction may itself be selected as a coordinator of the transaction in some embodiments. The coordinator need not be the first node of the chain in at least some embodiments, nor may the coordinator necessarily be the decider node. FIG. 18 illustrates an example of a distributed transaction participant node chain 1804 that includes a node designated as the coordinator of the transaction, according to at least some embodiments. As shown, the node chain 1804 comprises storage nodes 1632A, 1632B, 1632K and 1632C, with 1632A designated as the first node of the chain and 1632C the terminal and decider node in the chain. The targeted pages of the transaction that are to be modified include page P1 of extent E1 at node 1632A, page P7 of extent E5 at node 1632B, page P4 of extent E6 at node 1632K, and page P9 of extent E8 at node 1632C. (Although the examples of FIGS. 16, 17 and 18 all show only a single page being modified at each chain member, in general any number of pages may be modified at each chain member in various embodiments.) Node 1632K has also been designated as the transaction coordinator.

Accordingly, in its role as transaction coordinator, node 1632K may send the Tx-prepare message 1801 to the first node 1632A of the chain. As in the scenario illustrated in FIG. 16, Tx-prepare messages may be propagated sequentially along the node chain, e.g., Tx-prepare 1802 may be sent from node 1632A to node 1632B, Tx-prepare 1803 may be sent from node 1632B to 1632K, and Tx-prepare 1804 may be sent from node 1632K to the decider node 1632C, assuming the respective local page-level commit decisions at each of the intermediary nodes are positive.

The decider node 1632C may initiate a propagation of Tx-commit messages in the reverse sequence, e.g., Tx-commit message 1851 may be sent from node 1632C to node 1632K, Tx-commit message 1852 may be sent from node 1632K to node 1632B, and Tx-commit message 1853 may be sent from node 1632B to node 1632B. To complete the transaction, in the depicted embodiment, node 1632A may send a final Tx-commit message 1804 to the coordinator node 1632K. In at least some embodiments, the dynamic selection of participant nodes of the node chains as coordinators may help to more evenly distribute the coordination workload (e.g., workload related to the preliminary phases of the transaction during which the information needed for Tx-prepare messages is collected and analyzed) among the storage subsystem nodes than would have been possible if the coordinator were chosen statically.

Figure 19:
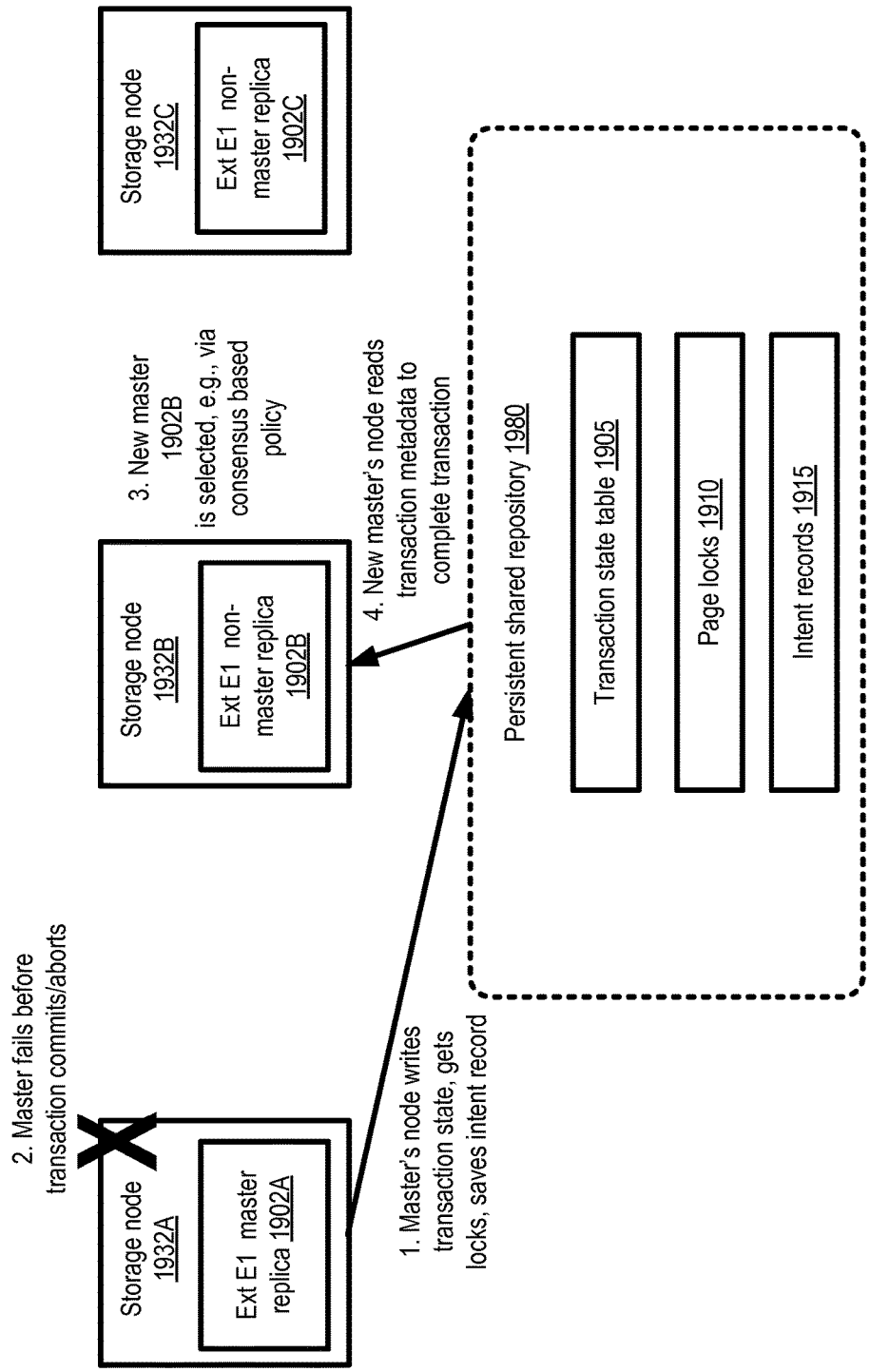
FIG. 19 illustrates example operations that may be performed to facilitate distributed transaction completion in the event of a failure at one of the nodes of a node chain, according to at least some embodiments.

In at least some embodiments, each of the node chain members may store transaction state records locally for some time even after the transaction, as discussed below with reference to FIG. 19. The state information may be used, for example, during recovery operations that may be needed in the event that one of the participant nodes fails before the transaction is completed (either committed or aborted). Over time, such transaction state information may use up more and more memory and/or storage space. Accordingly, in order to free up the memory and/or storage devoted to state information for older transactions, at some point after a given transaction is committed or aborted, the coordinator node 1632K may transmit Tx-cleanup messages 1871, 1872 and 1873 to the nodes of the chain 1804 in the embodiment depicted in FIG. 18. The Tx-cleanup messages may indicate identifiers of the transactions whose state records should be deleted from the storage nodes. Accordingly, in at least some embodiments, the storage nodes may remove the specified transaction state records upon receiving a Tx-cleanup message. The Tx-cleanup messages may be sent from the coordinator to the storage node chain members in parallel (as suggested in FIG. 18) or may be propagated sequentially in various embodiments. The coordinator may decide to transmit Tx-cleanup messages for a given transaction after a tunable or configurable time period has elapsed since the transaction was committed or aborted in some embodiments, and the time period may be adjusted based on various factors such as measurements of the amount of storage/memory space used up by old transaction records at various storage nodes. Although the coordinator node happens to be a member of the node chain 1804 in FIG. 18, Tx-cleanup messages may be sent by coordinator nodes regardless of whether the coordinator is a member of the node chain or not. In some embodiments a single Tx-cleanup message may comprise indications of several different transactions whose records should be cleaned up. In at least one embodiment, instead of the coordinator sending Tx-cleanup messages as shown in FIG. 18, some other selected member of the chain may be responsible for transmitting the Tx-cleanup messages. For example, the Tx-cleanup messages may be sent by the first member (e.g., node 1632A in FIG. 18) of the chain in one such embodiment.

In any distributed computing environment, especially large provider networks in which thousands of commodity computing and/or storage devices are being used, the possibility of hardware and/or software failures at some subset of the components has to be dealt with when designing the services being implemented. FIG. 19 illustrates example operations that may be performed to facilitate distributed transaction completion in the event of a failure at one of the nodes of a node chain, according to at least some embodiments. Three storage nodes storing 1932A, 1932B and 1932C are shown storing respective replicas 1902A, 1902B and 1902C of the same logical extent E1. Initially, replica 1902A is designated the master replica, while 1902B and 1902C are designated non-master replicas.

The storage node chain generated for any given distributed transaction may typically comprise storage nodes where the master replicas of the extents involved in the transaction are stored. Such nodes may also be referred to as "master nodes" or "leader nodes" with respect to those extents whose master replicas are stored there. Changes made at a given node chain member to a physical page may be propagated among the other replicas from the master node. Thus, the messages discussed earlier (e.g., Tx-prepare, Tx-commit and Tx-abort) may typically be sent to the master nodes for the extents involved in the transaction in at least some embodiments.

In the depicted embodiment, the master node 1932A may store intent records 1915, page locks 1910, and transaction state records 1905 at a persistent shared repository 1980 that is also accessible to other storage nodes at which members of E1's replica group are stored. In at least some embodiments, each node chain member that participates in a distributed transaction message flow (such as nodes 1632A, 1632B and 1632C of FIG. 16, and nodes 1632A and 1632B of FIG. 17) may store a transaction record 1905 indicating its local view of the state of the distributed transaction at the time that a Tx-prepare, Tx-commit, or Tx-abort message is sent from the node chain member. For example, if the commit analysis for the local page modification indicates that the modification is acceptable, and an intent record to modify the local page is stored, a transaction state record indicating that the transaction (identified by a unique identifier selected by the coordinator and included in the Tx-prepare message) is in a PREPARED state from the perspective of the node chain member. When a decider node determines that the transaction as a whole is to be committed, it may save a transaction record with the state set to COMMITTED. When a non-decider node receives a Tx-commit message, the transaction's state (which was previously PREPARED) may be changed to COMMITTED in the depicted embodiment. When any node of the chain decides to abort the transaction, a transaction state record with the state set to ABORTED may be stored in repository 1980. When any node chain member receives a Tx-abort message, the transaction state record may be modified to set the state to ABORTED. As mentioned above in the discussion regarding Tx-cleanup messages, in at least some embodiments transaction state records 1905 may be retained at a given storage node for some time period after the messaging associated with the transaction has completed from the perspective of that node. This may be done for various purposes in different embodiments—e.g., to aid in recovery from failure situations resulting from lost messages, for debugging, for audit purposes, and so on. When a Tx-cleanup message is received for a given transaction, the transaction state records may be deleted or archived in some embodiments.

The persistent state repository 1980 may be used so that a failover node may take over the transaction-related operations if a master node fails before the transaction is completed (e.g., before all the Tx-prepare, Tx-Commit, Tx-Abort or messages that the master is responsible for sending for a given transaction are received successfully at their intended recipients). For example, as indicated by the arrow labeled "1", master node 1932A (with respect to extent E1) may write a transaction state record 1905, an indication of a page lock 1910, and an intent record 1915) for a given transaction Tx1 for which it received a Tx-prepare message in repository 1980 at time T1. Before the corresponding Tx-commit or Tx-abort message is received, node 1932 may fail, as indicated by the "X" and the text labeled "2". In accordance with a replicated state management protocol, node 1932B may be selected as the new master node with respect to extent E1 (as indicated by the label "3"), e.g., by designating replica 1902B as the new master. In some embodiments a consensus-based policy may be used to elect the new master. The node chain member that would (prior to the failure of node 1932A) have transmitted a Tx-commit or Tx-abort to node 1932A, may instead find that the master role with respect to extent E1 has been transferred to node 1932B, and may therefore send the Tx-commit or Tx-abort to node 1932B instead. Because the intent record, lock and transaction state record were all stored in the persistent repository 1980, node 1932B may be able to read the required transaction information for Tx1 from repository 1980 and easily perform the transaction-related tasks that would otherwise have been performed by node 1932A. In at least some embodiments, the persistent repository 1980 may be implemented as a component of the replicated state management system used for propagating changes among replicas, associating logical timestamps with reads and writes, and so on.

Figure 20:
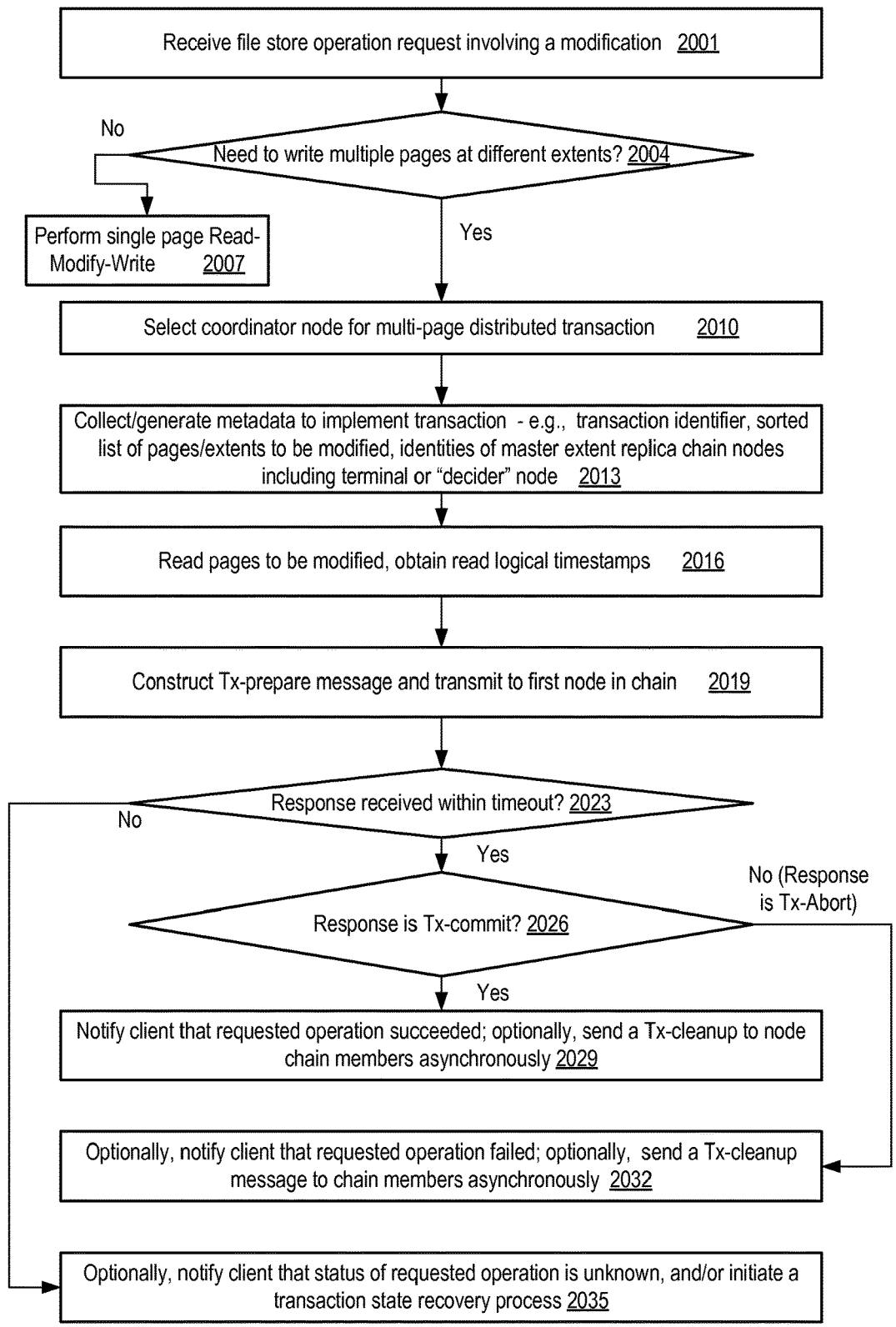
FIG. 20 is a flow diagram illustrating aspects of operations that may be performed to coordinate a distributed transaction at a file system storage service, according to at least some embodiments.

FIG. 20 is a flow diagram illustrating aspects of operations that may be performed to coordinate a distributed transaction at a file system storage service, according to at least some embodiments. As indicated in element 2001, a file store operation request that involves a modification may be received, e.g., at a metadata node from an access node or from another metadata node. An analysis of the request may reveal whether multiple pages (containing either metadata, data or both), e.g., at different extents and/or different storage nodes are required to fulfill the request. If only a single page is to be modified, as detected in element 2004, a Read-Modify-Write sequence similar to those described earlier may be initiated (element 2007).

If multiple pages need to be modified or written to (as also detected in element 2004), a distributed transaction may be started by selecting a identifying a coordinator node (element 2010). A variety of techniques may be used to select a coordinator in different embodiments. In at least one embodiment, one of the participants involved in the transaction—e.g., a storage node at which a master replica of one of the targeted pages is stored, or one of the metadata nodes responsible for generating and managing the metadata being affected by the transaction, may be selected. In some embodiments, a set of storage subsystem, metadata subsystem or access subsystem nodes may be designated in advance as coordinator candidates, and a particular node from among the candidates may be selected.

The coordinator may collect various elements of information needed to complete the transaction (element 2013). Such information may include, for example, a list of all the pages that are to be modified and a list of the corresponding write payloads (content of the bytes to be written) may be generated in the depicted embodiment. The coordinator may also determine, e.g., using a deadlock avoidance mechanism, the order in which page-level commit analyses should be performed for the transaction (and hence the order in which locks should be acquired). In some embodiments, for example, using the deadlock avoidance mechanism may comprise sorting the identifiers of the targeted pages using a consistent sorting methodology that is applied to all distributed transactions, so that the order in which locks are obtained on any two pages does not change from one transaction to another. The coordinator may construct the storage node chain for the transaction in the depicted embodiment, for example by identifying the (current) master storage nodes for all the extents whose pages are targeted, and arranging them in the order in which the commit analyses should be performed. In at least one embodiment, the coordinator may also be responsible for generating a unique transaction identifier (e.g., a universally unique identifier or UUID that incorporates a randomly-generated string). In some embodiments in which read logical timestamps (RLTs) or operation sequence numbers such as those discussed with respect to the conditional write techniques described above are available for I/O operations, the coordinator may also read all the targeted pages and determine the RLTs associated with the reads (element 2016). The coordinator may then construct a Tx-prepare message that indicates the node chain, the write payloads, and the RLTs, and transmit the Tx-prepare message to the first node of the chain (element 2019).

At least in some embodiments, the coordinator may then start a timer set to expire after a selected timeout period, and wait for a response to its Tx-prepare message. If no response is received within the timeout period (as detected in element 2023), in some embodiments a response may be provided to the client that requested the file store operation of element 2001 indicating that the result of the operation is unknown (element 2035). In at least one embodiment, a transaction state recovery operation may be initiated, e.g., by sending another Tx-prepare message to the first node of the chain if that node is still accessible, or to a replacement node for that first node if one can be found or configured.

If, within the timeout period, a Tx-commit message is received at the coordinator (as determined in element 2026), this may indicate that all the individual page modifications of the transaction have been successfully performed. Accordingly, in some embodiments, the coordinator may send an indication that the requested operation has succeeded to the client that requested the operation (element 2029). In at least one embodiment, Tx-cleanup messages may be sent to the chain nodes, e.g., asynchronously with respect to the receipt of the Tx-commit, so that any resources holding transaction state for the committed transaction at the node chain members can be released. As discussed earlier, Tx-cleanup messages may be sent either by the coordinator or by some other selected chain member, such as the first member of the chain.

If a Tx-abort message is received at the coordinator (as also detected in element 2026), the coordinator may in some embodiments optionally send an indication to the client that the requested operation failed (element 2032). In some embodiments, Tx-cleanup messages may also be sent to those chain members who had participated in the aborted transaction, either by the coordinator or some other member of the chain. Since transactions may be aborted by any of the chain members, only a subset of the members may have stored transaction state records before the abort occurred, and hence only a subset of the chain members may be sent Tx-cleanup messages in some implementations. In other implementations, the Tx-cleanup messages may simply be sent to all the nodes of the chain, and those nodes that had not stored any transaction state for the transaction identified in the Tx-cleanup message may ignore the Tx-cleanup message.

Figure 21:
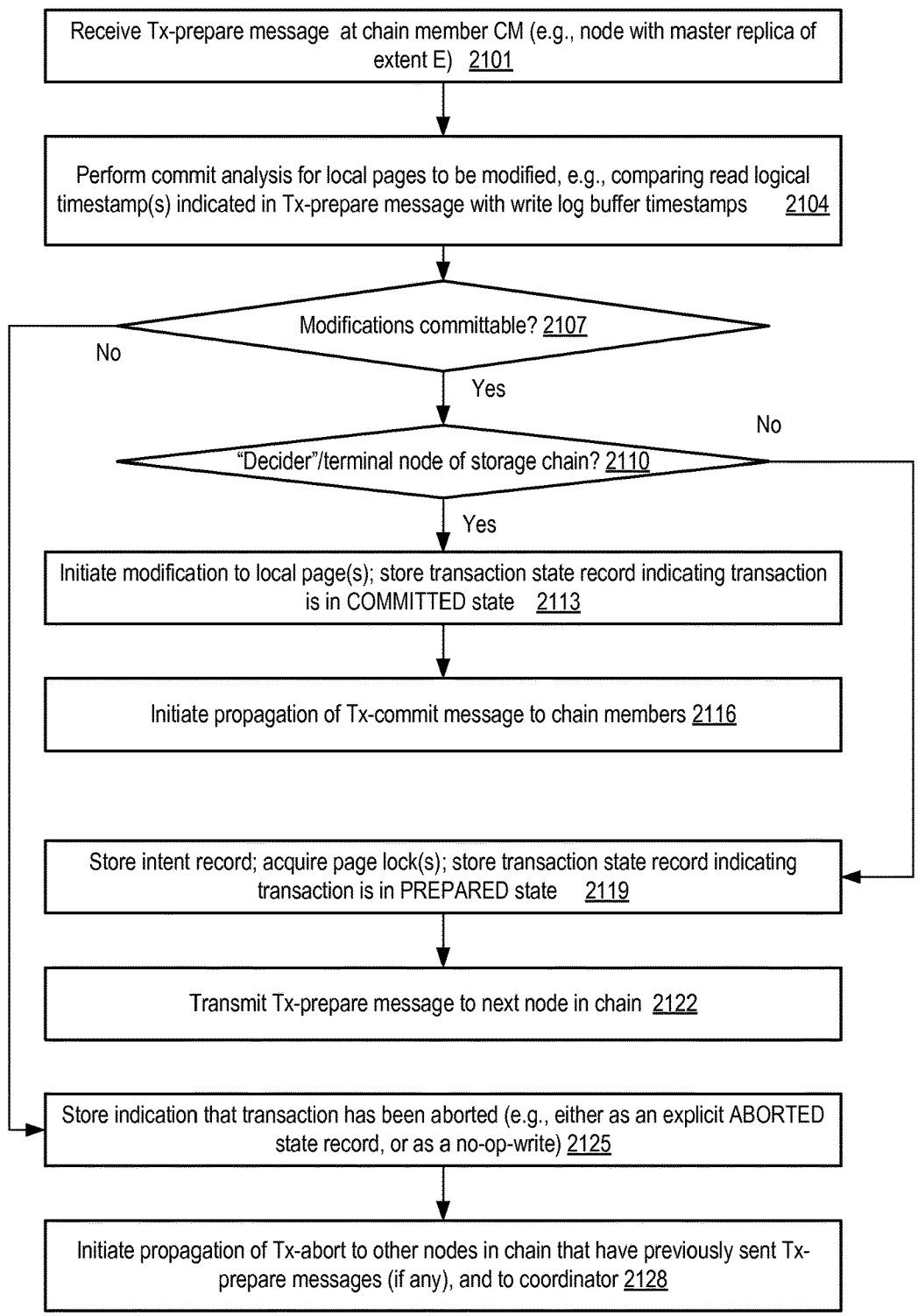
FIG. 21 is a flow diagram illustrating aspects of operations that may be performed in response to receiving a transaction-prepare message at a node of a storage service, according to at least some embodiments.

FIG. 21 is a flow diagram illustrating aspects of operations that may be performed in response to receiving a transaction-prepare (Tx-prepare) message at a node of a storage service, according to at least some embodiments. A member CM of the node chain constructed by the coordinator, e.g., a node storing a master replica of one of the extents whose pages are to be modified as part of the transaction, may receive a Tx-prepare message from some other node (e.g., typically either from the coordinator or from some non-decider member of the chain) (element 2101). The Tx-prepare message may indicate, in a list of proposed page modifications for the transaction, one or more proposed page-level modifications to a page P whose parent extent's master replica is stored at CM. CM may determine whether the changes are acceptable/committable from its perspective, e.g., by checking in a write log buffer (similar to the buffers shown in FIG. 14) whether page P has been modified since a read logical timestamp indicated for P in the Tx-prepare message was obtained. In some cases multiple page level modifications, either to the same page or to different pages being stored at CM, may be indicated in the Tx-prepare message, and all such changes may be checked for acceptability.

If the local page-level modifications are committable, as determined in element 2107, different actions may be taken depending on whether CM is the decider (the last member of the node chain) or not. If CM is the decider (as detected in element 2110), the modifications to the local page or pages may be initiated, and a transaction record indicating that the transaction is in COMMITTED state may be stored in persistent storage in the depicted embodiment (element 2113). The decider node may then initiate the propagation of Tx-commit messages to the other members of the node chain (element 2116). The Tx-commit messages may be propagated sequentially in some embodiments, e.g., in the reverse order relative to the sequential order in which the Tx-prepare messages were transmitted for the same transaction. In other embodiments, the Tx-commit messages may be sent in parallel.

If the local page-level modifications are committable and CM is not the decider node (as also determined in elements 2107 and 2110), in the depicted embodiment CM may (a) store an intent record (indicating that if the remaining node chain members also find their local changes committable, CM intends to perform its local modifications), (b) lock the targeted local pages of CM (e.g., to prevent any writes to those pages until the distributed transaction as a whole is committed/aborted), and (c) store a transaction state record indicating that the transaction is in PREPARED state (element 2119). CM may then send a Tx-prepare message on to the next node in the chain (element 2122).

If the local page-level modifications are not committable (as also detected in element 2107), e.g., if the page P has been written to since the RLT for P indicated in the Tx-prepare message was obtained, the transaction as a whole may have to be aborted in order to support sequential consistency semantics. Accordingly, CM (which may be a non-decider node or a decider node) may store an indication that the transaction has been aborted (element 2125). In some implementations, a transaction state record indicating the transaction is in ABORTED state may be stored. In other implementations, a dummy or "no-op" write record may be stored in a local write log buffer (similar to buffers 1450 of FIG. 14). Such a dummy write would have the same effect as the state record indicating the ABORTED state. That is, if for some reason (e.g., as a result of receiving an erroneous or delayed message) an attempt is made to re-try the transaction at CM, the retry would fail. CM may initiate a propagation of a Tx-abort message to the other nodes in the chain that have already sent Tx-prepare messages (if there are any such nodes) and/or to the coordinator (element 2128).

Figure 22:
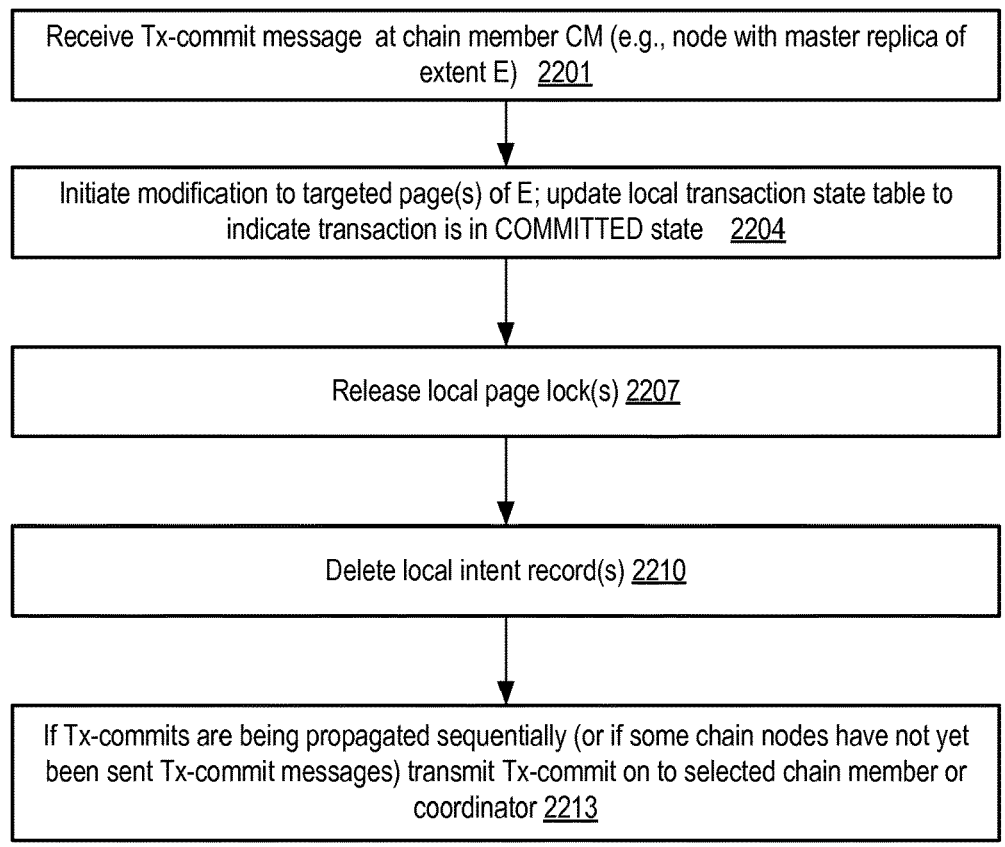
FIG. 22 is a flow diagram illustrating aspects of operations that may be performed in response to receiving a transaction-commit message at a node of a storage service, according to at least some embodiments.

FIG. 22 is a flow diagram illustrating aspects of operations that may be performed in response to receiving a transaction-commit (Tx-commit) message at a node of a storage service, according to at least some embodiments. As shown in element 2201, a node chain member CM, indicated by the transaction coordinator in the Tx-prepare message for the transaction, may receive a Tx-commit message. The Tx-commit message may (at least under normal operating conditions) typically be received at some time after CM has performed its local page-level commit analysis and stored a transaction record indicating the transaction is in a PREPARED state. In response to receiving the Tx-commit message, CM may initiate the actual modifications to the local targeted pages (element 2104) and modify the transaction state record to indicate that the transaction is now in COMMITTED state. In some embodiments, depending on the data durability requirements of extent E, multiple extent replicas may have to be modified before the local page writes can be considered completed. In some such scenarios CM may wait, after initiating the page modifications, until enough replicas have been updated before changing the transaction record.

CM may then release the lock(s) it was holding on the targeted page or pages (element 2207). In at least some embodiments, the intent record that CM had stored when responding to the Tx-prepare message for the transaction may be deleted at this point (element 2210). As noted earlier, in some embodiments, Tx-commit messages may be propagated sequentially among the chain members in reverse order relative to the Tx-prepare messages, while in other embodiments, parallel propagation may be used, or some combination of sequential and parallel propagation may be used. If sequential propagation is being used, or if CM can determine (e.g., based on indications within the Tx-commit message that it received) that some nodes of the chain have not yet received a Tx-commit message, CM may then transmit a Tx-commit message on to a selected node in the chain or to the coordinator (element 2213). In some embodiments duplicate Tx-commit messages may be ignored—e.g., if a given node or the coordinator receives a Tx-commit message for transaction Tx1 and Tx1 is already recorded as having been committed, the new Tx-commit message may be disregarded. In some such embodiments, a non-sequential propagation mechanism may be used for Tx-commit messages to shorten the total time taken to complete the transaction, in which, for example, each node that receives a Tx-commit message may forward Tx-commit messages to N other nodes of the chain.

Figure 23:
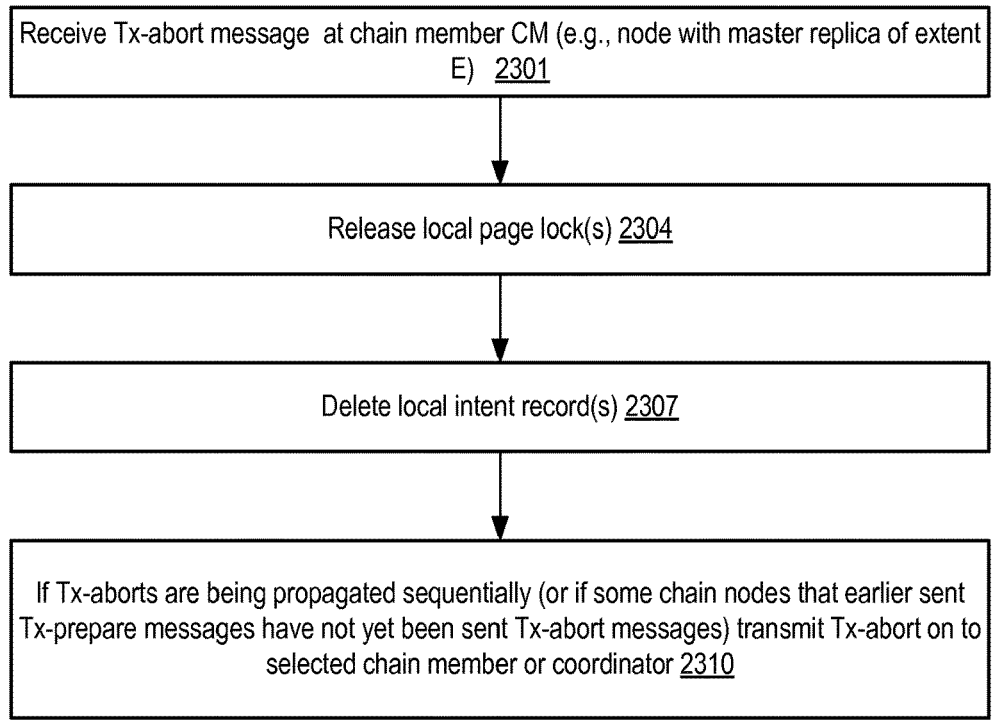
FIG. 23 is a flow diagram illustrating aspects of operations that may be performed in response to receiving a transaction-abort message at a node of a storage service, according to at least some embodiments.

FIG. 23 is a flow diagram illustrating aspects of operations that may be performed in response to receiving a transaction-abort (Tx-abort) message at a node of a storage service, according to at least some embodiments. As shown in element 2301, a Tx-abort message may be received at a chain member CM. Just like a Tx-commit message, a Tx-abort message may (at least under normal operating conditions) typically be received at some time after CM has performed its local page-level commit analysis and stored a transaction record indicating the transaction is in a PREPARED state.

In response to receiving the Tx-abort message, CM may release the lock(s) it was holding on the targeted page or pages (element 2304). In at least some embodiments, the intent record that CM had stored when responding to the Tx-prepare message for the transaction may be deleted at this point (element 2307). As in the case of Tx-commit messages, in different implementations, either sequential, parallel, or hybrid (i.e. some combination of sequential and parallel) propagation may be employed for Tx-abort messages. In some embodiments, Tx-abort messages may be propagated sequentially among the chain members in reverse order relative to the Tx-prepare messages, for example. If sequential propagation is being used, or if CM can determine (e.g., based on indications within the Tx-abort message that it received) that some nodes of the chain that had earlier sent Tx-prepare messages have not yet received a Tx-abort message, CM may then transmit a Tx-abort message on to a selected node in the chain or to the coordinator (element 2310). In some embodiments, as with duplicate Tx-commit messages, duplicate Tx-abort messages may be ignored—e.g., if a given node or the coordinator receives a Tx-abort message for transaction Tx1 and Tx1 is already recorded as having been aborted, the new Tx-abort message may be disregarded. In some such embodiments, a non-sequential propagation mechanism may be used for Tx-abort messages to shorten the total time taken to abort the transaction, in which, for example, each node that receives a Tx-abort message may forward Tx-abort messages to N other nodes of the chain.

On-Demand Page Allocation Using an Extent Oversubscription Model

In many storage systems, performance goals may sometimes potentially conflict with space-efficiency goals. For example, in general, keeping the amount of metadata (such as structures that comprise logical-block-to-physical-page mappings) relatively small relative to the amount of data being managed may help to speed up various types of file store operations. If metadata grows too large, the cache hit rate at the access nodes' metadata caches may fall, which may result in more interactions between the access and metadata subsystems to service the same number of client requests. Since at least some metadata may be maintained on a per-logical-block basis, this would suggest that having large logical blocks (e.g., 4 megabyte or 16 megabyte logical blocks) would be better from a performance perspective than having small logical blocks. However, if physical pages for the entire logical block were allocated at the time the first write to the logical block is requested, this might result in suboptimal space usage efficiency. For example, consider a scenario where the logical block size is 4 MB (thus, a minimum of 4 MB of physical space would be allocated for any given file if enough space for an entire logical block is allocated at a time), and the median amount of data stored in a file within a given directory or file system is, say, 32 KB. In such a scenario, a large amount of physical storage space would be wasted. If logical block sizes were set to close to the median file size, however, this may result in very large amounts of metadata for large files, thus potentially slowing down operations not just directed to the large files but to the file storage service as a whole.

A number of techniques may be used to deal with the tradeoffs between space efficiency and performance in different embodiments. In one technique, an oversubscription model may be used for extents, and physical pages within a given logical block may only be allocated on demand rather than all at once (i.e., if a logical block size is set to X kilobytes, and the first write to the logical block has a payload of only (X-Y) kilobytes, only enough pages to store X-Y kilobytes may be allocated in response to the first write). In another technique, described after the discussion of the oversubscription model, logical blocks of different sizes may be employed within a given file store object, so that the sizes of at least some of the stripes of the object may differ from the sizes of other stripes. It is noted that while extents may be replicated for data durability in various embodiments as described earlier (including in embodiments at which extents are oversubscribed and/or variable logical blocks sizes are used), the extent replication techniques may be considered orthogonal to the logical-block-to-page mappings, and to extent oversubscription, as discussed here. Accordingly, extent replicas may not be discussed in detail herein with respect to oversubscribed extents or with respect to variable-sized stripes. To simplify the presentation, a logical extent may be assumed to comprise a single physical extent with respect to most of the discussion of extent oversubscription management techniques and with respect to discussions of techniques used for variable-sized stripes or variable-sized logical blocks.

Figure 24:
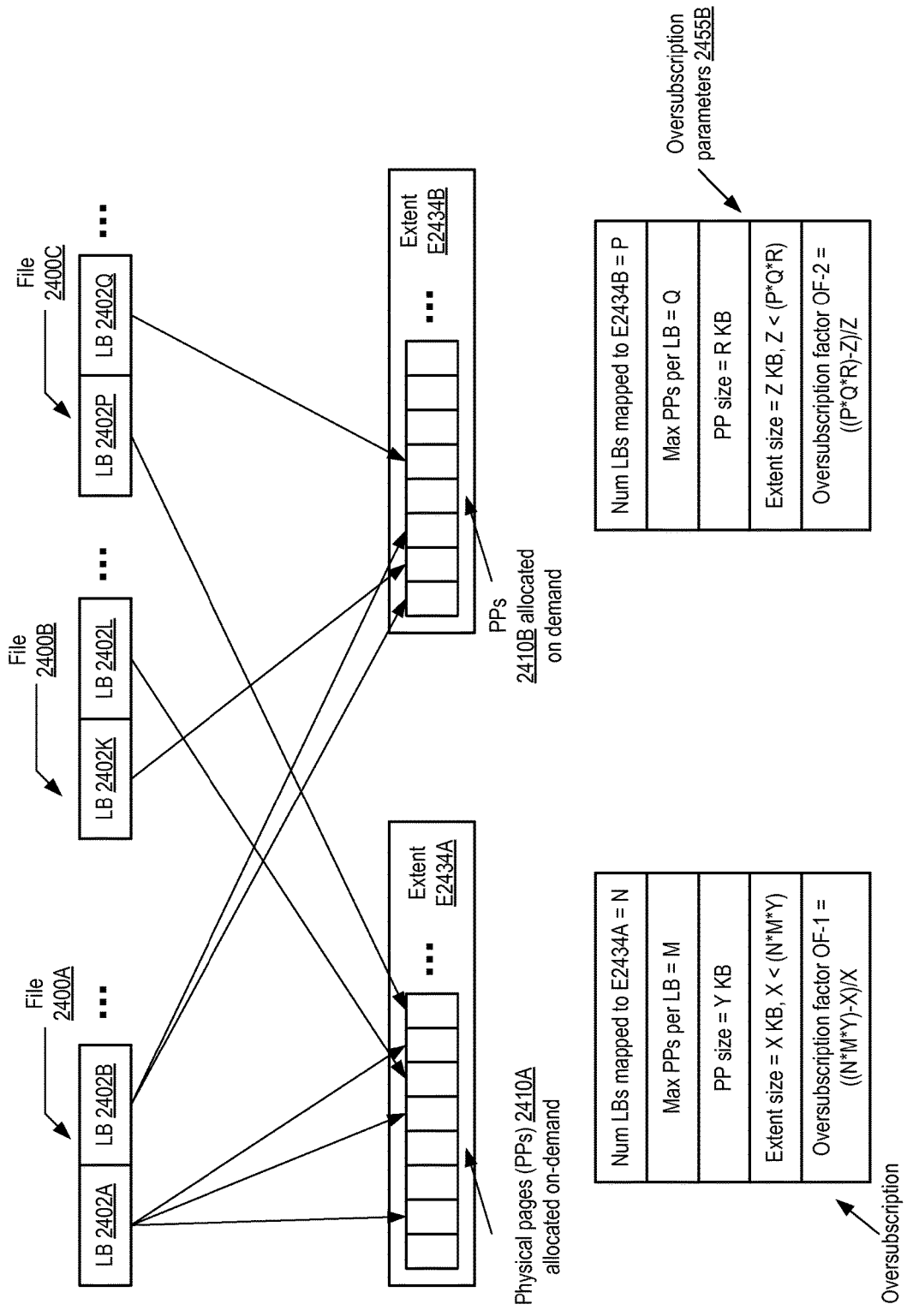
FIG. 24 illustrates examples of over-subscribed storage extents at a distributed storage service, according to at least some embodiments.

FIG. 24 illustrates examples of over-subscribed storage extents at a distributed storage service, according to at least some embodiments. In the depicted embodiment, logical blocks of a given file store object (such as files 2400A, 2400B, or 2400C) are all of the same size, and all the physical pages allocated for a given logical block are part of a single extent. A physical page within a given extent may typically also be of the same size as the other physical pages of the extent in the depicted embodiment. Thus, in one example implementation, an extent may comprise 16 Gigabytes of 32-KB physical pages, while a logical block may comprise 4 megabytes. The sizes of the extents, logical blocks and/or physical pages may be set using respective configuration parameters in at least some embodiments.

As shown, different logical blocks of the same file may at least in some cases be mapped to different extents, and as a result logical blocks may be considered the equivalent of stripes. File 2400A comprises LB (logical block) 2402A and 2402B. LB 2402A is mapped on-demand to some number of physical pages (PPs) 2410A of extent E2434A. Similarly some number of physical pages 2410B at extent E2434B are allocated on demand for LB 2402B. At extent E2434A, some number of pages 2410A are allocated on demand for LB 2402L of file 2400B as well as LB 2402P of file 2400C. At extent E2434B, some number of pages 2410B are allocated on demand for LB 2420K of file 2400B and for LB 2402Q of file 2400C. The on-demand allocation technique may be implemented as follows in the depicted embodiment: whenever a write request directed to a particular logical block is received, the starting offset within the file, and the size of the write payload (e.g., the number of bytes to be written or modified) may be used to determine whether any new physical pages are to be allocated, and if so, how many new physical pages need to be allocated. (Some write requests may not need any new pages to be allocated, as they may be directed to previously-allocated pages.) Only the number of new physical pages that are required to accommodate the write payload may be allocated, instead of, for example, allocating at one time the entire set of physical pages that could potentially be written as part of the logical block. Consider the following example: LB 2402A is 4 megabytes in size, and PPs 2410A are 32 KB in size. A first write to LB 2402A, comprising 28 KB of write payload, is received. Prior to this point, no physical storage has been allocated for LB 2402A in the example scenario. The storage service makes a determination that only one PP 2410A is needed for the first write (since 28 KB can be accommodated within a single 32-KB page). As a result, only one PP 2410A is allocated within extent E2434A, even though the entire 4 MB of LB 2402A may eventually have to be stored within extent E2434A, since all the pages of a given logical block have to be allocated from within the same extent in the depicted embodiment.

In general, in at least some embodiments, it may not be straightforward to predict what fraction of a logical block is eventually going to be written to; some sparse files may contain small regions of data at widely different logical offsets, for example. In order to improve space usage efficiency in the depicted embodiment, extents E2434A and E2434B each may be oversubscribed. An extent may be considered to be oversubscribed if it is configured to accept write requests to more logical blocks than could be fully physically accommodated within its current size—e.g., if the complete offset range within all the logical blocks were somehow to be written to at the same time, the extent may have to be enlarged (or a different extent may have to be used). Thus, as shown in oversubscription parameters 2455A, N logical blocks may be mapped to extent E2434A, and each logical block could be mapped to a maximum of M physical pages of Y kilobytes each. Extent E2434A's current size is X Kilobytes, where X is less than (N*M*Y). An oversubscription factor OF1 applies to extent E2434A in the depicted embodiment, equal to the ratio of the potential overflow amount of storage ((N*M*Y)−X) to the actual size of the extent (X). Similar oversubscription parameters 2455B apply to extent E2434B. E2434B can currently store only up to Z kilobytes, but it is configured to accept write requests directed to P logical blocks, each of which can be mapped to Q physical pages of R KB each. Z is less than (P*Q*R), and the oversubscription factor OF2 for E2434B is therefore ((P*Q*R)−Z)/Z. In some embodiments, different extents may be configured with different oversubscription factors. In one embodiment, a uniform oversubscription factor may be used for all the extents. As described below, in some embodiments the oversubscription factor and/or a free space threshold associated with the oversubscription factor may be modified for at least some extents over time, e.g., based on collected metrics of file system usage or behavior. Techniques similar to those described herein for oversubscription management at the per-extent level may also or instead be applied to oversubscription at other levels in various embodiments—e.g., storage subsystem nodes may be oversubscribed based on the oversubscription of their extents, individual storage devices may be oversubscribed, and so on.

Figure 25:
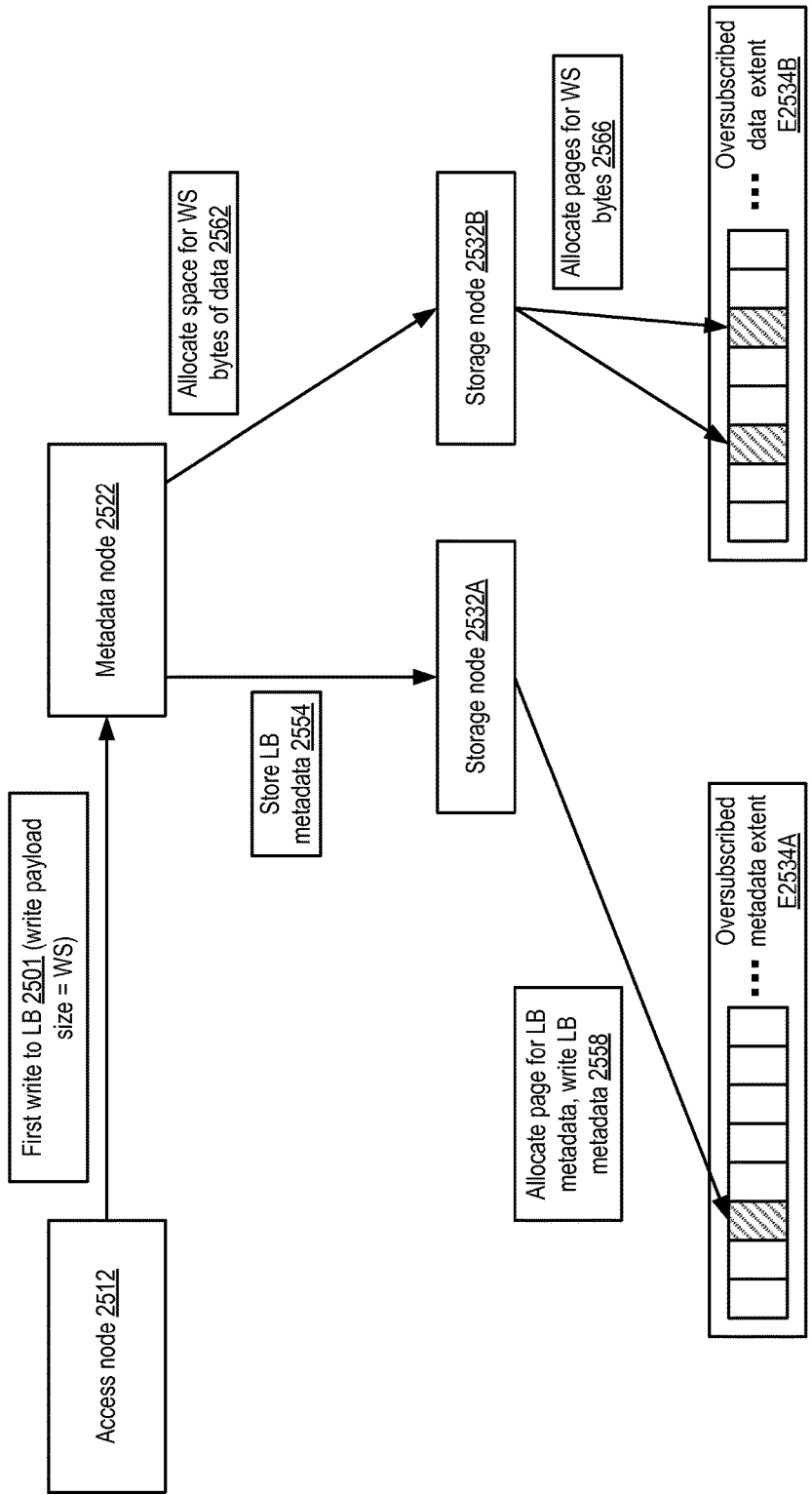
FIG. 25 illustrates interactions among subsystems of a storage service implementing on-demand physical page-level allocation and extent oversubscription, according to at least some embodiments.

FIG. 25 illustrates interactions among subsystems of a distributed multi-tenant storage service implementing on-demand physical page-level allocation and extent oversubscription, according to at least some embodiments. As shown, both metadata extents (such as E2534A) and data extents (such as E2534B) may be oversubscribed in the depicted embodiment. A first write request directed to a particular logical block (LB) may be received at a metadata node 2522 from an access node 2512, as indicated by arrow 2501. The write request may comprise a write payload of size "WS", and may, for example, have been generated at the access node 2512 in response to a client's write request directed to a file 2400.

The metadata for the logical block itself may not have been created at the time the write request 2501 is received—e.g., the write may simply be the first write directed to a file 2400 after the file is opened. In the depicted embodiment, the metadata node 2522 may first generate and write LB's metadata. A request 2554 may be sent, for example, to a storage node 2532A to store the LB's metadata. The storage node may allocate a page from an oversubscribed metadata extent E2534A, and store the metadata generated by the metadata node 2522, as indicated by block 2558. The particular metadata extent to be used may be selected by either the metadata node 2522, the storage node 2532A, or by a different placement component of the storage service in different embodiments. The selection may be based, for example, on various factors such as the name of the file being modified, the amount of free space available in various extents, and so on.

The metadata node 2522 may also determine how many new physical data pages are to be allocated to store the write payload of WS bytes in the depicted embodiment. A request 2562 for the appropriate number of physical pages to accommodate WS bytes may be sent to a different storage node 2532B in at least some embodiments than is used for the LB metadata. The storage node 2532B may allocate the requested number of physical pages (which may in at least some cases be less than the number of pages that would be required if the entire address range of the logical block were written at once) at an oversubscribed data extent 2534B in the depicted embodiment. The identities of the physical pages may be stored within the LB metadata stored at extent 2534A in the depicted embodiment—e.g., the storage node 2534B may transmit the addresses of the data pages within extent 2534B to metadata node 2522, and metadata node 2522 may submit a request to storage node 2532A to write the addresses within the LB metadata. In some embodiments, the data pages may be allocated before the metadata pages are allocated, so that for example the allocation of the metadata page can be combined with the writing of the data page addresses without requiring additional messages. In one embodiment, the write payload may be transmitted to the storage node 2532B by the metadata node 2522 together with the allocation request 2562 for the data pages, in which case the writing of the WS bytes may be combined with the allocation of the data pages, without requiring additional messages. In at least some embodiments, after the data page or pages have been allocated for the first write request 2501, the identity of the appropriate storage node (2532B) at which the data is to be stored may be provided to the access node 2512, and the access node 2512 may submit the write payload to the storage node.

In at least some embodiments, as mentioned earlier, the use of the oversubscription model may result in situations where a given extent may run short of sufficient storage space for all the logical blocks whose contents it is designated to store. Accordingly, in some embodiments, oversubscribed extents may have to be expanded from time to time, or extent contents may have to be moved or copied from their original extent to a larger extent. In some embodiments, in order to avoid synchronous delays that might otherwise result if extent-level data copying or extent expansion is supported, free space thresholds may be assigned to oversubscribed extent. An asynchronous extent expansion operation, or asynchronous transfer of extent contents, may be implemented in such embodiments if the free-space threshold is violated. Different extents may grow at different rates, depending on the nature of the storage workload directed to them. A maximum extent size may be defined for at least some extents (e.g., based on the capacity of the particular storage devices being used). As a result, when such a maximum extent size is reached for a particular extent, the extent may no longer be considered as oversubscribed, and the storage service may employ different logic to deal with such maximally-sized extents than the logic used for extents that can still grow. In some embodiments, selected extents may be moved to a different storage node or a different storage device proactively in order to make room for growth of other extents. Such proactive moves may in some implementations be performed as background tasks, so as to minimize disruption of ongoing client-requested operations. A number of different rules, policies or heuristics may be used to select which extents are to be moved proactively to make room for other extents in different embodiments—e.g., in one embodiment, extents with most of their capacity unused may be chosen for proactive moves in preference to extents with most of their capacity already in use. The opposite approach may be used in other embodiments—e.g., extents that have already reached their maximum size (or are closer to reaching their maximum size) may be moved in preference to those that still have substantial growth possible. Similarly, the target storage devices or storage nodes to which the extents are moved may also be selected based on configurable policies in various embodiments. In one embodiment, extents may only be moved when absolutely necessary (e.g., proactive moves may not be implemented).

Figure 26A:
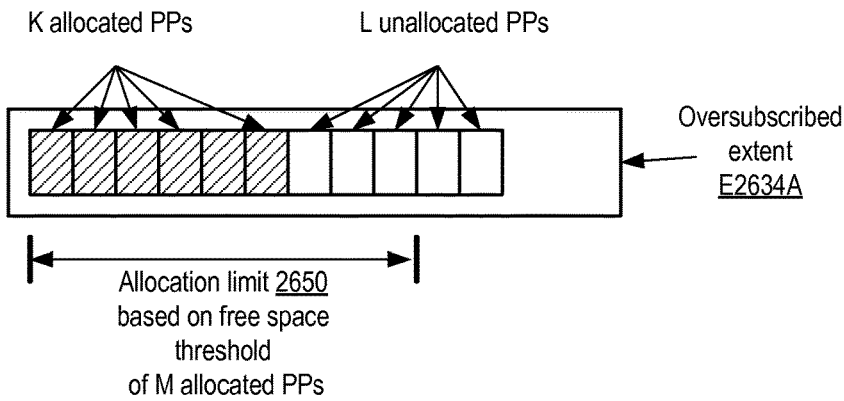
Figure 26B:
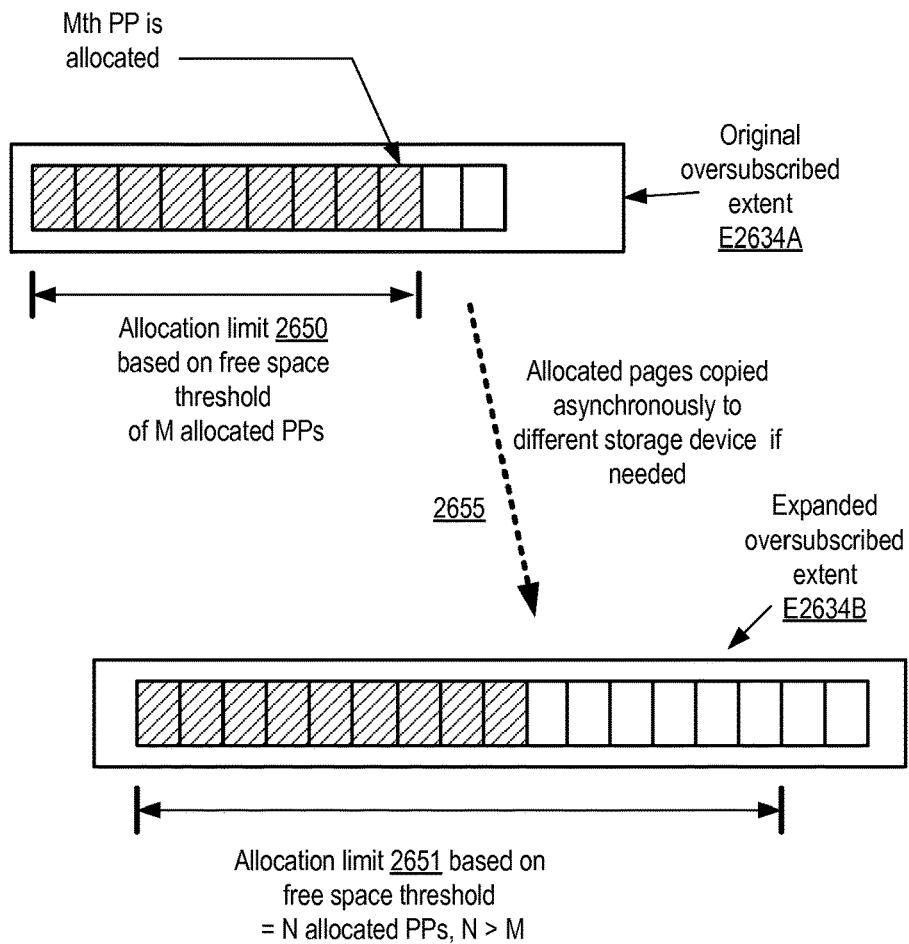
FIG. 26b illustrates an expansion of the extent resulting from a violation of the free space threshold, according to at least some embodiments.

FIG. 26a illustrates an extent for which a free space threshold has been designated, while FIG. 26b illustrates an expansion of the extent resulting from a violation of the free space threshold, according to at least some embodiments. As shown in FIG. 26a, the free space threshold set for an oversubscribed extent E2634A may be set such that a maximum limit 2650 of M physical pages may be allocated within the extent before expansion is triggered. As long as the number of allocated pages K of extent 2634A is less than M (i.e., the number of unallocated pages L is above the free threshold limit), new pages may be allocated on demand in response to write requests as illustrated in FIG. 25. If/when the Mth page is allocated, an asynchronous copying of the contents of the original extent 2634A to a larger or expanded extent 2634B may be initiated, as indicated by arrow 2655 of FIG. 26b. As shown, the maximum allocation limit (N pages) of the expanded extent 2634B may be larger than the allocation limit of M pages of the original extent 2634A. In some embodiments, it may be possible to expand at least some extents without copying the pages—e.g., if a given oversubscribed extent is located on a storage device with sufficient space to accommodate a desired expansion, the size of the extent may be increased within the storage device. In other embodiments, the contents of the original extent may have to be copied to a different storage device, potentially at a different storage node. Thus, in one implementation, expanded extent 2634B may occupy a different physical storage device than the original extent 2634A. In at least some implementations, extents of several different sizes may be created at the storage service—e.g., N1 extents of 10 GB may be created, N2 extents of 20 GB may be created, and so on. In such embodiments, expansion of an extent may involve copying pages from a 10 GB extent to a pre-existing 20 GB extent, for example. The term "extent expansion", as used herein, is intended to refer generally to any of these types of operations that lead to the ability to store additional data or metadata contents at an oversubscribed extent when its free space threshold is violated—e.g., whether the operation involves in-place enlargement of an extent or a transfer of extent contents from one storage device to another. Thus, an extent may in some embodiments be expanded by, in effect, replacing the storage device being used for the extent with a different storage device, either at the same storage node as the original device or at a different storage node. In some embodiments, if an extent identifier E1 was used to refer to the extent prior to the expansion, and a different storage device is used post-expansion, a different extent identifier E2 may be used post-expansion. In other embodiments, the same identifier may be used post-expansion.

Figure 27:
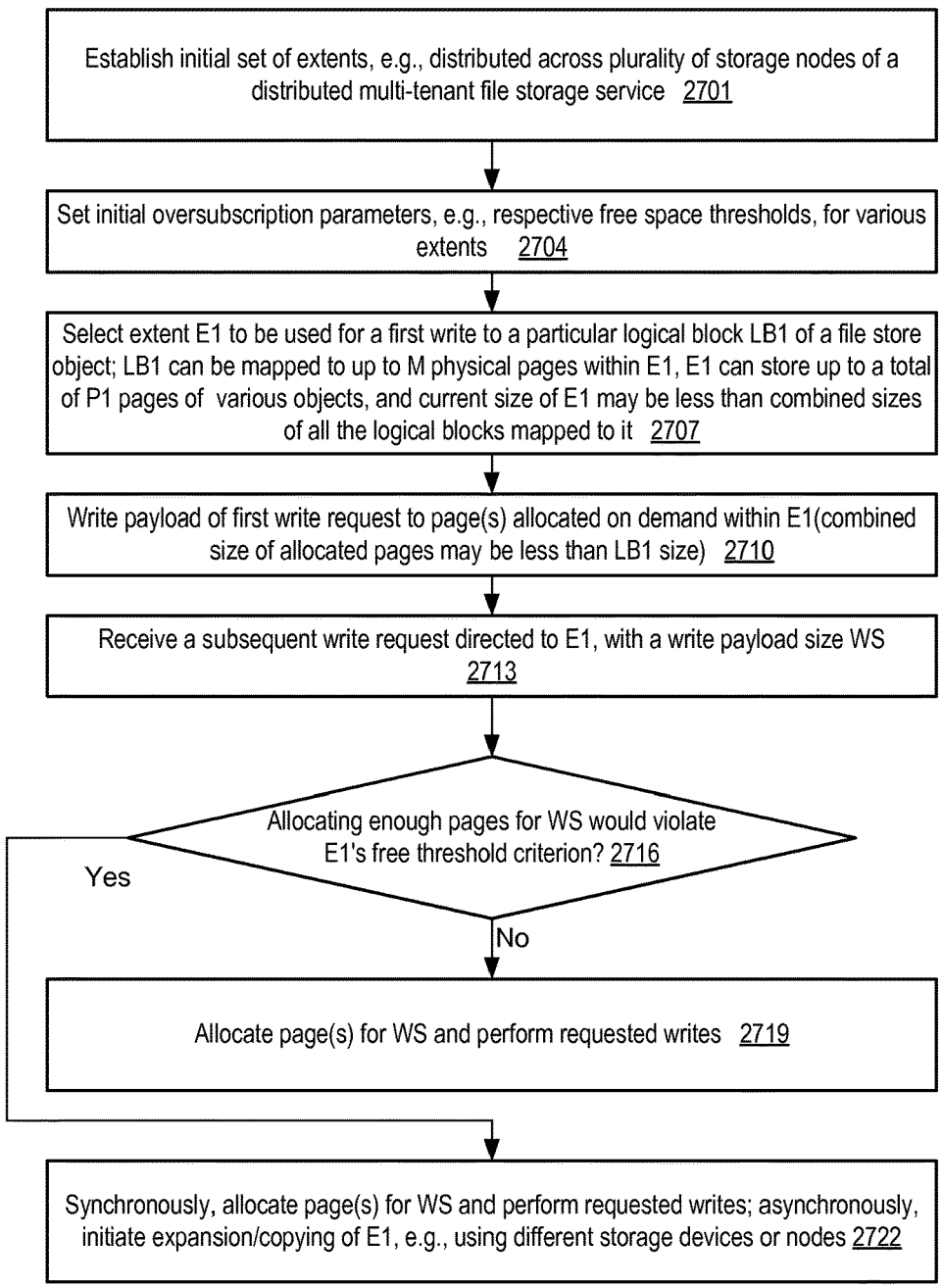
FIG. 27 is a flow diagram illustrating aspects of operations that may be performed to implement on-demand physical page allocation at extents that support oversubscription, according to at least some embodiments.

FIG. 27 is a flow diagram illustrating aspects of operations that may be performed to implement on-demand physical page allocation at storage services that support extent oversubscription, according to at least some embodiments. As shown in element 2701, a plurality of physical extents may be set up at a plurality of storage subsystem nodes of a distributed multi-tenant file storage service. In some embodiments, some number of extents of one or more different sizes may be pre-configured at the time that the storage service is started up at a set of resources of a provider network, for example. In other embodiments, a set of extents may be set up when a new file store (e.g., a file system) is initialized. Each extent may comprise enough space for some selected number of physical pages, with each page comprising some number of bytes that can be used for storing contents of logical blocks of either data or metadata in some embodiments. For example, in one embodiment, each of a set of extents may comprise 8 Gigabytes of storage space on a particular SSD or rotating-disk-based storage device, the default logical block size being used objects whose contents are to be stored at the extent may be 4 MB, and the physical page size may be set to 32 KB. With this set of parameters, each logical block may comprise up to 128 physical pages, and each extent may store up to approximately 2000 fully-populated logical blocks (blocks to which at least 4 MB of data has actually been written, so that there are no unwritten ranges of offsets within the logical blocks). In general, it may be the case that not all the ranges of offsets within the logical block may contain data (or metadata), since in at least some file system protocols writes may be directed to random offsets within a file or a metadata structure. The contents of a given logical block may be contained within a given extent in the depicted embodiment—e.g., all the physical pages to which the logical block is mapped may have to be part of the same extent.

Because of the potential for unwritten gaps in the logical blocks, a set of oversubscription parameters may be determined for at least some subset of extents (element 2704), in accordance with which more logical blocks may be assigned to a given extent than could be accommodated if the blocks were to be fully populated. The parameters for a given extent may indicate, for example, the oversubscription factor (e.g., a measure of how much additional space could potentially be required for the logical blocks mapped to the extent), one or more thresholds (such as the free space threshold discussed above) at which various actions such as extent expansion are to be triggered, preferred storage devices or extents to which the contents of the current extent should be copied/moved if the thresholds are met, and so on.

In response to a particular write request directed to a logical block LB1 of a file store object, such as the first write to a file or to a metadata structure, a particular extent E1 of the available extents may be selected to store contents of the logical block (element 2707). For example, E1 may be capable of storing up to P1 pages in all (which could be part of several different file store objects in a multi-tenant environment), including up to M pages of LB1. In at least some scenarios E1 may be oversubscribed at the time that it is selected—e.g., the combined sizes of the logical blocks mapped to it (at least some of which may not be fully populated with data or metadata) may exceed the current size of E1. E1 may be selected based on various criteria in different embodiments, such as the fraction of its storage space that is free, the type of storage device (SSD or rotating disk-based) that is preferred for the file store object, etc. One or more pages may be allocated within E1 for the first write, and the payload of the first write request may be written thereto (element 2710). While the combined size of the allocated pages may be sufficient to accommodate the payload, the combined size of the allocated pages may at least in some cases be smaller than the size of the logical block LB1 (e.g., if the payload size is smaller than LB1's size). Under normal operating conditions, in at least some embodiments E1 would only have been selected for the first write if implementing the write would not violate E1's free space constraints.

A subsequent write request with a write payload of size WS directed to E1 may be received (element 2713). The subsequent write request may be directed either to LB1 or to some other logical block mapped to E1. If allocating enough physical pages to accommodate the write payload WS would not violate the free space threshold set of E1 (as detected in element 2716), the required number of physical pages may be allocated, and the requested write may be performed (element 2719). If E1's free space threshold would be violated (as also detected in element 2716), in the depicted embodiment one synchronous operation and one asynchronous operation may be initiated. Synchronously with respect to the write request, e.g., so as to avoid any lengthy delays in responding to the write request, one or more additional pages would be allocated within E1. Asynchronously, an extent expansion operation of the kind discussed above with respect to FIG. 26b may be initiated. The extent expansion may involve, for example, an in-place enlargement of E1 by changing E1-related metadata at its original storage device, or it may involve transferring at least some of E1's contents to some other storage device (and/or some other storage node) at which a larger extent may be configured. It is noted that in at least some embodiments, E1 may be one extent replica (such as the master replica) of a replica group configured in accordance with a data durability policy associated with a file store of which LB1 is a block and writes performed at E1 may be propagated to one or more additional replicas in accordance with the kinds of replication techniques (e.g., erasure coding, full replication, etc.) discussed earlier. At least in some embodiments in which extents are oversubscribed and pages within a given block are allocated on-demand, the sizes of pages within a given extent or logical block may differ, and/or the sizes of logical blocks within a given file or metadata structure may differ.

Figure 28:
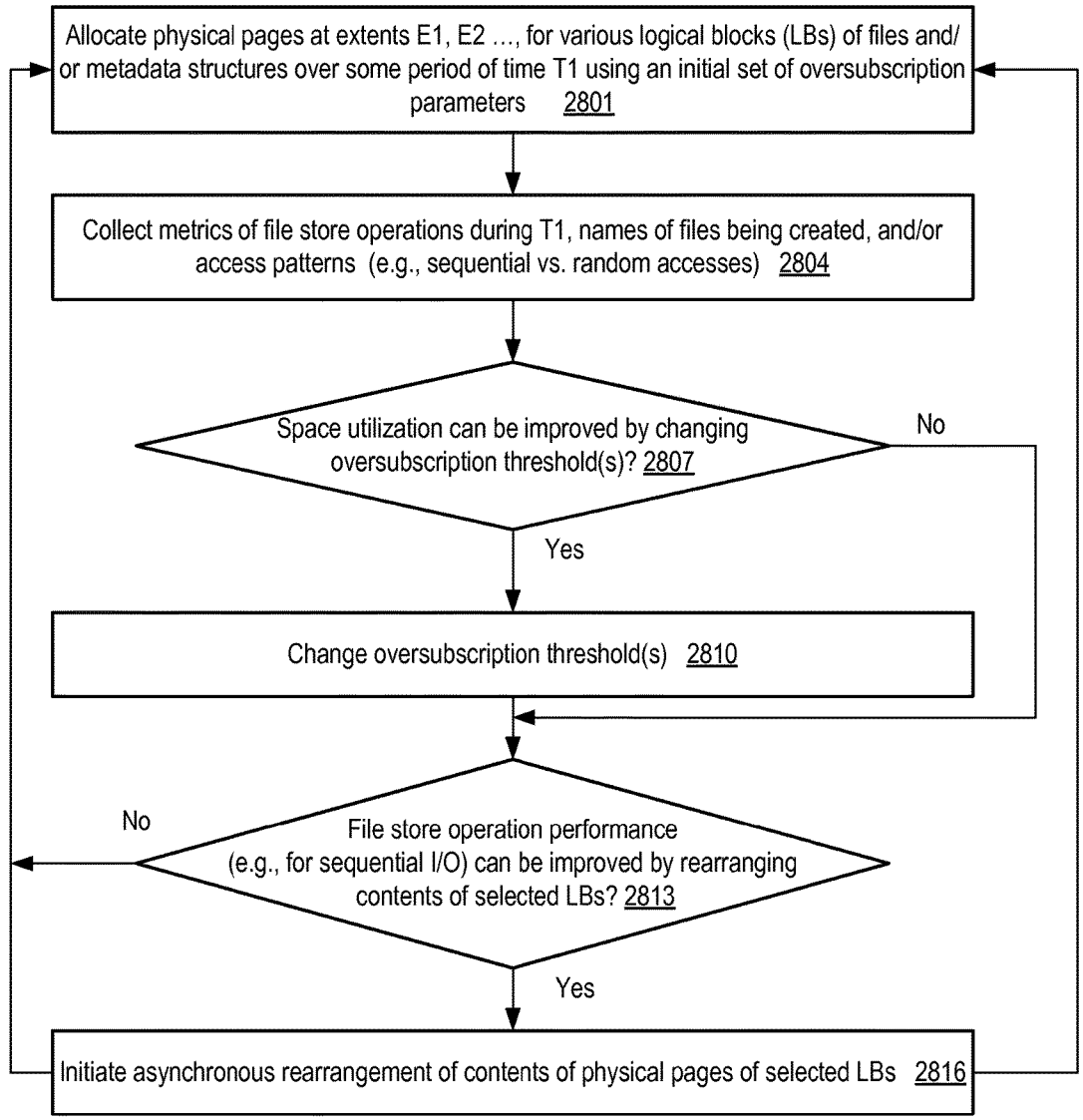
FIG. 28 is a flow diagram illustrating aspects of operations that may be performed to dynamically modify extent oversubscription parameters, according to at least some embodiments.

Dynamic on-demand page-level allocation of storage may have the side effect of separating parts of the same logical block—e.g., the pages allocated for a given logical block may at least in some cases not be contiguous on the storage device(s) being used. In some embodiments, it may be possible to monitor various characteristics of file store operations over time, and optimize the way in which extent oversubscription is being implemented, including for example the degree of oversubscription, as well as the manner in which pages of a given logical block are laid out on a physical storage device. FIG. 28 is a flow diagram illustrating aspects of operations that may be performed to dynamically modify extent oversubscription parameters, according to at least some embodiments. As shown in element 2801, physical pages may be allocated over a time period T1 for data and/or metadata in accordance with an initial set of oversubscription parameters set for some set of extents E1, E2, etc.

A number of different metrics may be collected during T1 on the file store operations being performed using the oversubscribed extents (element 2804). For example, file access patterns may be analyzed, e.g., to determine the proportions of reads and/or writes that are random versus sequential. Statistics on file sizes (e.g., on the mean or median file size, and on how a file's size tends to change over time), on gaps within files (e.g., the extent to which logical blocks are populated), and/or on response times and throughputs for various types of operations may be collected. In some embodiments and for certain types of operations, it may be feasible to infer likely patterns of file access from the file names—e.g., file used to store e-mails may be identifiable based on file name extensions and may be expected to be accessed in a particular way, files used for database logs or web server logs may be identifiable by name and may have characteristic access patterns, and so on. Such information and metrics on storage use may be analyzed, e.g., at optimizer components of the storage service in accordance with a machine learning technique, to determine whether modifying any of the oversubscription parameters may be advisable, or whether the physical pages of some logical blocks should be consolidated. If a determination is made that changing oversubscription thresholds may improve space utilization levels (element 2807), the threshold may be modified accordingly (element 2810) and a new set of metrics with the modified parameters may be collected. For example, in one embodiment, oversubscription parameter settings for a file system FS1 may initially be set conservatively—e.g., an oversubscription factor of only 10% may be set. Later, after storage use metrics and address range gaps for objects within FS1 are analyzed, the allowed oversubscription level may be increased, say to 20%. If it is determined that file store performance (e.g., for sequential reads/writes) may be improved by rearranging the physical pages of some set of logical blocks, contents of selected physical pages may be rearranged (element 2813) (e.g., by allocating contiguous space to hold the contents of a given block, and copying the contents of the block from their original non-contiguous locations to the contiguous locations). In at least some embodiments, such rearrangements may typically be performed asynchronously with respect to incoming I/O requests, so that the clients issuing the read/write requests do not experience delays due to the optimization operations. Other types of optimizations, such as for example moving some extents to faster storage devices (such as SSDs) or slower storage devices than the ones currently being used, may also be initiated on the basis of similar analysis in various embodiments.

Variable Stripe Sizes

In some embodiments, another approach may be taken to the tradeoffs discussed above between metadata size and storage space efficiency. In some embodiments employing this technique, extents need not be oversubscribed, and all the storage that could potentially be required for a given logical block may be acquired up front, e.g., at the time that the first write is directed to the block. However, logical blocks within a given storage object (which, as discussed above, may represent the units of striping file data and/or metadata across extents, storage devices or storage nodes) may not all be of the same size. In some such embodiments, the logical block size, and hence the amount of space allocated at a time, may be increased as a function of the logical offset within the file. Starting with a relatively small amount of storage space being allocated for the first block, more and more space may be allocated for subsequent blocks; thus, both it may be possible to implement both small files and large files without creating an amount of metadata that increases linearly with object size.

Figure 29:
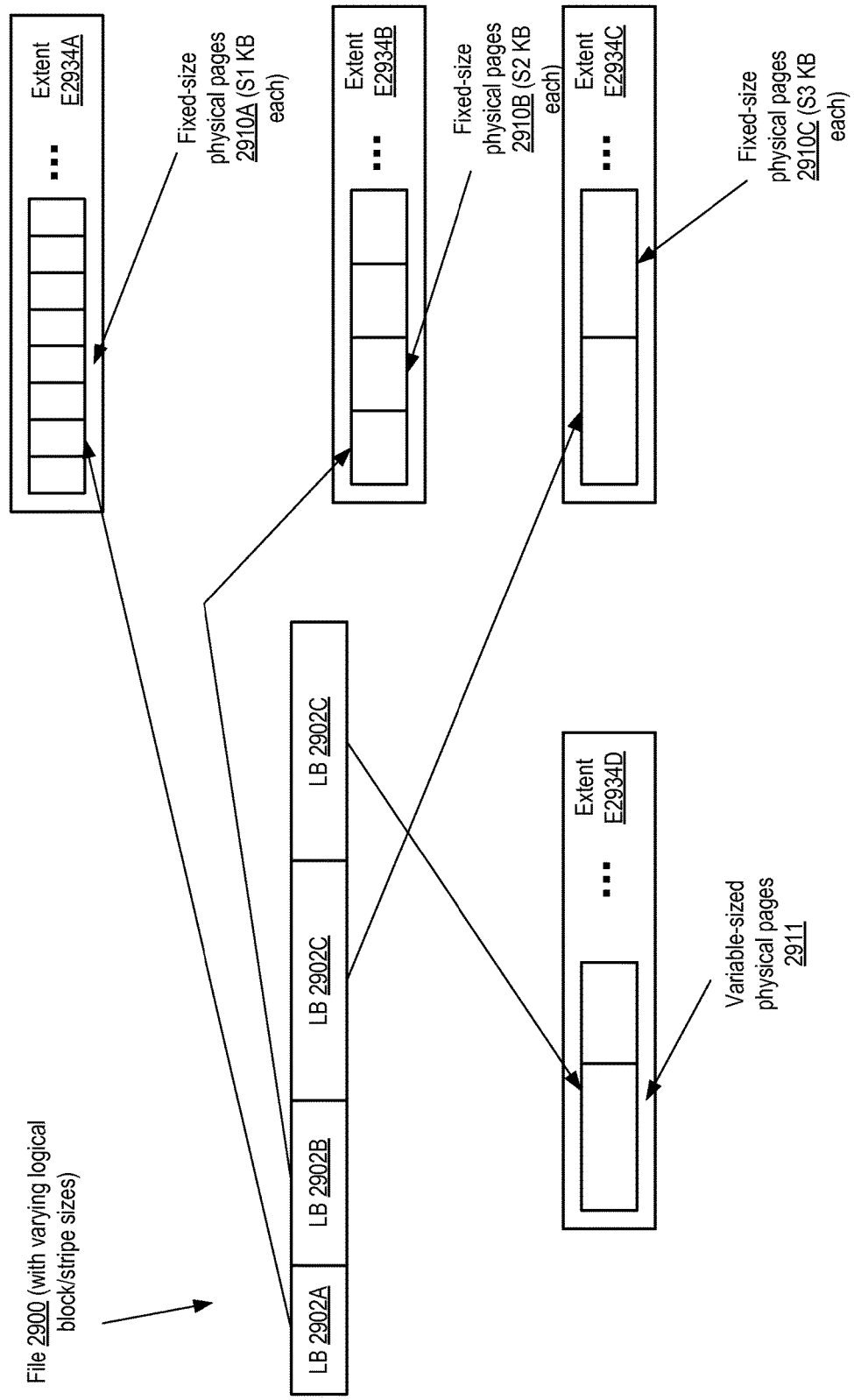
FIG. 29 illustrates examples of file store objects striped using variable stripe sizes, according to at least some embodiments.

FIG. 29 illustrates examples of file store objects whose contents are stored using variable stripe sizes, according to at least some embodiments. Recall that, as discussed with reference to FIG. 4, different logical blocks of a file store object may typically (although not necessarily) be mapped to different extents at different storage devices at respective storage nodes, and that logical blocks may therefore be considered equivalent to stripes. A file 2900 is selected as an example of a storage object, although various metadata structures may also be implemented using variable stripe sizes in various embodiments. File 2900 is shown as comprising four stripes or logical blocks LB 2902A, 2902B, 2902C and 2902D. At least some of the logical blocks 2902 may differ in size from at least some of the others, although some subset of the logical blocks may be of the same size.

Two types of extents are shown in FIG. 29—extents with fixed-size pages and extents with variable-sizes pages. Extent 2934A comprises physical pages 2910, each of which is S1 KB in size. Extent 2934B's pages 2910B are each S2 KB in size, while each of extent 2934C's pages is S3 KB in size. S1, S2 and S3 may differ from each other in the depicted embodiment, e.g., S1 may be smaller than S2, and S2 may be smaller than S3. As mentioned earlier, at least for extents with fixed page size, physical pages may represent the smallest units of I/O that are supported in some embodiments. Thus, it may be possible to support smaller reads and writes at extent 2934A than at 2934B or 2934C in the depicted embodiment. Extent 2934D supports variable-size pages—i.e., an arbitrary amount of physical space (with some specified minimum and maximum) may be allocated at a time within extent 2934D. In contrast, within extents 2934A, 2934B and 2934C, space may be allocated in multiples of their respective page sizes. In at least some embodiments, only a discrete set of page sizes, or a single page size, may be supported.

In response to the first write directed to an LB 2902, physical storage space for the entire stripe (which may be more than the physical space required for the write payload of the first write) may be allocated from a selected extent in at least some embodiments. Thus, for example, one or more pages 2910A of extent 2934A may be used for LB 2902A, and one or more pages 2910B of extent 2934B may be used for LB 2902B. Similarly, for LB 2902C, one or more pages 2910C may be allocated from extent 2934C, and one or more pages from extent 2934D may be allocated for LB 2902D. In some embodiments, any given logical block or stripe may be mapped to one contiguous region of physical storage space, while in other embodiments, the physical space allocated for a given logical block may be non-contiguous within the storage device address space in at least some cases. If relatively small stripe sizes are used, for example, for the first few stripes of a file, even small files may be striped across multiple extents, thus obtaining performance benefits of striping which may otherwise not have been achieved had a single large stripe size been used.

In general, in the depicted embodiment, when a write request with a specified offset and write payload size is received, a decision may be made (based on the offset and payload size) as to whether the write requires additional storage space to be allocated. Such a decision may be made in at least some embodiments at a metadata node of the storage service. If space does need to be allocated, the amount of (typically, but not necessarily) contiguous physical storage space to be allocated for the payload may be determined. In at least some embodiments, that amount of space allocated may depend on the write offset. (Examples of stripe sizing patterns over the course of a file's existence, and of some of the kinds of factors that may be taken into account when deciding stripe sizes, are discussed in greater detail below.) One or more storage nodes may be identified that have extents that can be used to allocate the desired amount of space. For example, if space for a one-kilobyte stripe is to be allocated, the storage service may attempt to identify extents that have 1 KB pages and have enough free space to accommodate the write of the stripe. It is noted that the minimum page size at a selected extent need not be equal to the stripe or logical block size—for example, the stripe size may be 3 KB, but an extent that supports 4 KB pages may be used, or another extent that supports 2 KB pages or 1 KB pages may be used. After physical storage for the desired stripe size is obtained, the modifications indicated in the write payload may be initiated. In some embodiments in which extents are replicated, for example, the modifications may be coordinated from the storage node at which the master replica is stored, and may be propagated to the non-master replicas from or by the master node.

Figure 30:
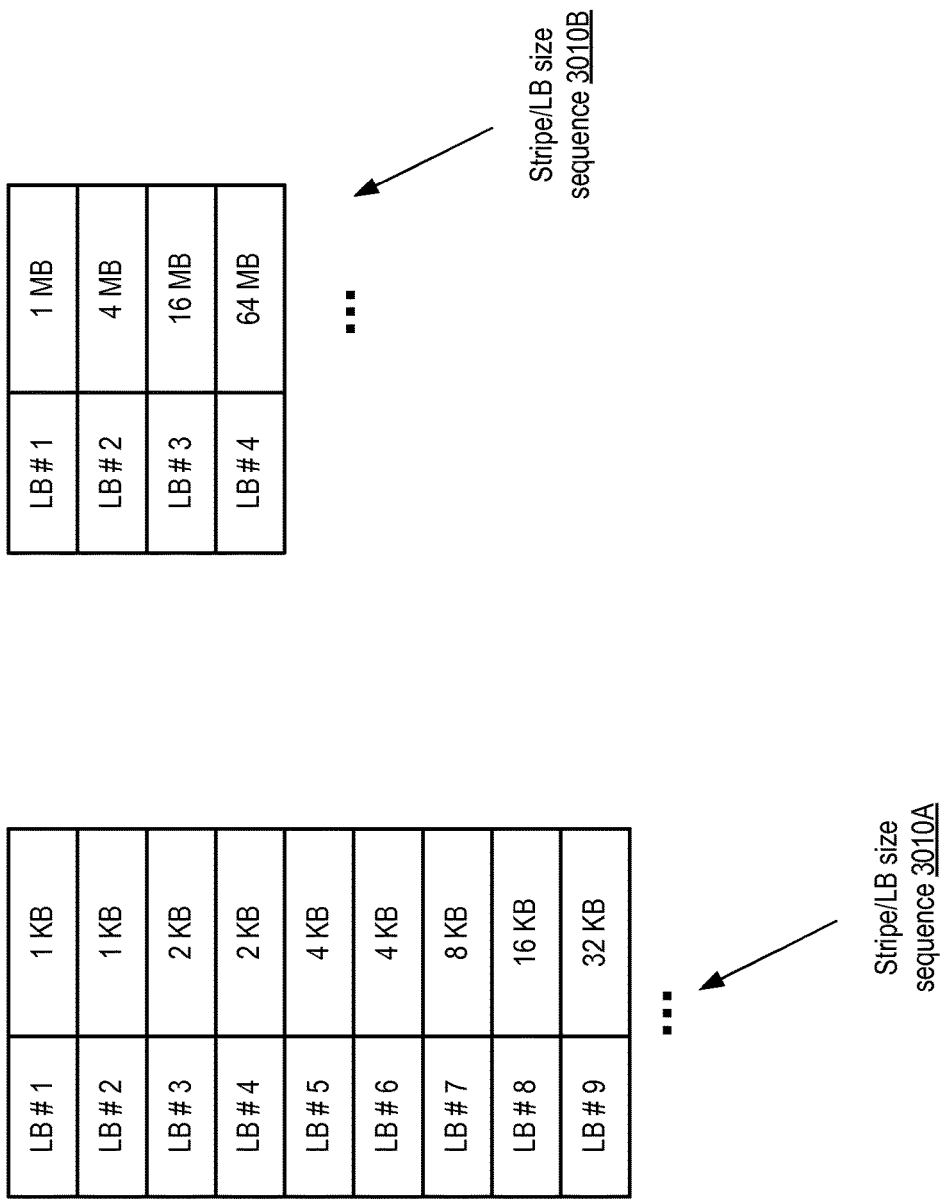
FIG. 30 illustrates examples of stripe sizing sequences that may be used for file store objects, according to at least some embodiments.

In some embodiments, stripe sizes within a given file or metadata structure may change as a function of offset in a predictable fashion. FIG. 30 illustrates examples of stripe sizing sequences that may be used for file store objects, according to at least some embodiments. In stripe size sequence 3010A, the sizes of the first nine logical blocks of a file store object may be set, respectively, to 1 KB, 1 KB, 2 KB, 2 KB, 4 KB, 4 KB, 8 KB, 16 KB, and 32 KB, for example. Such a pattern may be used, for example, for files or metadata structures that are expected to be small, or for files or structures that are expected to grow relatively slowly. For other files, to which for example a large number of sequential writes are expected with some high probability, a different stripe size sequence 3010B may be used, in which the sizes of the first four blocks are set to 1 MB, 4 MB, 16 MB and 64 MB respectively. Thus, even in implementations in which a discrete set of stripe sizes is implemented, a stripe size used for one file F1 may differ from any of the stripe sizes used for a different file F2. In some embodiments, at least some of the stripe size sequences 3010 to be used may be specified as configuration parameters of the storage subsystem. In some cases, as a file grows, it may be useful (for both metadata performance and for data access performance) to consolidate smaller stripes into larger stripes.

Figure 31:
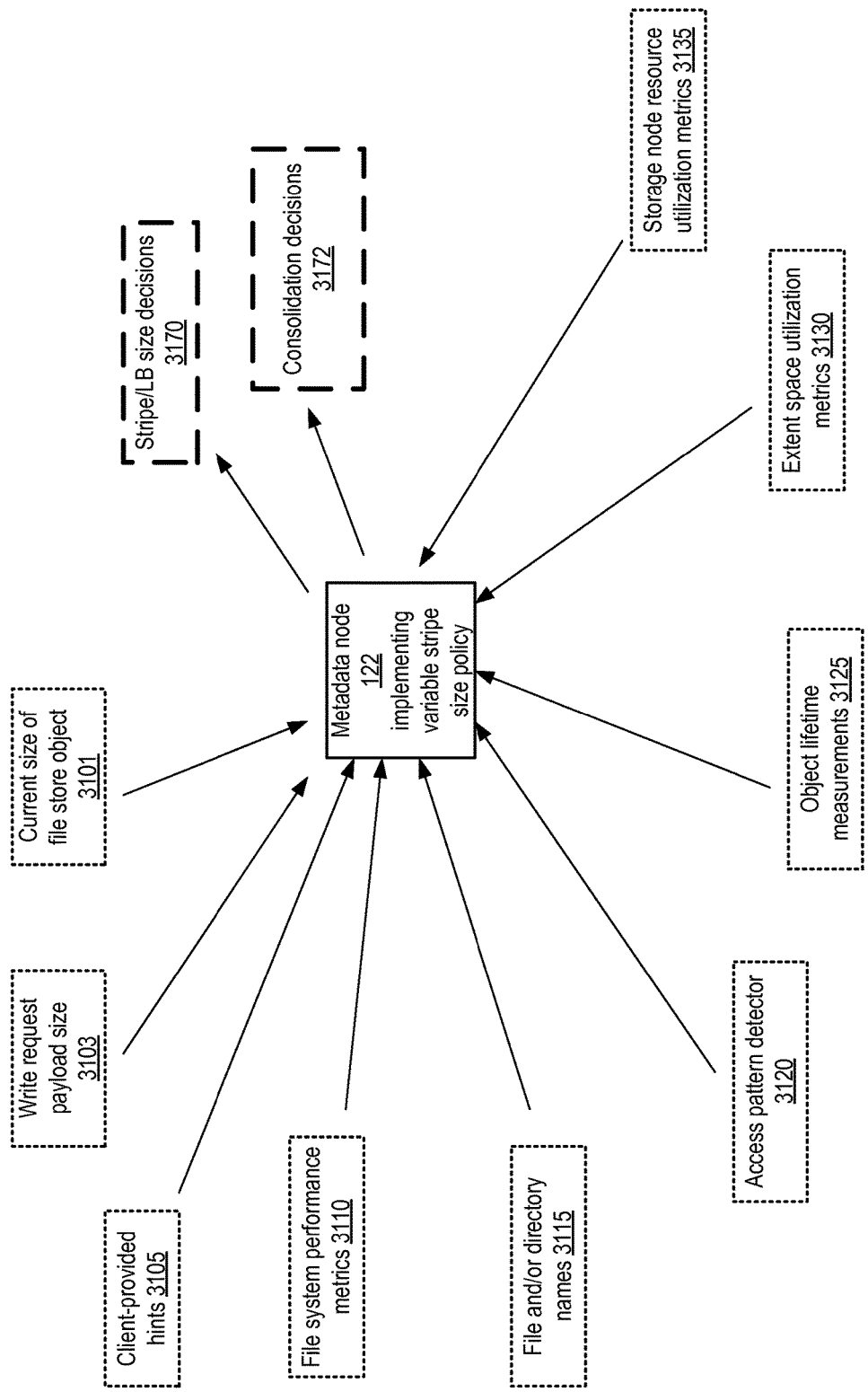
FIG. 31 illustrates examples of factors that may be taken into consideration at a metadata subsystem to make stripe sizing and/or consolidation decisions for file store objects, according to at least some embodiments.

FIG. 31 illustrates examples of factors that may be taken into consideration at a metadata subsystem to make stripe sizing decisions 3170 and/or consolidation decisions 3172 for file store objects, according to at least some embodiments. In the depicted embodiment, a metadata subsystem node 122 may be responsible for determining stripe/logical block sizes for various file store objects, including files and metadata structures, and for determining if and when physical pages and/or logical blocks should be combined or consolidated. When determining the stripe size to be used for the next portion of a file store object for which space is to be allocated, the metadata node 112 may consider the current size 3101 of the object and the write request payload size 3103. In one implementation, for example, the size of the first stripe allocated for a file store object may be based on the write payload of the first write directed to the object—e.g., if the payload of the first write is 3.5 megabytes, a 4 megabyte stripe size may be selected, while if the first write is less than or equal to 2 megabytes, a 2 megabyte stripe size may be selected. In some embodiments, when a file or directory is created at the request of a customer, hints 3105 may be provided to the storage service, indicating for example whether the object is going to be used primarily for sequential writes and reads, random writes and reads, or some mix of sequential and random access, and such hints may be used to select stripe/logical block sizes. Metrics 3110 of file system performance, such as the average response times achieved for writes and/or reads of different sizes, may also influence the selection of logical block size in some embodiments, and/or the scheduling of consolidation operations in which contents of earlier-created stripes are combined into larger stripes.

In some scenarios, as discussed earlier, the name (or part of the name, such as a file extension) of a file or directory may provide some guidance on the manner in which contents of the file or directory are expected to grow or be accessed. For example, some applications such as e-mail servers, web servers, database management systems, application servers, and the like use well-known file extensions and/or directory hierarchies for various parts of their functionality, and it may be possible for an optimizer component of the metadata node 112 to select stripe sizes more intelligently based such file/directory names 3115. In at least one embodiment, the metadata node 112 may determine the access patterns (e.g., random versus sequential, percent read versus percent write, read size distributions, write size distributions) and choose stripe sizes accordingly. Measurements 3125 of object lifetime (e.g., how much time, on average, elapses between a file's creation and deletion at a given file store) may be helpful in making stripe size decisions in some embodiments—for example, if most files within a given directory are expected to be deleted within X hours after creation, the decisions regarding their stripe sizes may not have much long-term impact. In some embodiments, extent space utilization metrics 3130 and/or storage node resource utilization metrics 3135 (such as CPU, memory, or network utilization levels of the storage nodes being used) may also play a role in determining stripe sizes. In one embodiment, small stripes of a given file or metadata structure may be combined into larger stripes based on one or more triggering criteria, e.g., if/when the file or structure grows beyond a threshold size or if/when frequent sequential accesses to the file are detected. Depending on the characteristics of the extents being used (e.g., on the particular page sizes supported at different extents), such combination operations may involve moving or copying data/metadata from one storage device to another or from one extent to another. In at least some embodiments, a machine learning technique may be employed to improve the stripe sizing and/or consolidation decisions being made at the storage service over time. As part of such a machine learning approach, the relative impact of the various factors illustrated in FIG. 31 on overall file store performance and/or cost may be analyzed.

Figure 32:
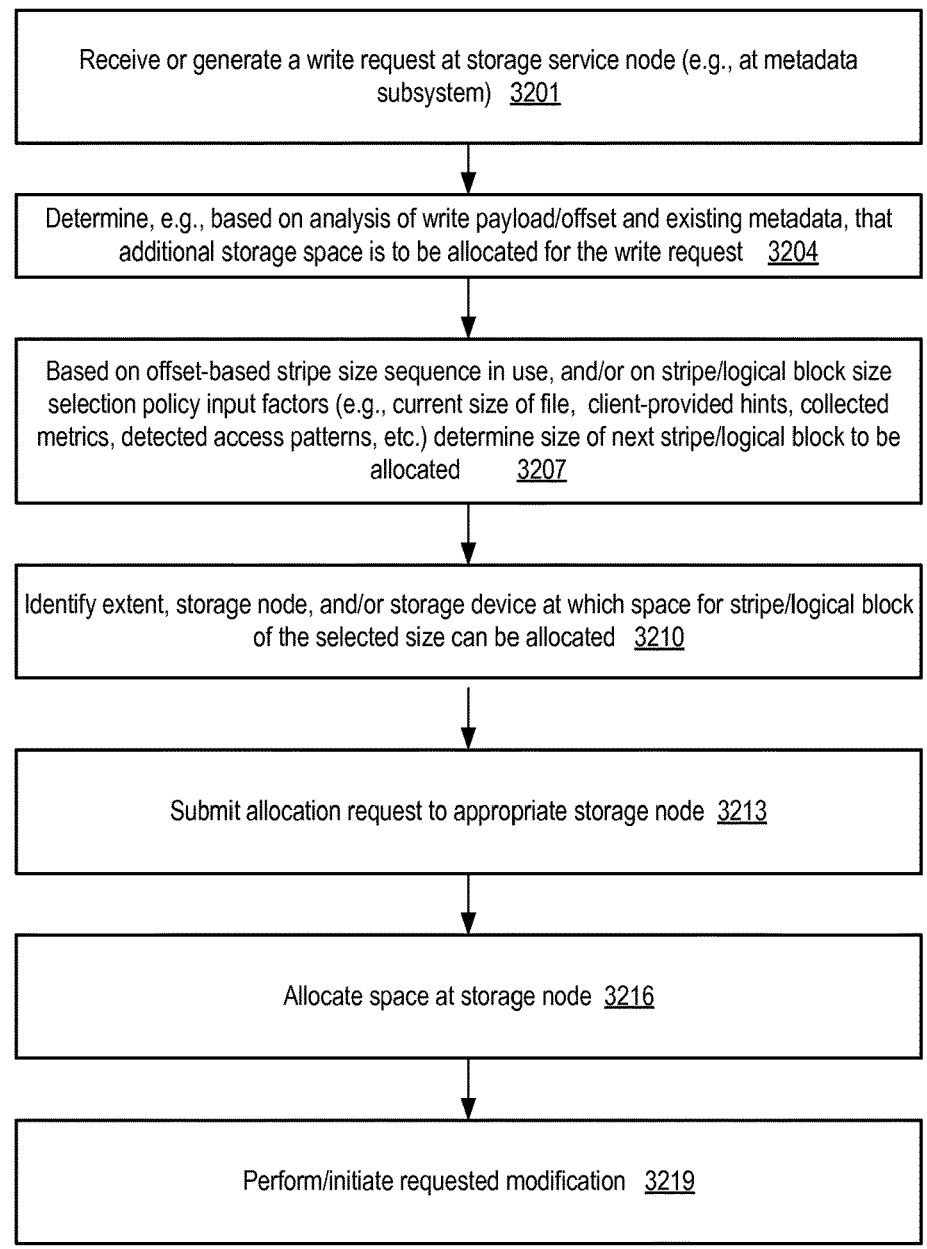
FIG. 32 is a flow diagram illustrating aspects of operations that may be performed to implement striping using variable stripe sizes, according to at least some embodiments.

FIG. 32 is a flow diagram illustrating aspects of operations that may be performed to implement striping using variable stripe sizes, according to at least some embodiments. A write request indicating a write offset within a file store object, and a write payload, may be received or generated (element 3201), e.g., at a metadata node 112 of a distributed multi-tenant storage service. In some cases, the write request could be generated at an access node 122 in response to a customer-issued file system API call such as a file write, while in other cases the metadata node may itself decide that some new metadata is to be stored, or that existing metadata is to be modified. Based on analysis of the write offset, the write payload, and existing metadata (if any) of the targeted object, a determination may be made that additional storage is to be allocated to implement the write (element 3204). (As mentioned earlier, some writes that consist entirely of modifications of pre-written content may not require additional storage.)

The size of the next new stripe or logical block of the file store object may be determined (element 3207), e.g., based on an offset-based stripe sizing sequence in use for the file store object (similar to the sequences shown in FIG. 30) and/or on some combination of the factors shown in FIG. 31, such as the size of the object, the detected access patterns, etc. The particular extent, storage node and/or storage device to be used to store at least one replica of a stripe of the selected size may then be identified (element 3210). As discussed in the context of FIG. 29, in at least some embodiments, a given extent may be configured to use a particular physical page size, and as a result not all extents may be suitable for allocating space for a given logical block size; accordingly, the extent may be selected based on the sizes of its pages. In some scenarios, only a discrete set of logical block sizes that map to a discrete set of physical page sizes of the supported extents may be permitted. Extents that are configured to support variable page sizes (such as extent 2911 of FIG. 29) may be available in some embodiments, and such extents may be selected for allocating space for logical blocks/stripes of a variety of sizes. In some embodiments, a plurality of storage nodes (e.g., distributed among several availability containers or data centers) may be identified for a replica group of extents when space for a new logical block or stripe is allocated.

An allocation request for the desired amount of physical storage space may be sent to at least one selected storage node (element 3213). The storage node may allocate the requested physical storage, e.g., enough pages to store contents of the stripe if the stripe were fully populated (element 3216). The modification indicated in the write request may then be initiated or performed (element 3219). Depending on the data durability policy associated with the file store object, the write payload may have to be propagated to several different replicas before the write can be considered complete. It is noted that at least in some embodiments, on-demand page allocation and/or oversubscribed extents may be used in combination with variable stripe sizing of the kind described above.

Offset-Based Congestion Control Techniques

Customer workloads that access small portions of a data set with high concurrency can cause hot spots in a distributed file storage service. For example, if a customer requests multiple sequential reads of a file using multiple threads of execution at about the same time, all the threads may end up accessing a single stripe or logical block near the beginning of the file first. Furthermore, depending on the relative sizes of the logical block and the read payload (the amount of data being requested in each read request from the customer), multiple read requests may be directed to a single stripe from each thread. In such a scenario, when many clients request multiple reads from the same logical block at about the same time, congestion control techniques may be implemented within the address range of the logical block to prevent poor overall throughput and/or poor response times for individual threads. In some embodiments, such congestion control techniques may associate offset-based priorities with I/O requests, in which for example the scheduling priority given to a read request may increase with the read offset within the logical block.

Figure 33:
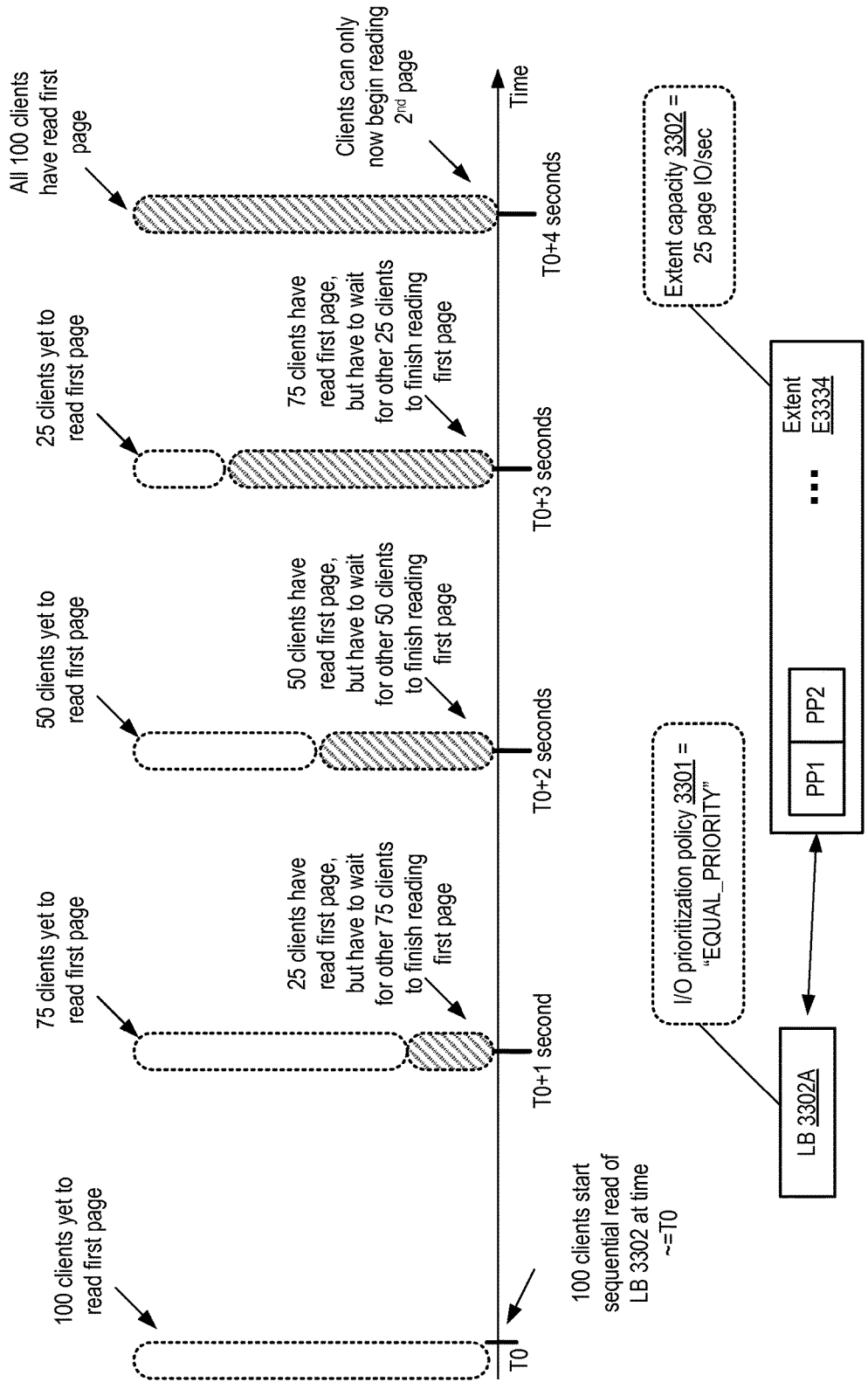
FIG. 33 illustrates an example timeline of the progress made by multiple concurrent read requests directed to a logical block of a storage service object in a scheduling environment in which all the read requests to the logical block are granted equal priority relative to one another, according to at least some embodiments.

To motivate the discussion of offset-dependent congestion control techniques, an illustration of a potentially problematic scenario that could result from un-prioritized read request scheduling may be helpful. FIG. 33 illustrates an example timeline of the progress made by multiple concurrent read requests directed to a logical block of a storage service object in a scheduling environment in which all the read requests to the logical block are granted equal priority relative to one another, according to at least some embodiments. Extreme values have been chosen for various parameters of the example in order to more clearly illustrate the potential problems; the selected parameters are not intended as representative of common usage scenarios.

Elapsed time increases from left to right in FIG. 33. At approximately time T0, 100 client threads each start a sequential read of a logical block 3302 whose contents (e.g., either data or metadata) are stored at two physical pages PP1 and PP2 of an extent E3334. Logical block 3302 may, for example, represent the first logical block of a file which also includes other logical blocks (not shown). Assume that the contents of LB 3302 are read a page at a time, e.g., to read the entire logical block, a given client has to first read PP1 and then read PP2. The extent E3334 can handle up to 25 page I/Os per second, as indicated by extent capacity 3302. This capacity limit may be assumed to be enforced in the example scenario illustrated by ensuring that no more than 25 page reads are allowed to start during a given second of time. As indicated by I/O prioritization policy 3301, all the read requests are treated as having equal priority (which has the same effect as not using prioritization). Given these parameters, consider the state of the client requests at the following times along the timeline: T0, T0+1 second, T0+2 seconds, T0+3 seconds, and T0+4 seconds.

At approximately T0, 100 requests are waiting to start reading page PP1. Due to the extent capacity constraints, only 25 are allowed to start (and finish) reading PP1 between T0 and T0+1. Accordingly, at T0+1, 75 clients are yet to read PP1, while 25 clients have completed reading PP1. However, because all requests are treated with equal priority, it may well be the case that the 25 clients that have completed reading PP1 may not be able to proceed to page PP2 until the remaining 75 clients have read PP1. Thus, the 25 clients that are indicated by the darker rounded rectangle at T0+1 may wait for the other 75 to complete reading PP1. At time T0+2, 25 more clients may have completed reading PP1, but they too may have to wait, until the remaining 50 clients read PP1. At time T0+3, 25 clients may have yet to read PP1, and the 75 that have read PP0 may be forced to wait for them. Only at T0+4, when all 100 clients have read the first page, are any of the clients allowed to proceed to page PP2 in the example scenario in which equal priorities are assigned to all the read requests directed at the pages of LB 3302.

Figure 34:
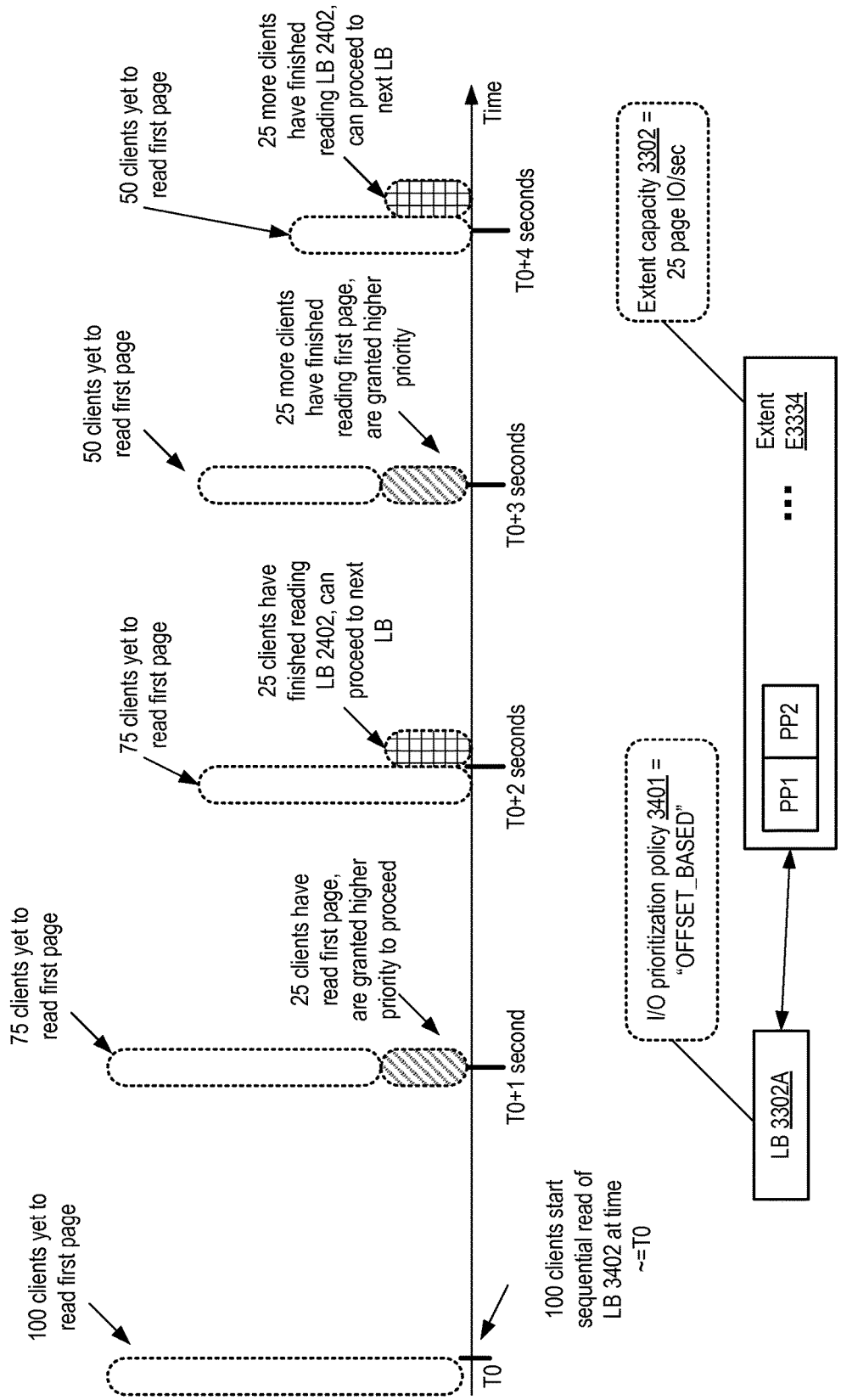
FIG. 34 illustrates an example timeline of the progress made by multiple concurrent read requests directed to a logical block of a storage service object in a scheduling environment in which an offset-based congestion control policy is used, according to at least some embodiments.

In at least some embodiments it may be possible to improve overall performance achieved for the sequential reads by assigning higher priorities (or, equivalently, lower costs) to those clients that have made more progress. FIG. 34 illustrates an example timeline of the progress made by multiple concurrent read requests directed to a logical block of a storage service object in a scheduling environment in which an offset-based congestion control policy is used, according to at least some embodiments. Logical block 3302 once again comprises two pages PP1 and PP2 at an extent E3334 with a capacity of 25 page I/Os per second. In the depicted embodiment, LB 3302 has an offset-based I/O prioritization policy 3401 to implement congestion control. In accordance with the policy, read requests that are directed to higher offsets within LB 3302 are given higher priority than read requests directed to lower offsets.

At approximately T0, 100 clients begin their sequential read operations. At T0+1, 25 clients have completed reading page PP1, and these 25 clients are now requesting reads at a higher offset than the remaining 75. According to the offset-based prioritization policy, the 25 clients who have finished reading PP1 are granted higher priority than the remaining 75 at time T0+1. Thus, those 25 clients now begin reading page PP2, while the 75 others wait. At time T0+2, the 25 clients have finished reading all of LB 3302, and can proceed on to the next logical block (if any) of the file or metadata structure being read sequentially. Since the next logical block would (with a high probability) be stored at a different storage device, this means that starting from T0+2, the workload of the 100 clients would begin to be distributed across two storage devices, instead of still being directed to the same extent as in the case where equal priorities were being used. At T0+3, 25 more clients have finished reading PP1, and are granted higher priority than the remaining 50 clients that are yet to read PP1. At T0+4, 25 more clients have finished reading both pages, and can proceed to the next logical block. Meanwhile, 50 clients have yet to read page PP1 at T0+4 in FIG. 34 (which, from the perspective of those 50 clients, is a worse outcome than could have been achieved if equal priorities were being used for all clients as shown in FIG. 33, where all 100 clients finish reading page PP1 at T0+4). Thus, some client requests may be treated somewhat "unfairly" with respect to others in the scheme illustrated in FIG. 34. As another illustration of the unfairness, consider a scenario in which I/O requests R1 and R2 are received at times Tk and (Tk+delta) from clients C1 and C2 respectively, where R1 is directed to an offset O1 within a logical block, R2 is directed to offset O2 within the logical block, and O2 is greater than 01. Even though R2 is received after R1, R2 may be assigned a higher priority based on its higher offset, and hence may be scheduled and/or completed earlier than R1 under the scheme of FIG. 34. In some cases, if R2 is part of a sequential pattern of reads, for example, the entire set of sequential reads may complete as a result of offset-based prioritization before R1 is scheduled. Despite this "unfairness", however, the scheme of FIG. 34 would in general tend to lead more quickly to I/O workload parallelism, as the sequential reads of various sets of clients would tend to get distributed sooner among different storage devices than if equal priorities are used for all requests regardless of offset. In scenarios in which the file store object being accessed comprises a plurality of stripes at different store devices (which is expected to be the case for most file store objects), such spreading of the workload more evenly across storage devices using offset-based prioritization may help improve overall average completion times and overall throughput for the sequential operations. From the perspective of the components of a multi-tenant storage service supporting hundreds or thousands of clients concurrently, it may not always be straightforward (or efficient) to keep track of whether a particular page read request is a random read or is part of a sequential read sequence, and as a result in some embodiments the offset-based prioritization may be used for page-level reads in general, regardless of whether the read is part of a larger sequential scan or not. At least in some embodiments, offset-based prioritization within logical blocks may be used for any combination of the following types of operations on data and/or metadata: sequential reads, sequential writes, random reads, or random writes.

Figure 35A:
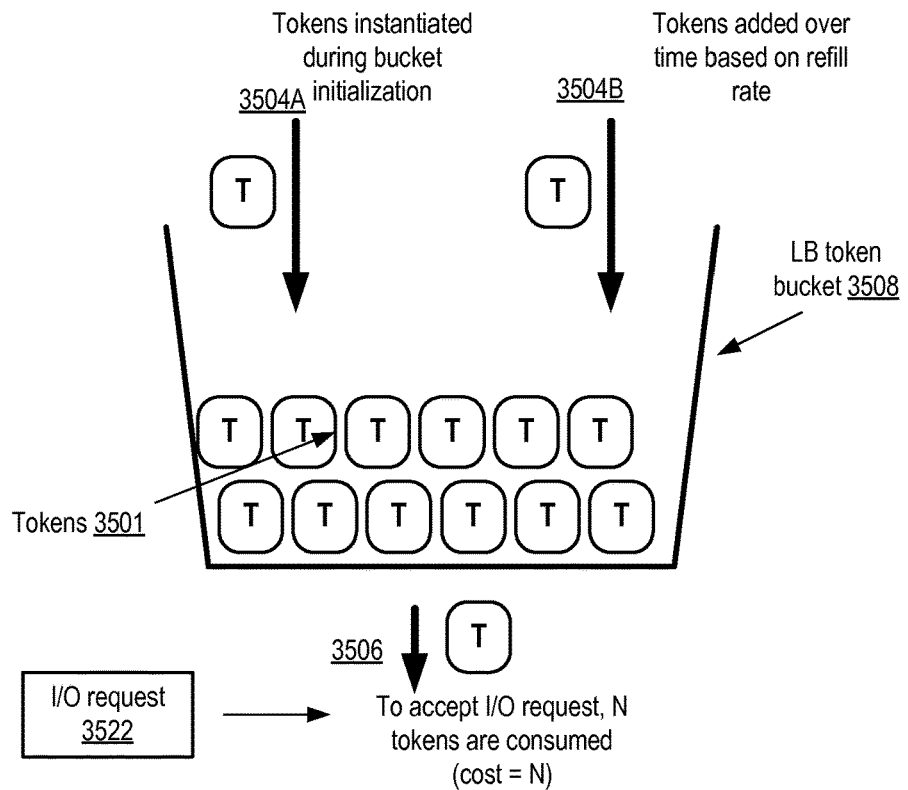
FIG. 35a illustrates an example of a token-based congestion control mechanism that may be used for scheduling I/O requests at a storage service, wile
Figure 35B:
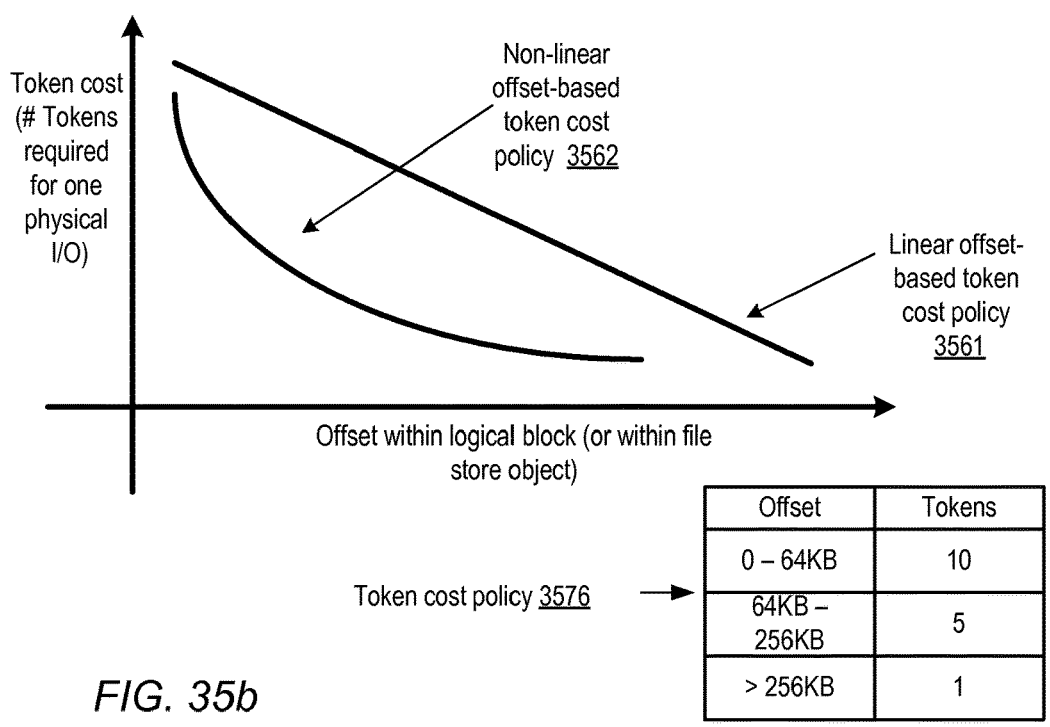
FIG. 35b illustrates examples of offset-based token consumption policies that may be employed, according to at least some embodiments.

A number of different offset-based congestion control techniques based on similar principles as those illustrated in FIG. 34 may be employed in different embodiments. FIG. 35a illustrates an example of a token-based congestion control mechanism that may be used for scheduling I/O requests at a storage service, while FIG. 35b illustrates examples of offset-based token cost policies that may be employed, according to at least some embodiments. Generally speaking, token-based mechanisms may be used for workload management of various types of entities, such as storage objects, database tables, database partitions, and the like. In the context of a distributed file storage service, such buckets may be maintained for logical blocks of files, for logical blocks of metadata structures, for entire files, and/or for entire metadata structures in various embodiments. A mechanism that uses a single bucket 3508 of tokens 3501 is illustrated in FIG. 35a for simplicity of presentation; however, combinations of multiple buckets may be used in some embodiments, such as one bucket for read operations and a different bucket for write operations. According to the mechanism, a bucket 3508 (e.g., a logical container which may be implemented as a data structure within a software congestion control module in at least some embodiments) set up for congestion control purposes associated with a particular work target such as a logical block of a file may be populated with an initial set of tokens 3501 during bucket initialization, as indicated via arrow 3504A. The initial population may be determined, e.g., based on expectations of the concurrent workload level, a provisioned operation limit associated with the work target, or some combination of such factors in various embodiments. For some types of buckets the initial population may be set to zero in some embodiments. In some implementations the initial population of a bucket may be set to a maximum population for which the bucket is configured.

When a new I/O request 3522 (such as a read request or a write request) is received, e.g., at a congestion control subcomponent of a storage node 132, the congestion controller may attempt to determine whether some number N of tokens (where N may be greater than or equal to 1, depending on implementation or on configuration parameters) are present in the bucket 3508 in the depicted embodiment. If that number of tokens is available in the bucket, the I/O request 3522 may be accepted for execution immediately, and the tokens may be consumed or removed from the bucket (arrow 3506). Otherwise, if N tokens are not present, the execution of the requested storage operation may be deferred until sufficient tokens become available in the depicted embodiment. The number of tokens used up for a given I/O request may be referred to as the "cost" of accepting the I/O request.

As shown by the arrow labeled 3504B, the bucket 3508 may be refilled or repopulated over time, e.g., based on configuration parameters such as a refill rate associated with the bucket. In some implementations, token refill operations may accompany, or be performed in close time proximity to, consumption operations—e.g., within a single software routine, N tokens may be consumed for admitting a request, and M tokens may be added based on the refill rate and the time elapsed since the bucket was last refilled. Refill rates or token counts of a given bucket may be modified in some implementations, e.g., to allow higher work request rates to be handled, typically for short time intervals. Limits may be placed on the maximum number of tokens a bucket may hold in some embodiments, and/or on the minimum number of tokens, e.g., using configuration parameters. Using various combinations of configuration parameter settings, fairly sophisticated admission control schemes may be implemented using token buckets in different embodiments. In particular, as described below, by requiring different token costs for I/O requests directed to different offsets, offset-based prioritization similar to the example of FIG. 34 may be implemented.

In one simple example scenario, to support a steady load of 25 I/O requests per second (IOPS) of equal priority at a logical block LB1, bucket 3508 may be configured with an initial population of 25 tokens, a maximum allowable population of 25 tokens and a minimum of zero tokens. The cost per I/O may be set to 1 token, the refill rate may be set to 25 tokens per second, and one token may be added for refill purposes (assuming the maximum population limit is not exceeded) once every 40 milliseconds. As I/O requests 3522 arrive, one token may be consumed for each request. If a steady state workload at 25 IOPS, uniformly distributed during each second, is applied, the refill rate and the workload arrival rate may balance each other. Such a steady-state workload may be sustained indefinitely in some embodiments, given the bucket parameters listed above. However, if more than 25 I/O requests are received during a given second, some requests may have to wait, and the kind of scenario illustrated in FIG. 33 may result.

Instead of setting the cost to 1 token per I/O request, regardless of offset, in one embodiment more tokens may be required for I/O requests directed towards smaller offsets than are required for I/O requests directed towards higher offsets in the file. An example of such a token cost policy 3576 is shown in FIG. 35*b*. According to policy 3575, 10 tokens are required for each I/O directed to an offset between 0 and 64 KB within a logical block, 5 tokens are required for an I/O directed to an offset between 64 KB and 256 KB, and 1 token is required for each I/O directed to an offset greater than 256 KB. Since more tokens are required for lower offsets, I/Os directed to lower offsets may be more likely to be blocked or delayed for a given token bucket population and refill rate, while I/Os directed towards higher offsets may in general be scheduled more quickly. Various different mathematical functions or mappings may be selected (e.g., based on heuristics, machine learning components of the storage system, or configuration settings chosen by an administrator) to compute costs from offsets in different embodiments. In some embodiments, a linear offset-based token cost policy 3561 may be used, while in other embodiments non-linear cost policies such as 3562 may be used. The cost policies, refill rates and other congestion control parameters being used for various logical blocks, files, or metadata structures may be modified over time, e.g., in response to the analysis of performance metrics obtained from the storage service. Different parameters may be used for different logical blocks within a given file store object in some embodiments, and/or different parameters may be selected for different file store objects. In at least some embodiments, a similar offset-based congestion control technique may be applied at the file store object level instead of, or in addition to, at the logical block level—e.g., a higher priority may be assigned to I/Os directed to an offset X within a file than is assigned to I/Os directed to an offset Y, where Y is less than X. Instead of using token-based techniques, in some implementations, other variable cost assignment techniques may be used in some embodiments to assign different priorities to I/O requests directed within a logical block or within a storage object. For example, in one embodiment, a numerical cost may simply be assigned to each I/O request, and outstanding I/O requests may be handled in inverse order of assigned cost.

Figure 36:
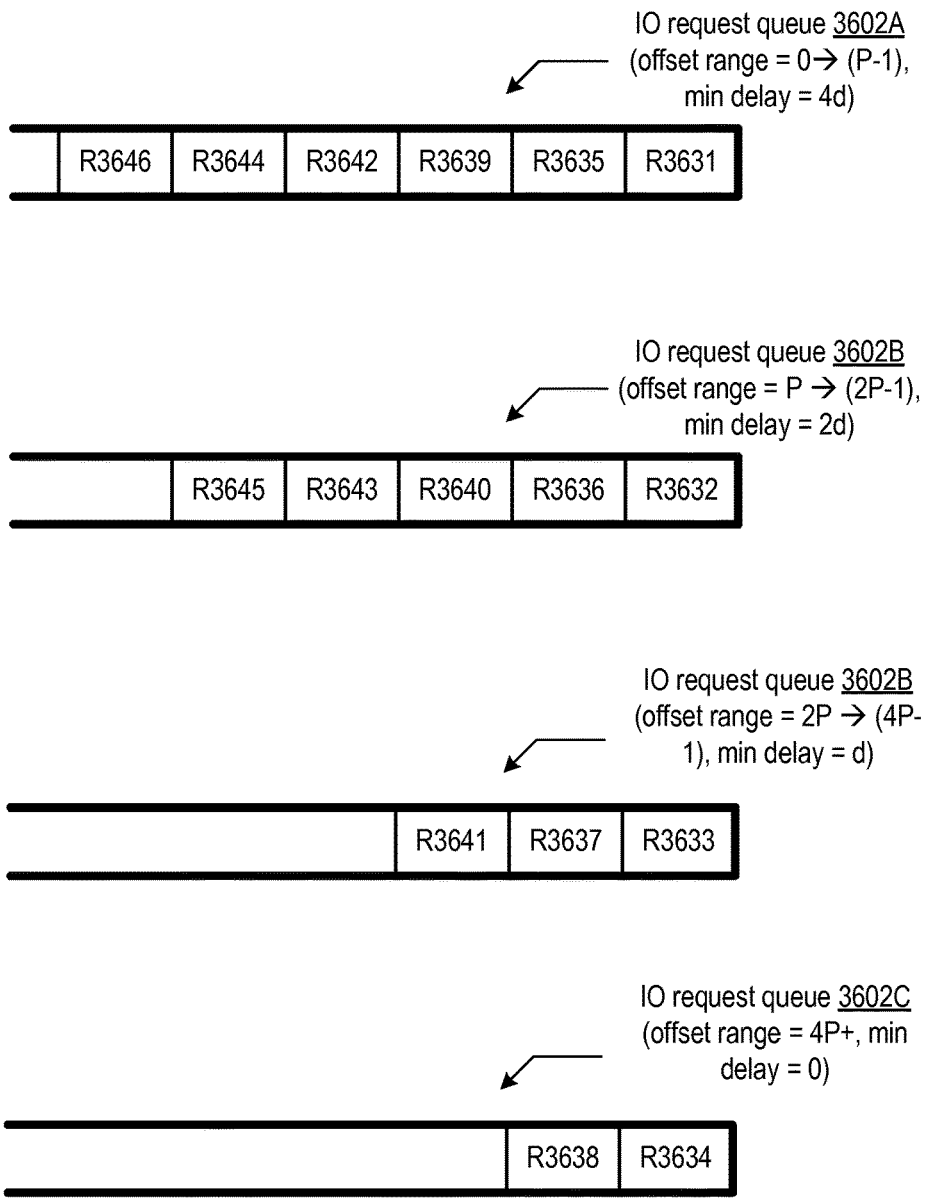
FIG. 36 illustrates an example of the use of offset-based delays for congestion control at a storage service, according to at least some embodiments.

In at least one embodiment, respective queues may be set up for I/O requests directed to different offset ranges within a logical block or file store object. Each such queue may have an associated delay interval before any one of its queued I/O requests is serviced, with larger delays assigned to lower-offset I/O requests. FIG. 36 illustrates an example of the use of offset-based delays for congestion control at a storage service, according to at least some embodiments. In the depicted embodiment, four queues 3602A, 3602B, 3602C and 3602D are shown, each designated for I/O requests (indicated by labels beginning with "R", such as request R3631) within a particular offset range of a logical block. Queue 3602A is used for I/O requests to offsets (e.g., in bytes) between 0 and P−1; queue 3602B is used for I/O requests to offsets between P and 2P−1; queue 3602C is used for I/O requests with offsets between 2P and 4P−1, and queue 3602D is used for I/O requests with offsets higher than 4P. Each queue 3602 has an associated minimum delay, indicating the minimum time that must elapse between the implementation of any two queued I/O requests of that queue. The minimum delays for queues 3602A, 3602B, 3602C and 3602D are shown as 4d, 2d, d, and 0 respectively. Consider an example scenario in which d is set to one second, the population of the various queues at time T is as shown, and no new requests arrive for at least a few seconds. Since requests of queue 3602D have a minimum delay of zero seconds, request R3634 may be scheduled first, followed by R3638. Then, requests within queue 3602C may be scheduled, with a delay of one second between the completion of each request and the commencement of the next. Requests of queue 3602B may then be scheduled at two-second intervals, followed by requests of queue 3602A with four seconds of delay between each pair of requests. In the depicted embodiment, the minimum delays may add to the queuing delay of an I/O request. For example, a particular request R1 may have to wait K seconds in its queue simply because there are other requests in the same offset range that arrived before R1, and then, when R1 reaches the front of the queue, R1 may still have to wait for the minimum delay associated with its queue. The delays between scheduling requests may in general allow higher-offset (and hence higher-priority) requests that arrive during those delays to be serviced more quickly in the depicted embodiment. A number of variations of the straightforward offset-based queuing technique may be used for congestion control in different embodiments—e.g., in one embodiment, the delay associated a given queue 3602 may depend on the number of higher-priority requests that are waiting for service. In one implementation, a delay to be used for a given I/O request may be computed simply by multiplying its offset by a constant.

In some embodiments, error messages may be used as a mechanism for implementing offset-based prioritization. If a particular I/O request R1 is directed to a lower offset some other request or requests, instead of placing R1 in a queue or requiring more tokens to be used for R1, an error message may be returned to the client that submitted R1. The client may then retry the I/O (assuming the I/O is still considered necessary by the client). The delay resulting from the retry may be considered analogous to the insertion of the request in an offset-based queue as described above.

In at least some embodiments, the storage devices at which the logical blocks are stored may have to reach a threshold workload level before the prioritization policy is enforced. For example, in FIG. 35, the extent E3334 has a defined or baseline capacity of 25 page I/Os per second, and as a result the prioritization policy may only be applied when the workload exceeds (or at least approaches) the capacity in the depicted embodiment. The threshold that triggers the prioritization may itself be a modifiable parameter in at least some embodiments. For example, in various embodiments, distinct thresholds may be applied to different extents, to different storage nodes, to different physical storage devices, or to different logical blocks within the same extent. Such thresholds may be dynamically modified based on various factors. In one implementation, the threshold could be changed based at least in part on an overall workload level (e.g., as computed based on a statistical analysis of measurements obtained over some time period) of the extent, the storage device or storage node at which the extent is located, or even the particular logical block to which the threshold is applied. Other factors that could be used to adjust the thresholds may include, for example, the identity of the client(s) that submit I/O requests to a logical block or the clients on whose behalf the storage service object containing the logical block was created (e.g., some clients may be considered more important than others and may thus have higher thresholds assigned), the time of day (e.g., the threshold may be increased during typically low-usage periods such as between 11 PM and 6 PM), or the names of the file systems, directories, files, volumes or other storage objects implemented using the extent.

In some embodiments, an element of randomness may be added to the congestion control technique—e.g., instead of implementing fixed delays for each offset range, a delay that includes a random component (obtained using some selected random number generator) may be used. In token-based congestion control schemes, a random number of tokens may be added to the requirement for an I/O request to a given offset range. Such randomization may in some cases help to smooth out the workload distribution, and may help to reduce the probability of undesirable edge cases in which, for example, storage devices may end up being underutilized.

In at least some embodiments, different congestion control policies may be used for different categories of storage operations. FIG. 37 illustrates examples of congestion control policies that may be dependent on the type of storage object being accessed and various characteristics of the requested accesses, according to at least some embodiments. As shown in table 3780, congestion control parameter settings 3710 may vary based on the content type 3702 (e.g., metadata versus data), whether a request is a read or a write (I/O type column 3704), and/or on whether the request is part of a sequential or random sequence (access pattern column 3706). Different congestion control settings may also or instead be used based on I/O payload size (column 3708) (e.g., how many bytes of data/metadata are being read or written) and/or on the current size of the targeted object (column 3710).

For sequential reads of metadata structures, where the individual read payload sizes are less than 4 KB and the metadata structure is smaller than S1 MB, linear offset-based prioritization may be used for congestion control in the depicted embodiment. Random metadata write operations of any size are to be treated as having equal priorities. Sequential data reads with payload sizes greater than 64 KB, directed at files with size >128 MB, are to use offset-based priorities with exponential decay as a function of offset. Various details (such as the cost associated with each priority level, the offset boundaries for different priorities, or the minimum delays between requests) of the congestion control policies have been omitted from FIG. 36 to simplify the presentation. It is noted that other factors than those shown in FIG. 36 may be used to assign congestion control parameters in different embodiments, and that not all the factors shown in FIG. 36 need be considered in at least some embodiments. For example, in some embodiments, congestion control techniques may only be used for concurrent sequential reads.

Figure 38:
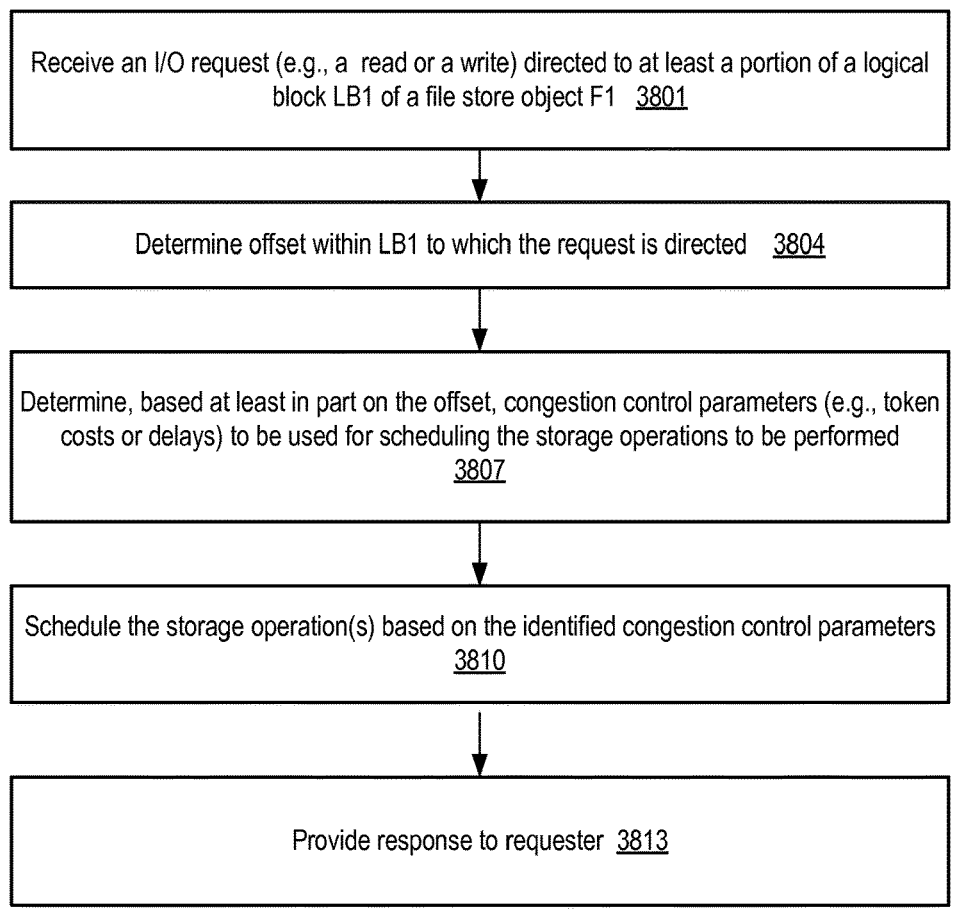
FIG. 38 is a flow diagram illustrating aspects of operations that may be performed to implement offset-based congestion control for scheduling I/O operations at a storage service, according to at least some embodiments.

FIG. 38 is a flow diagram illustrating aspects of operations that may be performed to implement offset-based congestion control for scheduling I/O operations at a storage service, according to at least some embodiments. As shown in element 3801, an I/O request (a read or a write) directed to at least a portion of a logical block LB1 of a storage object (such as a file or a metadata structure) being managed by a multi-tenant file storage service may be received. In different embodiments, offset-based congestion control decisions may be made at any of the various subsystems described above, or by a combination of subsystems. In some embodiments congestion control decisions for file reads/writes may be made at access subsystem nodes, while the decisions for metadata may be made at the metadata subsystem. In other embodiments, congestion control decisions may be made at storage subsystem nodes for both data and metadata. The offset within the logical block LB1 at which one or more storage operations are to be performed to fulfill the I/O request may be determined (element 3804).

Based at least in part on the offset, values of one or more congestion control parameters (e.g., the cost value assigned to the IO request, such as the number of tokens to be consumed from a token bucket, or the delay before the execution of a storage operation) may be determined (element 3807). In at least some embodiments, the parameters selected may favor, or give a higher priority to, requests at higher offsets within the logical block LB1 than to requests at lower offsets. The storage operations corresponding to the I/O request may then be scheduled in accordance with the selected congestion control parameters (element 3810). In at least some embodiments and for certain types of I/O requests, a response may be provided to the requester (element 3813). It is noted that the offset-based congestion control techniques similar to those described herein may be used in a variety of storage service environments in different embodiments, including services that implement file system interfaces/protocols, services that implement a web services interface in which the storage object is associated with a universal record identifier (URI), or services that implement a block-level device interface.

Consistent Object Renaming Techniques

Figure 39:
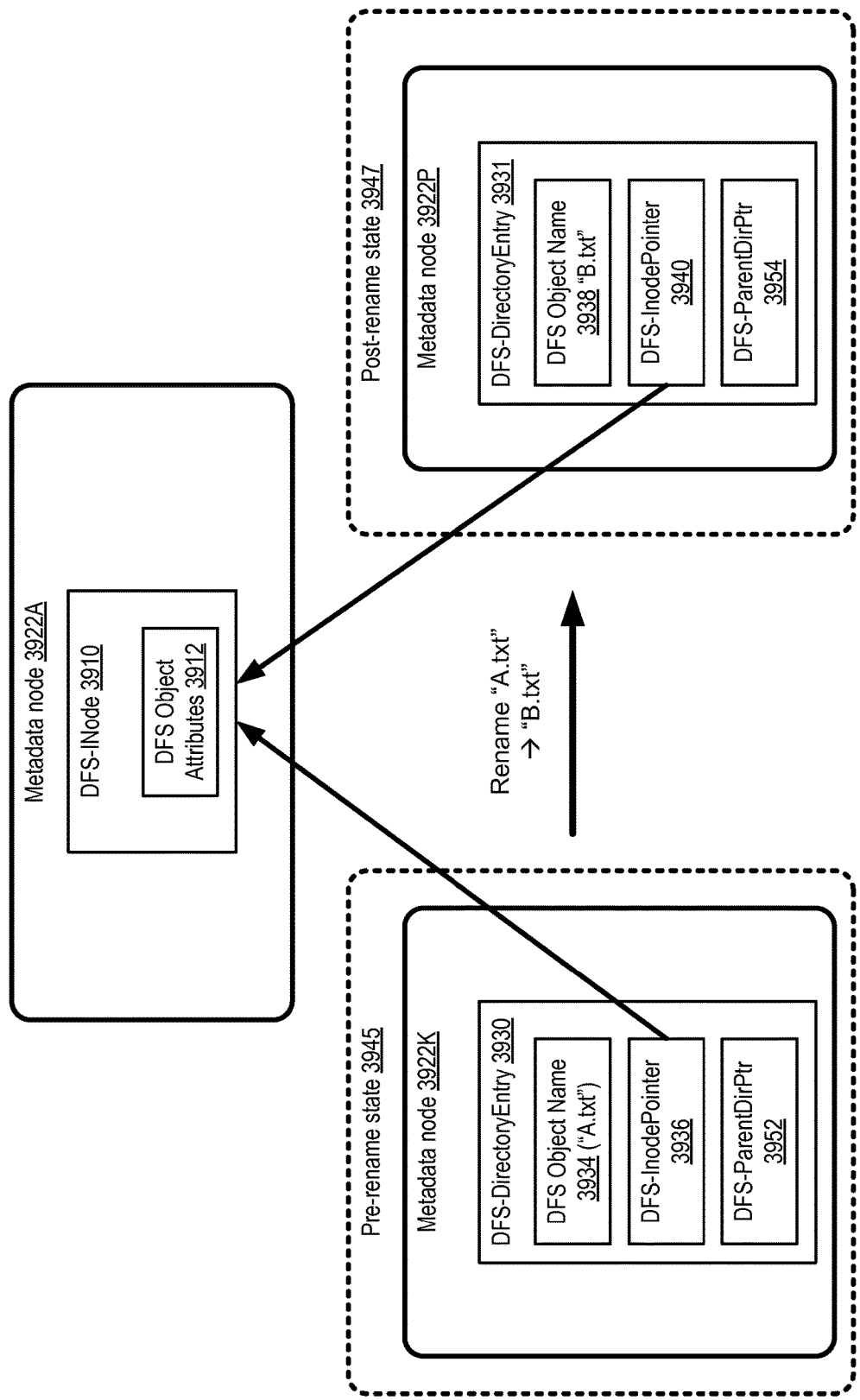
FIG. 39 illustrates an example of the metadata changes that may have to be performed at a plurality of metadata subsystem nodes of a storage service to implement a rename operation, according to at least some embodiments.

At a distributed file storage service, object rename operations—e.g., operations performed in response to customer requests to change the name of a file or a directory—may at least in some cases involve updates to metadata elements stored at more than one metadata node (or more than one storage node, if the metadata subsystem stores its structures at the storage subsystem). Although the distributed transaction technique described earlier may be used to implement such multi-node renames, in at least some embodiment a different rename-specific mechanism may be used as described below. FIG. 39 illustrates an example of the metadata changes that may have to be performed at a plurality of metadata subsystem nodes of a file storage service to implement a rename operation, according to at least some embodiments. By way of example, the metadata changes needed to rename a file "A.txt" to "B.txt" are illustrated, although similar changes may be made for directory renames, link renames, and the like. In the depicted embodiment, three metadata subsystem nodes 3922A, 3922K and 3922P of the storage service are shown. Various attributes 3912 of a particular file store object initially named "A.txt", including for example an identification of the physical pages being used for the object at one or more storage nodes, a user identifier and/or a group identifier of the object's owner, the current size of the object, the last modification time, the access permissions or ACLs (access control lists), a link count indicating how many hard links point to the object, and so on, may be stored in a DFS node entry structure labeled DFS-Inode 3910 at metadata node 3922A. The DFS-Inode structure 3910 may be similar in concept to the inode structures implemented in many traditional file systems, with some set of added or modified features of the DFS-Inode resulting from the distributed nature of the file storage service.

The name "A.txt" of the file store object (prior to the implementation of the rename operation workflow) may be stored in a different metadata structure called DFS-DirectoryEntry 3930, at a different metadata node 3922K in the depicted embodiment. DFS-DirectoryEntry 3930 may include a field 3934 for the object name and a pointer to the DFS-Inode 3910 that stores the attributes of the object. In at least some embodiments, the DFS-DirectoryEntry 3930 may also include a parent directory pointer DFS-ParentDirPtr 3952 pointing to the DFS-DirectoryEntry of the parent directory of the object. Thus, for example, if "A.txt" is in a directory "dir1", the DFS-ParentDirPtr may point to the DFS-DirectoryEntry of "dir1". DFS-DirectoryEntry metadata structures may be referred to in the subsequent discussion simply as directory entries, while DFS-Inode structures may be referred to simply as node entries.

The particular metadata node 3922A that is chosen to manage a given object's directory entry may be selected using different techniques in different embodiments, such as by hashing the name of the object at the time the object is created, by selecting the metadata node based on its current available workload capacity or space availability, and so on. As a result, a different metadata node 3922P may at least in some cases be selected to manage the directory entry to be created for the second operand ("B.txt") of the "rename A.txt B.txt" operation.

The changes required to implement the rename of "A.txt" to "B.txt" are indicated in FIG. 39 by the labels "Pre-rename state 3945" and "Post-rename state 3947". To implement the rename workflow, a new directory entry 3931 with object name field 3938 set to "B.txt", and a pointer field pointing to DFS-Inode 3910 should be created, and the original directory entry 3930 with the name field "A.txt" should be removed. The node entry 3910 itself may not be modified during the rename in at least some embodiments. For consistency, the combination of metadata changes shown in FIG. 39 may have to be performed in such a way that either all the changes (at both metadata nodes involved) succeed, or none succeed. In some embodiments, as described earlier, the metadata structures may actually be stored using extents implemented at physical storage devices of storage subsystem nodes of the service. In the latter scenario, four types of entities may be involved in a rename workflow, any one of which may fail independently of the other, or may independently lose incoming or outgoing network packets: the metadata node and the storage node of the original directory entry ("A.txt"'s directory entry) and the metadata node and storage node of the new directory entry ("B.txt"'s directory entry). Accordingly, a rename workflow designed to take possible failures and/or communication delays at any of the participant nodes may be implemented, using a sequence of at least two atomic operations as described below. Each atomic operation of the sequence may be confined to one of the metadata nodes, and may therefore be easier to implement than multi-node atomic operations. It is noted that each metadata node (and/or storage node) involved may be configured to manage metadata for numerous file store objects, potentially belonging to numerous clients of the storage service in a multi-tenant environment, and as a consequence each metadata or storage node may have to handle large numbers of rename requests and other file store operation requests concurrently.

Figure 40:
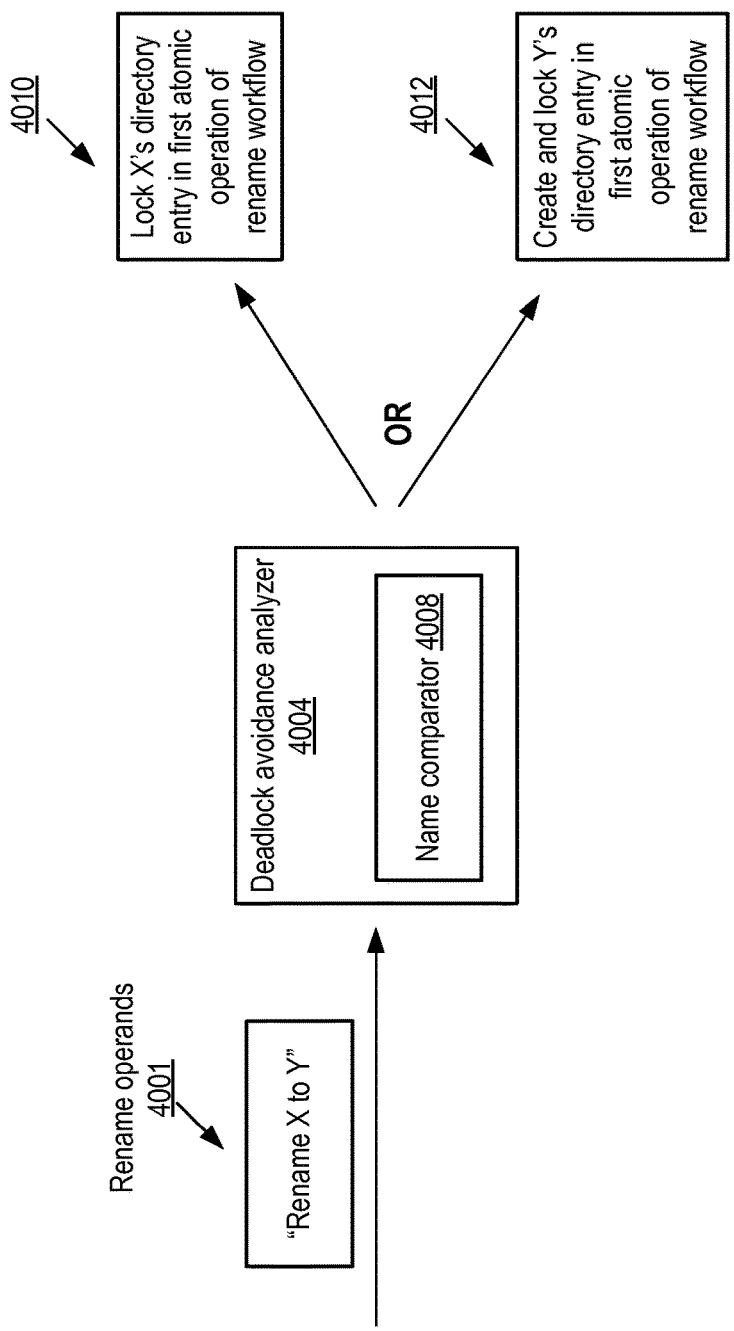
FIG. 40 illustrates a use of a deadlock avoidance mechanism for concurrent rename operations, according to at least some embodiments.

To prevent inconsistency and/or metadata corruption, metadata structures such as directory entries may be locked (e.g., using exclusive locks) during rename workflows in some embodiments. In order to prevent deadlocks (as might potentially occur if, for example, two rename requests "rename A.txt B.txt" and "rename B.txt A. txt" are received in very close time proximity), a lock ordering protocol may be employed in at least some embodiments. FIG. 40 illustrates a use of such a deadlock avoidance mechanism for concurrent rename operations, according to at least some embodiments. A deadlock avoidance analyzer module 4004 (e.g., a subcomponent of the metadata subsystem) may take as input the operands 4001 of the rename request (e.g., operands "X" and "Y" of a "rename X to Y" request) and generate a particular lock acquisition order in the depicted embodiment.

Two alternative lock acquisition sequences 4010 and 4012, of which exactly one may be generated as output by the deadlock avoidance analyzer module 4004, are shown with respect to a "rename X to Y" request in the depicted embodiment. According to acquisition sequence 4010, a lock on X's directory entry is to be obtained as part of a first atomic operation of a rename workflow. According to acquisition sequence 4012, a directory entry for Y is to be obtained (after creating the directory entry if necessary) in a first atomic operation of the rename workflow. In the depicted embodiment, a name comparator 4008 may be used by the deadlock avoidance module to arrive at the lock sequence. The two operands may be compared, e.g., lexicographically, and in at least some embodiments the operand that is first in the lexicographic order may be selected as the one to be locked in the first atomic operation. (In other embodiments, the operand that is second in lexicographic order may be locked first; as long as the ordering logic is applied consistently across different rename operations, which specific one of the operands is locked first may not matter.) Thus, in such embodiments, the same directory entry may be locked first regardless of whether the rename request was "rename X to Y" or "rename Y to X". In this way, even if two requests "rename X to Y" and "rename Y to X" are received near-concurrently, deadlocks may be avoided, since it would not be possible for X to be locked for the first request and Y to be locked for the second request. In some embodiments, techniques other than lexicographic comparison may be used to determine lock order among the rename operands. Since multiple objects (e.g., multiple files or directories) may have the same name within a given file store, while the identifiers assigned to DFS-Inodes may typically be expected to be unique within a file store, in at least some embodiments the "names" used as inputs to the comparator may be obtained by concatenating or otherwise combining the identifier of a selected DFS-Inode associated with the object (e.g., the parent DFS-Inode of the object) with the object's name. Other disambiguation techniques may be used in other embodiments to overcome potential problems of file name (or directory name) re-use—e.g., the entire path from the root of the file store to the object may be used as the "name" for lock sequence determination in one embodiment, or DFS-Inode identifiers associated with several of the path's directories may be combined with the object name.

In at least some embodiments, based on the output of the deadlock avoidance analysis, one of two different rename workflows may be implemented for a given rename request.

Figure 41:
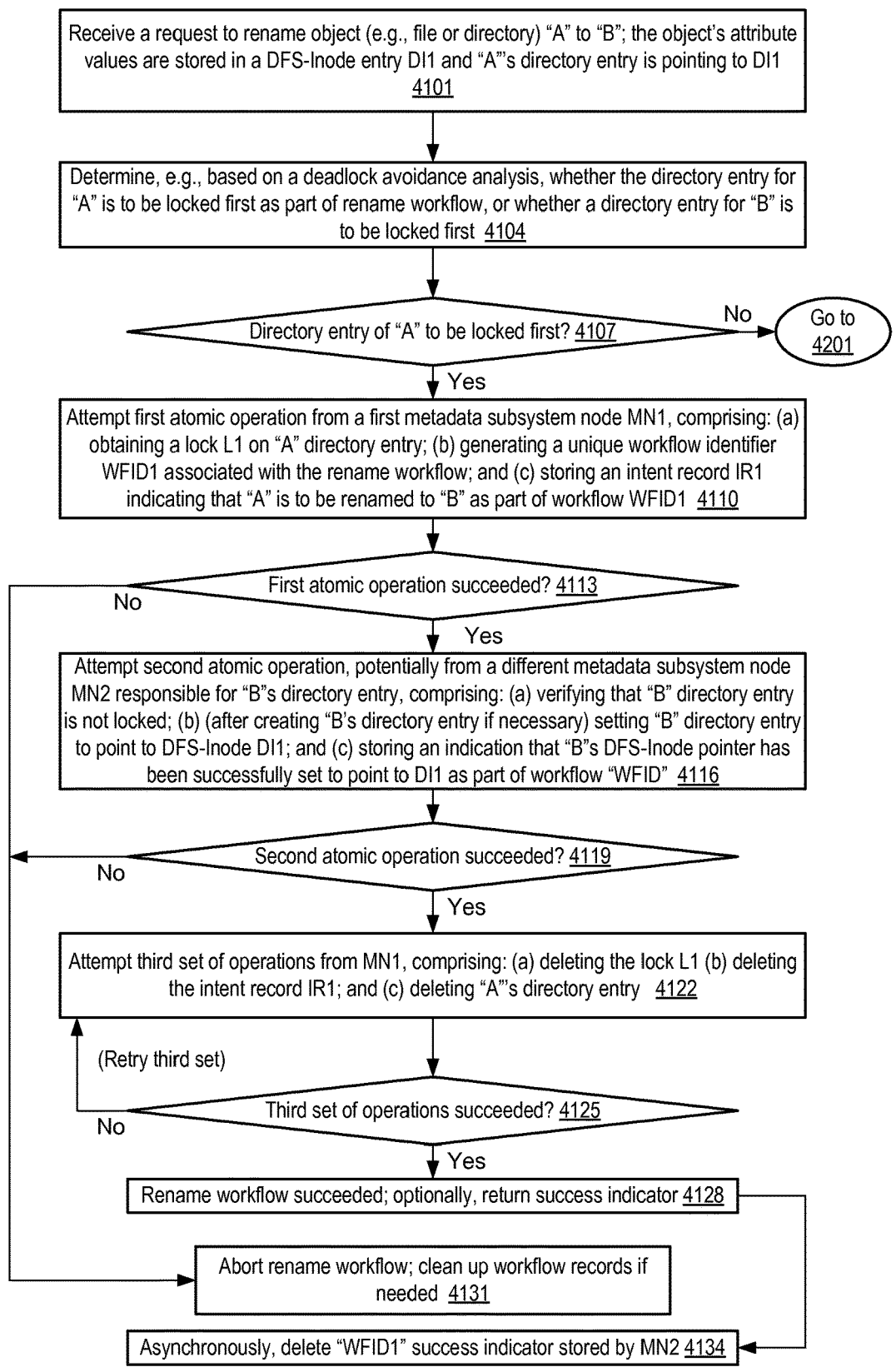
FIG. 41 is a flow diagram illustrating aspects of operations that may be performed to implement a first rename workflow based on a first lock ordering, among two possible lock orderings, that may be determined at a storage service for a rename operation, according to at least some embodiments.

The two workflows may differ in which directory entry is locked first. Each of the rename workflows may be considered as comprising at least three phases: a first set of operations performed atomically (which may collectively be referred to as "the first atomic operation" of the workflow), a second set of operations performed atomically (which may collectively be referred to as "the second atomic operation"), and a third set of operations for which atomicity may be implementation-dependent. Additional (typically asynchronous) phases may also be included in some cases as described below. FIG. 41 is a flow diagram illustrating aspects of operations that may be performed to implement a first rename workflow based on a first lock ordering, among two possible lock orderings, that may be determined at a storage service for a rename operation, according to at least some embodiments. As shown in element 4101, a request to rename a particular file store object, such as a file or a directory, whose current name is "A" to "B" may be received, e.g., at a metadata subsystem of a distributed storage service. For example, an access subsystem node may receive a rename command from a customer, and transmit a corresponding internal rename request to a selected metadata node. In embodiments in which a storage subsystem of the service is used for both metadata and data, the metadata node may for example comprise a process or thread co-located at the same hardware server as a storage node. A directory entry for "A" may currently point to a node entry DI1 that comprises values of various attributes of the object, such as ownership identification, read/write permissions, and the like. A directory entry for "B" may not yet exist.

A determination may be made, e.g., based on deadlock avoidance analysis, whether a lock on "A"'s directory entry is to be acquired first as part of the rename workflow, or whether a lock on a directory entry for "B" (which may first have to be created) is to be acquired first (element 4104). If B's directory entry is to be locked first (element 4107), the workflow steps illustrated in FIG. 42 may be used, as indicated by the label "Go to 4201" in FIG. 41. If "A"'s entry is to be locked first (as also determined in element 4107), a first atomic operation of the rename workflow may be attempted at a particular metadata node MN1 of the storage service (element 4110). The first atomic operation may comprise the following steps in the depicted embodiment: (a) obtaining a lock L1 on "A"'s directory entry; (b) generating a unique rename workflow identifier WFID1 for the workflow being attempted and (c) storing an intent record IR1 indicating that the object currently named A is to be renamed to B. In at least some implementations the intent record may include or indicate the workflow identifier WFID1. In one implementation, a state management subcomponent of the storage service (e.g., similar to the replicated state machine illustrated in FIG. 12) may be used to combine the three steps into one atomic operation. The order in which the three steps of the first atomic operation are performed relative to each other may vary in different implementations. In some embodiments, respective representations of the lock L1, the intent record IR1 and/or the workflow identifier WFID1 may each be replicated on persistent storage devices, e.g., using extent replicas of the storage subsystem as described earlier. In at least one embodiment, the persistent storage locations selected for storing the lock, the intent record and/or the workflow identifier may be accessible from replacement metadata nodes in the event of a failure of MN1. As long as the lock L1 is held, no other modification may be applied to "A"'s directory entry in the depicted embodiment. If the lock is already held when the first atomic operation is attempted, e.g., on behalf of some other concurrent or near-concurrent modification operation, the first atomic operation may be delayed until the lock becomes available.

If the initial atomic operation succeeds, as determined in element 4113, the second atomic operation of the rename workflow may be attempted. It is noted that with respect to each of the atomic operations of the workflows illustrated in FIGS. 41 and 42, in at least some embodiments the atomic operation may be re-tried one or more times (e.g., based on some configurable maximum retry count) in the event that the operation cannot be completed on the first attempt. The second atomic operation may be performed at the metadata node (MN2) that is designated to manage and/or store the directory entry for "B". In some embodiments, after the first atomic operation is completed at MN1, a request to perform the second atomic operation may be sent from MN1 to MN2. The request may include the workflow identifier WFID1 in at least some implementations. As shown in element 4116, the second atomic operation may comprise the following steps: (a) verifying that "B"'s directory entry is not currently locked on behalf of some other modification operation (b) setting B's directory entry to point to the node entry DI1 for the object being renamed and (c) storing a record indicating that, for the workflow with identifier WFID1, the pointer modification step of "B"'s directory entry succeeded. In at least some cases, "B"'s directory entry may not exist at the time that the second atomic operation is attempted, in which case the step of verifying that it is not locked may be implemented implicitly by creating a new directory entry for "B". In at least some embodiments, a lock may be acquired on B's directory entry before the pointer is modified, e.g., to prevent any concurrent modifications of "B"'s directory entry. The lock may be released after the pointer to DI1 is set in some such embodiments. As in the case of the writes performed as part of the first atomic operation, the writes of the second atomic operation (e.g., the setting of the pointer and the success indication) may be performed at persistent storage locations such as replicated extents from which they may be read later in the event of a failure at MN2. A state management subcomponent of the storage service may be used to enforce atomicity of the combination of the writes.

If the second atomic operation succeeds (as determined in element 4119), a third set of operations may be attempted (element 4122). Like the first atomic operation, this third set of operations may also be executed at MN1. In at least some embodiments, an indication received at MN1 that the second atomic operation succeeded (e.g., a response to a request sent from MN1 to MN2 for the second atomic operation) may trigger the third set of operations. In the third set of operations, the lock L1 acquired on "A"'s directory entry may be deleted, the intent record IR1 may be deleted, and "A"'s directory entry itself may be deleted. As mentioned earlier, in some implementations, this third set of operations may also be performed as an atomic unit, and in such cases the operations of the third set may be referred to as the "third atomic operation" of the workflow. In other implementations atomicity may not be enforced for the third set of operations. In embodiments in which the metadata generated during the first atomic operation (e.g., the intent record, the workflow identifier and the indication of the lock) are stored in persistent storage, the third set of operations may be expected to succeed eventually, even if one or more retries are required due to failures of various kinds, regardless of whether the third set is performed atomically or not. If the third set of operations succeeds as well (as detected in element 4125), the rename workflow as a whole may be deemed to have succeeded (element 4128). In at least some embodiments a response to the rename request may be sent, indicating that the rename succeeded. In some embodiments no response may be sent, and the requester.

In the depicted embodiment, if either of the two atomic operations did not succeed, the workflow as a whole may be aborted (element 4131), and any of the records generated in earlier parts of the workflow may be deleted (such as the intent record IR1, a representation of the acquisition of lock L1 and/or the success record stored at MN2). If any operation of the third set of operations fails as detected in element 4125), it may simply be retried in the depicted embodiment as indicated by the arrow leading back to element 4122. As mentioned earlier, in at least some embodiment multiple attempts may be tried for each of the atomic operations before declaring failure. In some embodiments, at some point after the third set of operations of a workflow with identifier WFID1 is complete, the success record stored at MN2 may be deleted (element 4134), e.g., asynchronously with respect to the completion of the third set of operations.

Figure 42:
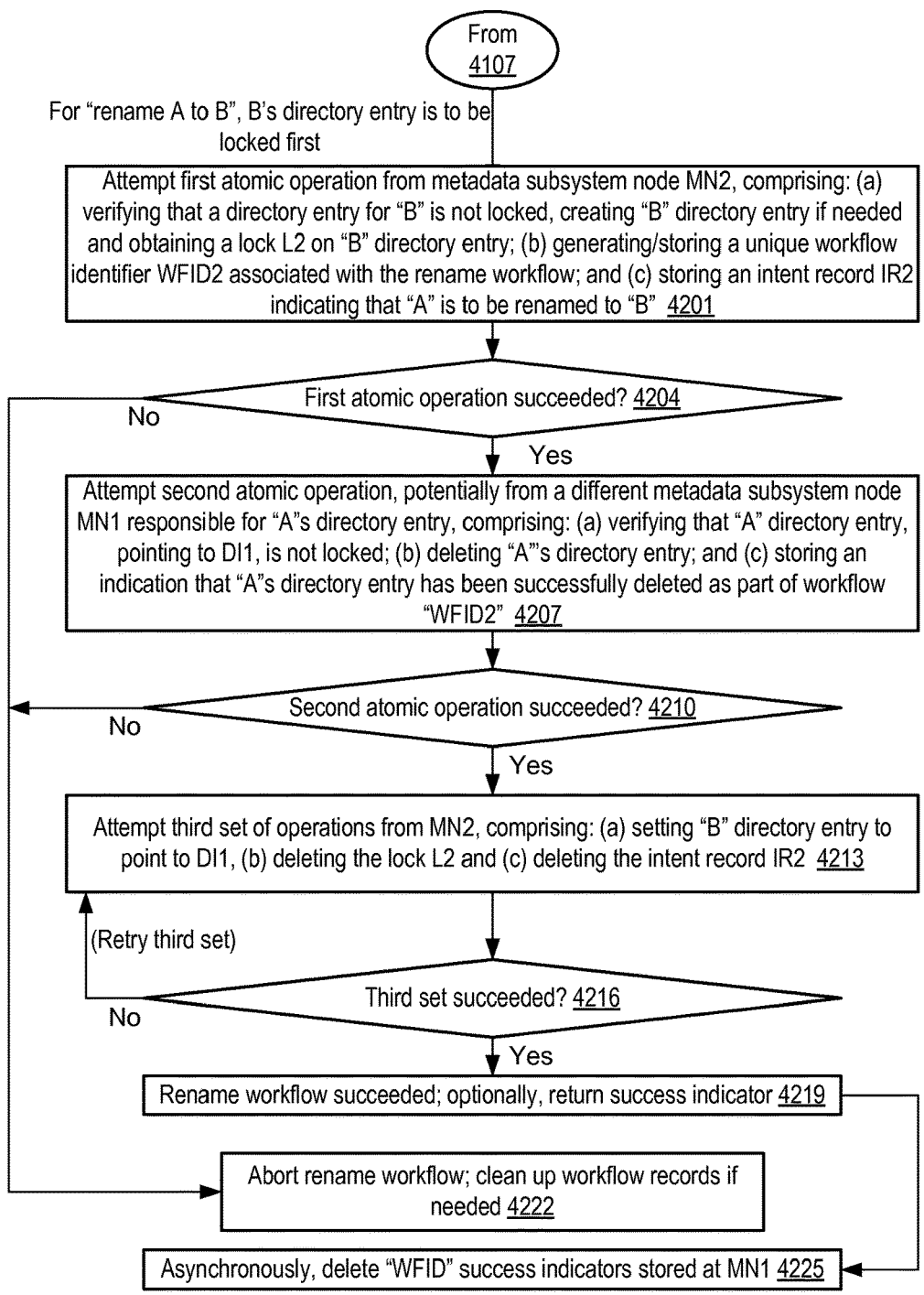
FIG. 42 is a flow diagram illustrating aspects of operations that may be performed to implement a second rename workflow based on a second lock ordering, among the two possible lock orderings, that may be determined at a storage service for a rename operation, according to at least some embodiments.

As indicated in the negative output of element 4107 of FIG. 41, a different rename workflow may be attempted if the directory entry for "B" is to be locked first. FIG. 42 is a flow diagram illustrating aspects of operations that may be performed to implement a second rename workflow based on such a second lock ordering, among the two possible lock orderings, that may be determined at a storage service for a rename operation, according to at least some embodiments. This second workflow may also comprise two successive atomic operations to be used to rename "A" to "B" in the depicted embodiment, followed by a third set of operations that may or may not be implemented atomically depending on the implementation. The first atomic operation (element 4201 of FIG. 42), performed at the metadata node MN2 (the node responsible for storing a directory entry for object name "B") may include verifying that "B"'s directory entry is not locked for some other operation, creating "B"'s directory entry if needed, locking "B"'s directory entry, generating and storing a unique workflow identifier WFID2 for the rename workflow, and storing an intent record IR2 indicating that the object currently named "A" is going to be renamed to "B". In some implementations the intent record IR2 may include or indicate the workflow identifier WFID2.

If the first atomic operation succeeds (as detected in element 4204), a second atomic operation of workflow WFID2 may be attempted (element 4207). This second atomic operation may be performed at the metadata node MN1 at which "A"s directory entry is managed, and in some embodiments may be triggered by a request from MN2 indicating that the first atomic operation has succeeded. The second atomic operation may include verifying that A's directory entry is not locked, deleting "A"'s directory entry, and storing a persistent record that "A"'s director entry has been successfully deleted as part of workflow WFID2. If the second atomic operation succeeds (as determined in element 4210), the third set of operations may be attempted at MN2 (element 4213). In some embodiments, an indication that the second atomic operation succeeded, e.g., a response received at MN2 to a request sent from MN2 to MN1 earlier for the second atomic operation, may trigger the attempt to perform the third set of operations. The third set of operations may include setting "B"s directory entry to point to DI1 (the node entry for the object being renamed), releasing/deleting lock L2, and deleting the intent record IR2.

If the third set of operations succeeds (as detected in element 4216), the workflow as a whole may be deemed to have succeeded (element 4219), and in some embodiments a success indicator may be returned to the requester of the rename operation. As in the workflow illustrated in FIG. 41, the third set of operations of FIG. 42 may be expected to succeed eventually, although one or more retries may be required in failure scenarios as indicated by the arrow leading back from element 4216 to element 4213. Asynchronously with respect to the completion of the third set of operations, the success record stored by MN1 (indicating that "A"'s directory entry has been deleted) may itself be deleted (element 4225) in at least some embodiments. If either of the two atomic operations fail, the rename workflow as a whole may be aborted (element 4222), and records stored during earlier operations of the aborted workflow may be cleaned up. As in the operations illustrated in FIG. 41, the storage service's state management mechanisms and/or replicated extents may be used for the atomic operations of the second workflow.

Figure 43:
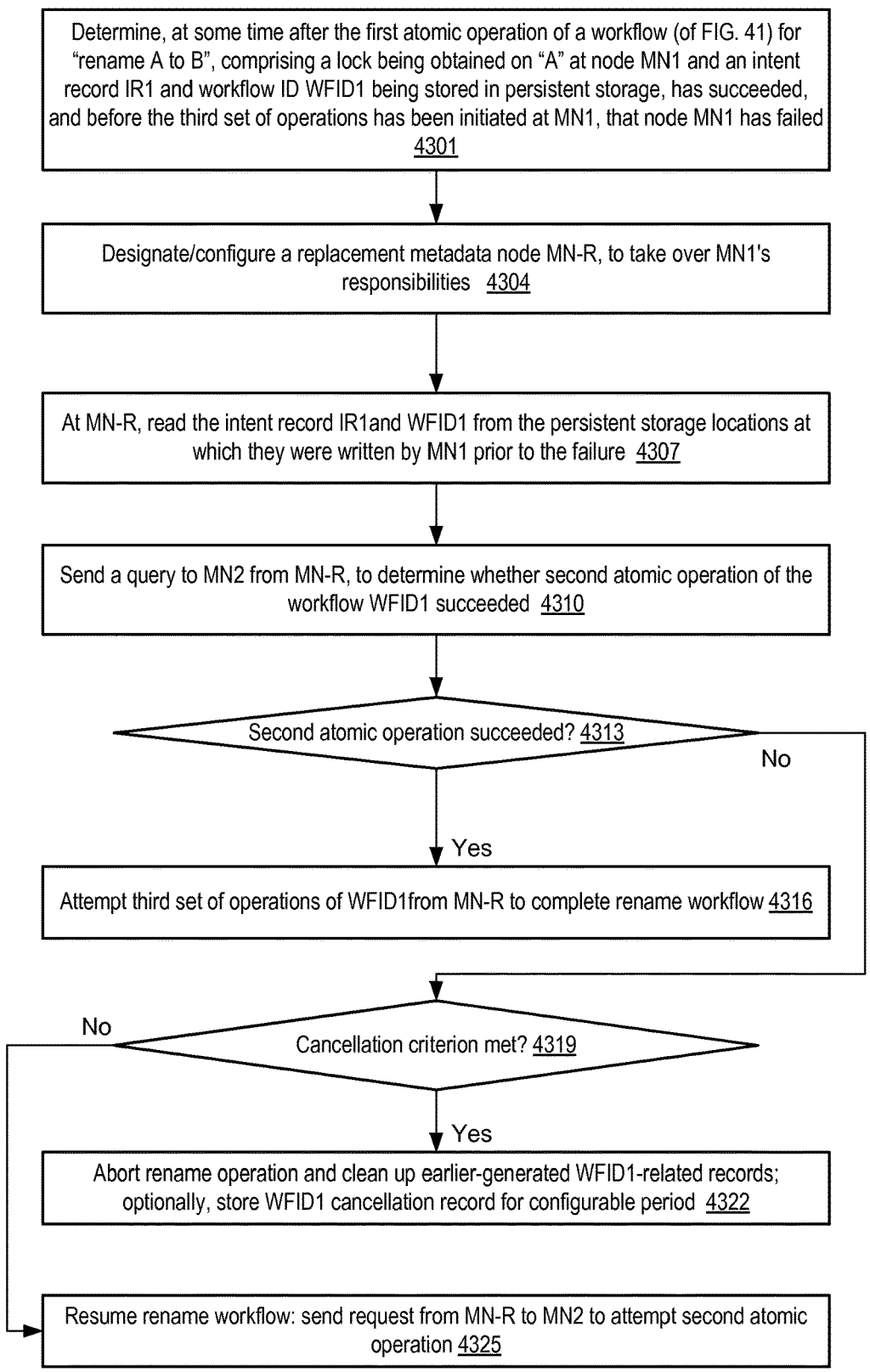
FIG. 43 is a flow diagram illustrating aspects of recovery operations that may be performed in response to a failure of one metadata subsystem node of a pair of metadata subsystem nodes participating in a rename workflow, according to at least some embodiments.
Figure 44:
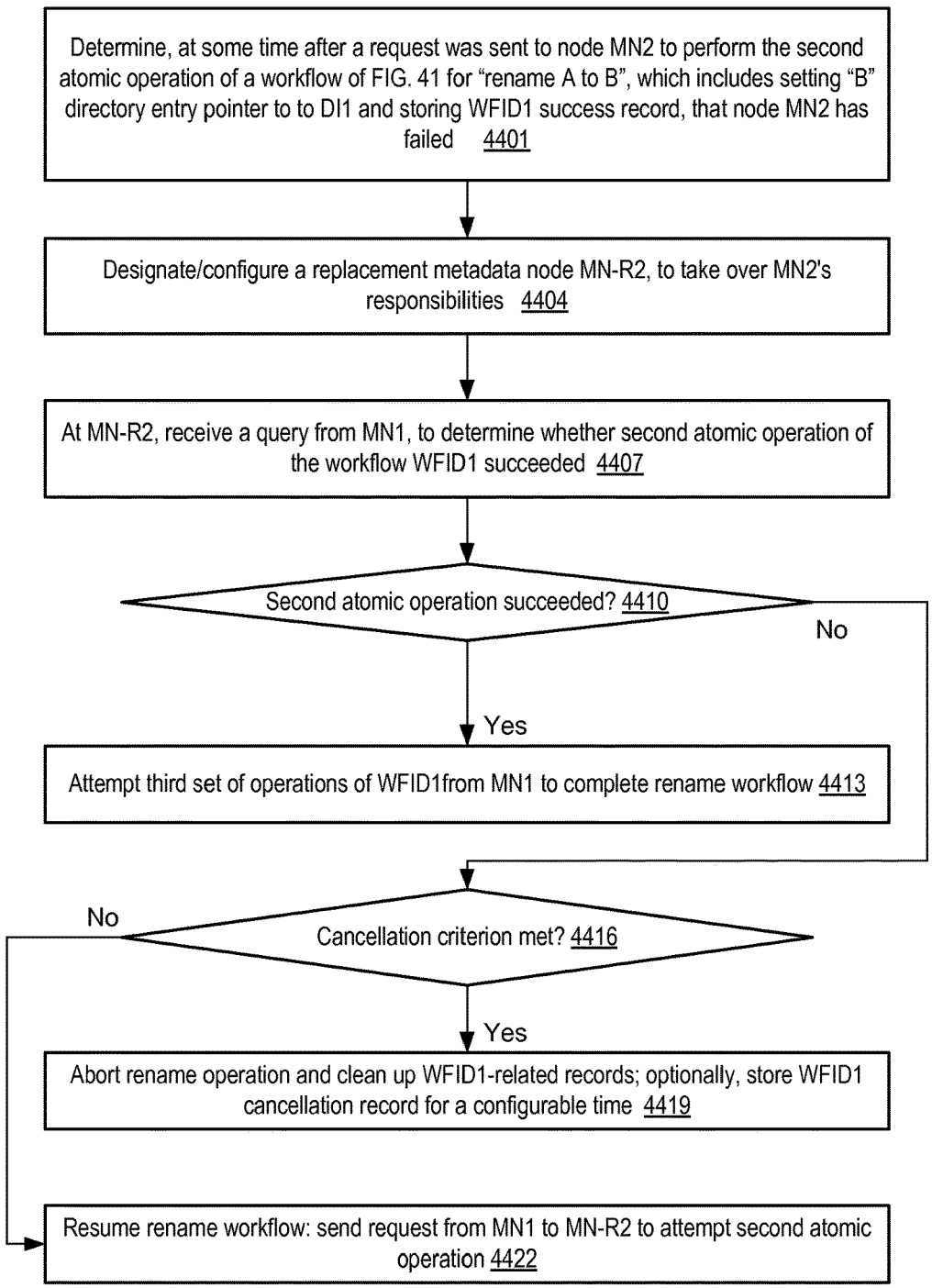
FIG. 44 is a flow diagram illustrating aspects of recovery operations that may be performed in response to a failure of the other metadata subsystem node of the pair of metadata subsystem nodes participating in the rename workflow, according to at least some embodiments.

Using the deadlock-avoiding lock ordering sequence and the operations illustrated in FIG. 41 and FIG. 42, rename operations for file store objects may be implemented to achieve the desired level of consistency expected by the file system protocols being used. The techniques of storing intent records associate with unique workflow identifiers in persistent storage may be helpful in recovery from various types of failures in different embodiments. FIG. 43 is a flow diagram illustrating aspects of recovery operations that may be performed in response to a failure of one metadata subsystem node of a pair of metadata subsystem nodes participating in a rename workflow, according to at least some embodiments, while FIG. 44 is a flow diagram illustrating aspects of recovery operations that may be performed in response to a failure of the other metadata subsystem node of the pair of metadata subsystem nodes participating in the rename workflow, according to at least some embodiments. To simplify the presentation, FIG. 43 and FIG. 44 each illustrate operations that may be performed if a single metadata node failure occurs during the workflow sequence illustrated in FIG. 41, although similar recovery strategies may be employed even if both metadata nodes involved in the workflow fail in at least some embodiments.

As shown in element 4301 of FIG. 43, a failure of node MN1 may be detected at some point after the first atomic operation (whose steps were illustrated in element 4110) of FIG. 41's workflow sequence completes, and before the third set of operations (element 4122) of FIG. 41's workflow sequence is begun. For example, the processes or threads implementing the metadata node MN1 where "A"s directory entry is managed may exit prematurely, or MN1 may become unresponsive to health checks due to a network-related failure or due to a software bug that results in a hang. Under such circumstances, a replacement metadata node MN-R may be configured or designated to take over the responsibilities of MN1 (element 4304) in the depicted embodiment. In some embodiments, as mentioned earlier, MN1 may have been configured as a member of a redundancy group comprising a plurality of metadata nodes, and another member of the redundancy group that was preconfigured for failover may be quickly designated as a replacement. In other embodiments, replacement metadata node MN-R may not be part of a preconfigured redundancy group.

In the first atomic operation of the workflow of FIG. 41, MN-1 stored intent record IR1 and workflow identifier WFID1 in persistent storage, together with a representation of the lock L1. The replacement metadata node MN-R may read the intent record IR1 and workflow identifier WFID1 that were written prior to MN-1's failure (element 4307). MN-R may then send a query to MN2, the metadata node responsible for "B"'s directory entry, to determine the status of the workflow WFID1 (element 4310) in the depicted embodiment—e.g., to find out whether B's directory entry pointer has already been set to point to DI1 (the node entry of the object being renamed) as part of the second atomic operation of the workflow.

As mentioned earlier, each metadata node may be responsible for managing metadata for several different files and/or for several different clients in embodiments in which the distributed storage service is multi-tenant. Consequently MN2 may have stored respective success records corresponding to the second atomic operation of numerous rename workflows. Upon receiving the query regarding the status of the workflow with identifier WFID1, MN2 may look up its records of successful atomic operations. If MN2 finds a success record for WFID1's second atomic operation (as determined in element 4313), it may inform MN-R that the second atomic operation was completed (i.e., that "B"'s directory entry was set to point to the node entry DI1). Accordingly, in the depicted embodiment, MN-R may then attempt the third set of operations in an effort to complete the rename workflow identified by WFID1 (element 4316).

At least in some scenarios, it may be the case that the second atomic operation of workflow WFID1 does not succeed. For example, MN1 may have failed before its request to MN2 to start the second atomic operation was successfully transmitted, or the request may have been lost, or MN2 may not have been able to successfully implement the requested second atomic operation. In some embodiments, if MN-R is informed that the second atomic operation had not succeeded (as also determined in element 4313), MN-R may have the option of either abandoning or resuming the workflow. In the depicted embodiment, if a cancellation criterion is met (as detected in element 4319), the rename workflow may be aborted and metadata record associated with WFID1 that were stored by MN1 may be removed (e.g., the intent record IR1 and the representation of the lock L1 may be deleted from persistent storage) (element 4322). In one embodiment, the cancellation criterion may be met if the time that has elapsed since the original rename request was received from a client exceeds some configured threshold. An elapsed-time-dependent termination of the rename workflow may be implemented, for example, under the assumption that in view of the long elapsed time, the client that requested the rename would have realized that the original request did not succeed, and would therefore not be expecting the rename to succeed at this point. In some embodiments, a cancellation record indicating that the workflow with identifier WFID1 has been aborted/cancelled may be stored for some configurable time period, e.g., at either MN-R, at MN2, or at both MN-R and MN2. In one such embodiment, after determining that the workflow is to be abandoned, MN-R may first send a request to MN2 to store the cancellation record, and may delete both the intent record and the lock after it is informed that MN2 has successfully stored the cancellation record to persistent storage.

If, however, the cancellation criterion is not met (as also detected in element 4319), in the depicted embodiment MN-R may resume the workflow by sending a request to MN2 to implement the second atomic operation (element 4325). Other strategies to respond to MN1 failures may be implemented in various embodiments—e.g., in some embodiments the rename workflow may always be resumed regardless of the time that has elapsed since the initial rename request was received, and in at least one embodiment the rename workflow may always be abandoned in the event of a failure of MN1 after the completion of the first atomic operation.

FIG. 44 illustrates operations that may be performed if metadata node MN2 fails during the workflow sequence illustrated in FIG. 41, according to at least some embodiments. As shown in element 4401, a failure of MN2 may be detected, for example after a request to implement the second atomic operation (element 4116) of the workflow is sent to MN2. In a manner similar to that discussed for replacing MN1 by MN-R above, a replacement metadata node MN-R2 may be designated or configured for MN-R in the depicted embodiment (element 4404). MN-R2 may be able to read the success records written to persistent storage by MN2 prior to its failure.

At MN-R2, a query from MN1 may be received to enable MN1 to determine whether the second atomic operation of the workflow with identifier WFID1 was successfully completed (element 4407). If the second atomic operation had been completed prior to MN2's failure (as detected in element 4410), MN-R2 may be able to find a success record for WFID1, and may respond to MN1 accordingly. MN1 may then resume the workflow by attempting the third set of operations (element 4413).

If the second atomic operation of WFID1 had not been completed, a similar procedure may be implemented in the embodiment depicted in FIG. 44 as was implemented in FIG. 43. If a cancellation criterion for the rename operation is met (as detected in element 4416)—e.g., if the time elapsed since the rename was requested exceeds some threshold time T—the rename operation may be aborted and the data structures related to WFID1 may be cleaned up (element 4419). Otherwise, if the cancellation criterion has not been met, the workflow may be resumed by MN1 by sending a request to perform the second atomic operation to MN-R2 (element 4422).

While FIG. 43 and FIG. 44 illustrate recovery techniques responsive to failures at either metadata node during the workflow of FIG. 41, analogous techniques may also be implemented if either metadata node fails during the workflow illustrated in FIG. 42 in at least some embodiments. As long as the replacement node configured for the failed metadata node is able to read the workflow records (e.g., the intent record, the lock, and/or the success record) from persistent storage, it may be possible to resume the workflow after the failure. For example, in the workflow of FIG. 42, if MN2 fails after the first atomic operation and a replacement MNR-2 is designated, MNR2 may read the intent record IR2 and the workflow identifier WFID2 and send a status query regarding to MN1, and so on. In a manner similar to that shown in FIGS. 43 and 44, depending on how long it takes to detect the failure and configure the replacement node, and how much progress the rename workflow had made prior to the failure, in some cases the rename workflow of FIG. 42 may be abandoned after a metadata node failure. In embodiments in which metadata is stored using the same underlying storage subsystem as is used for data, recovery techniques similar to those illustrated in FIG. 43 and FIG. 44 may be used to respond to storage node failures as well. In some embodiments the functionality of a metadata node and a storage node may be performed at the same host or hardware server, and as a result a failure of that host or server may affect both types of nodes.

Scalable Namespace Management

The goals of the distributed storage service may include handling very large numbers of files, directories, links, and/or other objects in a scalable manner in various embodiments. For example, for some large customers, a given file system may comprise a million or more directories, and a given directory may comprise a million or more files. In some embodiments, in order to support high throughputs and/or to ensure that response times remain relatively flat at high concurrency for various namespace operations such as directory listings, lookups, inserts and deletes as the number of objects in the namespace increases to such levels, a data structure called a hash-directed acyclic graph (HDAG) may be used for managing namespace entries. The term namespace is used herein to refer to the collection of names of objects (files, directories, hard and soft links, and the like) created within a given file system or other data store logical container, and to the relationships (e.g., parent-child relationships) between the objects. In some embodiments, a respective HDAG may be generated for each directory of a file system, e.g., by the metadata subsystem of the service. The HDAG-based namespace management techniques described below may utilize some of the features of the distributed storage service that have been described earlier, such as the striping of metadata structures at configurable granularity across multiple storage extents and the ability to perform modifications at a plurality of storage devices in a single atomic operation. For example, in one implementation a respective logical block (which may be mapped to one or more pages of a respective extent) may be used for each node of a particular HDAG, thus potentially partitioning the namespace entries among a plurality of storage servers.

Figure 45:
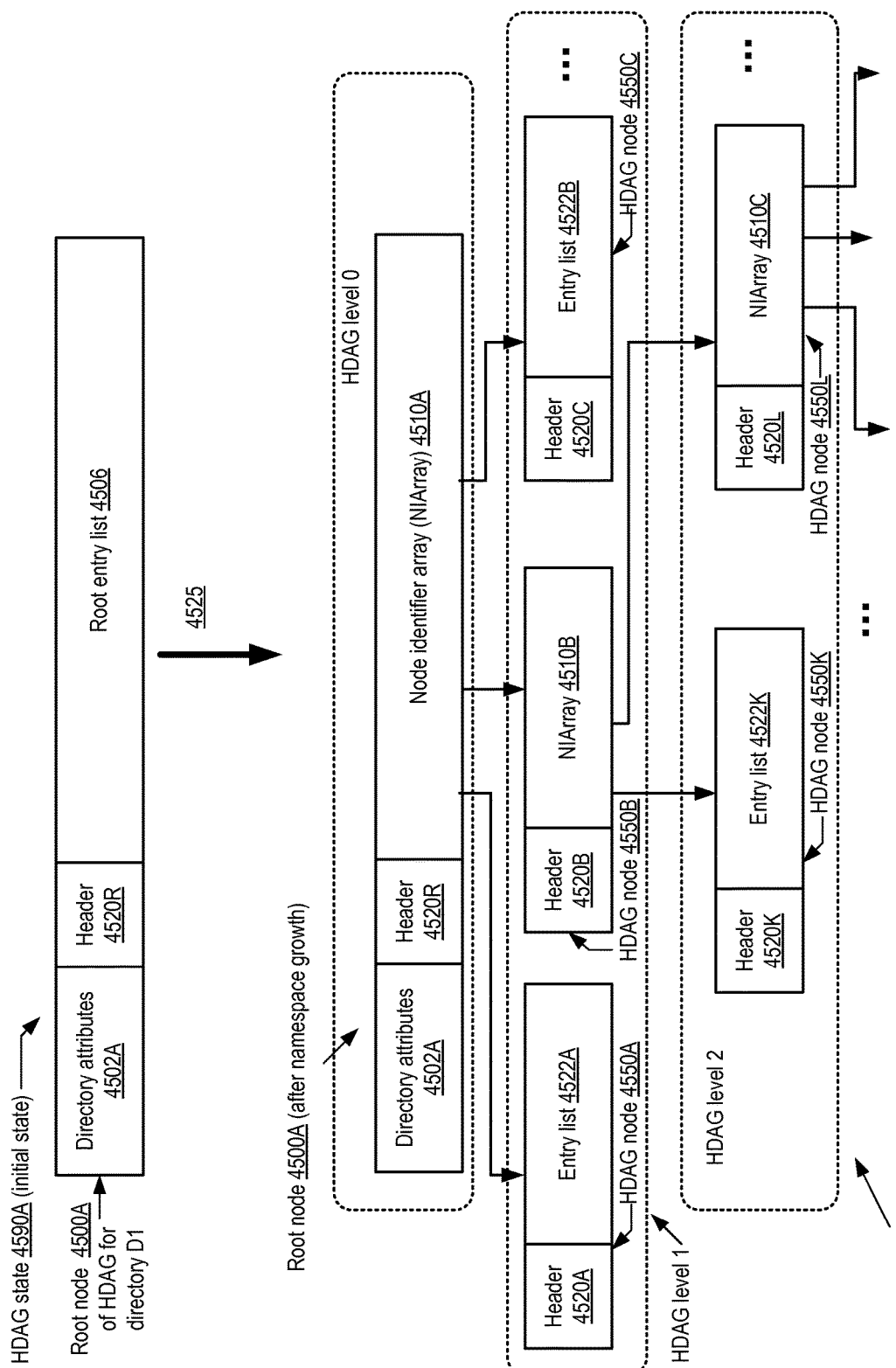
FIG. 45 illustrates an example of a hash-based directed acyclic graph (DAG) that may be used for file store namespace management, according to at least some embodiments.

FIG. 45 illustrates an example of a hash-directed acyclic graph (HDAG) that may be used for file store namespace management, according to at least some embodiments. An HDAG for a directory may include at least two types of nodes in the depicted embodiment: entry list (EL) nodes (each of which comprise a list of directory entries similar to the DFS-DirectoryEntry structures shown in FIG. 39, with pointers to respective DFS-Inodes that contain other attribute values for the corresponding objects), and node identifier array (NIArray) nodes (each of which comprise an array of pointers to a set of child nodes). The type of a node may be indicated in a header field, such as header field 4504A or 4520A. When a directory D1 is created, an HDAG in initial state 4590A, comprising a single EL node (such as node 4500A, referred to as the root node of the HDAG), may be created for the directory. In some implementations, the DFS-Inode for the directory may itself be used as the root node of the HDAG. Root node 4500A may comprise sufficient space to hold some set of directory attributes 4502A, a header field 4520R indicating the type of the root node (initially EL), and a root entry list 4506 for the first few files or subdirectories created within D1. A given EL node may store up to some configurable number (e.g., a value that may be selected for all the EL entries of a given file store) of namespace entries, and a given NIArray node may store up to some configurable number of node identifiers (e.g., another value selected for all the NIArray entries of a given file store). In at least some embodiments, the maximum permissible size of an HDAG node may be determined such that the contents of one HDAG node can be written to storage in a single atomic operation—e.g., in one implementation, if the HDAG parameters are selected such that an HDAG node never occupies more than 4 kilobytes, extents that support 4 kilobyte pages may be used for the HDAGs, and/or a logical block size of 4 kilobytes may be used. Other mappings between HDAGs, logical block sizes, and page sizes may be used in other implementations.

As more files or subdirectories are added within D1 (as indicated by arrow 4525), the root entry list 4506 may eventually become full, and the root node 4500A may be split into some number of child nodes using a hash function to distribute its entry list members into the child nodes. The type of the root node may be changed from EL to NIArray, and pointers to the child nodes (e.g., the logical or physical storage addresses at which the child nodes are stored) may be written to respective elements in an NIArray at the root node. A selected strong hash function may be applied to each of the entry names (e.g., file names or subdirectory names) to produce a hash value of a desired size, and portions of the bit-sequence representation of the hash value for a given entry may be used to map the entry to a new child node. Several types of split operations (described in detail below) may be implemented in various embodiments on non-root nodes as they fill up, using a similar hash-based distribution of entries among newly-created child nodes. In response to lookup requests, the same hash function may also be used to search for entries for specified object names, e.g., using successive subsequences of the bit sequence representation of the hash value as indexes to navigate respective levels of the HDAG until a node with the targeted entry is found. To obtain a directory listing, all the pointers starting from the root node's NIArray (assuming the root node has split) may be followed recursively until the entire HDAG has been traversed and all its entries have been retrieved. Further details regarding various types of HDAG operations are provided below.

The type of an entry list node may change as a result of one or more types of HDAG operations under some conditions—e.g., root node 4500A has become an NIArray node after its entries are distributed among child nodes (and as described in further detail below, in some cases an NIArray node may be transformed into an entry list node after a deletion). The NIArray 4510A includes pointers (e.g., storage addresses) of child nodes 4550A, 4550B and 4550C in HDAG state 4590B. The entries that were originally in root entry list 4506 may initially be distributed among respective entry lists at the child nodes (e.g., entry list 4522A of node 4550A, entry list 4522B of node 4550C, and another entry list initially created at node 4550B). Thus, each of the child nodes 4550A, 4550B and 4550C may have started out as an EL node. By the time state 4590B is reached, however, node 4550B itself has split and become an NIArray node, with pointers to its own children nodes 4550K and 4550L being stored in NIArray 4510B. Node 4550L has also changed state from EL to NIArray in state 4590B, and its NIArray 4510C includes pointers to its children nodes. Node 4550K still remains an EL node, with entry list 4522K representing some of the files/directories created within D1. The headers of each of the nodes (e.g., headers 4520R, 4520A, 4520B, etc.) may be modified when and if the type of the node is changed as a result of a node split (or a node join after some types of entry deletions) in the depicted embodiment. In some implementations, at least at some points in time, the root node 4500A and/or other HDAG nodes may comprise some number of bytes that are not in use. In state 4590B, the HDAG may be considered as comprising at least three "levels" including a root level, HDAG level 1 (comprising nodes 4550A, 4550B and 4550C that can be accessed in a single lookup using NIArray pointers of the root node), and HDAG level 2 (comprising nodes 4550K and 4550L that can be accessed in a single lookup using NIArray pointers of level 1 nodes). The term "HDAG level" may be used herein as an indication of the number of nodes that have been encountered, starting from the root node of the HDAG, to arrive at some particular node. HDAG nodes that have no children may be referred to as leaf nodes. At least in some embodiments, it may be the case for two leaf nodes L1 and L2 of an HDAG, during respective traversals towards the leaf nodes from the HDAG root, different numbers of nodes may be encountered before reaching L1 than are encountered before reaching L2. It is noted that in the embodiment illustrated in FIG. 45, the hash values that are used to distribute the entries among the nodes, and thereafter to look up the entries, may not need to be stored within the HDAG itself.

Figure 46:
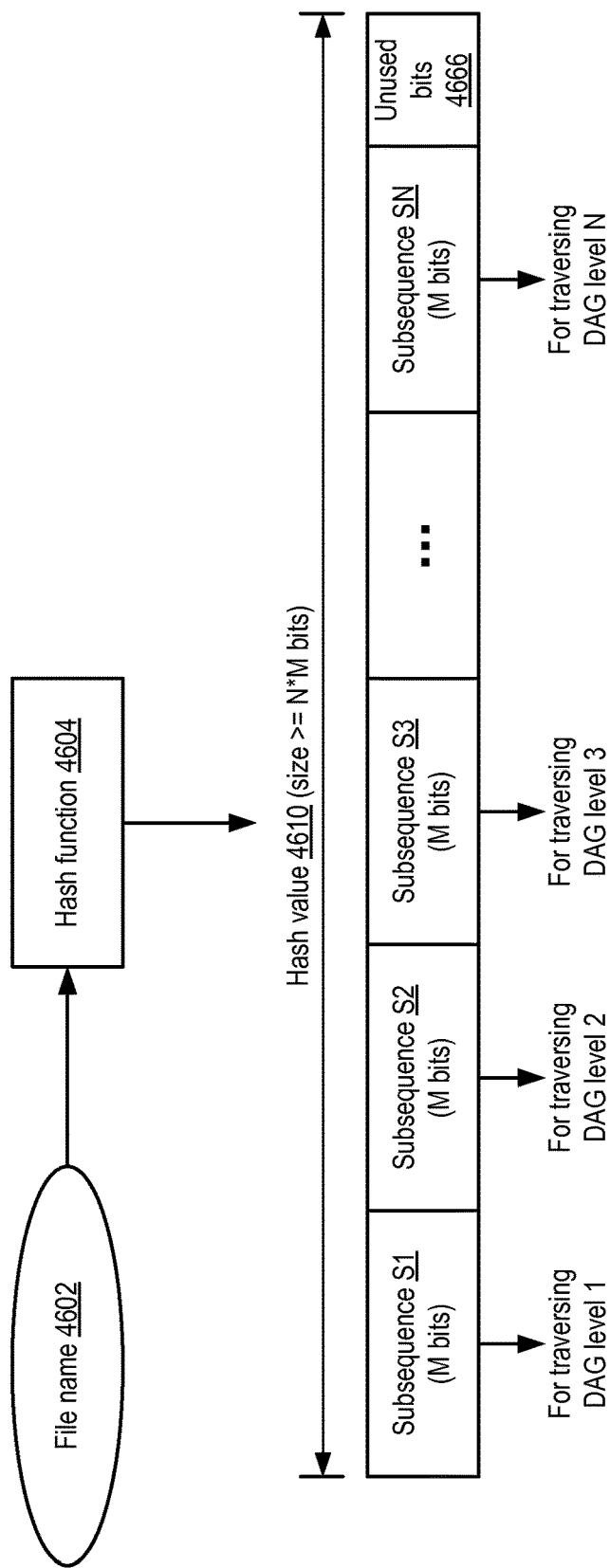
FIG. 46 illustrates a technique for traversing an HDAG using successive subsequences of a hash value obtained for a file name, according to at least some embodiments.

As noted earlier, one of the goals of the namespace management technique may be to enable fast lookups by name. FIG. 46 illustrates a technique for navigating an HDAG using successive subsequences of a hash value obtained for a file name, according to at least some embodiments. (Similar techniques may be used for directories, links or other file store objects) The name 4602 of the file is used as input to a selected hash function 4604, e.g., in response to a lookup request with the name as a parameter. In some embodiments, a string of up to K (e.g., 255) UTF-8 characters may be used as a file name or a directory name. Other length restrictions or encodings of file store object names may be used in other embodiments. In one embodiment, different hash functions may be used for respective file stores—e.g., the hash functions may be specified as configuration parameters, or may be selected by the storage service based on expectations of the namespace size for the file store, hints provided by the clients on whose behalf the file store is being created, and so on. In at least one embodiment, various metrics of the effectiveness of a hash function in use may be tracked over time, such as the average number of levels of the HDAG for a given number of namespace entries, or the degree to which the HDAGs are balanced (e.g., whether some entries are reached by passing through far fewer levels than others), and a different hash function may be selected (at least for future use) if the measured effectiveness is not sufficient.

In the depicted embodiment, a hash value 4610 expressible as a sequence of (at least) N*M bits may be generated, where N and M may be configurable parameters. N subsequences of the hash value 4610 (e.g., S1, S2, ... SN) of M bits each may be used as indexes into corresponding levels of the HDAG—e.g., subsequence S1 may be used to select the NIArray pointer (of the root node) to be used to navigate level 1, subsequence S2 may be used to select the NIArray pointer to be used to navigate level 2 starting from the level 1 node, and so on. Not all the bits in a given subsequence need be used for a given search or navigation level—e.g., only the q high-order bits (where q<M) may be used in some cases. In some embodiments, some bits 4666 of the hash value may not be used for any level.

When a new entry is to be added to a file store, e.g., in response to an open file command or create directory command, the hash value for the name of the new entry may be obtained, and the HDAG may be traversed using the subsequence-based navigation technique described above until a candidate EL node to which the name is mapped is found. (In some scenarios, it may be the case that the namespace has run out of space for entries—such special cases are discussed below). If the candidate node has no more free space in its entry list, or of its free space would fall below a threshold level if the new entry were added, the candidate node may be split. At least some of the entries of node that is split may be distributed among one or more new nodes added to the HDAG, e.g., using selected subsequences of the hash values of the entries as described below. At least two different types of HDAG node split operations may be performed in some embodiments.

Figure 47:
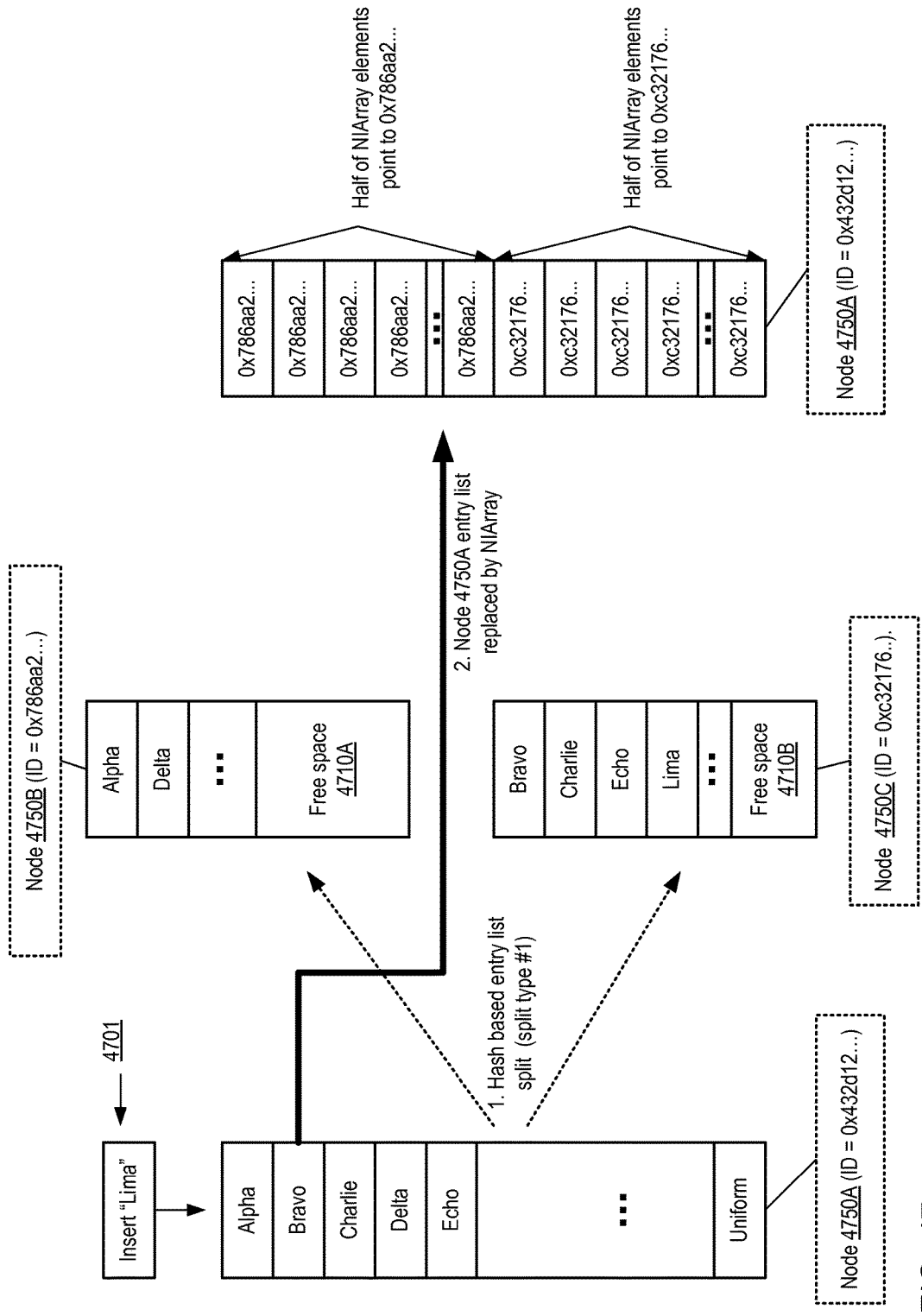
FIG. 47 illustrates an example of the first of two types of HDAG node splits that may result from an attempt to insert an entry into a namespace, according to at least some embodiments.

FIG. 47 illustrates an example of the first of two types of HDAG node splits that may result from an attempt to insert an entry into a namespace, according to at least some embodiments. In this first type of split, the type of an HDAG node may be changed from entry list (EL) to NIArray as described in detail below. The namespace entry insertion may be one of several steps taken in response to a client request to create a namespace object such as a file in some embodiments—e.g., the other steps may include allocating space for a DFS-Inode object associated with the file, setting the initial attributes of the file and/or setting a pointer from the namespace entry to the DFS-Inode and from the Inode to one or more physical pages to be used for storing file contents. The order in which these steps are taken may differ in different embodiments.

A request to insert an entry 4701 with name (e.g., file name) "Lima" into a namespace is received in the embodiment shown in FIG. 47, and a candidate EL node 4750A is found after navigating within the HDAG created for the directory into which the insertion of the object with name "Lima" is being attempted. Initial portions of the identifiers of the HDAG nodes (which may also correspond to their storage addresses, and thus may be used as parameters to read or write operations directed to the storage subsystem) are shown as hexadecimal strings in FIG. 47—e.g., node 4750 has an ID "0x432d12 ... ". The first type of node split, illustrated in FIG. 47, may be attempted under the following conditions in the depicted embodiment: either (a) the candidate node 4750A is the root node or (b) only one NIArray pointer entry in the parent node of node 4750A (not shown in FIG. 47) points to node 4750A. If either of these conditions is met, space may be allocated (e.g., at respective metadata extents) for two new HDAG nodes 4750B and 4750C in the depicted embodiment. (It is noted that two child nodes are illustrated in FIG. 47 for ease of presentation; in other embodiments, more than two new child nodes may be created during a split.) Each of the entries that were previously in node 4750A (e.g., "Alpha". "Bravo", "Charlie", etc.), and the new entry "Lima", may be mapped to one of the new nodes 4750B or 4750C based on their respective hash values, as indicated by the arrows labeled "1". In one implementation, for example, if the candidate node were in the Kth level of the HDAG, the (K+1)th subsequences of the hash values for the entries may be sorted based on their most significant bit, and the entries whose hash values have "1" as their most significant bit may be mapped to node 4750B, while the entries whose hash values have "0" as their most significant bit may be mapped to node 4750C. In embodiments in which more than two child nodes are created during a split, more bits may be used for the mapping of the entries—e.g., if four child nodes are created, the two highest-order bits of the hash subsequence values may be used, and so on. In the depicted embodiment, depending for example on the object names and the hash function, it may not always be the case that the entries of the node being split (4750A in the depicted example) are distributed uniformly between the child nodes, and at least in some embodiments no attempt may be made to "balance" the HDAG by trying to achieve such uniformity. Instead, the strength and quality of the hash function may be relied upon in such embodiments to achieve a reasonably balanced distribution of entries among the nodes. After the distribution of the entries among the child nodes in the depicted example, child node 4750B has free space 4710A that may be used for subsequent insertions, while child node 4750C has free space 4710B that may be sued for subsequent insertions.

Node 4750A, which was an EL node prior to the split, may be converted into an NIArray node, as indicated by the arrow labeled "2" in FIG. 47. Half of its NIArray entries may be set to point to node 4750B (e.g., by storing 4750B's ID 0x786aa2 . . . ) and the other half may be set to point to node 4750C (e.g. by storing 4750C's ID 0xc32176 . . . ). In an implementation in which the most significant bit was used to split the entries, the lower half of the NIArray entries (e.g., entries with indexes 0 to (NIArraySize/2)−1) may be set to point to the node 4750C (entries whose hash values began with "0"), and the upper half of the NIArray entries (e.g., entries with indexes (NIArraySize/2) to (NIArray-Size−1)) may be set to point to the other child node 4750C. In embodiments in which n children nodes are created as a result of the split, 1/n of the NIArray entries may be set to point to each of the children. The changes to the three nodes 4750A, 4750B and 4750C may be saved to persistent storage at the storage subsystem. In some embodiments, changes to all three nodes may be performed in a single atomic operation, e.g., using the distributed transaction technique described earlier. In other embodiments, the conditional writes described earlier may be used to make the changes for at least one of the three nodes persistent separately from the other nodes.

Figure 48:
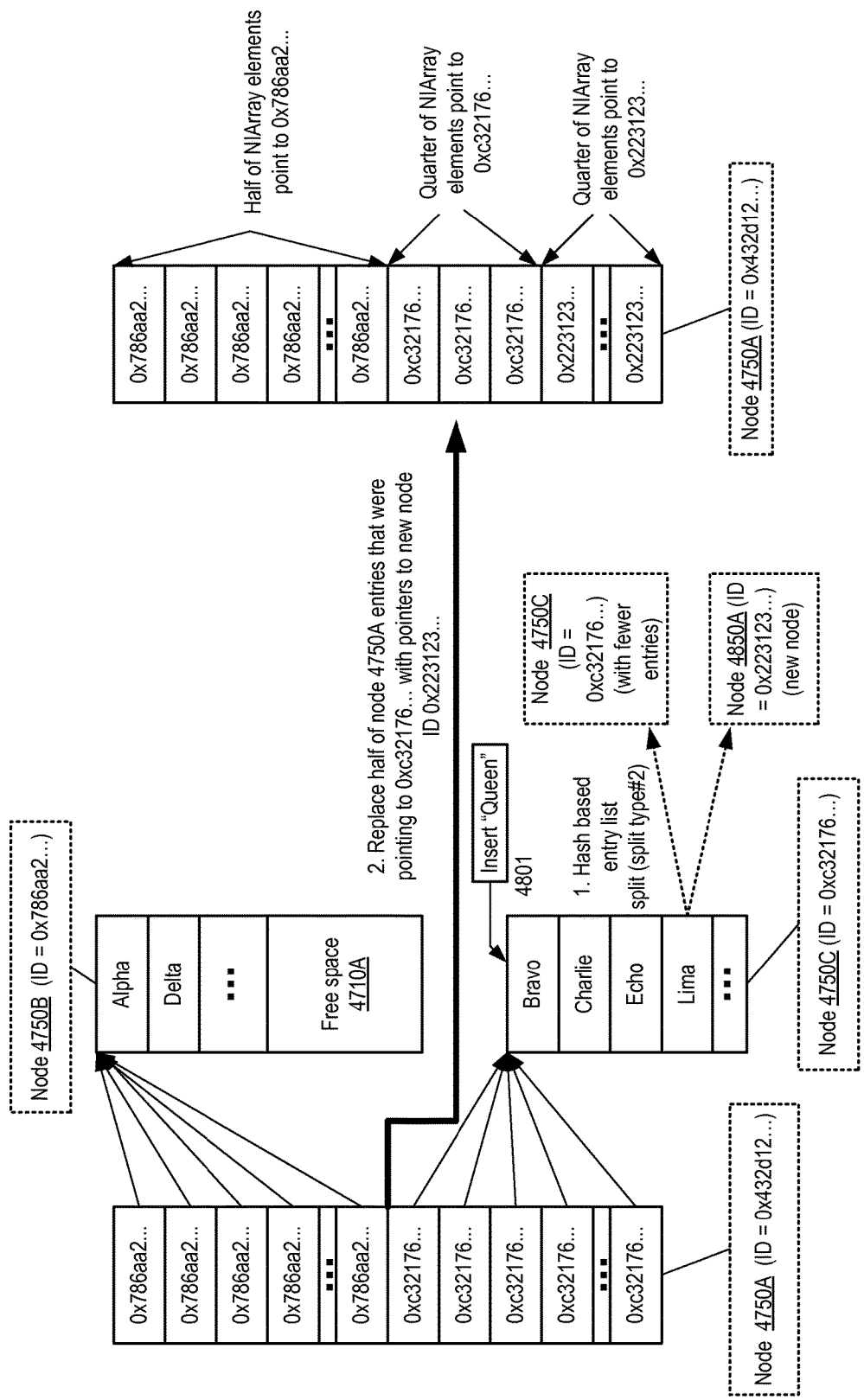
FIG. 48 illustrates an example of the second of two types of HDAG node splits that may result from an attempt to insert an entry into a namespace, according to at least some embodiments.

If the conditions outlined above for performing the first type of split operation are not met (e.g., if the parent node of the candidate node has more than one NIArray pointer to the candidate node), a second type of split operation may be performed. FIG. 48 illustrates an example of the second of two types of HDAG node splits that may result from an attempt to insert an entry into a namespace, according to at least some embodiments. In the depicted example, node 4750C has been identified as the candidate node for a new entry "Queen" 4801, and node 4750C has no free space left in its entry list. The parent node, 4750A, includes numerous pointers to node 4750C (e.g., the NIArray entries with the ID value 0xc32176 . . . ) at the time the insert of "Queen" is attempted. As indicated by the multiple elements with the same value "0x786aa2 . . . ", and the multiple elements with the value "0x32176 . . . ", in the depicted embodiment, the NIArray elements each point to the block at which the node's content is stored, not to individual EL entries within the node. In other embodiments, entry-level pointers may be used instead of or in addition to block-level pointers. In the scenario depicted in FIG. 48, only one new node (node 4850A with ID 0x223123 . . . ) is created instead of two nodes as was illustrated in FIG. 47. Hash values for the entries of node 4750C may be computed in a manner similar to that used for 4750A entries in FIG. 47. The hash values may be sorted based on the most significant bit. Those of the entries in 4750C at the time of the split that have a "1" as the most significant bit may be mapped to the new node 4850A, while the remaining (the ones with "0" as the most significant bit) may be kept within node 4750C, as indicated by the arrow labeled 1.

The parent node's NIArray entries may be modified to add pointers to the newly-added node 4850A in the depicted embodiment, as indicated by arrow 2. Of the 4750A NIArray entries that were previously pointing to 4750C, one half (e.g., the upper half of the array index range) may be set to point to the new node 4850A, while the other half may continue to point to 4750C. Thus, after the split, among the NIArray entries of node 4750A, half may contain the ID of 4750B (which was not affected in the split), one quarter may point to 4750C, and one quarter may point to 4850A. As in the case of the first type of node split discussed above, in some embodiments, the entries of the candidate node 4750C whose EL is full may be redistributed among more than two nodes (including the candidate node itself)—e.g., a total of 4 nodes may be used using 2 bits of the entry hash values for the distribution. Under some circumstances, a split of a given node may have to be propagated upwards towards the root of the HDAG—e.g., a node N1 may have to be split due to an insert, as a result N1's parent may also have to be split, and so on. The procedure of traversing the HDAG to reach a candidate node may have to be repeated in such cases, starting from the root of the HDAG.

The split operations illustrated in FIGS. 47 and 48 assume that a new level (e.g., new child pointers) may be added to the HDAG at the time when the split is attempted. However, in at least some embodiments, based for example on the hash value size and the number of bits used for navigating each level of the HDAG, at some point the maximum number of levels allowed by the hash function may be reached, and no more levels may be added. In such a scenario, instead of performing the hash-based splits illustrated in FIGS. 47 and 48, a chain or linked list for new entries that cannot be accommodated by the hash-based split may be created (e.g., using a third type of HDAG node). For example, in FIG. 48, if node 4850 becomes full and the limit on the number of levels has been reached when an attempt to insert a node "Tom" is made, a new node of type "chain" may be created to store "Tom"'s entry, and a pointer to the chain node may be inserted at a selected location in the candidate node. The chain node may itself be modified to point to other chain nodes if needed. In order to locate any given entry that has been included in a chain node, a sequential scan of the chain may be used instead of a hash-based lookup as is used at other types of nodes. In this way, large numbers of entries may be accommodated even if the HDAG becomes "unbalanced", although of course some of the speed advantages of hash-based traversal may be lost, as the chained entries may have to be traversed sequentially for a lookup. In various embodiments, the selection of a reasonably long hash value and a strong hash function may reduce the probability of having to use chain nodes to below an acceptable threshold.

Figure 49:
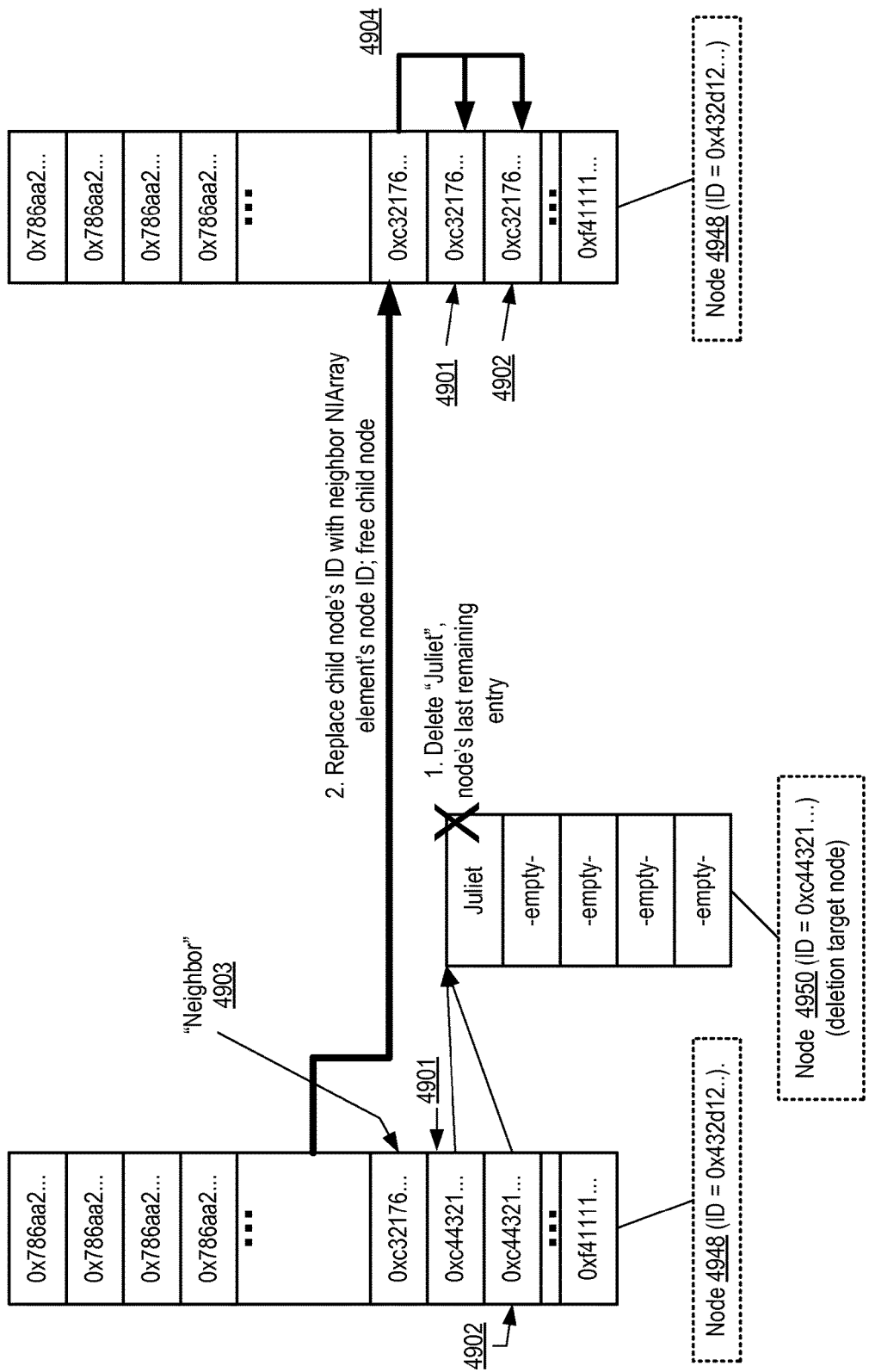
FIG. 49 illustrates an example of the first of two types of HDAG node deletion operations, according to at least some embodiments.

When a namespace entry E is to be deleted (e.g., when the corresponding file or directory is deleted at a client's request), the EL node from which the entry is to be deleted may be found using the hash-based traversal technique outlined above, in which respective subsequences of the hash value for the name of the object are used as indexes at successive levels of the HDAG. The EL node from which the entry is to be removed may be referred to as the deletion target node. If the deletion target contains more than one entry, E's entry may simply be deleted or marked as free, and no additional operations may be required. However, if there were no other namespace entries at the deletion target (i.e., if removing E's entry would result in an empty entry list), then the deletion target node itself may have to be deleted. FIG. 49 illustrates an example of the first of two types of HDAG node deletion operations, according to at least some embodiments. In the depicted example, a request to delete "Juliet" from a namespace represented by an HDAG is received. A hash value for "Juliet" is computed, and successive subsequences of the hash value are used to navigate from the root of the HDAG towards node 4950. Node 4950 is an EL node with a single entry (the entry for "Juliet" that is to be deleted) remaining. The Juliet entry may be deleted (as indicated by the "X" symbol and the accompanying label "1".) Because removing Juliet's entry results in an empty entry list at node 4950, node 4950 may itself have to be deleted. The consequences of deleting node 4950 on its parent node 4948 may differ depending on the state of node 4948's NIArray list.

In the depicted embodiment, the deletion target node's parent node may in general have one or more NIArray elements that point to the deletion target node (which may be termed "deletion target pointers"), and zero or more NIArray elements that point to nodes other than the deletion target node. Those NIArray elements that point to nodes other than the deletion target node, and are next to the deletion target pointers within the NIArray (e.g., at the immediately adjacent lower indexes within the array) may be termed "neighbors" of the deletion target pointers. If at least one neighbor exists in 4948's NIArray list when the last entry of the deletion target node is deleted, the neighbor pointer values may simply be copied into the deletion target pointers in the depicted embodiment. In the scenario depicted in FIG. 49, for example, there are two deletion target pointers, 4901 and 4902, in parent node 4948 that point to the deletion target node 4950 (as indicated by the fact that 4950's ID 0xc44321 . . . is stored in 4901 and 4902). Also, parent node 4948's NIArray comprises a neighbor element 4903, which stores a node ID 0x32176 . . . . Thus, as indicated by the arrow labeled 2, when a deletion of the Juliet entry results in an empty entry list at deletion target node 4950, and parent node 4948 comprises at least one neighbor in its NIArray, the contents of that neighbor are copied into the NIArray entries that were previously pointing to the deletion target node 4950. In addition, in the depicted embodiment, the deletion target node 4950 may be freed, e.g., by sending a request to release its storage space to the storage subsystem. The replacement of the contents of the deletion target pointer array elements by the contents of the neighbor pointer is indicated by arrow 4904. It is noted that in different embodiments, different techniques may be used to designate neighbors of the deletion target pointers—in some embodiments the NIArray entry that has the next higher index within the NIArray may be selected as the neighbor, for example.

Figure 50:
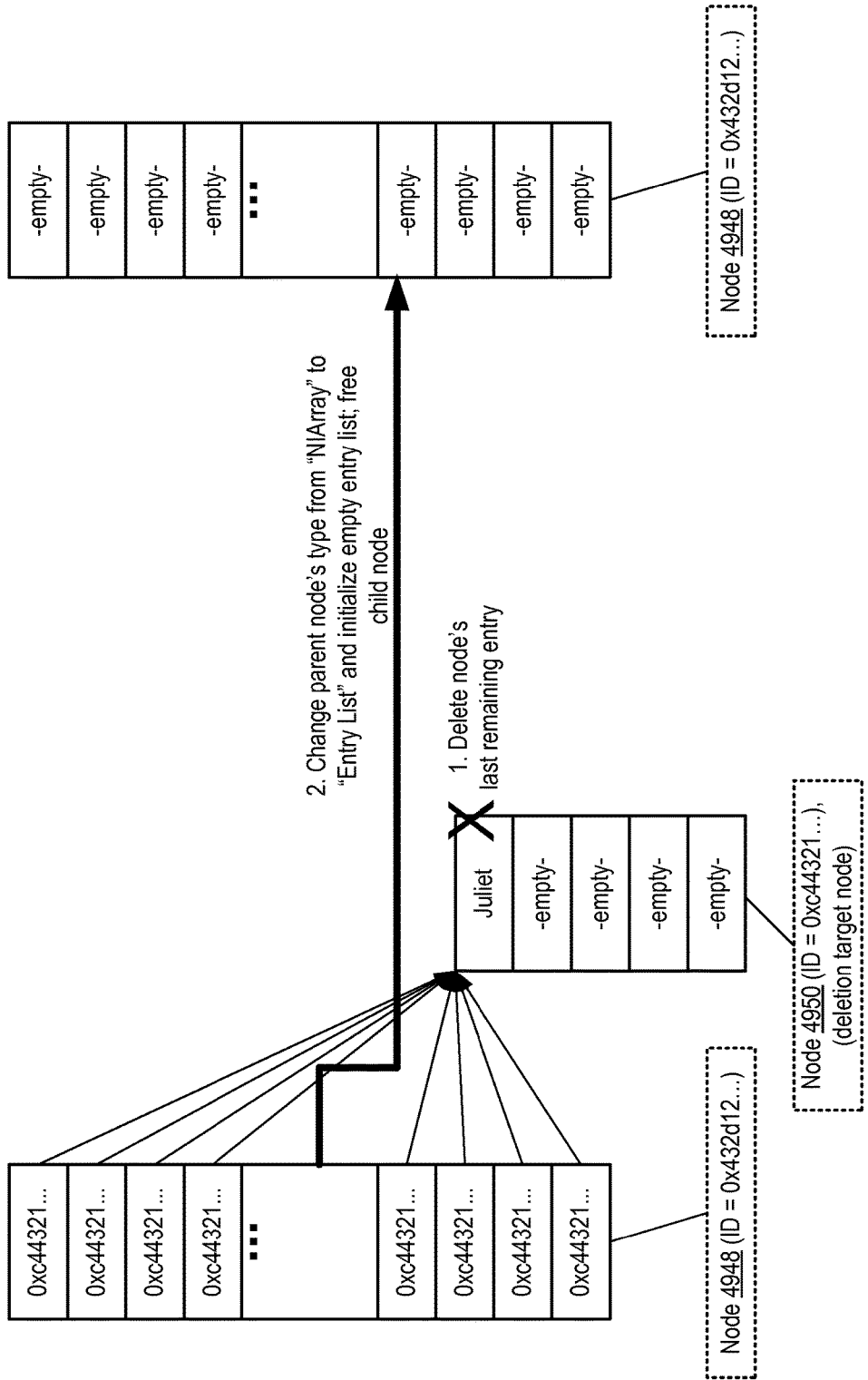
FIG. 50 illustrates an example of the second of two types of HDAG node deletion operations, according to at least some embodiments.

If there were no neighbors in the NIArray entry of the parent node of the deletion target node, the parent node may be reorganized in a different way in some embodiments. FIG. 50 illustrates an example of the second of two types of HDAG node deletion operations, according to at least some embodiments. As shown, the deletion target node 4950 comprises a single entry in its entry list. That sole remaining entry ("Juliet") is deleted, as indicated by the "X" symbol and the accompanying label "1". In the depicted example scenario, the NIArray of parent node 4948 does not contain any neighbor elements (i.e., NIArray elements that do not point to the deletion target node). The approach illustrated in FIG. 49 may thus not be feasible, as there are no neighbor pointer values available. Accordingly, a different approach may be taken, as illustrated by the arrow labeled "2": the type of the parent node 4948 may be changed to EL (entry list) instead of NIArray, and an empty entry list may be initialized for node 4948. The newly-initialized EL node may be re-used, e.g., when a new node is to be added to the HDAG as a result of the types of split operations described earlier. The deletion target node 4950 may be freed, in a manner similar to that discussed above with respect to FIG. 49. In various embodiments, the modifications made at a given level of an HDAG may in some cases require changes at other levels—e.g., in one embodiment, when the type of node 4848 is changed as described above, 4848's parent node's NIArray entries may have to be modified, and the effects of the changes may propagate upwards towards the root of the HDAG. As mentioned earlier, in various embodiments the conditional write technique and/or the distributed transaction technique described earlier may be used to combine a desired number of the HDAG changes resulting from a given insert or delete into an atomic operation.

Figure 51:
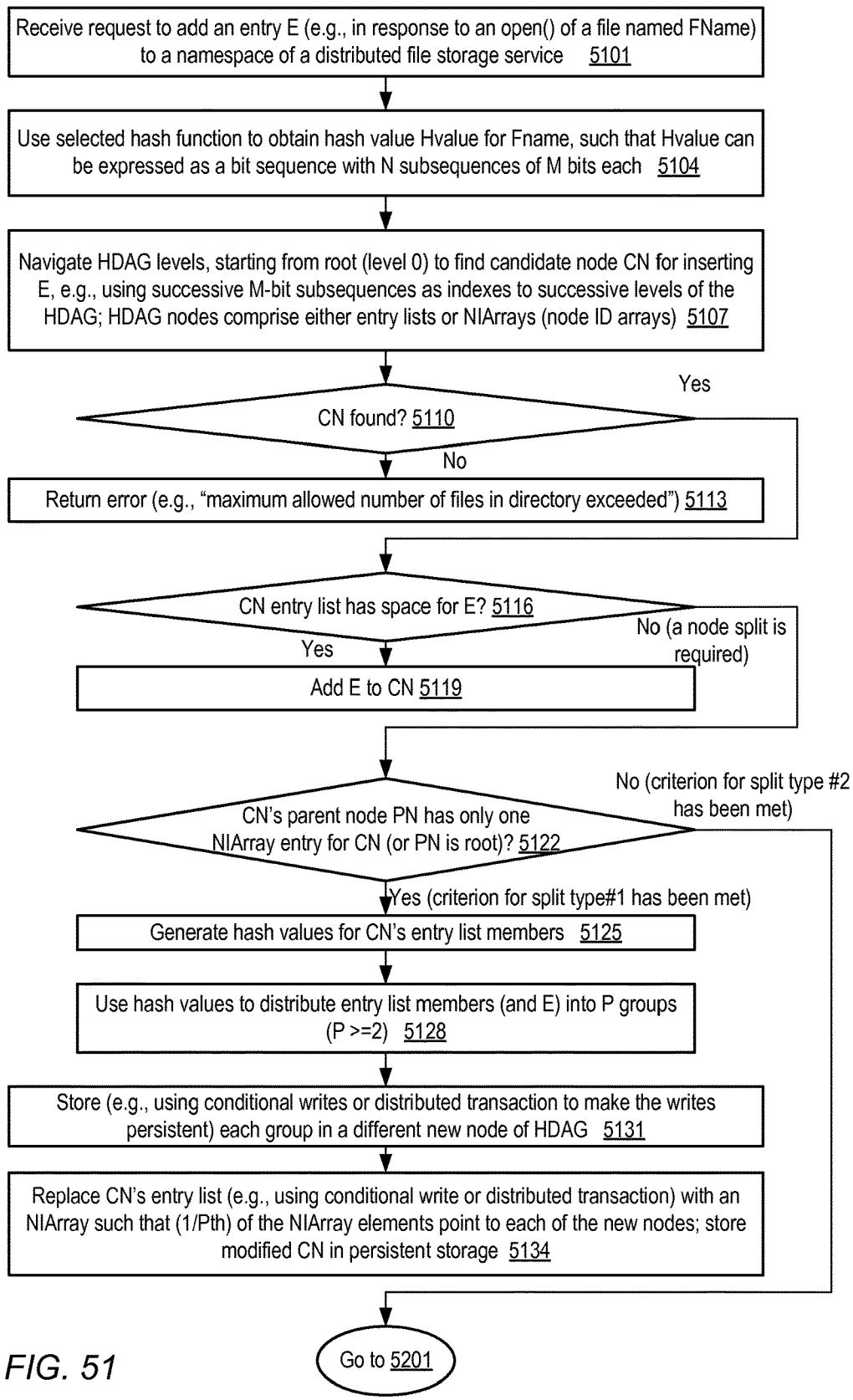
FIG. 51 is a flow diagram illustrating aspects of operations that may be performed in response to an insertion of an entry into a namespace that results in a first type of HDAG node split, according to at least some embodiments.

FIG. 51 is a flow diagram illustrating aspects of operations that may be performed in response to an insertion of an entry into a namespace that results in a first type of HDAG node split, according to at least some embodiments. A simple example of such a split operation is provided in FIG. 47. As shown in element 5101, a request to add an entry E to a namespace of a distributed multi-tenant storage service is received. The request may be generated, for example, in response to a command to create a file "Fname", or open a file "Fname", issued by a client of a file system implemented at the service. In one embodiment, the request may be generated at a command interpreter component at a particular metadata subsystem node, and may be received at a namespace manager component at another metadata subsystem node (or at the same metadata subsystem node). A hash function may have been selected for namespace management for the targeted file system (e.g., based on the strength of the hash function, the expected size and/or performance requirements of the file store, and/or on other factors). The hash function may be used to generate a hash value Hvalue corresponding to "Fname", where Hvalue can be expressed as N subsequences of M bits each (element 5104). In one implementation, for example, Hvalue may comprise 8 subsequences of 8 bits each, thus consuming at least 64 bits.

An HDAG comprising at least two types of nodes (node identifier array (NIArray) nodes and entry list (EL) nodes as described earlier) may have been set up for the namespace, e.g., for the directory into which the new file Fname is being added. An entry list node may be able to accommodate up to Max-EL entries in the depicted embodiment, where Max-EL may depend on such factors as the maximum lengths of the object names supported, the length of the DFS-Inode addresses or identifiers stored in the entry list, the number of bytes being used for an HDAG node, and so on. Similarly, an NIArray may be able to accommodate up to Max-NIDs elements in the depicted embodiment, with Max-NIDs being dependent upon the size of the node IDs and the size of the HDAG nodes. In at least one embodiment, a threshold population of entries EL-threshold may be designated, such that if the number of entries exceeds EL-threshold as a result of an insertion, a node split is to be initiated. In some implementations, the default value for EL-threshold may be set to Max-EL, e.g., splits may only be implemented when the EL becomes full. Similarly, a threshold may be defined for NIArray nodes in at least one embodiment, e.g., when the number of elements in the NIArray at a node exceeds NID-threshold, the NIArray node may be split. NID-threshold may be set to Max-EL by default in some embodiments. Either EL-threshold, NI-threshold, or both E1-threshold and NI-threshold may be implemented as configurable parameters in some implementations.

Starting from the root of the HDAG (the zeroth level), one or more HDAG levels may be navigated or traversed to identify a candidate node CN into which E should be added, using successive M-bit subsequences of Hvalue to identify the specific node or nodes to be examined at each level (element 5107). In at least some embodiments, each of the nodes of the HDAG may correspond to a different logical block, and the probability that a different extent at a different storage subsystem node is being used for it than for the other HDAG nodes may be high. If no candidate node is found (which may in some cases happen if the metadata subsystem has run out of space for the HDAG), as determined in element 5110), an error may be returned (e.g., "maximum number of files allowed in a directory has been exceeded") (element 5113). If a candidate node CN is found (as also determined in element 5110), and its entry list has enough space to accommodate the new entry E (e.g., the addition of E would not cause the EL length to exceed EL-threshold) (as detected in element 5116), the new entry E may be written to one of the currently unused entries in the list (element 5119). The modification to CN may be saved to persistent storage in the depicted embodiment, e.g., at one or more metadata extent replicas. In at least some embodiments, a DFS-Inode structure may be allocated for the object with name Fname, and a pointer to that DFS-Inode structure may be included within E. In response to subsequent lookup requests for "Fname", hash-based navigation similar to that illustrated in elements 5104 and 5107 may be used (i.e., respective subsequences of the hash value obtained for "Fname" may be used for respective levels of HDAG navigation until the entry for "Fname" is found).

If CN does not have enough space for E (e.g., if the EL-threshold has been reached, or would be reached by the insertion of E) (as also detected in element 5116), the number of pointer's in CN's parent NIArray list that point to CN may be determined. If the parent node has only one pointer to CN (or happens to be the root node of the HDAG) (as detected in element 5122), a first type of node split operation (similar to that illustrated in FIG. 47) may be initiated. Respective hash values may be obtained for the object names in each of the entries in CN's list (element 5125), in addition to the Hvalue already obtained for the new entry E. The hash values may be used to distribute the entry list members and E into P groups in the depicted embodiment (element 5128), e.g., using the log 2P most significant bits of the hash values as the sorting/distribution criterion. In one example implementation, P may be set to 2, so only the single most significant bit may be used. Each of the P groups may be stored as an entry list of a respective new node to be added to the HDAG (element 5131). A new NIArray may be created, with approximately 1/Pth of the array elements pointing to (e.g., containing the storage addresses or identifiers of) each of the P new nodes. CN's header may be modified to indicate that it is an NIArray node rather than an EL node, and the new NIArray may be written into CN (element 5134). The contents of the P new nodes of the HDAG and the modified CN may be saved to persistent storage, e.g., at one or more storage subsystem nodes. In some embodiments, the distributed transaction technique described above may be used to combine some subset or all of the changes to the HDAG into a single atomic operation. In other embodiments, conditional writes of the type described earlier may be used for at least some of the HDAG nodes.

Figure 52:
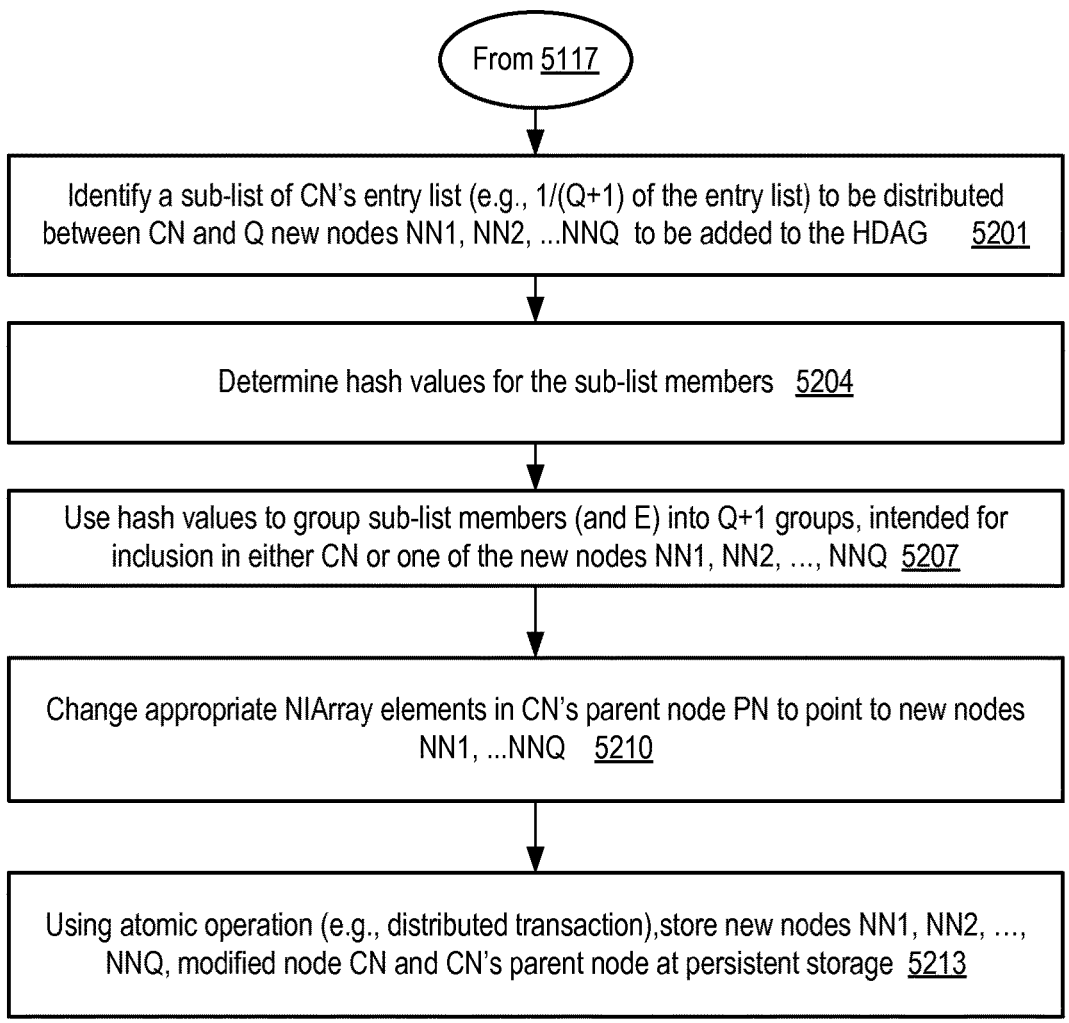
FIG. 52 is a flow diagram illustrating aspects of operations that may be performed in response to an insertion of an entry into a namespace that results in a second type of HDAG node split, according to at least some embodiments.

If the number of NIArray elements that were pointing to CN from CN's parent node exceeded one (as also detected in element 5122), a second type of split operation may be conducted on CN (as indicated by the "Go to 5201" element of FIG. 51). FIG. 52 is a flow diagram illustrating aspects of operations that may be performed in response to an insertion of an entry into a namespace that results in such a second type of HDAG node split, according to at least some embodiments. This type of split may be designated as a type-2 split herein, and the type of split illustrated in FIG. 51 may be referred to as a type-1 split. In the type-2 split, some of the members of CN's entry list may be moved into Q new HDAG EL nodes (where Q is no less than one), while some may remain in CN, and the parent node's NIArray pointers may be changed accordingly. In the depicted embodiment, a sub-list of CN's entry list may be selected for redistribution among Q new HDAG nodes NN1, NN2, NNQ and in CN itself. In one implementation, Q may be set to 1 and approximately (or exactly) half of the entry list may be considered for redistribution, while in another implementation, three-fourths may be considered. A respective hash value may be determined for each member of the sub-list (element 5204). The hash values may be used to arrange the sub-list members into Q+1 groups (element 5207), e.g., using some number of most significant bits of the hash values as the distribution criterion.

Q of the groups may be placed in respective new HDAG EL nodes, while the remaining group may be retained within CN. Some of the NIArray entries in CN's parent node that were pointing to CN may be set to point to the new nodes NN1, NNQ (element 5210). In the depicted embodiment, the HDAG nodes that were modified or created as a result of the split (e.g., the Q new nodes, CN, and CN's parent node) may be written to persistent storage in a single atomic operation (element 5213). The distributed transaction technique described above may be used in some embodiments. In other embodiments, a single atomic operation may not be used; for example, the conditional write technique may be used for at least some of the HDAG nodes.

It is noted that the technique whereby entry list members are re-distributed in type-2 splits may differ in some embodiments from that illustrated in FIG. 52. For example, in some embodiments, the sub-list members may be selected in such a way that they may be distributed entirely among the Q new nodes. In some embodiments, the size of the sub-list may be chosen at random—e.g., not all the type-2 splits that are implemented at a given HDAG or at a given file store may result in the same number of new nodes. In some embodiments, an element of randomness may also be introduced into type-1 splits—e.g., the EL-threshold used may be varied at random within a range, or the number of new nodes P may be selected at random from a range.

Figure 53:
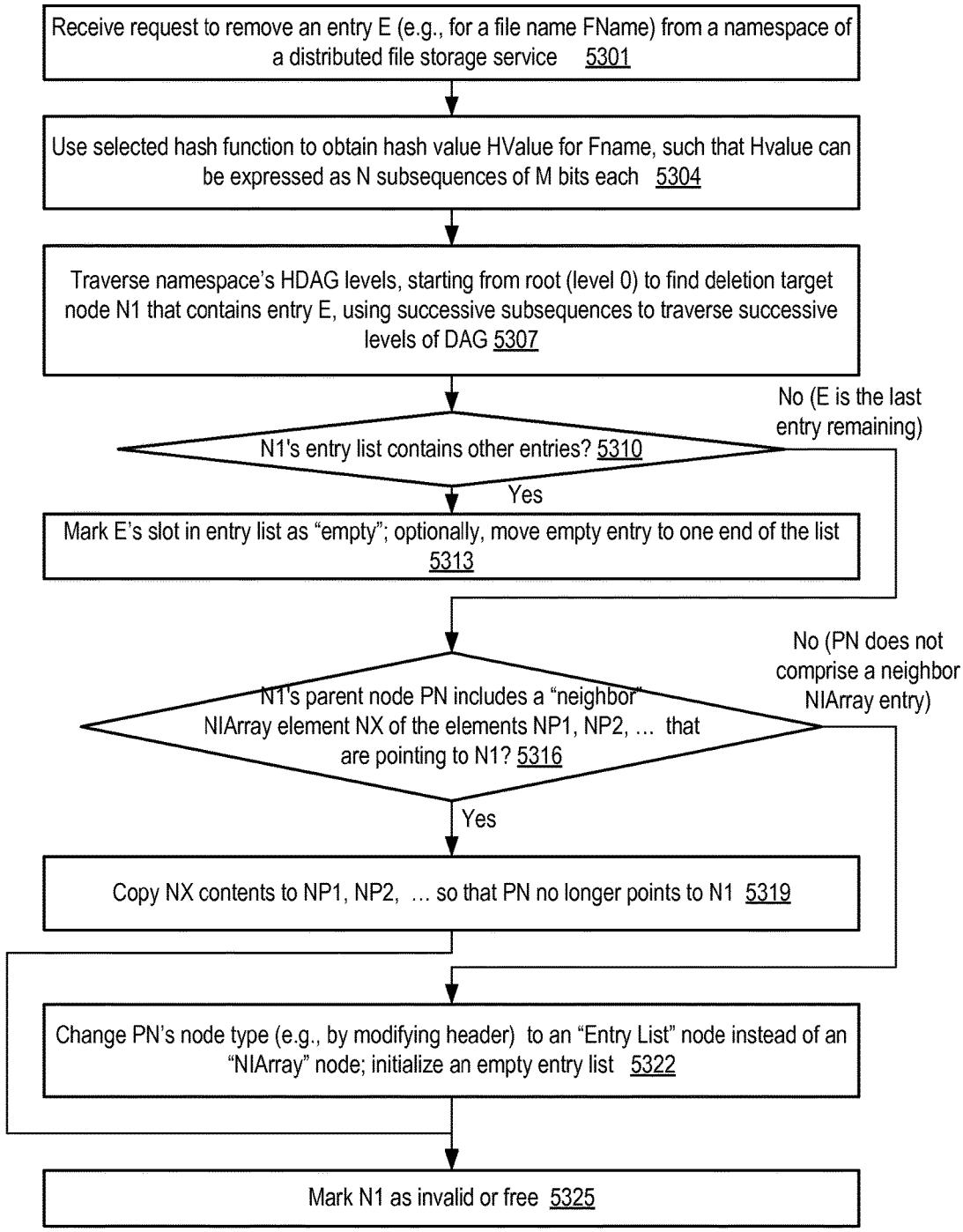
FIG. 53 is a flow diagram illustrating aspects of operations that may be performed in response to a deletion of an entry from a namespace, according to at least some embodiments.

FIG. 53 is a flow diagram illustrating aspects of operations that may be performed in response to a deletion of an entry from a namespace, according to at least some embodiments. As shown in element 5301, a request to remove an entry E for a file store object with a name Fname from a namespace of a distributed storage service may be received. Such a request may be generated as a result of a client request to remove a file or directory, for example. Using a selected hash function, a hash value Hvalue whose bit sequence can be divided into N subsequences of M bits each may be obtained (element 5304).

An HDAG generated for the namespace may be navigated or traversed, starting from its root node, to identify a deletion target node N1 which contains E (element 5307). At each level of the HDAG, a successive subsequence of the N subsequences may be used to identify the nodes to be read or examined. If N1's entry list includes at least one more entry (as detected in element 5310), E's slot within the entry list may simply be marked as unused or free (element 5313) and the deletion operation may be completed. In some implementations, e.g., to make it quicker to find non-empty entries, the freed entry may be moved to one end of the list. Thus, for example, if an entry list of length N contains two non-empty entries, in one such implementation, those two non-empty entries would be found at offset 0 and offset 1 within the list, while the entries with offsets 2, 3, . . . , N−1 would be empty. In some embodiments, the change to N1 may be made persistent synchronously, while in other embodiments N1 may be written to persistent storage at one or more extents asynchronously with respect to the delete request for E.

If E was the last entry in N1's entry list (as also detected in element 5310), the NIArray of N1's parent node PN may be examined. PN's NIArray may comprise one or more elements NP1, NP2, . . . , pointing to (e.g., storing the address or identifier of) N1. If the NIArray of PN also includes at least one "neighbor" element NX that points to some other node than N1 (as determined in element 5316), the contents of NX may be copied to NP1, NP2, . . . so that PN no longer contains a pointer to N1 (element 5319). In at least some embodiments, the array elements NP1, NP2, . . . may also or instead be marked as invalid.

If PN's NIArray contains no such neighbor elements that point to nodes other than N1 (as also detected in element 5316), PN may be modified in a different way in the depicted embodiment. As shown in element 5322, PN's type may be changed from NIArray to EL, e.g., by modifying its header. In addition, a new entry list may be initialized for PN—e.g., at least some of the bytes that were being used for the NIArray may be overwritten. In the depicted embodiment, regardless of whether a neighbor element was found or not in the parent node PN, the deletion target node may be marked as free or unused (element 5325). Contents of each of the node affected by the deletion, e.g., PN and N1, may be saved to persistent storage at one or more extents of the storage subsystem. In some embodiments a distributed transaction of the type described earlier may be used to make at least the changes shown in elements 5322 and 5325 part of a single atomic operation. In another embodiment, the modifications shown in element 5319 may also be combined with those of elements 5322 and 5325 in a single atomic operation or distributed transaction. Conditional writes may be used for each of the changes in at least one embodiment.

In various embodiments, configurable parameters (e.g., defined either at the file system level, or for the file storage service as a whole) may be used to determine various aspects of the hash-based namespace management technique. Such configurable parameters may be specified for any combination of: (a) the specific hash function(s) or hash function family to be used, (b) the required lengths of the bit sequence output by the hash function, (c) the lengths of various subsequences of the hash value output to be used for traversing respective levels of the DAG, (d) the fan-out of the splits of each type (e.g., the number of lists to which the entries of the split node are to be assigned in each split type), (e) the number (or fraction) of NIArray elements in which each new node's identifier is to be stored after a split, (f) the threshold population levels for each type of split, or (g) the maximum permissible number of levels of the DAG or the total size of the DAG. In some embodiments, additional constraints (e.g., extent placement constraints) may also be specified via parameters—e.g., a constraint that all the HDAG nodes of the first N levels be stored at the same extent may be specified, or a constraint that no two HDAG nodes should be stored at the same extent may be specified. In some embodiments, one or more of these parameters may be modified based on collected performance results. E.g., if namespace-related performance is unsatisfactory with a given set of parameters for a particular file system, the storage service may adjust the parameters—either for the same file system (which may involve new HDAGs to be created either on the fly or during a reconfiguration downtime period) or for file systems created subsequently.

Client Session Metadata Management

In at least some embodiments, the distributed storage service may support one or more stateful or session-oriented file system protocols such as NFS. In some such protocols, a client component of the service (e.g., a daemon running at a client-side execution platform) may typically create a session via one or more communications with a server component (e.g., another daemon running at a server-side execution platform), where the session has an associated expiration time during which the service is able to expedite responses to certain kinds of client requests, and where the session may be extended or renewed under some conditions. During a session, the client may, for example, obtain a lock on an object such as a file, and the lock may remain in effect until either the session ends or the client releases the lock. Subsequent accesses of the object from the client during the session may not require additional locking According to some file system protocols, such a time-bound grant of control of the state of a file (or another type of file store object) to a client from the server may be referred to as a "lease". A single lease may be associated with locks on a plurality of file store objects, and may be renewed either explicitly or implicitly by the client. In at least some embodiments, a session-oriented protocol may require that session state information (e.g., a list of locked files or directories associated with a client's lease, the expiration time of the lease, and so on) be maintained by the "file server". In a distributed file storage service, the protocol-mandated responsibilities of the file server may be distributed among the various subsystems described above—e.g., the access subsystem, the metadata subsystem, and/or the storage subsystem. Various factors such as scalable response time and throughput goals, metadata durability requirements, and so on, may be taken into consideration when deciding the specific portions of the protocol-mandated session-related functionality that should be implemented at different subsystems in different embodiments.

Figure 54:
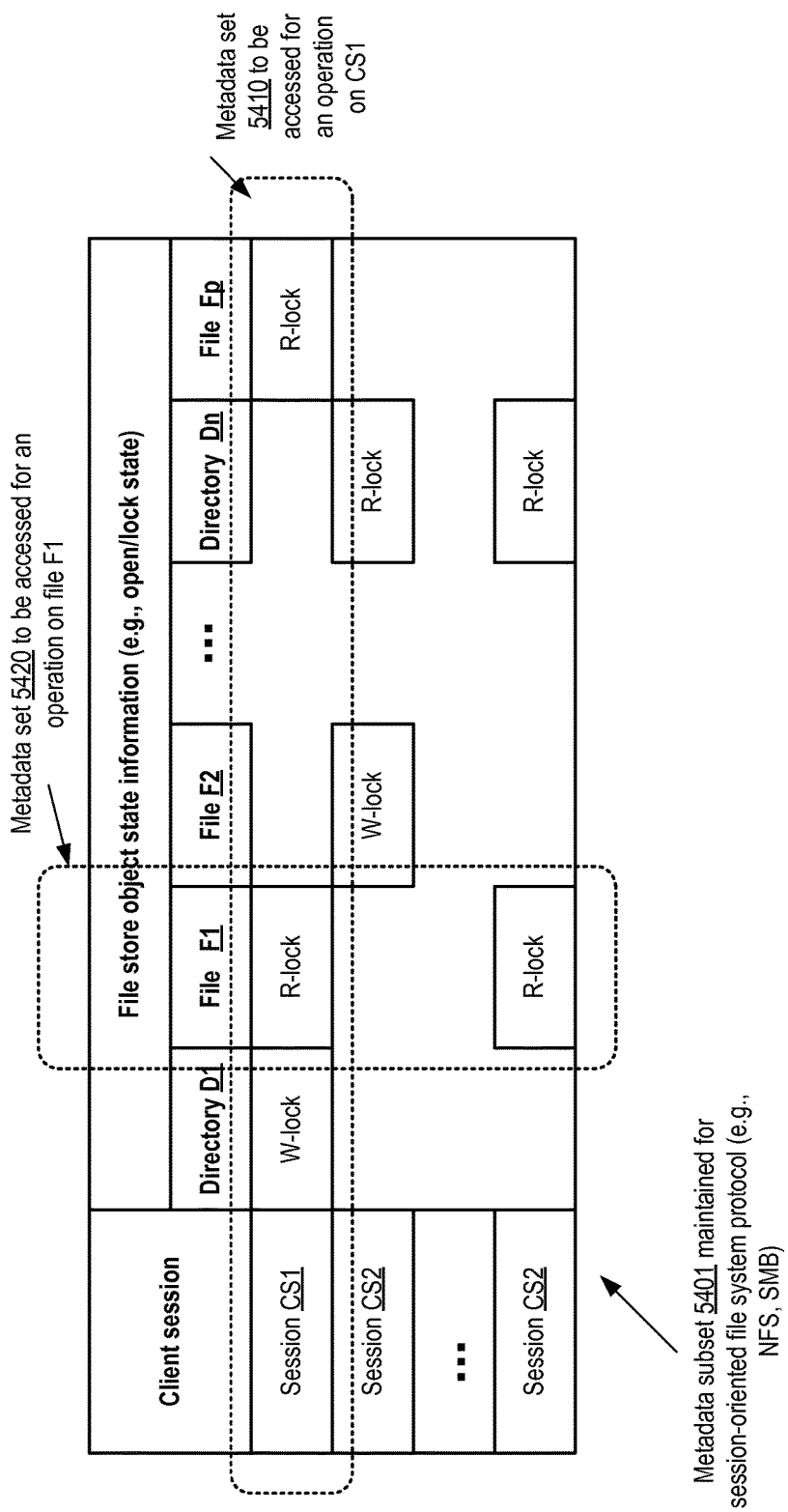
FIG. 54 illustrates two dimensions of metadata that may be maintained for session-oriented file system protocols at a distributed storage service, according to at least some embodiments.

FIG. 54 illustrates two dimensions of metadata that may be maintained for session-oriented file system protocols at a distributed storage service, according to at least some embodiments. Information about all the objects that have been opened and/or locked during a given client session may have to be accessed efficiently by the storage service for certain types of operations (e.g., for lease expirations, which may require that all the locks of a session be released). This first dimension of metadata information is represented by a row in the conceptual metadata table 5401 shown, such as the contents of metadata set 5401 that may be accessed for lease-related operations on client session CS1. Metadata set 5401 may, for example, comprise lock state indicators (LSIs) (such as NFS "StateIDs") whose use is discussed in further detail below, for a plurality of files, directories, links and the like. In the example shown, for client session CS1 a write lock state indicator W-lock is shown for directory D1, and R-locks (read lock indicators) are shown for files F1 and FP. It is noted that at least in some implementations, locking may be implemented at the file level but not at the directory level.

The second dimension is the set of session-related information that has to be maintained in accordance with the file system protocol on any given object, such as metadata set 5420 on file F1. This second collection of metadata (which may also include lock state indicators such as the R-lock of client session CS1) may have to be accessed efficiently when, for example, a new request to lock the object is received, or when a request to view the state or attributes of the object is received. In a file store that may store millions of objects (many of which are at least potentially distributed across multiple extents) and may have tens of thousands of concurrent client sessions with many different types of locking modes and/or leasing modes supported, it may not be practical or efficient to store all of the session-related information of the type illustrated in FIG. 54 in a single centralized location. FIG. 54 thus provides a conceptual view of at least two kinds of session-related metadata that may have to be accessed efficiently in various embodiments, and is not intended to imply any particular implementation approach.

It is noted that in addition to the session-oriented metadata 5401 required by a particular file system protocol, other internal metadata (such as namespace management metadata including HDAGs as described above, logical-block-to-physical-page mappings as described earlier, etc.) may also be maintained. The different types of metadata may be managed by independent subcomponents of the metadata subsystem in at least some embodiments—e.g., the management of striping or logical-block-to-physical-page mappings may be implemented orthogonally with respect to the management of client session information of the type illustrated in FIG. 54. Furthermore, the distributed storage service may, at least in on embodiment, support a plurality of stateful or session-oriented file system protocols, each of which might define respective session metadata object types and semantics. For example, NFS may specify its set of metadata objects and relationships, SMB may specify a different set, and so on. In such scenarios, separate sets of session-oriented metadata 5401 may be maintained for file systems associated with each of the different protocols.

Figure 55:
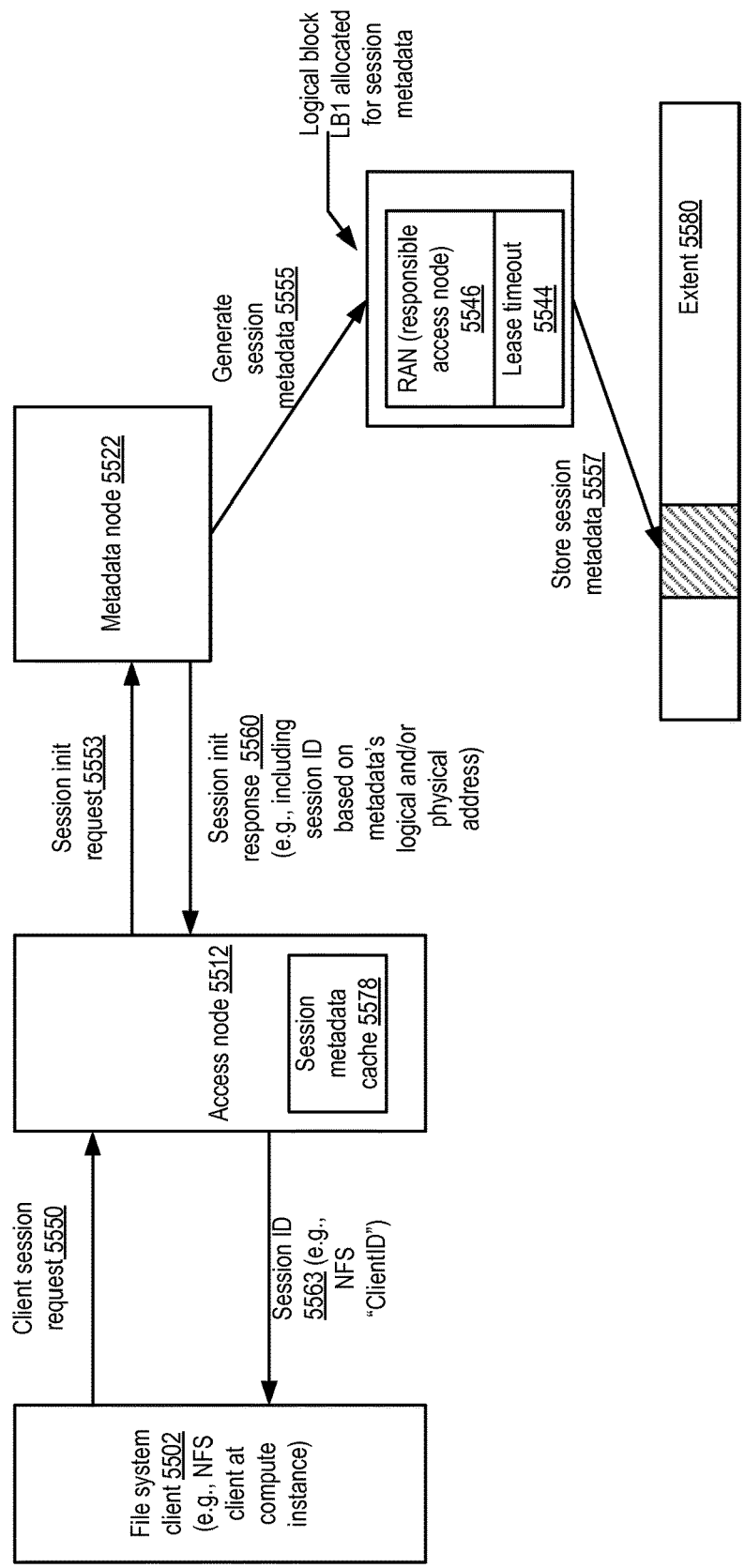
FIG. 55 illustrates an example of client session metadata-related interactions between subcomponents of a distributed storage service, according to at least some embodiments.

In at least some embodiments, a client (such as an NFS client implemented using one or more processes at a compute instance of a provider network) may request an establishment of a client session by transmitting a message to the distributed storage service, formatted in accordance with the file system protocol. FIG. 55 illustrates an example of client session metadata-related interactions between subcomponents of a distributed storage service, according to at least some embodiments. File system client 5501 may send a session request 5550 to an access subsystem node 5512, e.g., an access subsystem node whose IP address has been exposed or advertised as an endpoint for the file system being used by the client. In some implementations in which the file system protocol being used is NFS, for example, the session request may comprise a "SetClientID" request, and may include an identification of the client (generated by the client) and a unique, non-repeating object called a "verifier" (also generated by the client). The verifier may be used in some such implementations by the service to determine whether a client has rebooted since the session was originally instantiated; thus, the submission of a second SetClientID request with a different verifier may allow the service to expire the client's earlier session/lease. In response to the session request, the file system protocol in use may require that (unless error conditions are encountered) a session identifier 5563 (e.g., an NFS "ClientID" object) ultimately be provided to the requester by the service.

In at least some embodiments, the metadata subsystem of the distributed storage service may be responsible for managing the client session state information. For example, the metadata subsystem may control the manner in which client session state information is mapped to logical blocks as well as the mapping of those logical blocks to extents. The extents themselves may be stored at storage subsystem nodes in some embodiments, and at the metadata subsystem nodes in other embodiments as described earlier. While the access subsystem nodes may cache session-related metadata temporarily in some embodiments, the metadata subsystem may be designated as the authoritative source of client session information within the distributed storage service.

In the depicted embodiment, upon receiving the client session request, the access subsystem node 5512 may transmit a session initialization request 5553 to a selected metadata node 5522, requesting a session identifier to be generated by the metadata subsystem. The parameters provided by the client (e.g., the client's identifier and/or verifier) may be passed along to the metadata node by the access node in at least some embodiments. The metadata node 5522 may generate a new logical block LB1 to store at least a portion of the client's session metadata. LB1 may include, for example, a session identifier 5563 generated for the client session by the metadata node, a lease timeout setting 5544 for the session, and a "responsible access node" (RAN) field 5546 in the depicted embodiment. The RAN field may identify the particular access node 5512 through which the client's requests during the ensuing session are expected to be received at the back-end subsystems (e.g., the metadata subsystem or the storage subsystem). The metadata node 5522 stores contents of the logical block of the session metadata at one or more pages of a selected extent 5580 in the depicted embodiment, as indicated by arrow 5557. In some implementations, the metadata node 5522 may submit a request to the storage subsystem to store the logical block contents, while in other embodiments, the metadata node 5522 may write the contents to an extent that is managed by the metadata subsystem itself.

According to at least some embodiments, the session identifier (e.g., NFS ClientID) selected or generated for the client may be based at least in part on the storage address of the logical block—e.g., the session identifier may be used later as a parameter in a read operation to quickly look up the client session metadata. For example, in one implementation, each logical block may be assigned a 128-bit logical storage address, and the 128-bit logical address used for LB1 may be provided as the session identifier 5563 for the client, or may be included or encoded within the session identifier 5563. In another embodiment, the session identifier may be based at least in part on the physical storage address of at least one of the physical block(s) being used to store the session metadata elements. The metadata node 5522 may transmit a response 5560 to the session initialization request 5553. The response 5560 may include the session identifier 5563, which may be cached at the access node 5512 at cache 5578 and provided to the requesting client 5502 in the depicted embodiment. In some embodiments, the file system's session establishment protocol may require one or more addition interactions, e.g., a confirmation request message comprising the session identifier may be sent to the storage service by the client 5502 and the client may then receive a response confirming the validity of the session identifier. Subsequent requests from the client, such as file opens, closes, lock requests and the like may be required to include the session identifier 5563 in at least some embodiments. On receiving such later requests, the access node 5512 may validate the client's session identifier using cache 5578. If the session identifier is missing from the cache, the access node may submit a query to the metadata subsystem regarding the session, and may only proceed with the requested operation if the session is still open (or if a new session is instantiated by the metadata subsystem in response to the query).

As indicated earlier, in some embodiments a file system protocol such as NFS may implement a leasing technique for efficiently managing concurrent accesses to file system objects. In some such embodiments, a lease associated with a client session may represent a time-bound grant of control of the state of one or more files, directories, links or other client-accessible objects of a file system to the client. In at least one embodiment, another metadata object, referred to herein as a lock state indicator, may be used to represent the locking state of a particular file system object by the storage service. For example, in at least some implementations of the NFS protocol, a lock state indicator may be termed a "StateID". A lock state indicator for an object such as a file F1 may be defined in at least some embodiments in the context of to a given client session CS. Thus, for example, when a client C11 locks a file F1 as part of a client session CS1, a lock state indicator LSI1 for F1 that is specific to CS1 may be created; and later, when a different client C12 locks file F1 as part of a client session CS2, a different lock state indicator LSI1 may be generated by the storage service. In at least some embodiment, an LSI may incorporate, or include a pointer to, the session identifier of the corresponding client session—e.g., in one implementation, an NFS-compliant StateID may include a pointer to (or the actual value of) the corresponding ClientID. Each open client session may have an associated lease timeout period in some embodiments, at the end of which the locks associated with all of the session's LSIs may be freed. In some embodiments, open state indicators (similar to LSIs) may be used to indicate that a particular file store object is currently open for access by a client. An indication of the open state and the locked state of a file store object may be represented using a single metadata structure (e.g., an open/lock state indicator) in some implementations.

According to the semantics of at least some file system protocols implementing leases, one or more mechanisms for lease renewals may be supported. For example, a set of operation types may be defined, such that a request for an operation of that set of operation types by a client during an open session may automatically result in the renewal of the lease for some specified lease renewal term. If a client issues a request to read a file F1 in such an embodiment, for example, during a session CS1 for which the lease was set to expire at time T1, the lease may be extended to a later time T2. In some embodiments, APIs for explicitly renewing leases may also or instead be supported. If none of the types of requests that result in automatic (or explicit) lease renewal are received for a specified period, the lease may expire. In some embodiments, upon lease expiration, the corresponding locks (indicated by LSIs) may be released by the storage service, file system objects that were opened during the session and had not been closed before the lease expiration point may be closed, and at least in some embodiments the session metadata may be deleted from the metadata subsystem's persistent repository and/or from the access subsystem's caches.

Figure 56:
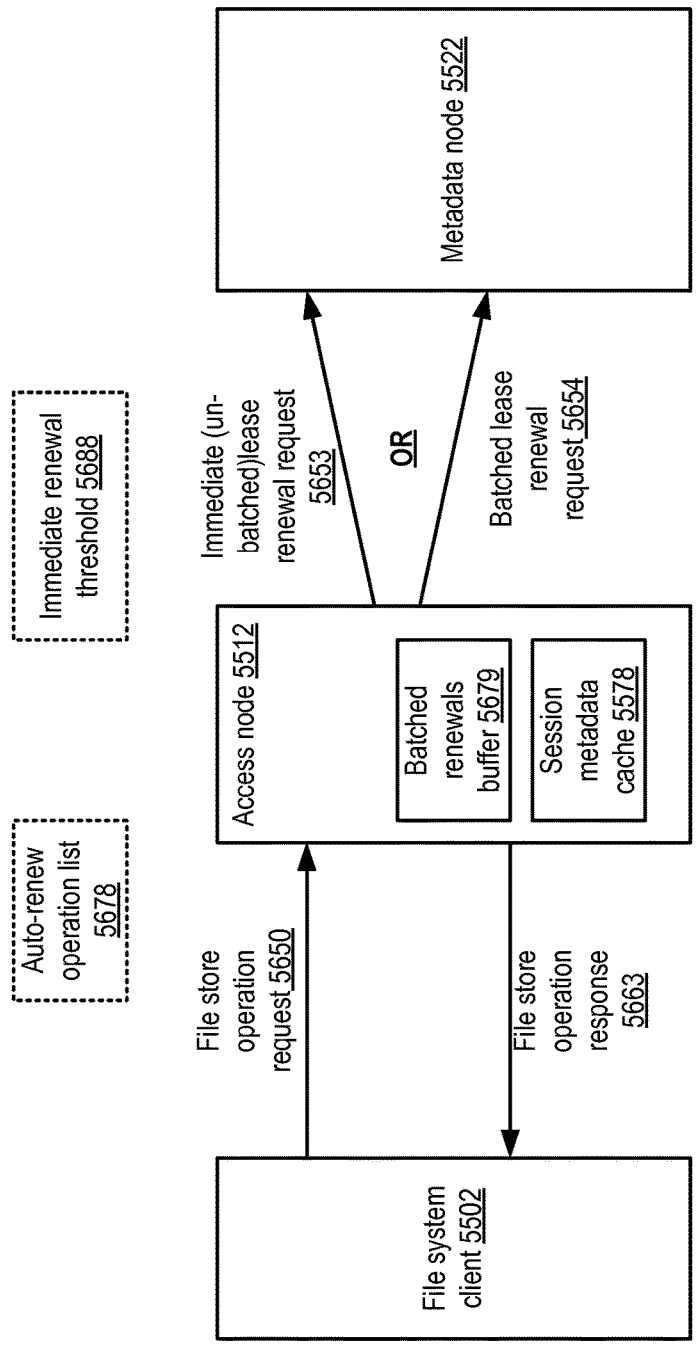
FIG. 56 illustrates alternative approaches to client session lease renewal at a distributed storage service, according to at least some embodiments.

FIG. 56 illustrates alternative approaches to client session lease renewal at a distributed storage service, according to at least some embodiments. In the depicted embodiment, an auto-renew operation list 5678 may be specified by a file system protocol being used by the client. The auto-renew operation list 5678 may indicate operation types that when requested during a currently open session, result in the automatic renewal of the lease(s) associated with the session. For example, in some NFS implementations, the auto-renew operation list may include (among others), read, write, open, lock, unlock, and set-attributes operations. In some implementations, a renew operation for explicit renewal of a lease may also be included in the operation list 5678.

In the depicted embodiment, an access subsystem node 5512 may receive a file store operation request 5650. If the operation request is of a type indicated in the auto-renew operation list (or is an explicit request to renew the client's lease), the access node 5612 may have two options in the depicted embodiment. The access node may either submit an immediate or un-batched lease renewal request 5653 to the metadata node 5522, or may defer the lease renewal for up to some configurable time period and submit a batched lease renewal request 5654 to the metadata node 5522. The batched lease renewal request may, for example, comprise session identifiers for a plurality of client sessions for which auto-renewal operation requests or explicit renewal requests were received during a time window. The batching of lease renewal requests may help to reduce the renewal-related overhead (e.g., communication overhead, processing overhead, or both) at the metadata node 5522 and/or the access node 5512 in at least some embodiments.

In some embodiments, a configurable immediate renewal threshold 5688 may be used by the access node to determine whether a given lease renewal should be transmitted immediately in response to the client's operation request 5650, or whether the deferred batch approach should be used for the client's lease renewal. If the immediate renewal threshold is set to X seconds, for example, and the client's lease is set to expire within X seconds of the time that operation request 5650 is received by the access node, an un-batched or immediate lease renewal request 5653 may be generated in the depicted embodiment. Otherwise, if more than X seconds remain before the lease is set to expire, a representation of the client's renewal request may be stored in batched renewals buffer 5679, and some number of renewals may be sent later in a batched lease renewal request 5654 to the metadata node 5522. The access node may have cached the lease expiration times for various client sessions for which the access node is responsible within session metadata cache 5578 in the depicted embodiment, and may use the cache contents to make a determination as to whether to send the immediate renewal request or a batched renewal request. Independently of the lease renewal, the access node may initiate the requested operations on behalf of the client (e.g., using cached client session metadata and/or cached logical-block-to-physical-page mappings), and may provide the appropriate file store operation response 5663 to the client 5502.

Figure 57A:
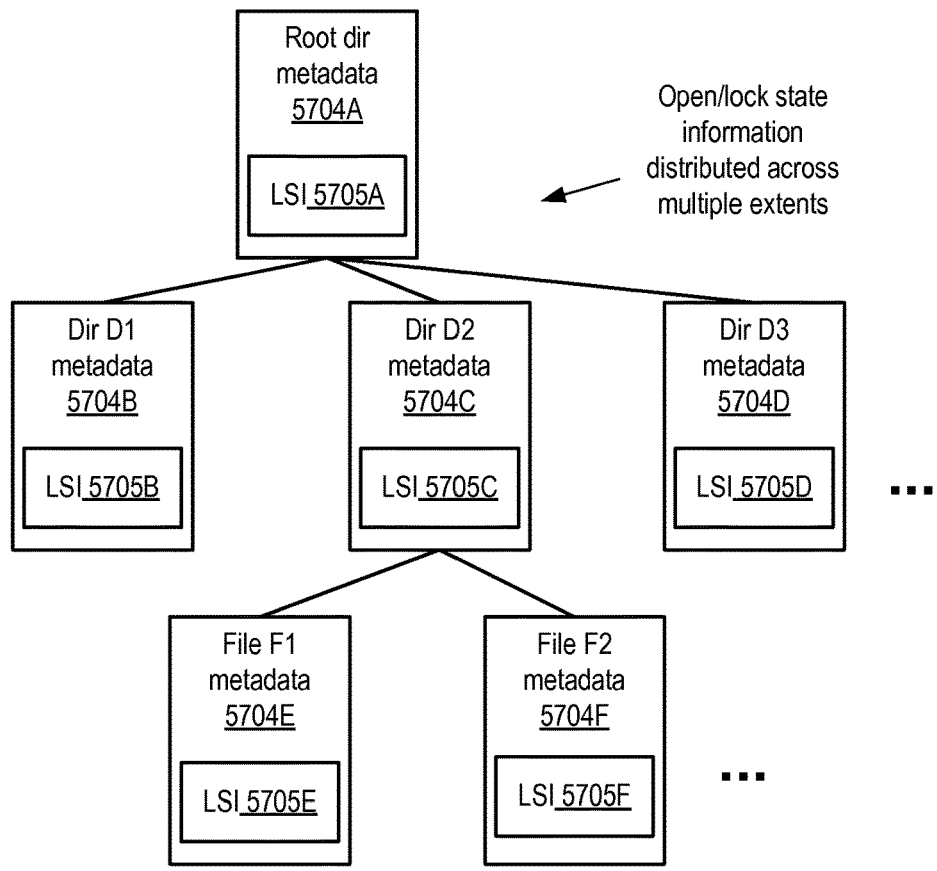
FIGS. 57a and 57b illustrate alternative approaches to lock state management for a session-oriented file system protocol at a distributed storage service, according to at least some embodiments.
Figure 57B:
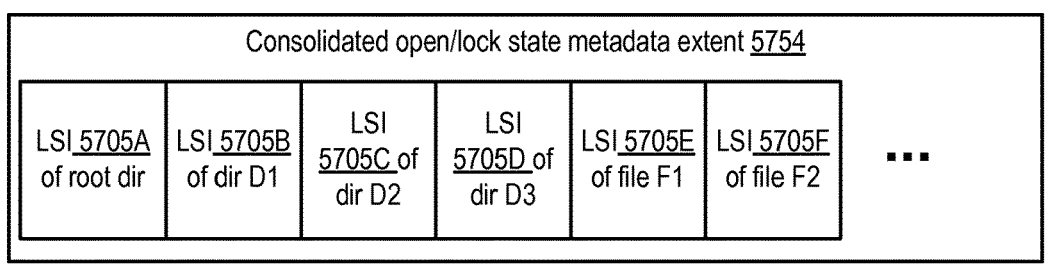

In order to perform various types of file store operations at the desired performance level, any of several approaches to the storage of lock state information for file store objects may be employed. FIGS. 57a and 57b illustrate alternative approaches to lock state management for a session-oriented file system protocol at a distributed storage service, according to at least some embodiments. In one approach, illustrated in FIG. 57a, the lock state indicators 5705 of a particular file system may be distributed among multiple extents. In some implementations of this approach, the LSIs containing lock and/or open state information for the various file store objects may be stored together with other types of metadata maintained for the entries, e.g., the corresponding namespace DFS-DirectoryEntries (namespace entries), DFS-Inodes, and/or the logical-block-to-physical-page mappings for the objects of the file system. Thus, for example, LSI 5705A for the root directory may be stored with other metadata 5704A for the root directory at one or more logical blocks of a particular extent, LSI 5705B for directory D1 may be stored with other metadata 5704B for directory D1 at a different extent, and so on. Similarly, respective open/lock state information entries 5705C, 5705D, 5705E and 5705F may each be stored in respective logical blocks for directory D2, directory D3, file F1, and file F2. In the second approach, illustrated in FIG. 57b, the open/lock state information for all the objects of a given file system may be stored in a consolidated fashion, e.g., within a single metadata extent 5754. When looking up all the LSI entries for a given client session, e.g., for session invalidation operation, multiple extents may have to be accessed if the distributed approach illustrated in FIG. 57a is used, while only one or a small number of extents may be required if the consolidated approach illustrated in FIG. 57b is used. However, under some circumstances the consolidated approach may result in poorer resource utilization than the distributed approach, e.g., because LSIs may be deleted as the population of file store objects changes, and/or because the amount of storage eventually required for lock/open state information for a given file system may not be easy to predict at the time that the file system is created and the extent for its LSIs is obtained.

Figure 58:
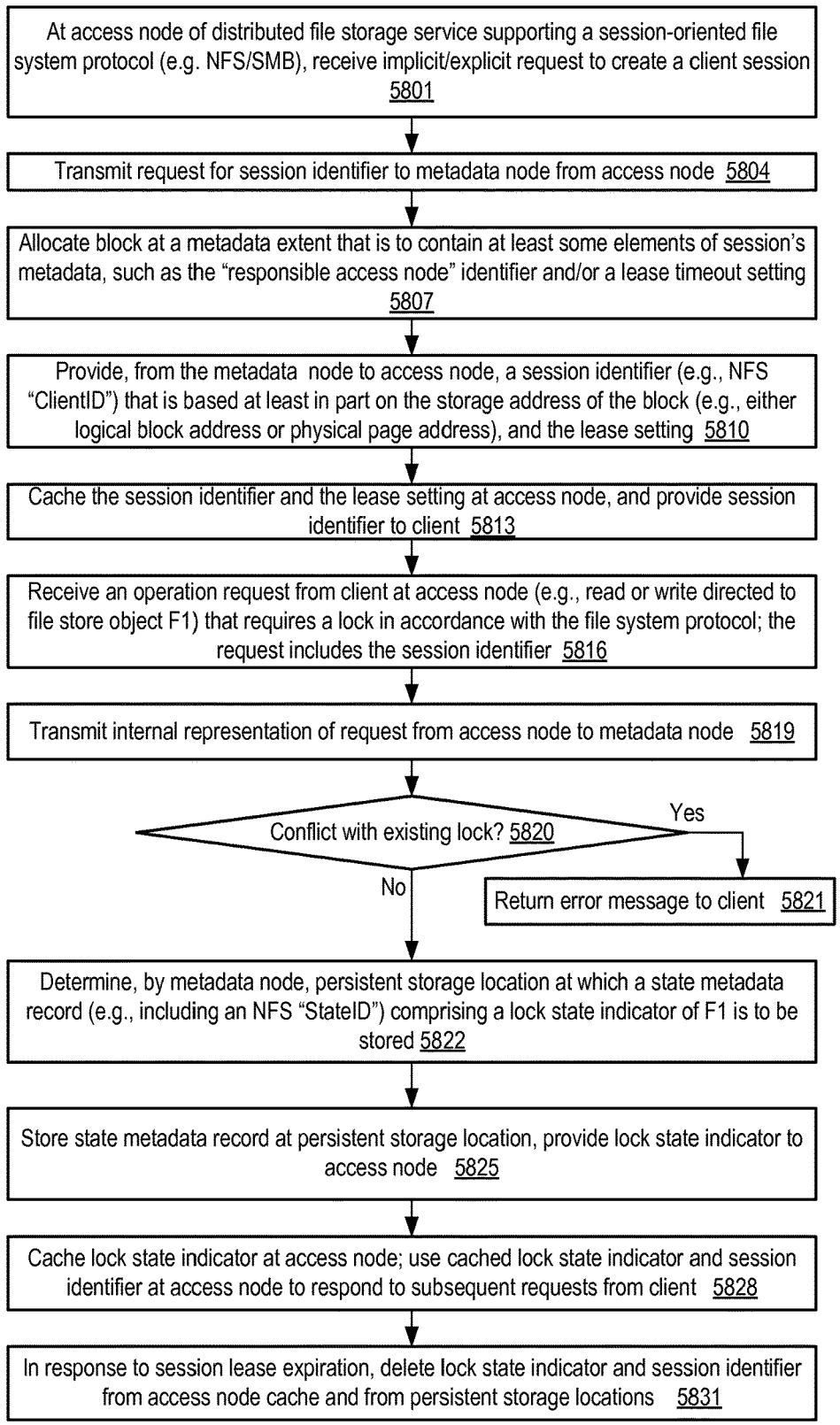
FIG. 58 is a flow diagram illustrating aspects of client session metadata management operations that may be performed a distributed storage service, according to at least some embodiments.

FIG. 58 is a flow diagram illustrating aspects of client session metadata management operations that may be performed a distributed storage service, according to at least some embodiments. As shown in element 5801, a request to initialize or create a client session may be received from a client at an access subsystem node of a distributed storage service that supports a stateful or session-oriented file system protocol such as NFS or SMB. In some implementations, an API requesting an explicit session initialization, similar to an NFS SetClientID API, may be used by the client. In other implementations, the request to establish the session may be implicit, e.g., a session may be initialized, if one does not already exist, in response to an open( ) API invoked from the client. The session request may in some implementations include an identification of the particular client (e.g., a value derived from an IP address and/or hostname of a host at which one or client processes are running) as well as a unique single-use-only verifier value. If a client process exits and has to be restarted, or if the host or compute instance at which the client processes run is rebooted, at least in some embodiments a new session may have to be initialized, and a different verifier may be supplied to the storage service in the corresponding session initialization request.

In the depicted embodiment, the metadata subsystem of the distributes storage service may be responsible for storing client session information at persistent storage at one or more extents, while the access subsystem may be configured to cache session state information, e.g., in volatile memory and/or local persistent storage at the access node. In response to receiving the session request, the access node may transmit a request for a session identifier, e.g., in an internal version of the client's session request, to a selected metadata node (element 5804). The metadata node may be selected based on the client's identification information in some embodiments—e.g., in one embodiment two different metadata nodes MN1 and MN2 may be selected for respective client sessions to be established for clients C11 and C12. The selected metadata node may allocate a logical block (mapped to some number of physical pages at metadata extents using one of the mapping techniques described earlier) for various elements of the client session metadata to be stored, including for example the lease settings for the session, the identity of the client, the identity of the responsible access node for the client session, and so on (element 5807). In at least some embodiments, a session identifier (e.g., NFS ClientID) may be determined for the new session based at least in part on the address at which the session metadata is stored—e.g., a logical block address or a physical page address may be incorporated within, or used as, the session identifier. The session identifier and an initial lease setting may be provided from the metadata node to the access node (element 5810) in the depicted embodiment. In some embodiments, only the session identifier may be provided to the access node, and the access node may be able to retrieve other elements of the session metadata from the storage subsystem using at least a portion of the session identifier as a parameter in a read request.

The session identifier and the lease information may be cached in a session metadata cache by the access node, and the session identifier may be returned to the client (element 5813). The client may include the session identifier as a parameter in subsequent file store operation requests, e.g., in open( ), read( ), write( ), getattribute( ), or close( ) calls directed at files or directories of the file system. When the access node receives such an operation request, it may look up the session information in its local cache, e.g., to verify that the client's session is still open.

For some types of operations in the depicted embodiment, e.g., write operations directed to files, locks may be required in accordance with the concurrency management techniques of the file system protocol in use. Upon receiving a given file system operation request (comprising the session identifier), such as a write or a read directed to a file store object F1, the access node may determine whether such a lock is needed (element 5816). If a lock is needed and is not already cached at the access node, a corresponding internal version of the operation request may be transmitted from the access node to a metadata node (element 5819). The metadata node may determine whether a conflicting lock state indicator already exists (e.g., because F1 is already locked on behalf of another client). If such a conflicting lock is found (as determined in element 5820), the client's file system operation request may be rejected (element 5821), e.g., by sending an error message indicating that the targeted object is already locked. If no conflict is found, the metadata node may determine a persistent storage location for a logical block to be used to store state information for F1, including for example the corresponding lock state indicator (element 5822). For example, in some embodiments, one of the techniques illustrated in FIG. 57a or 57b may be used to allocate space for the lock state indicator and/or other state metadata to be saved for F1. The state information may be stored at the persistent storage location (element 5825), and at least a portion of the state metadata including the lock state indicator may be provided to the access node.

The requested operation (e.g., the read or write directed to F1) may be completed, e.g., as a result of an internal I/O request directed to the storage subsystem by either the access node or the metadata node, and a corresponding response may be sent to the client. The access node may add the lock state indicator to its session metadata cache and use the cached lock state indicator, caches lease settings and/or the cached session identifier to respond to subsequent requests from the client during the session element 5828), e.g., without requiring interactions with the metadata subsystem for at least some of the subsequent requests. When and if the session expires, its metadata may be deleted from both the access node's cache and from the persistent storage allocated at the request of the metadata node (element 5831) in the depicted embodiment. It is noted that in accordance with some file system protocols, at least a portion of the session-related metadata may also be provided to and/or cached at client-side components of the service, e.g., daemons instantiated at the hosts at which applications utilizing the file storage service are run.

Figure 59:
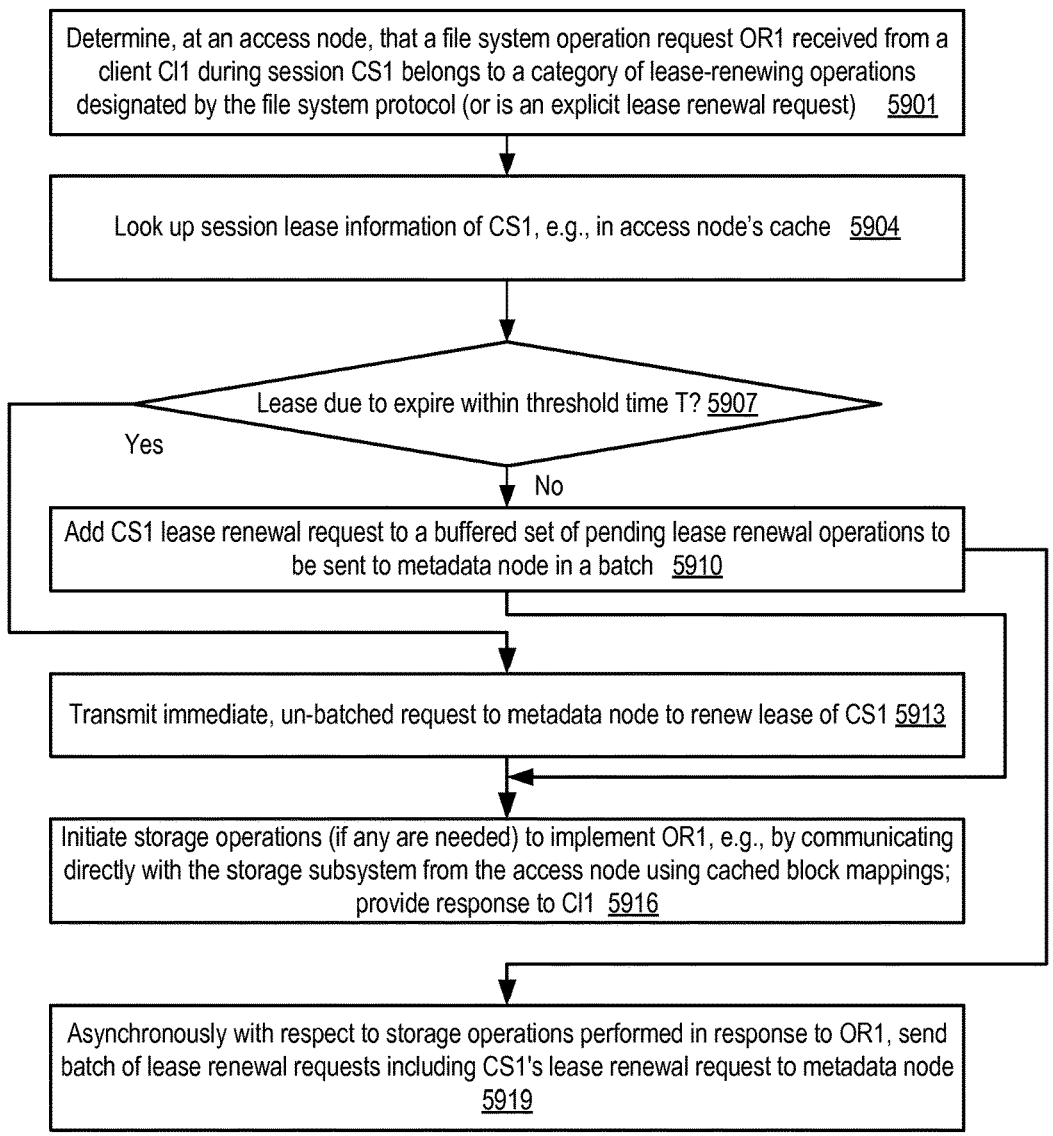
FIG. 59 is a flow diagram illustrating aspects of client session lease renewal operations that may be performed a distributed storage service, according to at least some embodiments.

FIG. 59 is a flow diagram illustrating aspects of client session lease renewal operations that may be performed a distributed storage service, according to at least some embodiments. As described earlier, a lease may represent a time-bound grant of control of the state of a set of files, directories or other client-accessible storage objects to a client from storage service. As shown in element 5901, a file store operation request OR1 that belongs to a category of operations that result in automatic lease renewals may be received from a client Cll at an access node of the storage service during a client session CS1. For example, a read, write, open or close request directed towards a particular file of a session-oriented file system such as NFS may be received. Different file system protocols may define respective sets of leas-renewing operations in various embodiments. The remaining operations illustrated in FIG. 59 may also be performed in response to an explicit lease renewal command in at least some embodiments. The request may include the client's session identifier (e.g., an NFS ClientID), which may be usable as an index value for metadata records in the access node's session metadata cache.

The access node may look up the lease information (e.g., when the lease is set to expire) for the client session (element 5904), e.g., in the session metadata cache. If the lease is due to expire within some threshold time interval T (as determined in element 5907), the access node may transmit an immediate lease renewal request for CS1 to a metadata node (element 5913). If, however, the lease is due to expire after the threshold time interval T, a lease renewal request for CS1 may be added to a buffered set of pending lease renewal requests to be sent in a batch to the metadata node. If the operation request OR1 requires storage operations to be performed (e.g., if the request cannot be satisfied by data or metadata already cached at the access node), the storage operations may be requested by the access node (element 5916), regardless of whether an immediate renewal request was sent or not. In the scenario where CST's lease renewal request is buffered, one or more of the buffered lease renewal requests may be transmitted to the metadata node asynchronously with respect to the operation request OR1 (element 5919).

In at least some embodiments in which the buffering technique for lease renewal requests is implemented, a different validity timeout may be configured or set for the version of the session metadata that is cached at the access node (including for example the session identifier and the LSIs of the session) than is set for the persistent version of the session metadata stored at the request of the metadata node. For example, in one implementation, if the lease timeout is set to 90 seconds in accordance with the file system protocol settings, a validity timeout of 120 seconds may be used for persistent session metadata records at the metadata subsystem, while a validity timeout of 30 seconds (e.g., based at least in part on the difference between the metadata subsystem's validity timeout and the protocol's lease timeout) may be set for the corresponding records at the access node's cache. Using such different timeout combinations, at least some types of potential failures or delays at the access node may be accommodated without causing clients to lose the benefits of their leases prematurely. For example, with the example timeout settings introduced above, since the access node would be required to refresh its cached lease information once every 30 seconds from the metadata subsystem in any case, while the client's actual lease is valid for 90 seconds, a batching delay of a few seconds (e.g., a delay of less than 30 seconds caused by a failover of the access node to a replacement node) would typically not be expected to result in any violations of the protocol lease semantics. Since lease-renewing operations may be expected to occur fairly frequently, the probability that the access node's shorter validity timeout results in extra traffic between the access node and the metadata subsystem may be kept quite low in such implementations. It is noted that at least some of the techniques described earlier, such as the use of conditional writes in read-modify-write sequences, distributed transactions, and/or replicated state machines in general, may also be used to manage client session-related metadata as well. For example, in one implementation, when a client session lease expires, and a plurality of session-associated lock state indicators distributed among various nodes of the service have to be deleted, a distributed transaction may be used.

Connection Balancing Using Attempt Counts

At some distributed storage systems expected to comprise thousands of nodes and expected to handle tens or hundreds of thousands of concurrent client requests, load balancing the client workload may be essential to achieving the targeted performance and resource utilization goals. In at least some provider network environments, a collection of load balancing nodes may be established as the intermediaries between various services and the clients that wish to utilize the services. In some embodiments, such an intermediary load balancing layer may be established between client devices and an access subsystem of a distributed storage service. Network connections (such as NFS mount connections) established on behalf of clients to distributed storage services may typically be fairly long-lived, and as a consequence the problems of workload balancing may become more complex than in environments in which user sessions are typically shorter (e.g., some types of web server environments). A number of different techniques may be used to manage workload levels of distributed storage service access nodes, including, for example, a connection balancing technique described below that takes into account the number of unsuccessful attempts that have previously been made to establish a connection on behalf of a particular client. In some embodiments, connections may be voluntarily terminated by access nodes under certain workload conditions, as also described below.

Figure 60:
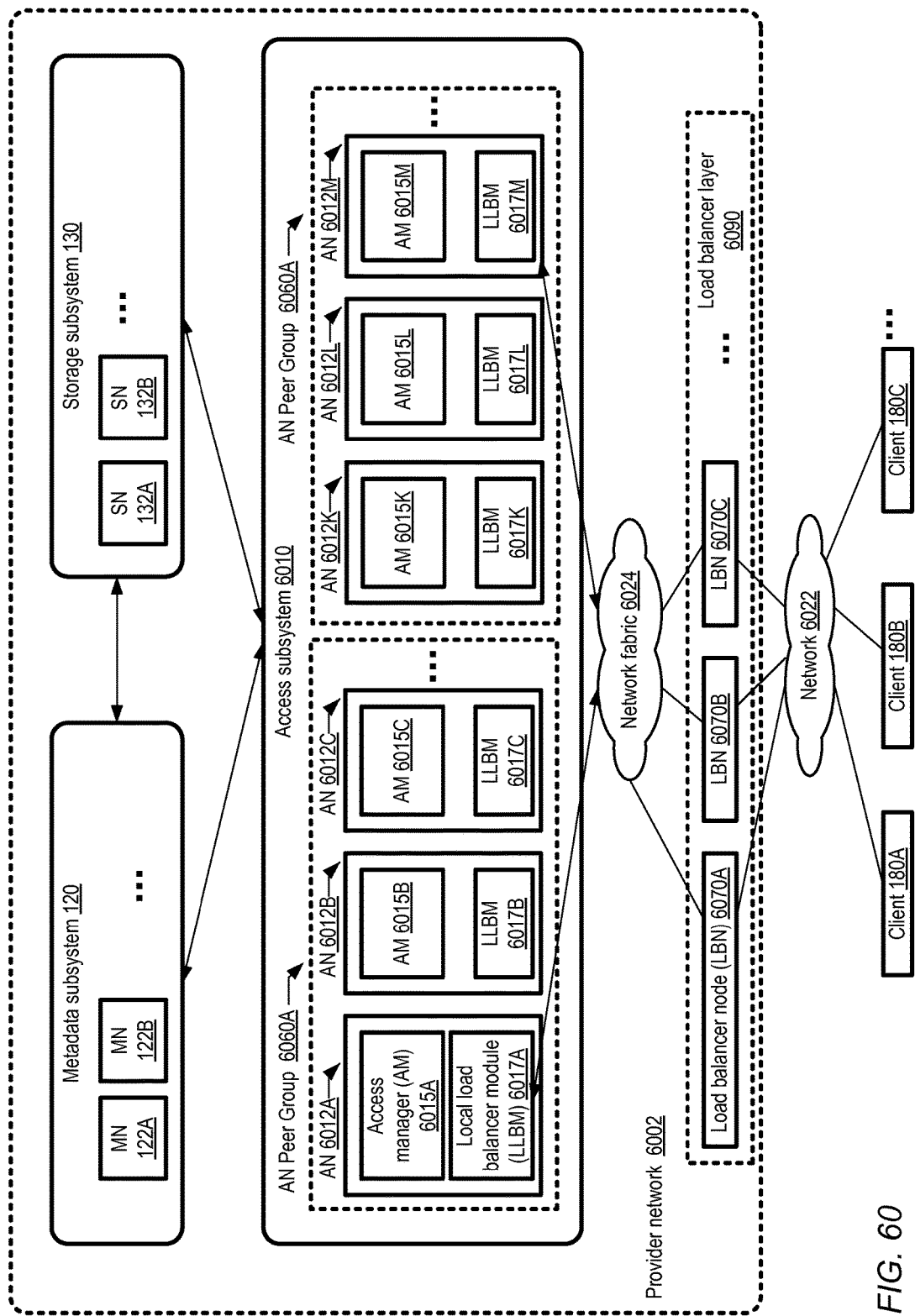
FIG. 60 illustrates a system in which a load balancer layer is configured for a distributed storage service, according to at least some embodiments.

FIG. 60 illustrates a system in which a load balancer layer is configured for a distributed storage service, according to at least some embodiments. In the depicted embodiment, the load balancer layer 6090 comprises a plurality of load balancer nodes (LBNs) 6070, such as nodes 6070A, 6070B, and 6070C, implemented using resources of a provider network 6002. The access subsystem 6010 of the distributed storage subsystem comprises a plurality of access node (AN) peer groups 6060, such as AN peer group 6060A comprising ANs 6012A, 6012B and 6012C, and AN peer group 6060B comprising ANs 6012K, 6012L and 6012M. The members of an AN peer group may collaborate with each other for connection rebalancing operations in at least some embodiments, as described below in further detail. The members of an AN peer group 6060 may be selected from among the plurality of access subsystem nodes of the storage service based on any combination of a variety of criteria in different embodiments—e.g., based on availability requirements of the access subsystem (e.g., such that a single localized power outage or other infrastructure outage does not cause failures at all the members of an AN group), latency requirements (e.g., such that different members of the group are able to support similar levels of latency), performance capacity requirements (such that the total throughput that can be handled collectively by an AN peer group is above some desired minimum). In some implementations, an AN peer group may comprise a plurality of access nodes that are all implemented on hardware servers mounted at a single rack. In other implementations, AN peer group boundaries may not coincide with rack boundaries; instead, other factors such as shared network address prefixes, resilience-to-failure or the types/numbers of file stores being handled may be used to define peer groups.

In at least some embodiments, the TCP/IP (Transmission Control Protocol/Internet Protocol) family of protocols may be used for communications between clients 180 and the storage service. A client 180 may transmit, a connection establishment request to an LBN 6070 whose network address (e.g., a virtual IP address) has been exposed as an endpoint for accessing the storage service. Various types of physical or virtual networks 6022 may be used by the clients in different embodiments. In one embodiment, as described earlier, some or all of the clients (such as compute instances configured as part of an isolated virtual network) may be instantiated at hosts within the provider network, and may thus use an internal network to connect to the load balancer nodes. In at least one embodiment, a load balancer node and a client of the storage service may both execute at the same host (e.g., as separate virtual machines), in which case no off-host network connection may be required. In another embodiment, a portion of a network external to the provider network 6002, such as a portion of the Internet may be used. In some embodiments, a plurality of LBNs may be configured to respond to traffic directed at a single IP address associated with the storage service. In one implementation, a particular LBN 6070 may first tentatively accept the client's connection establishment request, and that LBN 6070 may then attempt to establish a corresponding internal connection via network fabric 6024 (e.g., an L3 network) of the provider network 6002 to an access node 6012. In at least some embodiments, as described below, a given access node 6012 may reject the internal connection request issued by the LBN under certain workload conditions, and the LBN may consequently attempt to find another access node 6012 that is willing to establish the internal connection. In some embodiments, the specific criteria that an access node uses to accept or reject an LBN's request may depend on the number of unsuccessful attempts that the LBN has already made—e.g., the criteria may be relaxed as the number of unsuccessful attempts increase, so that the probability of connection establishment may increase with the number of attempts.

In the depicted embodiment, each AN 6012 comprises two subcomponents: a local load balancer module (LLBM) 6017 (e.g., LLBMs 6017A, 6017B, 6017C, 6017K, 6017L and 6017M), and an access manager (AM) 6015 (e.g., AM 6015A, 6015B, 6015C, 6015K, 6015L and 6015M). After a connection request has been accepted, in some embodiments an LLBM may be responsible for receiving encapsulated TCP packets sent by an LBN on behalf of a client over the network fabric 6024. In various implementations, the LBN may encapsulate the client's TCP packets using a different protocol (e.g., User Datagram Protocol (UDP) or some proprietary protocol used internally within the provider network), or using TCP itself—e.g., a client's TCP packet (including its headers) may be included within an LBN TCP packet for the transmittal between the LBN and the LLBM. The LLBM may unpack or de-capsulate the packets before passing the packets on to a TCP processing stack associated with the local AM. In some implementations the LLBM may change contents of one or more client packet headers such as the TCP sequence number before the transfer to the TCP processing stack. In at least some embodiments, the manipulations of the client packets (e.g., encapsulation/unpacking, changing headers, etc.) by the combination of the LBN and the LLBM may make it appear to the TCP processing stack as though the packet was received on a TCP connection established directly with the client 180 rather than via the LBN and the LLBM. The AM 6015 may implement storage service front-end logic, including, for example, caching metadata, managing interactions with the metadata subsystem 120 and/or the storage subsystem 130, and so on. In addition, in some embodiments, the AM 6015 may collect a set of local workload metrics of various resources of the AN, such as CPU metrics, network metrics, memory metrics and the like, that can be used for decisions on accepting additional connections. In one embodiment, the AMs of different peers of a peer group 6060 may query each other regarding their workload levels as described in greater detail below.

According to at least some embodiments, a connection request comprising an attempt count parameter may be received at an access node 6012 from an LBN 6070 on behalf of a client 180. The attempt count parameter may indicate the number of times the load balancer component has attempted to establish a connection on behalf of that particular client 180. In one embodiment, a client may submit a request to mount a file system (e.g., and NFS mount command), and the LBN may generate its connection request in response to receiving the mount command; the connection established as a result may be termed a "mount connection" and may be used for several subsequent requests from the same client. In other embodiments, other storage service commands or requests (i.e., requests other than mount requests) may also or instead trigger connection establishment requests. Upon receiving the connection request, the AN may identify one or more workload threshold levels (e.g., respective threshold levels Th1, Th2, . . . for a plurality of resources) to be used for an acceptance decision regarding the connection request. At least one of the threshold levels may be based on the attempt count parameter in some embodiments—e.g., for the first attempt, the CPU workload threshold may be Tc, while for a second attempt, the CPU workload level may be set to (Tc+delta), making it more likely that the connection is accepted on the second attempt. In one example scenario, if threshold level Tc is identified for CPU workload, and threshold level Tn is identified for network workload, the connection may be accepted if a CPU workload metric of the AN is below Tc and a network workload metric is below Tn. In another scenario, the connection may be accepted if either the CPU workload metric or the network workload metric is below the corresponding threshold. The workload metrics used for comparison with the thresholds may be computed over some time interval in some embodiments as discussed below, e.g., in order to reduce the impact of short-term workload fluctuations on the connection acceptance decision.

In response to a determination that the local workload metric or metrics of the access subsystem node are below the corresponding workload threshold levels, an indication that the connection is accepted may be provided to the requesting LBN 6070. Both the connection request and the acceptance indication may be formatted in accordance with the particular protocol being used for communication between the LBNs and the LLBMs (e.g., UDP, TCP, or some other protocol). The LBN 6070 may in some embodiments confirm to the client that the connection has been accepted by the AN. If the AN 6012 selected by the LBN cannot accept the connection (e.g., if the local workload metrics are above the threshold identified), a connection rejection message may be sent to the LBN. The LBN may then transmit its request (with the attempt count parameter incremented) to another AN, and this process may be repeated as illustrated in FIG. 61 and described below, until either the connection is successfully established or the number of attempts exceeds some maximum number of attempts permitted.

After a connection is successfully established, when the LBN 6070 receives a client-generated packet indicative of a storage service request, the LBN may transmit the packet to the LLBM at the access subsystem node (e.g., in an encapsulated format). The LLBM may manipulate the contents of the message received from the LBN (e.g., to unpack the original client-generated packet), and pass the original packet on to the AM 6015 for processing. Depending on the nature of the operations that have to be performed in response to the storage request, the AM may in some cases have to contact either the metadata subsystem 120, the storage subsystem 130, or both back-end subsystems. An indication of the storage service request may be transmitted to the appropriate subsystem(s). If the client's service request requires a response, the response may flow in the opposite direction—e.g., from the back-end subsystem(s) to the AN, from the AN to the client via the LBN. In at least some embodiments in which incoming packets are encapsulated by the LBN and unpacked by the LLBM, the LLBM may similarly encapsulate outgoing packets and the LBN may unpack the packets before passing them on to the client 180.

Figure 61:
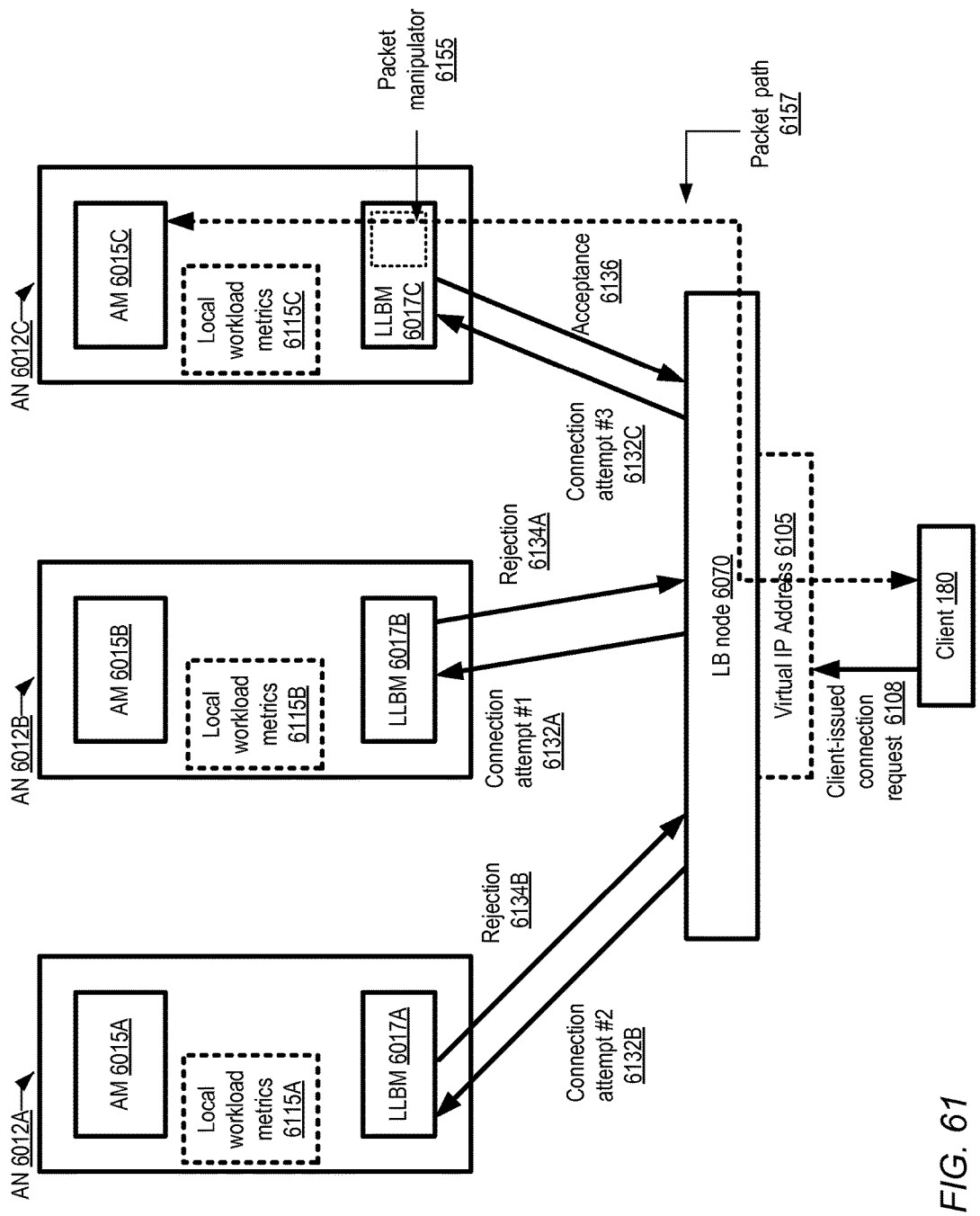
FIG. 61 illustrates example interactions between a load balancer node and a plurality of access subsystem nodes of a distributed storage service, according to at least some embodiments.

FIG. 61 illustrates example interactions between a load balancer node and a plurality of access subsystem nodes of a distributed storage service, according to at least some embodiments. In the depicted embodiment, a virtual IP address 6105 (e.g., an IP address that can be dynamically associated with different network interfaces, e.g., at different compute instances of a provider network's virtual computing service, and is not tied to a single network interface) may be exposed to enable clients to submit connection requests and other storage service requests to the storage service. One or more LBNs 6070 may be responsible for accepting traffic directed at the virtual IP address at any given time. In at least some embodiments, the LBNs (and/or the ANs) may be implemented using compute instances—e.g., a given LBN may comprise a process executing at a compute instance of a provider network's virtual computing service, launched at a commodity hardware server. The client may submit a connection establishment request 6108 to the virtual IP address 6108.

In the depicted embodiment, the LBN 6070 may receive the client's request, and select a particular AN 6012B as the first AN to which it should send a corresponding internal connection request. A number of different techniques may be used to select the AN—e.g., random selection may be used in some embodiments, round-robin selection may be used in other embodiments, and so on. In some embodiments, each LBN may be affiliated with a set of ANs (such as one or more AN peer groups defined based on availability, latency, capacity, or other criteria mentioned earlier), and the LBN may cycle through its affiliated ANs in a designated order for its connection attempts. In some embodiments, some number of the LBNs and some number of the ANs may both be located at the same rack, and an LBN may select an AN from within its own rack first. The LBN may submit the first connection attempt 6132A to an LLBM 6017B at the selected AN 6012B, e.g. with the attempt count parameter set to 1 in the depicted embodiment. (The attempt count parameter may be set to zero for the first attempt in some implementations.) The decision regarding acceptance or rejection of the request may be made either by the AM 6015 at the targeted AN, by the LLBM at the targeted AN, or by the combination of the LLBM and the AM at the targeted AN, in different embodiments.

If the first AN contacted sends a rejection 61234A to the LBN (e.g., based at least in part on one or more local workload metrics 6115B exceeding corresponding thresholds), the LBN may select a second AN (AN 6012A in the depicted example). The LBN 6070 may submit a second connection request attempt 6132B, with an incremented attempt count parameter, to the LLBM 6017A at the second AN. If a rejection 6134B is received again (e.g., based on AN 6012A's local workload metrics 6115A), the LBN 6070 may select a third AN 6012C, and submit the third attempt 6132C to its LLBM 6017C. In the depicted example scenario, the third AN 6012C sends back an acceptance 6136 based on an analysis of its local workload metrics 6115C, and the connection is established accordingly between the AM 6015C and the client 180. After the successful establishment of the connection, network packets between the storage service and the client 180 flow along path 6157 in the depicted embodiment. For example, the client may send a packet to the LBN 6070, the LBN may send the packet (potentially using an encapsulated or modified representation) to the LLBM 6017C, a packet manipulator 6155 of the LLBM may unpack or modify the received packet, and send the output of the manipulation to the AM 6015C. AM 6015C may then initiate the storage operations required, which may involve interactions with the metadata and/or storage subsystems.

Figure 62:
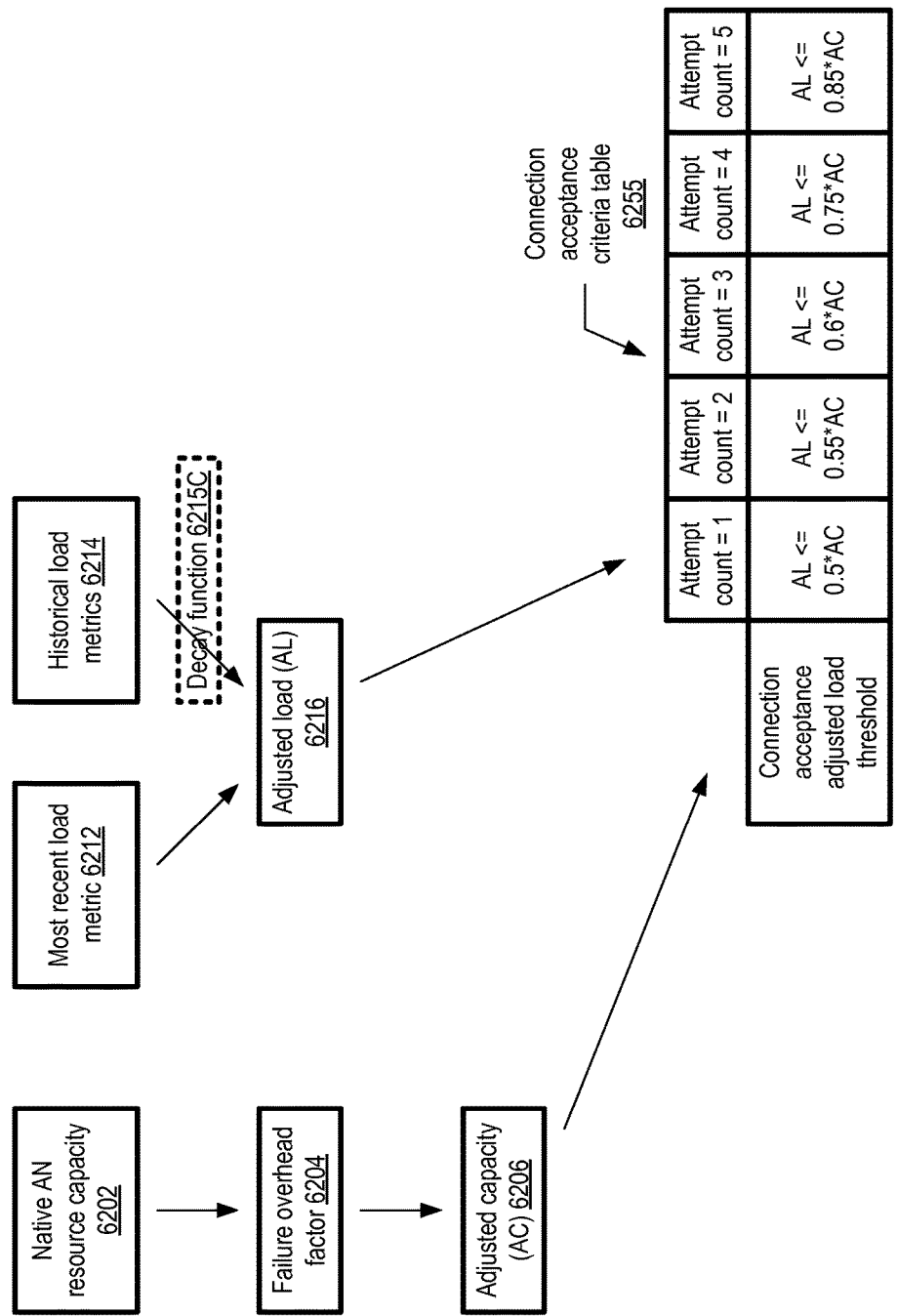
FIG. 62 illustrates examples of connection acceptance criteria that may vary with the number of connection attempts made, according to at least some embodiments.

FIG. 62 illustrates examples of connection acceptance criteria that may vary with the number of connection attempts made, according to at least some embodiments. In the depicted embodiment, for a given resource, the native or baseline capacity 6202 of an AN with respect to that resource (such as CPU or network bandwidth) may be modified by a failure overhead factor 6204 to arrive at an adjusted capacity (AC) 6206 to be used for connection acceptance decisions. For example, if the native CPU capability of the AN is X operations per second, in one scenario, one fifth of that capacity (0.2X) may be set aside to compensate for temporary workload increases that might occur in the event of failures of various kinds Thus, the adjusted CPU capacity would be set to 0.8X (X–0.2X) operations per second in such a scenario.

The local workload metrics collected for a given resource at an AN may exhibit short-term variations as well as long-term trends. Since the connections established for storage service operations (such as mount connections set up for NFS) may typically be long-lasting, it may not be advisable to accept/reject the connections on the basis of just the most recent metrics alone. Accordingly, an adjusted load metric (AL) 6216 may be obtained from a combination of the most recent metric 6212 and some set of historical metrics 6214 (e.g., metrics collected for that resource over the last 15 minutes or an hour). In some embodiments, a decay function 6215 (e.g., an exponential decay or a linear decay) may be applied to historical metrics when computing the adjusted load, e.g., to represent or model the reduction in the importance of the metrics over time.

To accept a connection request with a specified attempt count parameter at an AN, the adjusted load 6216 for a given resource may be compared to a threshold (expressed in terms of the adjusted capacity for that resource) that is dependent on the attempt count. Thus, as indicated in the connection acceptance criteria table 6255, a connection request with an attempt count parameter equal to one may be accepted if the AL for the resource being considered is less than or equal to 0.5*AC. If the connection request has failed once, and the attempt count is accordingly set to 2, the connection may be accepted of the AL is no greater than 0.55*AC. For an attempt count value of 3, the acceptance criterion may be relaxed further so that the connection is accepted if AL is no greater than 0.6*AC; for attempt count=4, AL may have to be no greater than 0.75*AC, and for attempt count 5, AL may have to be no greater than 0.85*AC. Thus, the more times that a connection is rejected in the depicted embodiment, the more heavily loaded the AN that eventually accepts it may be allowed to be. In other embodiments, the opposite approach may be used, in which in order to accept a connection request with an attempt count K, the workload level of the accepting node may have to be lower than the workload level required to accept the connection request with a lower attempt count (K-L). Such an approach, in which the relative ease of acceptance of a connection decreases as the attempt count increases, may be used for example in a scenario in which new connection attempts are to be discouraged under heavy load conditions. The threshold conditions, as well as the parameters and functions (e.g., the decay function) used for the computation of the AC and the AL, may all be configurable settings in at least some embodiments. The number of distinct attempt count values for which acceptance criteria are defined may vary in different embodiments, and may itself be a configurable parameter in at least one embodiment. In some embodiments, the parameters, functions and/or thresholds may be dynamically modified over time, e.g., based on an analysis of the results achieved. In at least some embodiments, some of the acceptance criteria may be the same for a range of attempt count values—e.g., for attempt counts 1 and 2, the same threshold value may be used.

Figure 63:
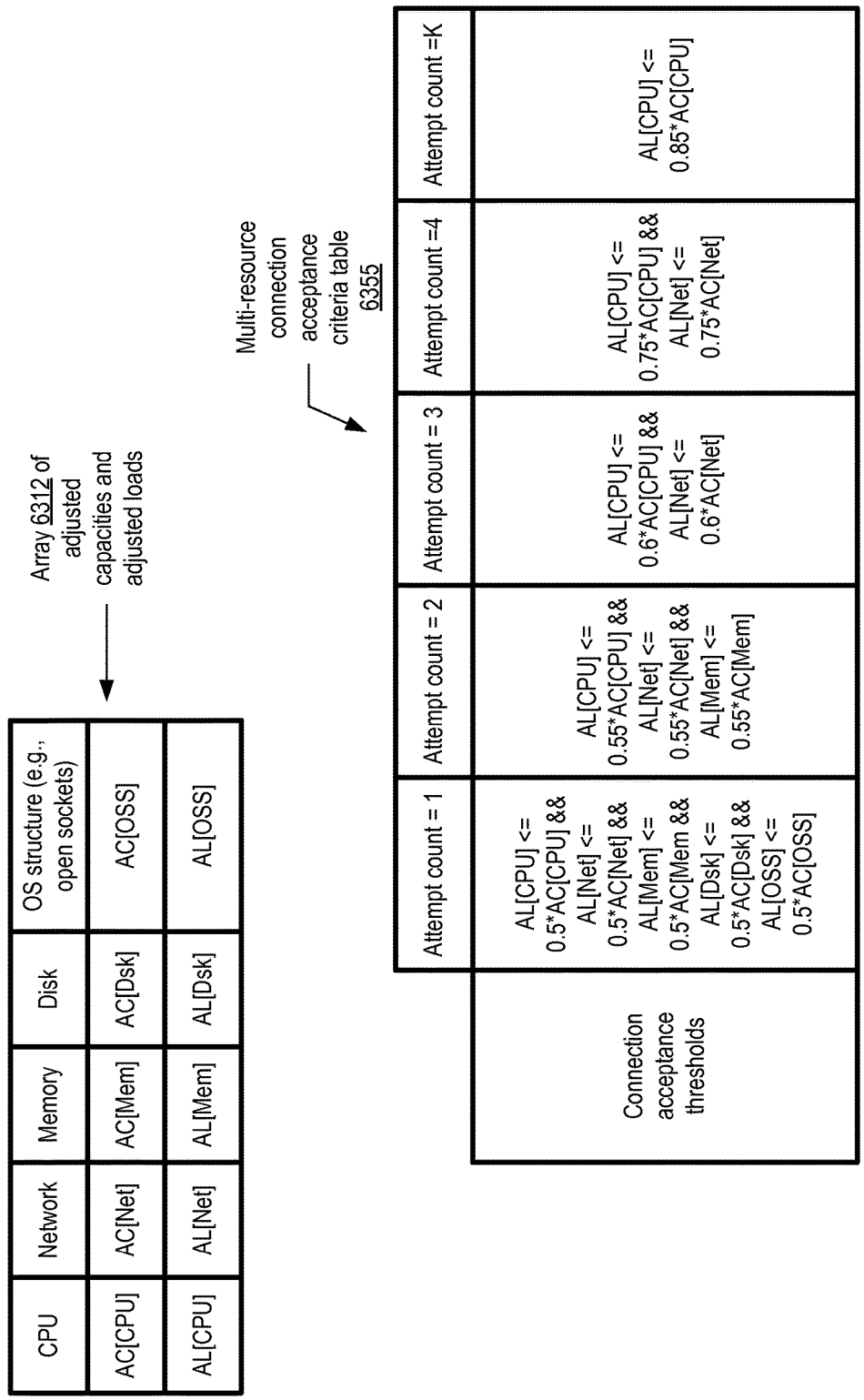
FIG. 63 illustrates examples of connection acceptance criteria that may be dependent on workload levels associated with a plurality of resources, as well as on connection establishment attempt counts, according to at least some embodiments.

In some embodiments, as mentioned above, local workload levels associated with more than one resource may be taken into account when making connection acceptance decisions. FIG. 63 illustrates examples of connection acceptance criteria that may be dependent on workload levels associated with a plurality of resources, as well as on connection establishment attempt counts, according to at least some embodiments. Five examples of adjusted load levels and corresponding adjusted capacities are shown in array 6312. AL[CPU] represents the adjusted CPU workload of the access node, while AC[CPU] represents the adjusted CPU capacity. AL[Net] represents adjusted network load, and AC[Net] represents adjusted network capacity. AL[Mem] represents adjusted memory load, and AC[Mem] represents adjusted memory capacity. AL[Dsk] represents adjusted local storage device capacity load at the access node, and AC[Dsk] represents adjusted storage device capacity. In at least some embodiments, adjusted loads and capacities may also be determined for logical resources such as open sockets that are represented by operating system structures at the access nodes. The adjusted workloads (AL[OSS]) and the adjusted capacities (AC[OSS]) for such operating system structures may be considered in connection acceptance decisions in at least some embodiments. For each resource, the adjusted load and the adjusted capacity may be expressed in the same units—e.g., if the network load is expressed in packets/second, the network capacity may also be expressed in packets/second.

Thresholds expressed in terms of the AC array elements may be determined for each of various attempt count values, as indicated in multi-resource connection acceptance criteria table 6355. Different combinations of resources may be taken into account for different attempt count levels in the depicted embodiment—e.g., for attempt count=2, thresholds for CPU, network, and memory may be compared to the corresponding adjusted loads, while for attempt count=K, only CPU loads and thresholds may be compared. The "&&" symbols in table 6355 indicate Boolean "AND"s, so that, for example, at attempt count=4, both the CPU and network criteria may have to be met to accept a connection. In various embodiments, different Boolean combinations of the load vs. threshold comparisons for different resources may be used—e.g., either ORs, ANDs, or both ORs and ANDs may be used.

Figure 64:
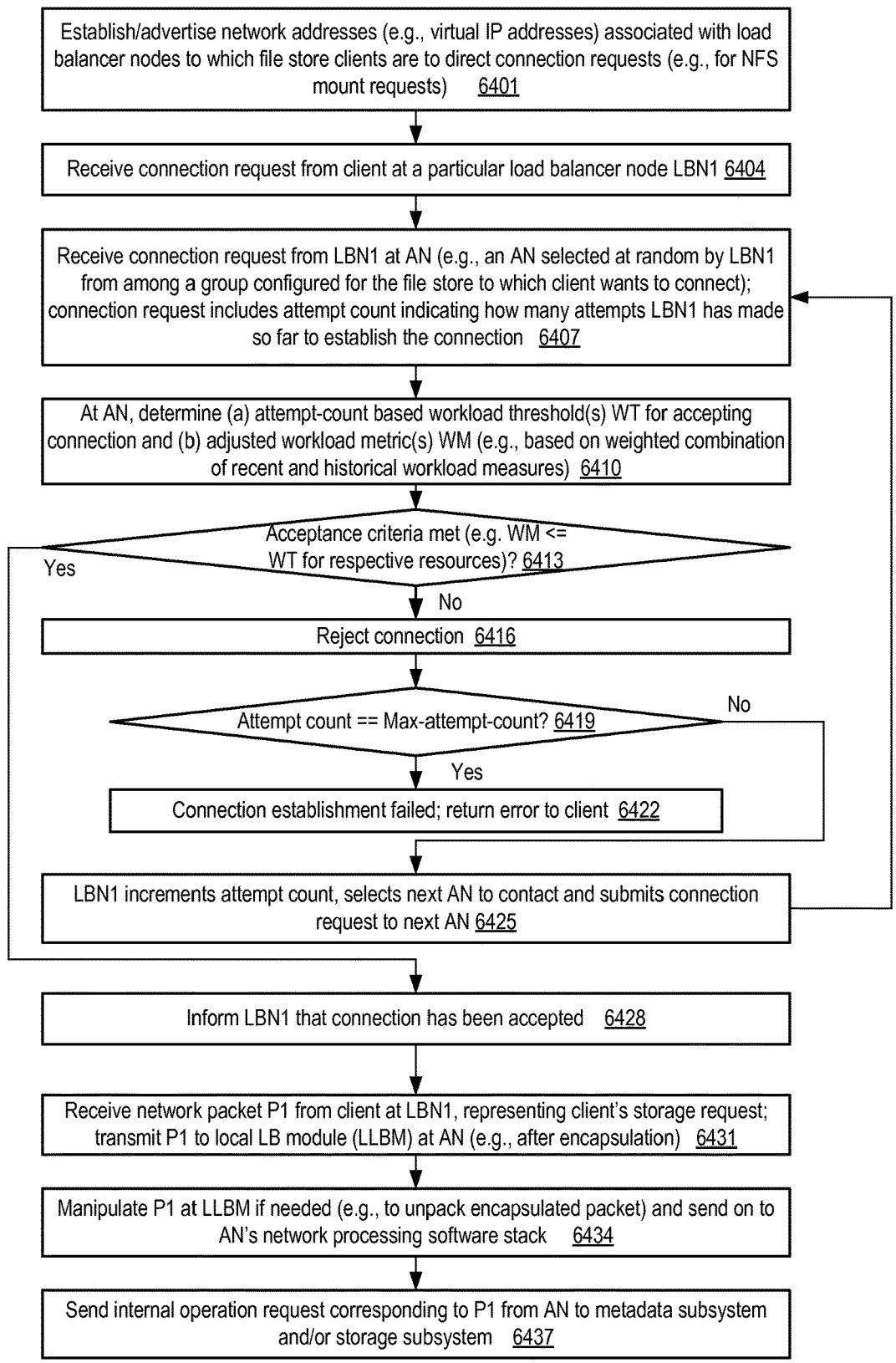
FIG. 64 is a flow diagram illustrating aspects of operations that may be performed to implement connection balancing based on attempt counts at a distributed storage service, according to at least some embodiments.

FIG. 64 is a flow diagram illustrating aspects of operations that may be performed to implement connection balancing based on attempt counts at a distributed storage service, according to at least some embodiments. As shown in element 6401, a set of load balancer nodes' network addresses (e.g., virtual IP addresses that may be accessible from within an isolated virtual network of the type illustrated in FIG. 3) may be exposed to clients to enable them to submit storage-related requests to the service. A connection request from a client may be received at a particular LBN, LBN1 (element 6404). LBN1 may in turn submit a corresponding connection request, comprising an attempt count parameter indicating the number of times an attempt to establish the connection has been made, to a selected access node AN (element 6407). Various approaches may be used to selecting the next AN to which a connection establishment attempt is directed—e.g., the ANs may be selected at random, using a round-robin approach, or based on some other factors such as how recently a connection was established at the AN from LBN1.

The AN may determine adjusted local workload metrics (WM) for one or more resources, and the threshold values (WT) with which those workload metrics are to be compared to accept/reject the connection (element 6410). At least some of the thresholds may differ for different attempt count values. The thresholds may be expressed in terms of adjusted resource capacities in some embodiments, and the adjusted resource capacities may in turn derived from native or baseline resource capacities and failure adjustment factors. In some embodiments, various Boolean combinations of resource-specific acceptance conditions may be used, as indicated in FIG. 63. If the acceptance criteria are met, e.g., if WM<=WT for the resources being considered for the attempt count value, as determined in element 6413, LBN1 may be informed that the connection has been accepted (element 6428). After the connection is accepted, a packet representing a storage request may be received at LBN1 from the client and transmitted to an LLBM (local load balancer module) at the AN to which the connection was established (element 6431). In some implementations, the client's packets may be encapsulated by LBN1, and unpacked or extracted by the LLBM (element 6434). The LLBM may transfer the packet to a network processing stack at the AN, where the packet contents may be analyzed to determine which storage service operations are needed to respond to the client's request. Requests for those operations may be sent to other subsystems of the service as needed (e.g., to the metadata subsystem and/or the storage subsystem) (element 6437).

If the criteria for accepting the connection are not met at the AN selected by LBN1 (as also detected in element 6413), the connection attempt may be rejected (element 6417). If LBN1 has already made the maximum number of attempts permitted ("Max-attempt-count") to establish the connection (as detected in element 6419), an error message may be returned to the client in some embodiments (element 6422) indicating that connection establishment failed. In many embodiments, the attempt-count-based acceptance criteria may be selected in such a way that the likelihood of failure to establish a connection is kept very low. The number of connection establishment failures may be tracked, and additional ANs may be configured as needed to keep the number or fraction of failures below a target level.

If LBN1 has not yet submitted the maximum permissible number of connection attempts for the client (as also detected in element 6419), LBN1 may select another AN to which a connection request should be submitted (element 6425). A new connection attempt, with the attempt count parameter incremented, may be sent to the selected AN, and the operations corresponding to elements 6407 onwards may be repeated. In some embodiments, the same kinds of techniques that were used by LBN1 to select the first AN may be used for selecting ANs for subsequent attempts. In other embodiments, LBN1 may change its criteria for selecting ANs based on attempt count—e.g., the first AN may be selected at random, while the next AN may be selected based on how successful LBN1 has been in previous attempts at connection establishment with various ANs. In one such embodiment, an LBN may maintain statistics on its connection establishment success rate with various ANs, and may use the statistics to select ANs that have been able to accept connections more frequently in the past.

Connection Re-Balancing Using Peer Group Workload Information

Connections established to file storage systems, such as NFS mount connections, may often persist for a long time. Information that was relevant to the connection acceptance decision at the time the connection request was received, such as the resource workload levels of one or more resources during some prior time interval, may not necessarily be indicative of current conditions at the access node at some later point during the connection's lifetime. In one example, an access node may have accepted a connection at a time when its adjusted CPU load was X, but the connection may still be in use at a later time when the adjusted CPU load has remained at 1.5X for some period. Accordingly, in some embodiments access nodes may attempt to re-balance their workloads under some circumstances.

Figure 65:
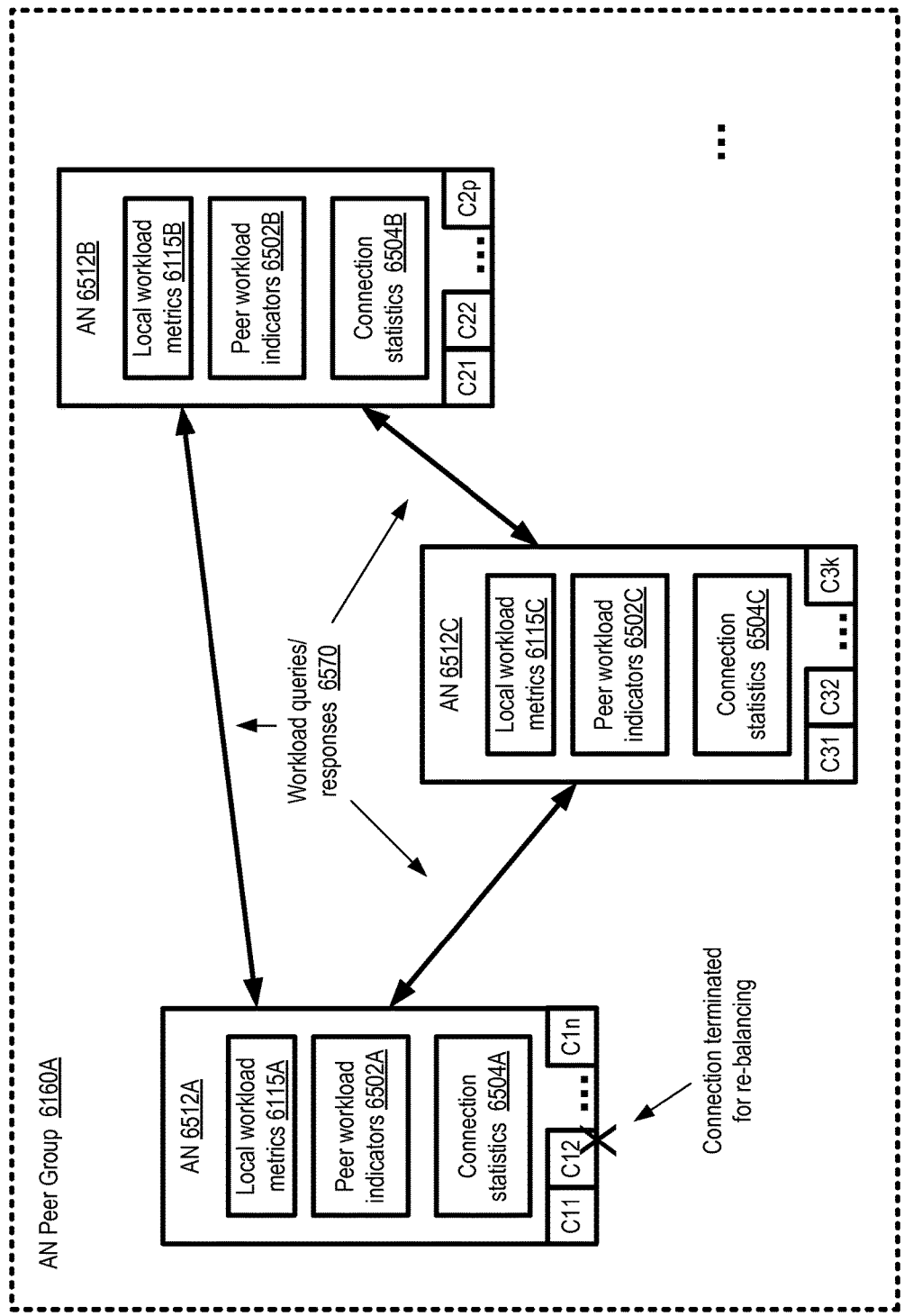
FIG. 65 illustrates an example of an access subsystem of a distributed storage service at which client connection re-balancing may be attempted based on workload indicators of members of a peer group of access nodes, according to at least some embodiments.

FIG. 65 illustrates an example of an access subsystem of a distributed storage service at which client connection re-balancing may be attempted based on workload indicators of members of a peer group of access nodes, according to at least some embodiments. An access node peer group comprising three nodes, ANs 6512A, 6512B and 6512C is shown. Membership in a peer group may be determined based on a variety of factors in different embodiments as mentioned above, including for example availability, latency, capacity, co-location, or shared network address prefixes. In the depicted embodiment, each peer group member may collect at least two types of workload metrics: local workload metrics 6155 (e.g., 6115A, 6115B or 6115C) such as the observed loads discussed earlier for CPUs, network, memory and other resources of the AN, and indicators 6502 of the workload levels at other ANs of the peer group. In the depicted example configuration, AN 6512A may collect peer workload indicators 6502A from ANs 6512B and 6512C, AN 6512B may collect peer workload indicators 6502B from ANs 6512A and 6512C, and AN 6512C may collect peer workload indicators from ANs 6512A and 6512B. The manner in which the workload indicators are collected, and/or the nature or contents of the workload indicators, may differ in different embodiments. In some embodiments, for example, a given AN may simply send a connection establishment query to each of its peers at some selected points in time, and receive a response indicating whether the peer is willing to accept a connection or not. In some embodiments in which connection acceptance decisions may be affected by attempt count parameters as discussed earlier, the connection establishment queries may also include an attempt count parameter (e.g., an attempt count parameter value of "1" may be used). The AN that sends the queries may keep track of how many connections each of the peers was willing to accept during some time interval. In embodiments in which each AN is expected to take its local workload metrics into account when making connection acceptance decisions, the connection acceptance rate may serve as an accurate and easy-to-obtain workload indicator. In other embodiments, the ANs may simply exchange digests or summaries of their local workload metrics periodically or according to some schedule, and such summaries may be used as workload indicators. In some embodiments, workload indicators may be sent only in response to queries, while in other embodiments, workload indicators may be pushed to a peer group member regardless of whether a query was received or not. The specific technique used for sharing workload information may be selected (or modified) in the depicted embodiment such that the total traffic and processing overhead associated with queries/responses 6570 is kept below a threshold.

Each AN of the peer group has some set of established or open connections, such as connections C11, C12, . . . C1n at AN 6512A, connections C21, C22, . . . C2p at AN 6512B, and connections C31, C32, C3n at AN 6512C. The access nodes may each maintain respective connection statistics 6504 on their open connections—e.g., statistics 6504A may be maintained at AN 6512A, statistics 6504B may be maintained at AN 6512B, and statistics 6504C may be maintained at AN 6512C. Connection statistics 6504 maintained for a particular connection Cjk may include, for example, a measure of the age of the connections (e.g., when Cjk was established), the amount and time distribution of traffic on the connection, the number of storage operations (e.g., file opens, reads, writes, etc.) that have been requested on the connection, the sizes of the packets, the number of packets dropped, and so on. If and when an AN determines that a connection is to be closed or disconnected for workload rebalancing, the connection statistics 6504 may be analyzed, and one or more connections may be closed in accordance with a closure target selection criterion that may be based on the statistics. Depending on the network protocol in use, the AN may send the appropriate messages to initiate the disconnection to the client; in some embodiments, an exchange of messages may be required to cleanly close the connection.

In some embodiments, a decision to close a connection may be made at an access node 6512 if both of the following conditions are met: (a) at least one local workload metric 6115 at that access node exceeds a rebalancing threshold and (b) a peer capacity availability criterion derived from the collected workload indicators is met. For example, in one scenario, if at least 70% of the peers of an AN 6512 would be willing to accept a new connection based on the latest available workload indicators, and AN 6512's own workload level has reached a high enough level, AN 6512 may decide to close or drop a selected connection. The local workload-based criterion may be used so that connection rebalance are only attempted when the AN's local resources are heavily utilized (e.g., so heavily utilized that no new connection would be accepted). The peer capacity availability criterion may be taken into account so that, for example, the client at the other end of a closed connection would have a reasonable chance of establishing a connection and continuing its storage service request stream.

If a decision to close some connection (or a plurality of connections) is made, in at least some embodiments the particular connection(s) to be closed may be selected based on an analysis of the connection statistics 6504 as mentioned earlier. For example, in order to avoid oscillation scenarios in which the same client's connections are closed repeatedly at different ANs, connections that have been in existence for longer than some threshold time may be preferred as closure targets. In some embodiments, connections whose traffic has led to greater resource use (e.g., connections that have been used for resource intensive storage operations) may be considered preferred targets for closure, relative to those connections that have led to more modest resource utilization at the AN. The AN may then initiate the closure of the selected connection(s) in accordance with the particular network protocol (e.g., TCP) that is being used. In response to the closure of the connection, the client may try to establish another connection in at least some embodiments. A load balancer node (which may be the same LBN as the one that participated in the establishment of the now-closed connection, or a different LBN) may then issue a connection establishment request in behalf of the client to a selected AN (e.g., belonging to the peer group of the AN that closed the connection). A connection establishment protocol similar to that described earlier may be used until an AN willing to accept the client's connection is found (or until the load balancer reaches the maximum attempt count). If the peer capacity availability criterion used to make the connection rebalancing decision is a good indicator of the willingness of ANs to accept connections, the client may soon be able to establish a new connection to replace the closed connection. In at least some embodiments in which a session-oriented file system is supported, it may even be possible for the client to continue with the same session that was being used before the connection rebalancing, as described below with reference to FIG. 68. In one embodiment, after a particular AN has closed a connection with a particular client C1, if the AN receives a subsequent connection request on behalf of the same client C1 within a re-connection threshold time interval, the connection request may be rejected, e.g., so as to avoid scenarios in which the same client has its connections closed repeatedly.

In one embodiment, a load balancer node may be able to establish a replacement connection transparently with respect to the client—e.g., without the client being informed or made aware that a closing of its connection was initiated by an AN. The load balancer node may be able to detect (e.g., by examining packet headers and/or packet body contents received from the AN) that a rebalancing-related disconnection has been initiated. Upon discovering this, the load balancer node may select a different AN, and initiate establishment a different connection to the different AN without informing or notifying the client. If the load balancer node is able to find an AN that accepts its request, in at least some embodiments, from the client's perspective nothing may appear to have changed (i.e., no effects of the re-balancing may be noticed by the client). In order to achieve such transparency, in some implementations the load balancer and the access subsystem may collectively have to manage connection state information transfer between the AN that initiated the disconnection and the replacement AN.

FIG. 66 illustrates an example of connection acceptance and re-balancing criteria that may be used at an access subsystem node, according to at least some embodiments. In the depicted embodiment, attempt-count based connection acceptance thresholds may be used, in a manner similar to that described earlier. However, it is noted that in at least some embodiments, the connection rebalancing technique used may be orthogonal to the connection acceptance criteria—e.g., connection rebalancing may be used in an embodiment even if the attempt-count based connection acceptance techniques described above are not used.

In the embodiment depicted in FIG. 66, as in some of the examples discussed earlier, the threshold used for different attempt count levels may make it easier for a connection to be accepted as the attempt count value rises. Thus, for example, to reject a connection request with attempt count equal to three, an AN's adjusted CPU load (AL[CPU]) would have to exceed 0.6 times the adjusted CPU capacity (AC[CPU]) and the AN's adjusted network load (AL[net]) would have to exceed 0.6 times the adjusted network capacity (AC [net]). However, to reject a connection request with an attempt count value of four, the adjusted loads for CPU and network would each have to be higher (0.8 times AC[CPU] and 0.8 times AC[net], respectively).

A combination of several factors contributes to the example rebalancing criteria illustrated in FIG. 66. First, the adjusted local load levels for the CPU, the network, or both, must exceed 0.85 times the corresponding adjusted capacity. Second, the adjusted memory load must exceed 0.85 times the adjusted memory capacity. Third, at least 600 seconds must have elapsed since the previous connection was closed at the access node due to rebalancing. And fourth, the estimated probability that a peer access node would be willing to accept a new connection (which may be obtained from the workload indicators collected from peer group members) may have to exceed 70%. Thus, a fairly stringent set of tests may have to be passed before a connection is terminated by an AN in the depicted embodiment.

Figure 67:
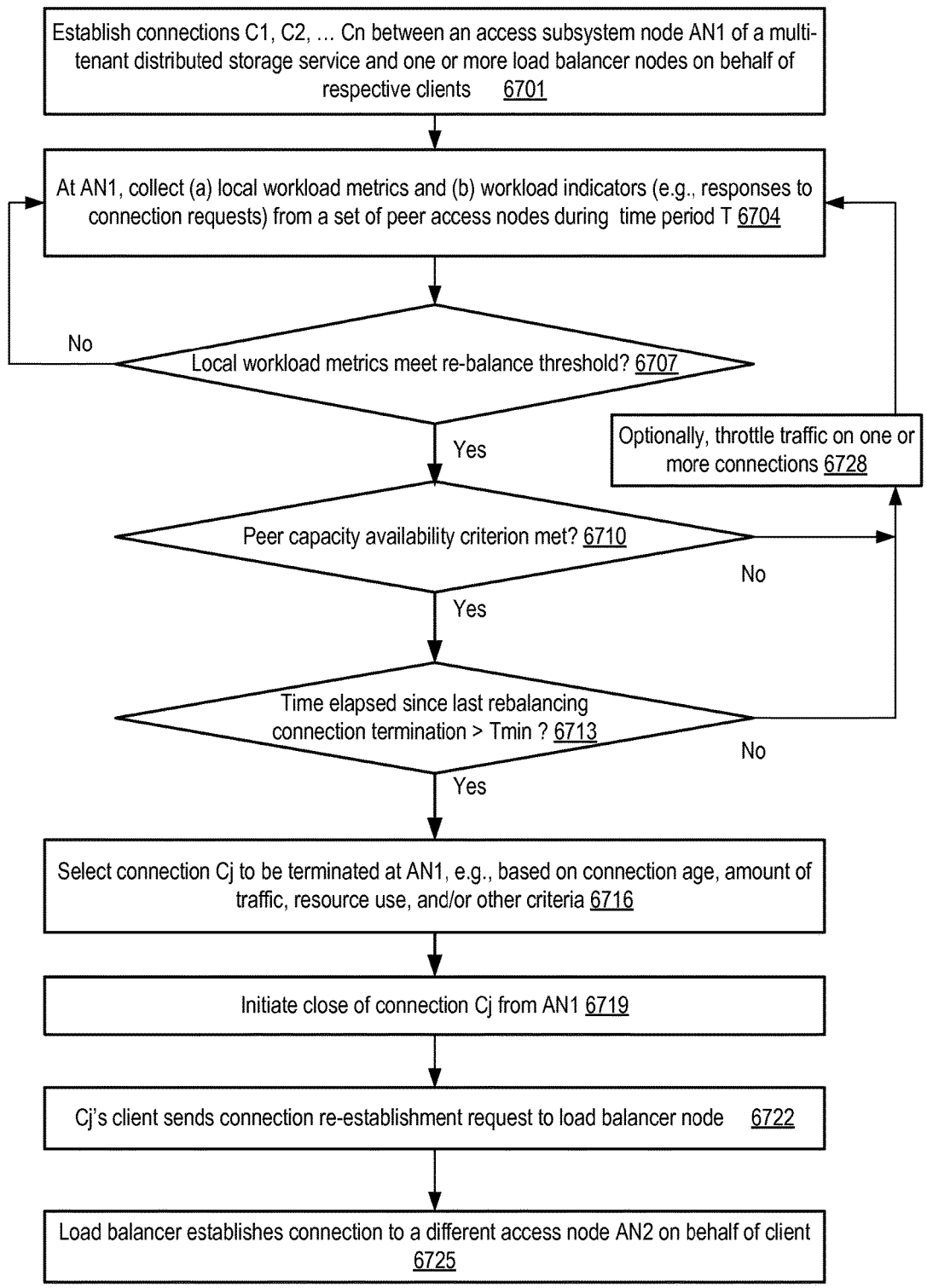
FIG. 67 is a flow diagram illustrating aspects of operations that may be performed at an access subsystem of a distributed storage service to implement connection re-balancing, according to at least some embodiments.

FIG. 67 is a flow diagram illustrating aspects of operations that may be performed at an access subsystem of a distributed storage service to implement connection rebalancing, according to at least some embodiments. As shown in element 6701, a number of network connections C1, C2, Cn may be established between an access node AN1 of a multi-tenant distributed storage subsystem and one or more load balancer nodes (LBNs) on behalf of one or more clients of the service. As described earlier, in some embodiments a set of network addresses (e.g., private virtual IP addresses accessible from within an isolated virtual network of a provider network, or public accessible IP addresses accessible from the Internet) may be configured for the load balancers and exposed to the clients that wish to access the service. In some embodiments, attempt-count based connection acceptance criteria may have been used to set up the connections C1-Cn, while in other embodiments the connections may have been established without taking attempt counts into consideration. In some embodiments, AN1 may comprise a local load balancer module (LLBM) that intercepts and manipulates packets sent by LBNs as described earlier, while in other embodiments AN1 may not include such LLBMs.

During some time period T, AN1 may collect two kinds of workload information (element 6704): local workload information pertaining to resources such as AN's CPU(s), AN's networking modules, and the like, and peer group workload indicators obtained from a number of peer ANs. In some embodiments, AN1 may submit workload-related queries to a selected set of peers (e.g., members of a peer group selected based on the kinds of criteria mentioned earlier), and the workload indicators may be received in response; in other embodiments, the ANs of a peer group may proactively push their workload indicators to each other at various points in time. In some implementations, AN1 may submit a query to a peer AN (e.g., AN-k) from time to time to determine whether AN-k is willing to accept a connection, and AN-k's response may be considered an indicator of AN-k's workload. In at least one implementation, AN1 may send a connection establishment request to AN-k (e.g., instead of sending a query about connection establishment). In some embodiments, an AN may provide a digest or summary of its current local workload estimates periodically to peer ANs, either on demand or proactively. In one embodiment, the workload indicators may be piggybacked on other types of messages exchanged between the ANs, e.g., on administrative messages or heartbeat messages.

Several criteria may have to be met before a connection is selected for termination or closure in the depicted embodiment. AN1 may determine whether its local workload metrics exceed a first re-balancing threshold (element 6707). The local workload metrics may be expressed using adjusted values that take the variation of the raw metrics over time into account in some embodiments, as described earlier with respect to adjusted load (AL) calculations for connection acceptance. The first re-balancing threshold may be expressed in adjusted capacity units for various resources in some embodiments, which set aside some of the native resource capacity as overhead for dealing with possible failures, as also described earlier with respect to adjusted capacities (ACs) used for defining connection acceptance criteria. In other embodiments, different sets of workload metrics and/or resources may be taken into account for re-balancing decisions than are considered for connection acceptance decisions.

If the local workload-based criterion for re-balancing is met, AN1 may determine whether a peer capacity availability criterion has been met (element 6710). The peer capacity availability criterion may be determined based on the workload indicators obtained from the other ANs in the depicted embodiment. In at least some embodiments, meeting the peer availability criterion may indicate that there is a reasonably high probability that if AN1 terminates a connection to a particular client, that client would be able to establish a connection with another AN. For example, in one scenario the peer capacity availability criterion may be met if AN1's own adjusted loads (for some set of selected resources) exceed 90% of the corresponding adjusted capacities, while AN1 can determine using peer workload indicators that at least 75% of the members of its peer group have adjusted loads of less than 40% of the corresponding adjusted capacities and would therefore be likely to accept new connections. It is noted that at least in some embodiments, the most recent workload indicator available at AN1 for a given peer AN-k may represent AN-k's state as of some previous point in time, and that different workload indicators may represent different points in time. In such embodiments, the peer capacity availability determination may therefore be based on approximate rather than exact data.

If the local workload criterion for re-balancing and the peer capacity availability criteria are met, in the depicted embodiment AN1 may also determine whether any of its connections were closed for re-balancing purposes within the last Tmin units of time (element 6713). For example, in the scenario illustrated in FIG. 66, Tmin was set to 600 seconds. If time greater than the minimum threshold setting Tmin has expired since a previous rebalancing-related connection termination (or if this is the first re-balancing being attempted at AN1), a particular connection Cj may be chosen for termination (element 6716) based on a closure target selection policy. The target selection policy may take various factors into account such as the age of the connection (connections that were more recently established may be less likely to be selected in some embodiments to avoid oscillating behavior), the amount of traffic on the connection, the amount of usage of various AN resources (e.g., CPU, memory, etc.) associated with the connection, and so on. In some embodiments AN1 may utilize the connection statistics 6504 to select a closure target.

The termination or closing of the selected target connection may be initiated from AN1 in the depicted embodiment (element 6719), e.g., in accordance with the appropriate connection termination syntax of the networking protocol in use. Upon determining that the connection has been dropped/closed, the client on whose behalf Cj was established may submit another connection establishment request to a selected LBN (element 6722). The LBN may accordingly establish a connection, e.g., with some other AN, e.g., AN2 on behalf of the client (element 6725). It is noted that, depending on the connection acceptance criteria in use and on the changes in AN1's workload, this new connection may in some situations be accepted by AN1 itself.

In the embodiment depicted in FIG. 67, if the local workload-based rebalancing threshold is not met (as detected in element 6707), AN1 may continue its regular operations, collecting local and peer workload information for subsequent time periods as indicated in element 6704. If one of the other two conditions for re-balancing are not met—e.g., if the peer capacity availability criterion is not met (element 6710) or insufficient time has elapsed since the last connection was terminated for re-balancing—AN1 may take some additional actions in the depicted embodiment to deal with its excessive workload. For example, as shown in element 6728, AN1 may optionally start throttling one or more of its open connections, e.g., by delaying the processing of selected packets, or by dropping packets. Of course, depending on the nature of the networking protocol in use, such actions may in some cases lead to retransmissions from the client, and may not be of much immediate help, at least until enough time elapses that a connection can be selected for termination. In another embodiment, if the local workload-based rebalancing threshold of element 6707 is met, AN1 may close a selected connection even if at least one of the other two conditions (corresponding to elements 6710 and 6713) is not met. It is noted that the three conditions that are considered to determine whether to close a connection in FIG. 67 may be checked in a different order than that shown in some embodiments, e.g., in some embodiments it may be the case that the time that has elapsed since the previous termination may be checked first, or that the peer capacity availability may be checked first.

Figure 68:
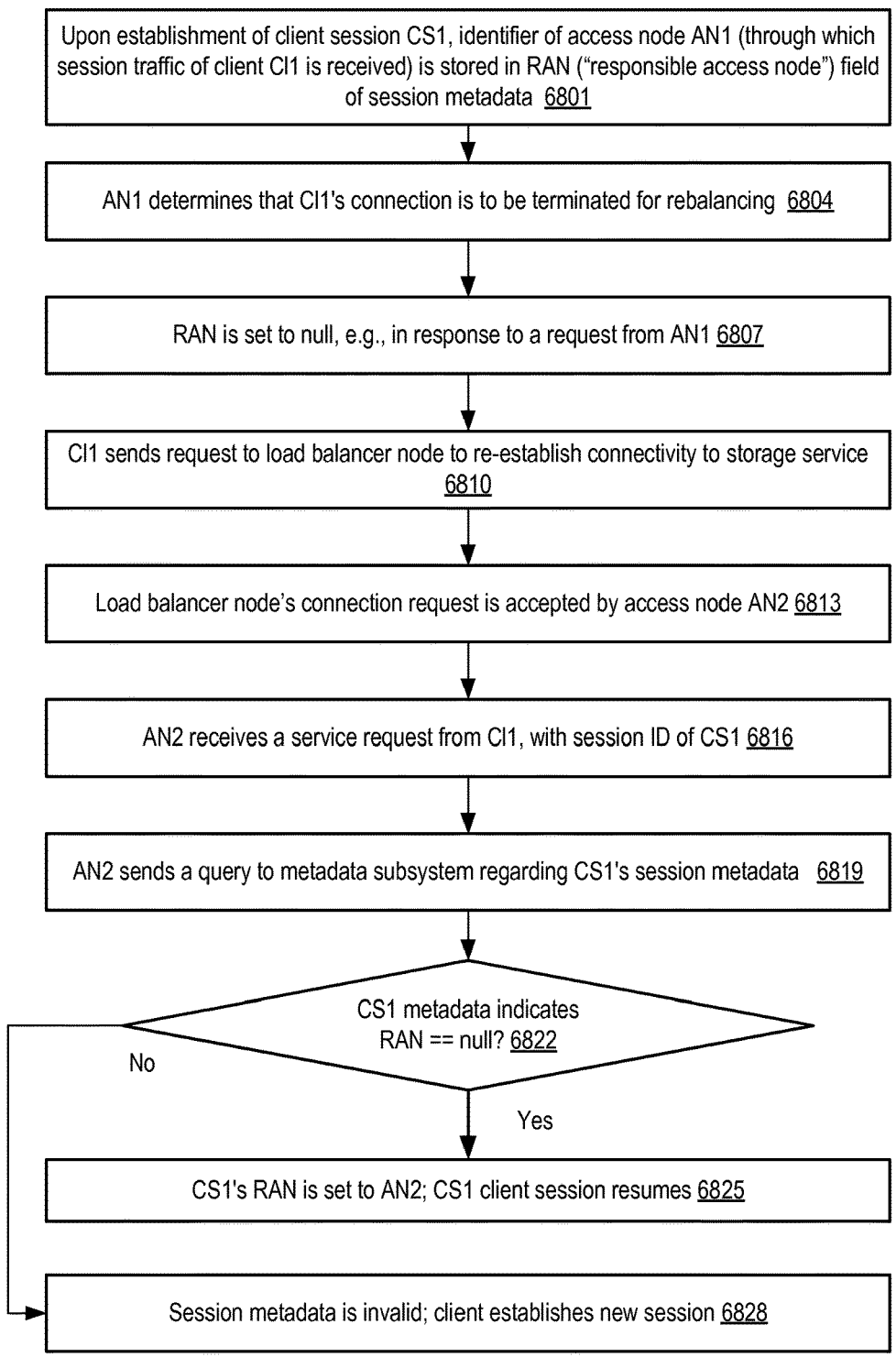
FIG. 68 is a flow diagram illustrating aspects of operations that may be performed at a distributed storage service to preserve client sessions across connection re-balancing events, according to at least some embodiments.

In some embodiments, at least one of the file system protocols supported at a distributed storage service may be session-oriented as described earlier, e.g., session identifiers may be generated for clients and associated with resource leases and/or locks. The termination of a client connection for rebalancing may result in undesired session termination in such embodiments unless proactive preventive steps are taken. FIG. 68 is a flow diagram illustrating aspects of operations that may be performed at a distributed storage service to preserve client sessions across connection re-balancing events, according to at least some embodiments. When a client session CS1 is established for a client C11, e.g., in response to an explicit session establishment request or when the client C11 issues a particular type of storage request, corresponding session metadata may be stored by or at a metadata subsystem node of the service which receives the session establishment request from a particular AN. As shown in element 6801, that session metadata may include a field identifying the particular access node that is being used for CS1 (e.g., the AN that submitted the session establishment request to the metadata node and is intended to be used for subsequent storage requests from C11). As also illustrated in FIG. 55, such a field may be referred to as the "responsible access node" (RAN) field. The client C11 may specify a session identifier (e.g., an NFS "ClientID" parameter) that is generated as part of the session metadata in its subsequent storage-related requests sent via AN1.

As shown in element 6804, AN1 may subsequently determine that C11's connection is to be terminated/closed for rebalancing, e.g., using the kinds of re-balancing criteria discussed above. Accordingly, the RAN field of the session metadata may be set to "null" (or to some other value indicating that no AN is responsible) (element 6807). The change to the metadata may be performed by the metadata node at the request of AN1 in some embodiments. The connection may be terminated at the initiative of AN1.

Eventually, after C11 realizes that the connection is closed, C11 may send another request, e.g., to a load balancer node, to try to re-establish connectivity to the storage service (element 6810). A different access node (AN2) may respond to the connection establishment request submitted on behalf of C11 by the LBN to accept the connection (element 6813). Client C11 may submit a storage service request (e.g., an open( ), read( ) or write( )) with the same session identifier that it was using prior to the connection's termination (element 6816). AN2 may receive such a storage service request, and send a query to the metadata subsystem to determine the status of the metadata corresponding to the client-specified session identifier (element 6819). If the metadata subsystem is able to find session metadata for the specified session identifier, and if the RAN field of that metadata is set to "null" (as detected in element 6822), this may indicate to AN2 that it is acceptable for AN2 to continue CL1's session with the existing metadata, and to assume responsibility for C11's session. Accordingly, the RAN field of CS1's metadata may be set to AN2's identifier (element 6825) and CS1 may be resumed. Otherwise, if for some reason CST's metadata records are not found, or if the RAN field in CS1's metadata was not set to "null", a new session may be created for the client (element 6828) in the depicted embodiment. Establishing the new session may involve the acquisition of one or more locks/leases in at least some embodiments, and may in such embodiments require more resources than if the current session could be resumed with AN2 as the responsible access node.

It is noted that in various embodiments, operations other than those illustrated in the flow diagrams of FIGS. 8a, 8b, 9, 10, 15, 20, 21, 22, 23, 27, 28, 32, 38, 41, 42, 43, 44, 51, 52, 53, 58, 59, 64, 67 and 68 may be used to implement the distributed file storage service techniques described above. Some of the operations shown may not be implemented in some embodiments, or may be implemented in a different order, or in parallel rather than sequentially. In at least some embodiments, the techniques described above may be used for managing workload variations at other types of storage services than file stores—e.g., similar techniques may be used for storage devices that expose volume-level block storage interfaces, unstructured storage devices that allow arbitrary storage objects to be accessed using web service interfaces rather than file system interfaces, or for accessing tables or partitions of relational or non-relational databases.

Use Cases

The techniques described above, of implementing highly scalable, available and durable file storage systems that support one or more industry-standard file system interfaces may be useful in a number of scenarios and for a variety of customers. Many customers of provider networks have already migrated several of their applications to the cloud to take advantage of the enormous amount of computing power that can be harnessed. However, several constraints may remain for such applications with respect to the ability to store very large amounts of data (e.g., petabytes) within a single file, and then to access the file from large numbers of clients concurrently without impacting performance. Scalability constraints may also remain with respect to file system directory hierarchies—e.g., the number of objects a given directory can store and the number of levels a directory hierarchy may contain. The ability to seamlessly add nodes to the various file storage service subsystems, such as the access subsystem, the metadata subsystem and the storage subsystem may help alleviate such scalability limitations. The logical separation of the metadata from the data may help achieve desired distinct levels of performance, availability and durability for both metadata and data, without imposing the requirements of the metadata (which may have more stringent needs) on the data. For example, metadata may be preferentially stored on SSDs, while data may be accommodated on less expensive rotating disk-based devices. Other storage systems in provider network environments may not support the familiar file system interfaces and the consistency semantics of the kinds that many applications are designed to rely on.

The optimistic concurrency control mechanisms described, including the conditional write mechanism for single-page writes and the distributed transaction scheme for multi-page writes, may help to avoid some of the types of bottlenecks that typically arise when more traditional locking-based schemes are used. Extent oversubscription and variable stripe sizing may be used to manage tradeoffs between space utilization efficiency and metadata size. The offset-based congestion control techniques may help improve overall I/O performance for certain types of applications, e.g., applications in which a given configuration file may have to be read by large numbers of concurrent client threads at application startup. The object renaming technique may help ensure file system consistency in the event of metadata node failures that may inevitably arise in large distributed file stores. The namespace management techniques discussed earlier may be used to implement file systems with millions of objects (even within a single directory) while maintaining relatively flat response times as the number of objects increases. The client session management caching and lease renewal techniques may help keep session-related overhead low. The load balancing and rebalancing approaches may help to reduce the likelihood of overload-induced failures.

Illustrative Computer System

Figure 69:
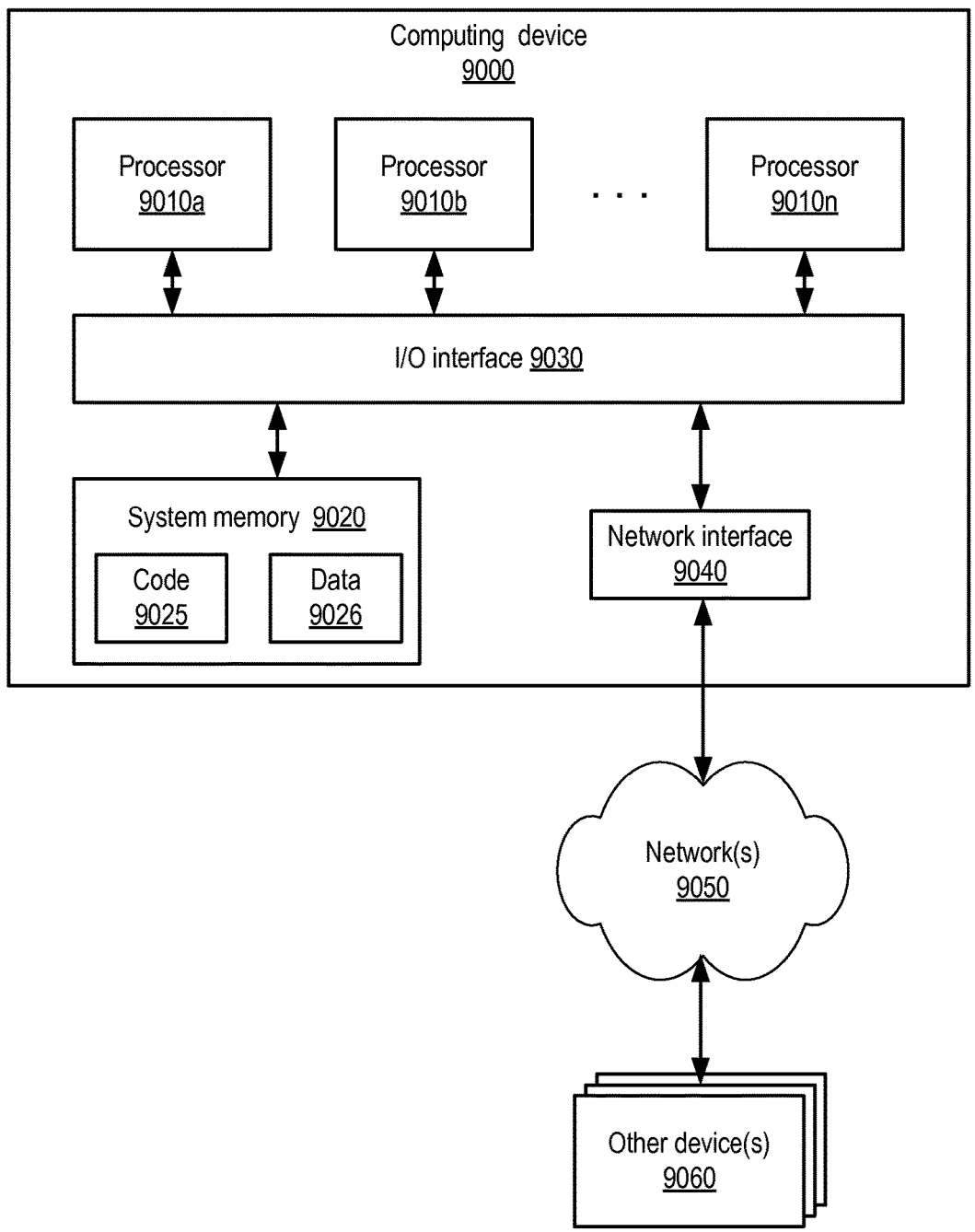
FIG. 69 is a block diagram illustrating an example computing device that may be used in at least some embodiments.

In at least some embodiments, a server that implements a portion or all of one or more of the technologies described herein, including the techniques to implement the components of the access, metadata and storage subsystems of the distributed file storage service and/or load balancer nodes may include or is configured to access one or more computer-accessible media. FIG. 69 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices used to store physical replicas of data object partitions. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 68, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 68 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 69 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices configured to:
receive, at an access subsystem of a distributed multi-tenant file storage service, a request to establish a client session for file store operations on behalf of a particular client, wherein subsequent file store requests in the client session are to be received via the access subsystem;
transmit, from the access subsystem to a metadata subsystem of the file storage service, a request to initialize the client session;
provide, to the access subsystem, a session identifier generated by the metadata subsystem based at least in part on a persistent session storage location at which one or more elements of metadata of the client session are stored, wherein the one or more elements include an indication of a lease associated with the client session;
cache, at the access subsystem, the session identifier generated by the metadata subsystem and an indication of the lease, prior to a transmission of the session identifier to the particular client;
receive, by the access subsystem, a different request from the client accessing a particular file store object, wherein the different request comprises the session identifier;
provide, to the access subsystem, a lock state indicator associated with the particular file store object and generated in response to the different request, wherein the lock state indicator is stored at a persistent lock storage location determined by the metadata subsystem, and the lock state indicator comprises the session identifier;
cache, at the access subsystem, the lock state indicator;
utilize, at the access subsystem, the cached session identifier, the cached indication of the lease, and the cached lock state indicator to respond to a service request from the client directed to the particular file store object; and
in response to a determination that a timeout associated with the lease has expired, delete (a) the lock state indicator from the persistent lock storage location, and (b) the session identifier from the persistent session storage location.

2. The system as recited in claim 1, wherein the one or more computing devices are further configured to:
determine, at the access subsystem, that the different request received from the particular client belongs to a category of lease-renewing operations; and
initiate a renewal of the lease.

3. The system as recited in claim 2, wherein to initiate the renewal of the lease, the one or more computing devices are further configured to:
determine, at the access subsystem in response to the different request, that the lease is due to expire after a time period greater than a threshold time period; and
combine, within a single batched lease renewal request to the metadata subsystem, a plurality of requests to renew respective leases associated with respective client sessions.

4. The system as recited in claim 1, wherein said access subsystem comprises a plurality of access nodes including a particular access node at which the request to establish the client session is received, wherein the one or more computing devices are further configured to:
store, within a particular element of the one or more elements of metadata stored at the persistent session storage location, an identifier of the particular access node.

5. The system as recited in claim 1, wherein the session identifier and the lock state indicator are formatted in accordance with one of: (a) a version of NFS (Network File System) or (b) a version of SMB (Server Message Block).

6. A method, comprising:
performing, by one or more computing devices:
receiving, at an access subsystem of a distributed file storage service, a request to establish a client session for file store operations on behalf of a particular client, wherein subsequent file store requests in the client session are to be received via the access subsystem;
transmitting, from the access subsystem to a metadata subsystem of the distributed file storage service, a request to initialize the client session;
receiving, at the access subsystem, a session identifier for the client session generated by the metadata subsystem based at least in part on a persistent session storage location at which one or more elements of metadata of the client session are stored;
caching the session identifier generated by the metadata subsystem at the access subsystem prior to a transmission of the session identifier to the particular client;
receiving, at the access subsystem, a particular request from the client, for which a lock is to be obtained on a particular file store object, wherein the particular request includes the session identifier;
determining, at the metadata subsystem, that a conflicting lock state indicator associated with the particular file store object has been created on behalf of a different client; and
rejecting the particular request.

7. The method as recited in claim 6, further comprising performing, by the one or more computing devices:
receiving, at the access subsystem, another request from the client, for which another lock is to be obtained on a different file store object, wherein the other request comprises the session identifier;
determining, at the metadata subsystem, a persistent lock storage location at which to store a lock state indicator associated with the different file store object, wherein the lock state indicator comprises the session identifier;
caching, at the access subsystem, the lock state indicator; and
utilizing, at the access subsystem, the cached session identifier and the cached indication of the lock state indicator to respond to an additional request from the client.

8. The method as recited in claim 7, wherein the one or more elements of metadata comprise an indication of a lease associated with the client session, and further comprising performing, by the one or more computing devices:
caching, at the access subsystem, the indication of the lease.

9. The method as recited in claim 7, further comprising performing, by the one or more computing devices:

determining, at the access subsystem, that the other request belongs to a category of lease-renewing operations associated with the file store object; and initiating a renewal of the lease.

10. The method as recited in claim 9, wherein said initiating the renewal of the lease comprises:

determining, at the access subsystem in response to the other request, that the lease is due to expire after a time period greater than a threshold time period; and combining, within a single batched lease renewal request to the metadata subsystem, a plurality of requests to renew respective leases associated with respective client sessions.

11. The method as recited in claim 9, wherein said initiating the renewal of the lease comprises:

determining, at the access subsystem as part of an operation performed in response to the other request, that the lease is due to expire after a time period smaller than a threshold time period; and transmitting an un-batched lease renewal request to the metadata subsystem.

12. The method as recited in claim 7, further comprising performing, by the one or more computing devices:

configuring a first validity expiration timeout setting for the session identifier at the access subsystem cache;

configuring a second validity expiration timeout for the session identifier at the metadata subsystem, wherein the first validity expiration timeout is smaller than the second validity expiration timeout.

13. The method as recited in claim 12, wherein in accordance with a file system protocol being used for the client session, a particular lease timeout is associated with the client session, wherein the second validity expiration timeout is greater than the particular lease timeout, and wherein the first validity expiration timeout is based at least in part on a difference between the second validity expiration timeout and the particular lease timeout.

14. The method as recited in claim 7, wherein said access subsystem comprises a plurality of access nodes including a particular access node, and further comprising performing, by the one or more computing devices:

receiving, at the particular access node, prior to said transmitting the request for a session identifier to the metadata subsystem, a request to establish the client session from the particular client; and storing, within a particular element of the one or more elements of metadata stored at the persistent session storage location, an identifier of the particular access node.

15. The method as recited in claim 14, further comprising performing, by the one or more computing devices:

determining, at the particular access node based on a workload balancing analysis, that a network connection used for the request to establish the client session is to be closed; and removing, from the particular element of metadata, the identifier of the particular access node.

16. The method as recited in claim 7, wherein the different file store object belongs to a first file store, further comprising performing, by the one or more computing devices:

designating, for the first file store, a persistent storage object in which lock state indicators for a plurality of objects of the file store are to be stored, wherein said determining, at the metadata subsystem, of the persistent lock storage location comprises identifying a particular portion of the persistent storage object at which to store the lock state indicator.

17. The method as recited in claim 6, wherein the session state identifier and the lock state indicator are formatted in accordance with one of: (a) a version of NFS (Network File System) or (b) a version of SMB (Server Message Block).

18. A non-transitory computer-accessible storage medium storing program instructions that when executed on one or more processors:

receive, at an access subsystem of a distributed file storage service, a request to establish a client session for file store operations on behalf of a particular client, wherein subsequent file store requests in the client session are to be received via the access subsystem;

transmit, from the access subsystem to a metadata subsystem of the distributed file storage service, a request to initialize the client session;

receive, at the access subsystem, a session identifier for the client session generated by the metadata subsystem based at least in part on a persistent session storage location at which one or more elements of metadata of the client session are stored;

cache the session identifier generated by the metadata subsystem at the access subsystem prior to a transmission of the session identifier to the particular client;

receive, at the access subsystem, a lock state indicator of a file store object from the metadata subsystem, wherein the lock state indicator is generated at the metadata subsystem in response to a particular request from the client during the client session;

cache, at the access subsystem, the lock state indicator; and determine a response, at the access subsystem, to another request from the client directed to the particular file store object based at least in part on the cached session identifier and the cached indication of the lock state indicator.

19. The non-transitory computer-accessible storage medium as recited in claim 18, wherein the one or more elements of metadata comprise an indication of a lease associated with the client session, wherein the instructions when executed on the one or more processors:

cache, at the access subsystem, the indication of the lease.

20. The non-transitory computer-accessible storage medium as recited in claim 19, wherein the instructions when executed on the one or more processors:

determine, at the access subsystem, that the other request belongs to a category of lease-renewing operations associated with the file store object; and initiate a renewal of the lease from the access subsystem.

21. The non-transitory computer-accessible storage medium as recited in claim 20, wherein to initiate the renewal of the lease, the instructions when executed on the one or more processors:

determine, at the access subsystem in response to the other request, that the lease is due to expire after a time period greater than a threshold time period; and combine, within a single batched lease renewal request to the metadata subsystem, a plurality of requests to renew respective leases associated with respective client sessions.

22. The non-transitory computer-accessible storage medium as recited in claim 19, wherein the session state identifier and the lock state indicator are formatted in accordance with one of: (a) a version of NFS (Network File System) or (b) a version of SMB (Server Message Block).

* * * * *